US010310088B2

(12) United States Patent
Elooz et al.

(10) Patent No.: US 10,310,088 B2
(45) Date of Patent: Jun. 4, 2019

(54) DYNAMIC ILLUMINATION ALLOCATION IN HIGHWAY DRIVING

(71) Applicant: Innoviz Technologies Ltd., Kfar Saba (IL)

(72) Inventors: David Elooz, Kfar Ha'Ro'E (IL); Amit Steinberg, Adanim (IL); Nir Osiroff, Givatayim (IL); Oren Rosenzweig, Tel Aviv (IL)

(73) Assignee: INNOVIZ TECHNOLOGIES LTD., Kfar Saba (IL)

( * ) Notice: Subject to any disclaimer, the term of this patent is extended or adjusted under 35 U.S.C. 154(b) by 0 days.

(21) Appl. No.: 15/861,110

(22) Filed: Jan. 3, 2018

(65) Prior Publication Data

US 2018/0143306 A1 May 24, 2018

Related U.S. Application Data

(63) Continuation of application No. PCT/IB2017/001320, filed on Sep. 20, 2017.
(Continued)

(51) Int. Cl.
*G01S 17/89* (2006.01)
*G01S 17/93* (2006.01)
(Continued)

(52) U.S. Cl.
CPC ............ *G01S 17/89* (2013.01); *B60Q 1/0023* (2013.01); *B60Q 1/26* (2013.01); *G01S 7/484* (2013.01);
(Continued)

(58) Field of Classification Search
CPC ...... G01S 7/4817; G01S 7/484; G01S 17/936; G01S 7/4811; G01S 17/42; G01S 7/4865;
(Continued)

(56) References Cited

U.S. PATENT DOCUMENTS 5,784,023 A 7/1998 Bluege
8,493,445 B2 7/2013 Degnan, III et al.
(Continued)

FOREIGN PATENT DOCUMENTS

CN 102565808 7/2012
WO WO 2011/144454 A1 11/2011
(Continued)

OTHER PUBLICATIONS

U.S. Appl. No. 15/391,916, filed Dec. 28, 2016.
(Continued)

*Primary Examiner* — Luke D Ratcliffe
(74) *Attorney, Agent, or Firm* — Finnegan, Henderson, Farabow, Garrett & Dunner, LLP

(57) ABSTRACT

A LIDAR system for use with a roadway vehicle traveling on a highway may include at least one processor configured to control at least one light source in a manner enabling light flux of light from at least one light source to vary over a scanning cycle of a field of view. The processor may also be configured to control at least one deflector to deflect light from the at least one light source in order to scan the field of view. The processor may also be configured to coordinate the control of the at least one light source with the control of the at least one light deflector such that during scanning of the field of view that encompasses a central region, a right peripheral region, and a left peripheral region, more light is directed to the central region than to the peripheral regions.

34 Claims, 108 Drawing Sheets

Related U.S. Application Data

(60) Provisional application No. 62/521,450, filed on Jun. 18, 2017, provisional application No. 62/441,574, filed on Jan. 3, 2017, provisional application No. 62/441,583, filed on Jan. 3, 2017, provisional application No. 62/441,581, filed on Jan. 3, 2017, provisional application No. 62/425,089, filed on Nov. 22, 2016, provisional application No. 62/422,602, filed on Nov. 16, 2016, provisional application No. 62/418,298, filed on Nov. 7, 2016, provisional application No. 62/414,740, filed on Oct. 30, 2016, provisional application No. 62/412,294, filed on Oct. 25, 2016, provisional application No. 62/405,928, filed on Oct. 9, 2016, provisional application No. 62/397,379, filed on Sep. 21, 2016, provisional application No. 62/396,864, filed on Sep. 20, 2016, provisional application No. 62/396,863, filed on Sep. 20, 2016, provisional application No. 62/396,858, filed on Sep. 20, 2016.

(51) Int. Cl.
| | | |
|---|---|---|
| *G01S 17/10* | (2006.01) | |
| *G01S 7/486* | (2006.01) | |
| *G01S 7/487* | (2006.01) | |
| *G01S 17/42* | (2006.01) | |
| *G01S 7/48* | (2006.01) | |
| *G01S 7/497* | (2006.01) | |
| *G01S 17/02* | (2006.01) | |
| *G01S 7/481* | (2006.01) | |
| *G05D 1/02* | (2006.01) | |
| *G08G 1/04* | (2006.01) | |
| *G08G 1/16* | (2006.01) | |
| *B60Q 1/00* | (2006.01) | |
| *B60Q 1/26* | (2006.01) | |
| *G01S 7/484* | (2006.01) | |

(52) U.S. Cl.
CPC .......... *G01S 7/4808* (2013.01); *G01S 7/4814* (2013.01); *G01S 7/4815* (2013.01); *G01S 7/4817* (2013.01); *G01S 7/4861* (2013.01); *G01S 7/4863* (2013.01); *G01S 7/4868* (2013.01); *G01S 7/4876* (2013.01); *G01S 7/497* (2013.01); *G01S 7/4972* (2013.01); *G01S 17/026* (2013.01); *G01S 17/10* (2013.01); *G01S 17/42* (2013.01); *G01S 17/93* (2013.01); *G01S 17/936* (2013.01); *G05D 1/024* (2013.01); *G08G 1/04* (2013.01); *G08G 1/166* (2013.01); *G05D 2201/0213* (2013.01)

(58) Field of Classification Search
CPC .......... G01S 17/10; G01S 17/89; G01S 17/36; G01S 7/003; G01S 7/4802; G01S 7/4813; G01S 17/026

See application file for complete search history.

(56) References Cited

U.S. PATENT DOCUMENTS

| | | | |
|---|---|---|---|
| 9,007,600 B2 | 4/2015 | Imaki et al. | |
| 9,121,703 B1 | 9/2015 | Droz et al. | |
| 9,128,190 B1 | 9/2015 | Ulrich et al. | |
| 9,310,471 B2 | 4/2016 | Sayyah et al. | |
| 9,368,936 B1 | 6/2016 | Lenius et al. | |
| 9,651,417 B2 | 5/2017 | Shpunt et al. | |
| 9,789,808 B1 * | 10/2017 | Hong | B60Q 1/085 |
| 2010/0271614 A1 | 10/2010 | Albuquerque et al. | |
| 2011/0285981 A1 | 11/2011 | Justice et al. | |
| 2013/0293681 A1 | 11/2013 | Borowski | |
| 2015/0192676 A1 | 7/2015 | Kotelnikov et al. | |
| 2015/0378012 A1 | 12/2015 | Sayyah et al. | |
| 2016/0049765 A1 | 2/2016 | Eldada | |
| 2016/0071416 A1 | 3/2016 | Kim et al. | |
| 2016/0327635 A1 | 11/2016 | Scheim et al. | |
| 2017/0205873 A1 | 7/2017 | Shpunt et al. | |
| 2017/0299700 A1 | 10/2017 | Pacala et al. | |
| 2018/0059248 A1 * | 3/2018 | O'Keeffe | G01S 7/4817 |

FOREIGN PATENT DOCUMENTS

| | | |
|---|---|---|
| WO | WO 2015/126471 A2 | 8/2015 |
| WO | WO 2015/199735 A1 | 12/2015 |
| WO | WO 2016/025908 A2 | 2/2016 |
| WO | WO 2017/079483 A1 | 5/2017 |
| WO | WO 2017/095817 A1 | 6/2017 |

OTHER PUBLICATIONS

U.S. Appl. No. 15/393,749, filed Dec. 29, 2016.
U.S. Appl. No. 15/393,285, filed Dec. 29, 2016.
U.S. Appl. No. 15/393,593, filed Dec. 29, 2016.

* cited by examiner

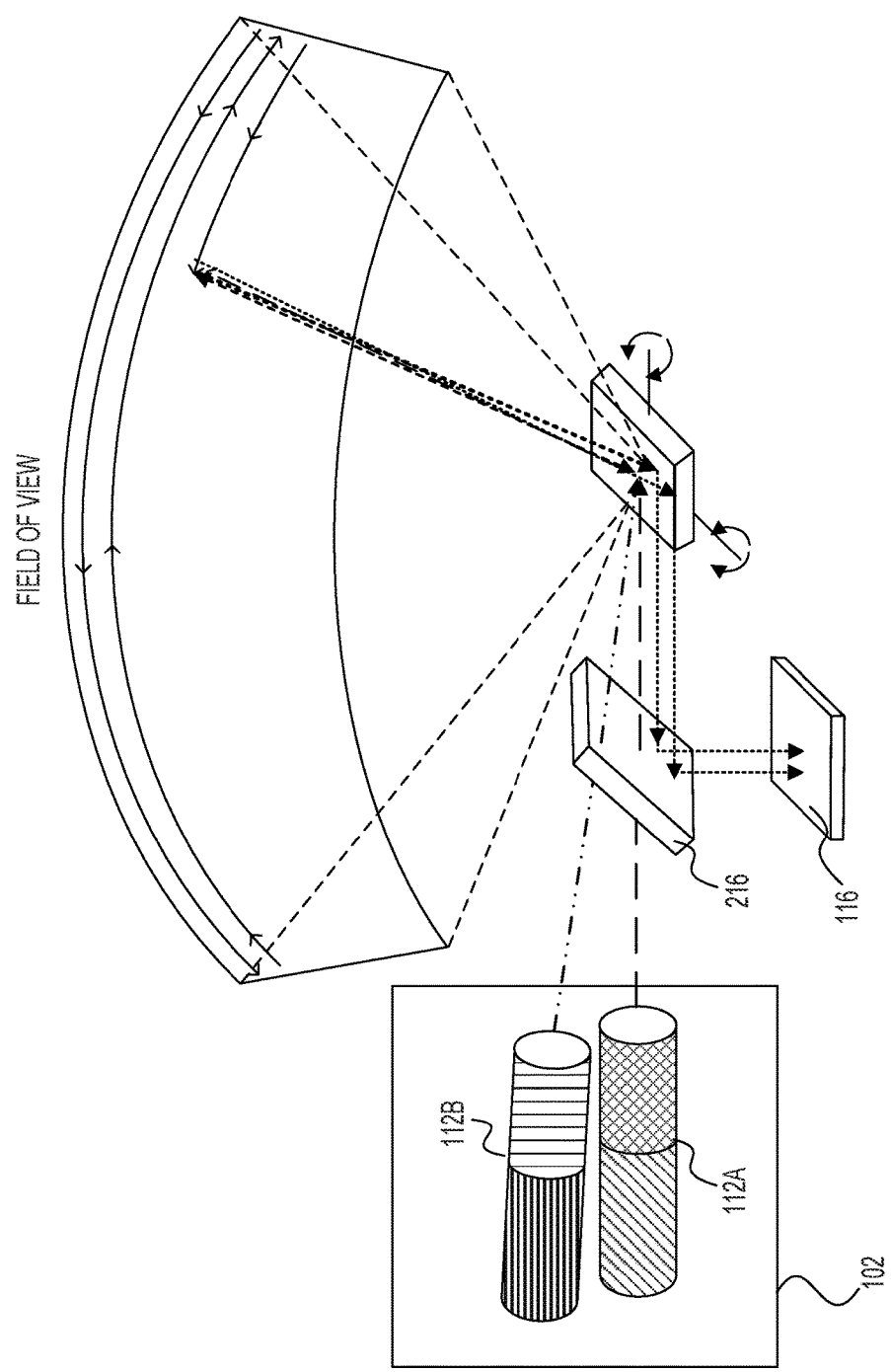

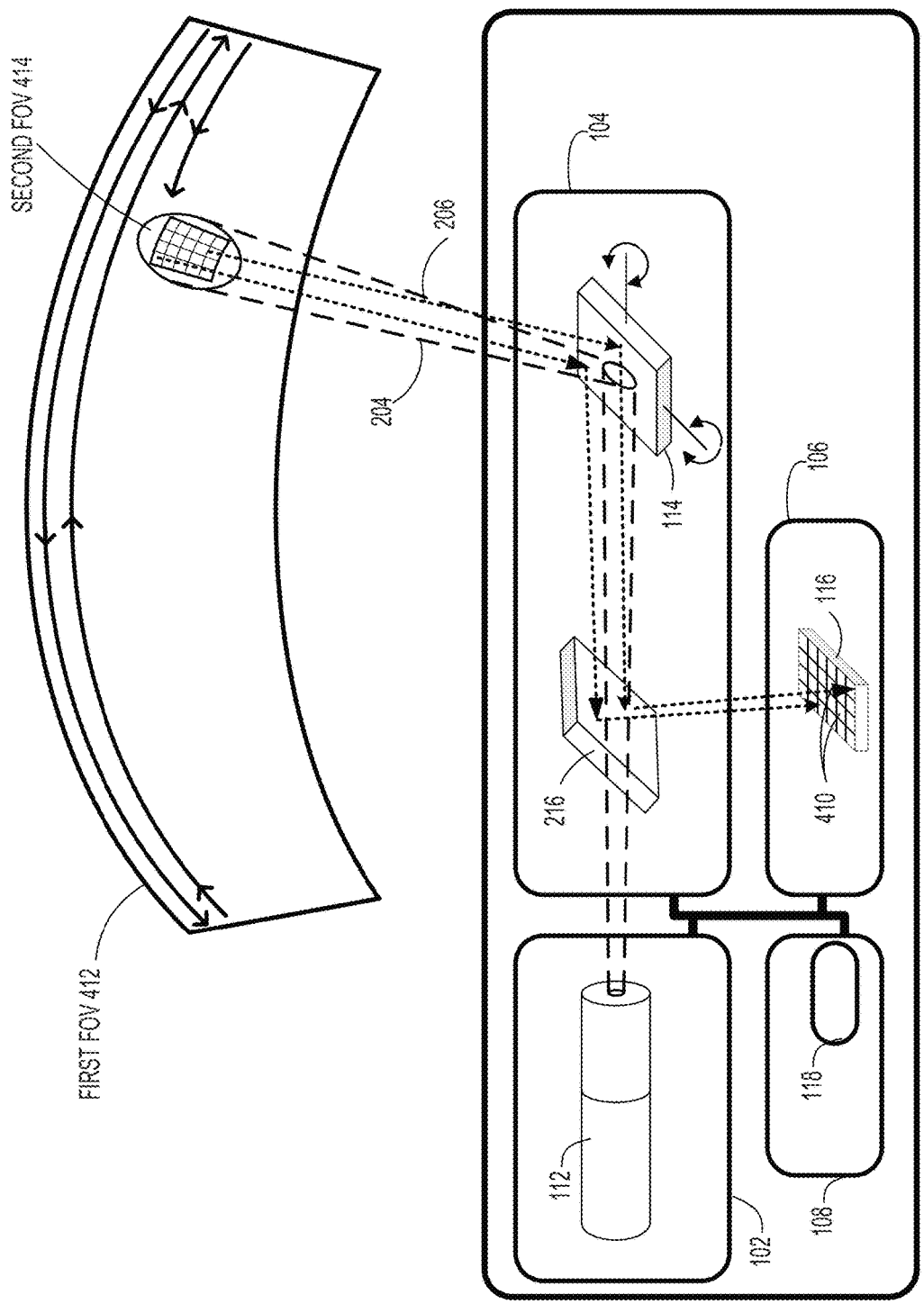

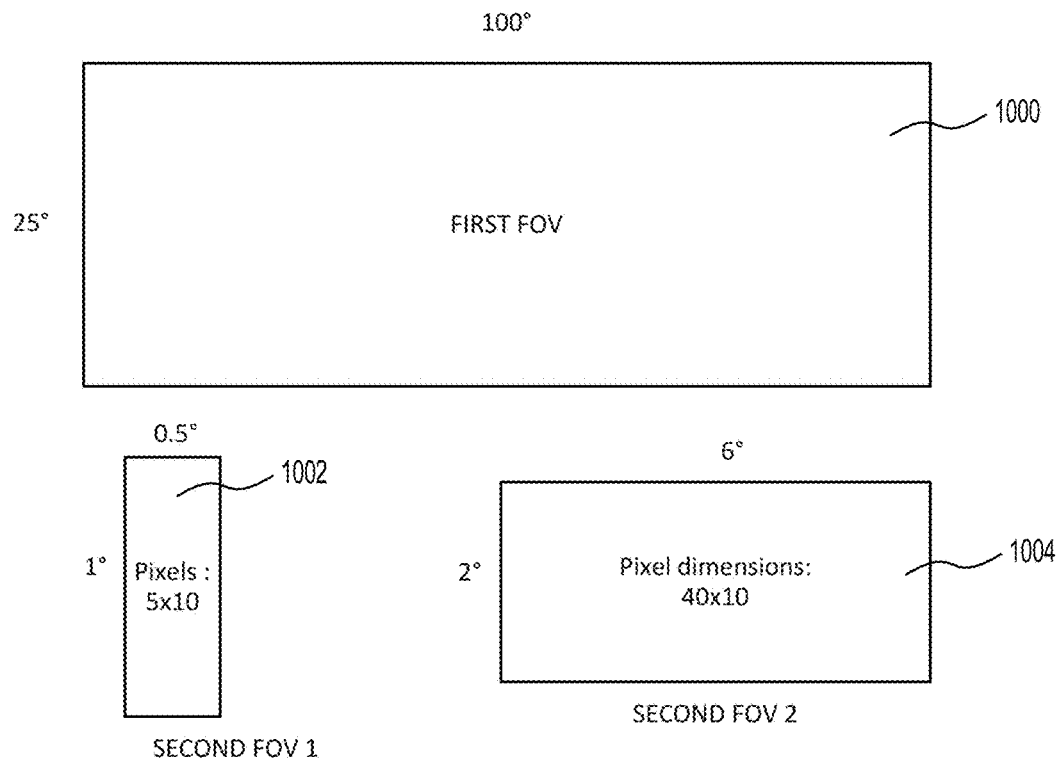
FIG. 10A
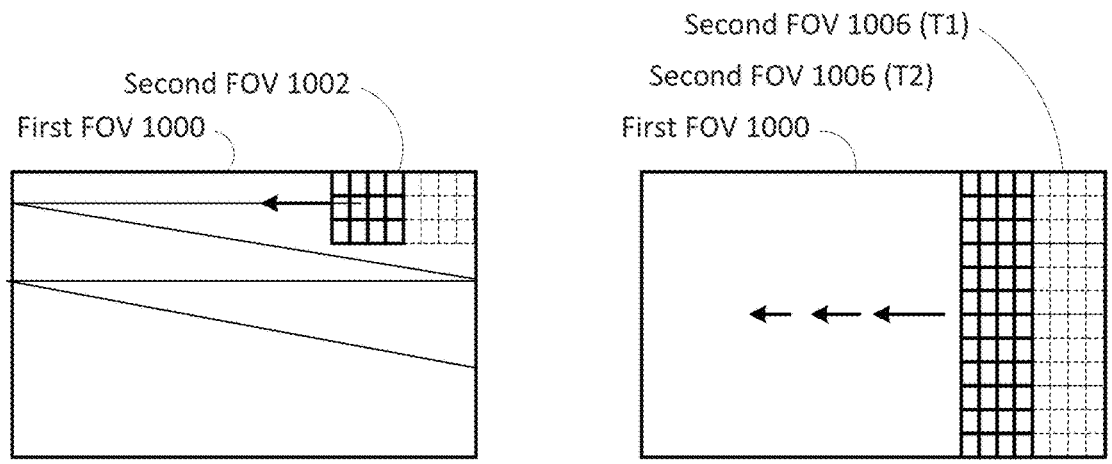
FIG. 10B  FIG. 10C

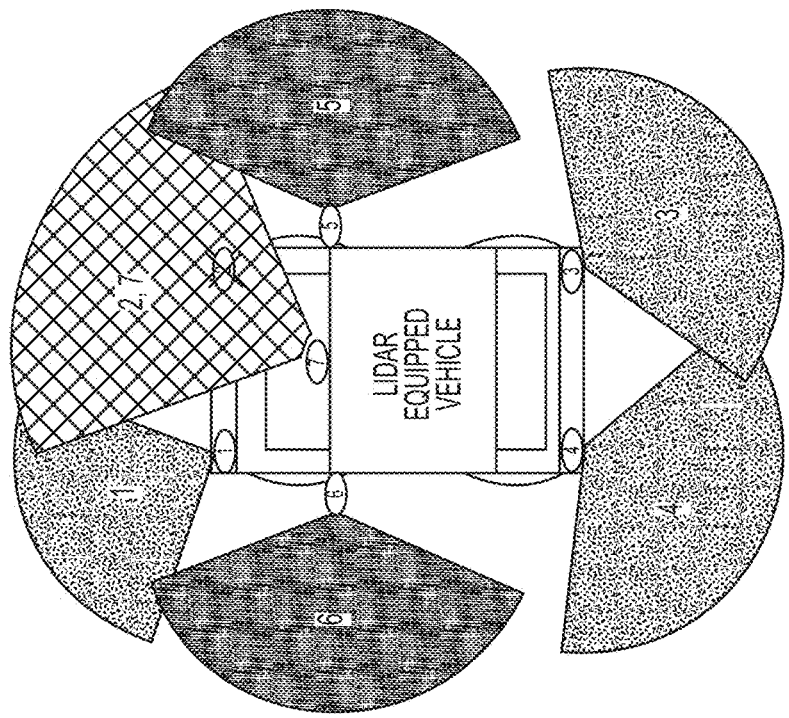
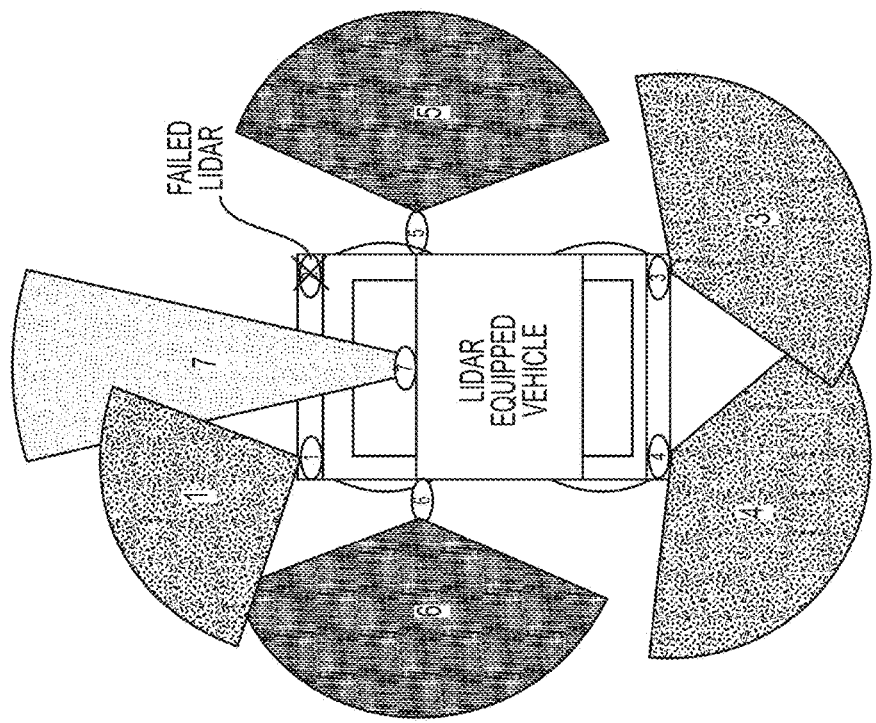
FIG. 31

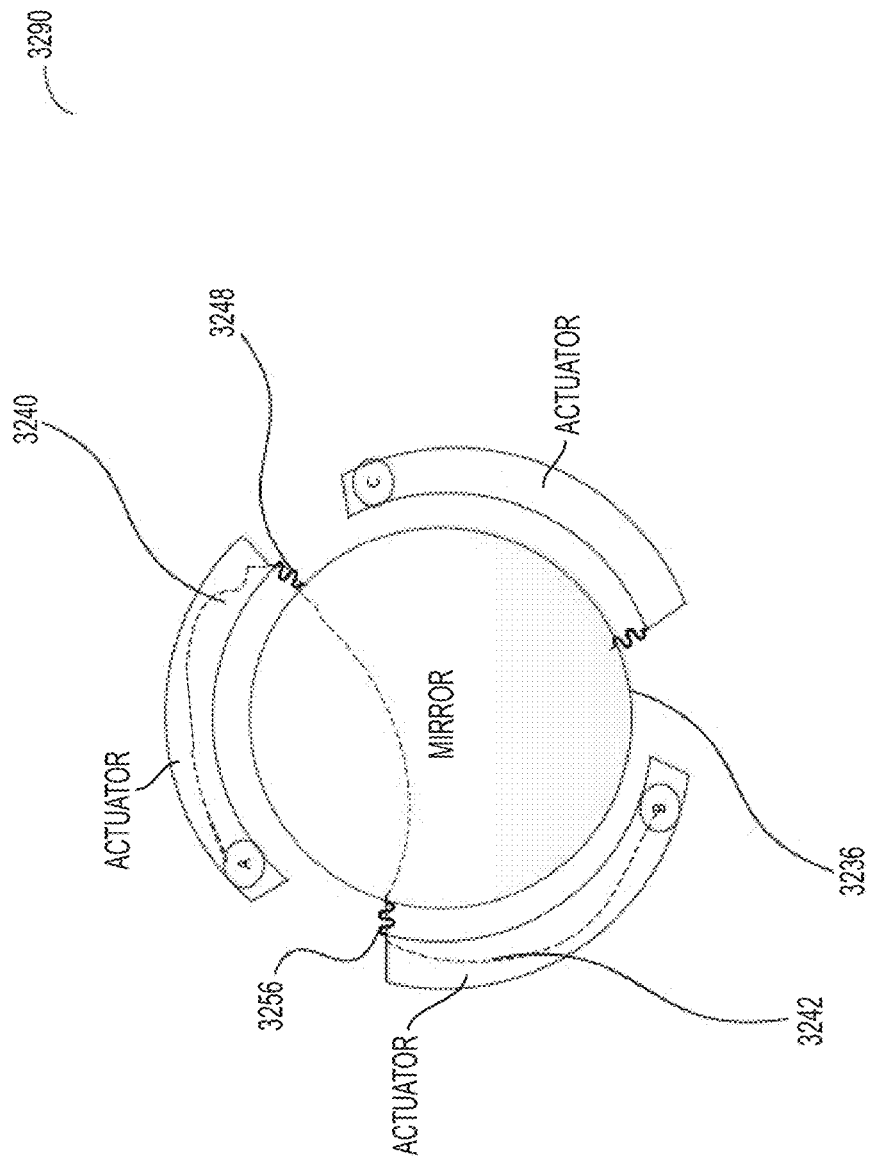

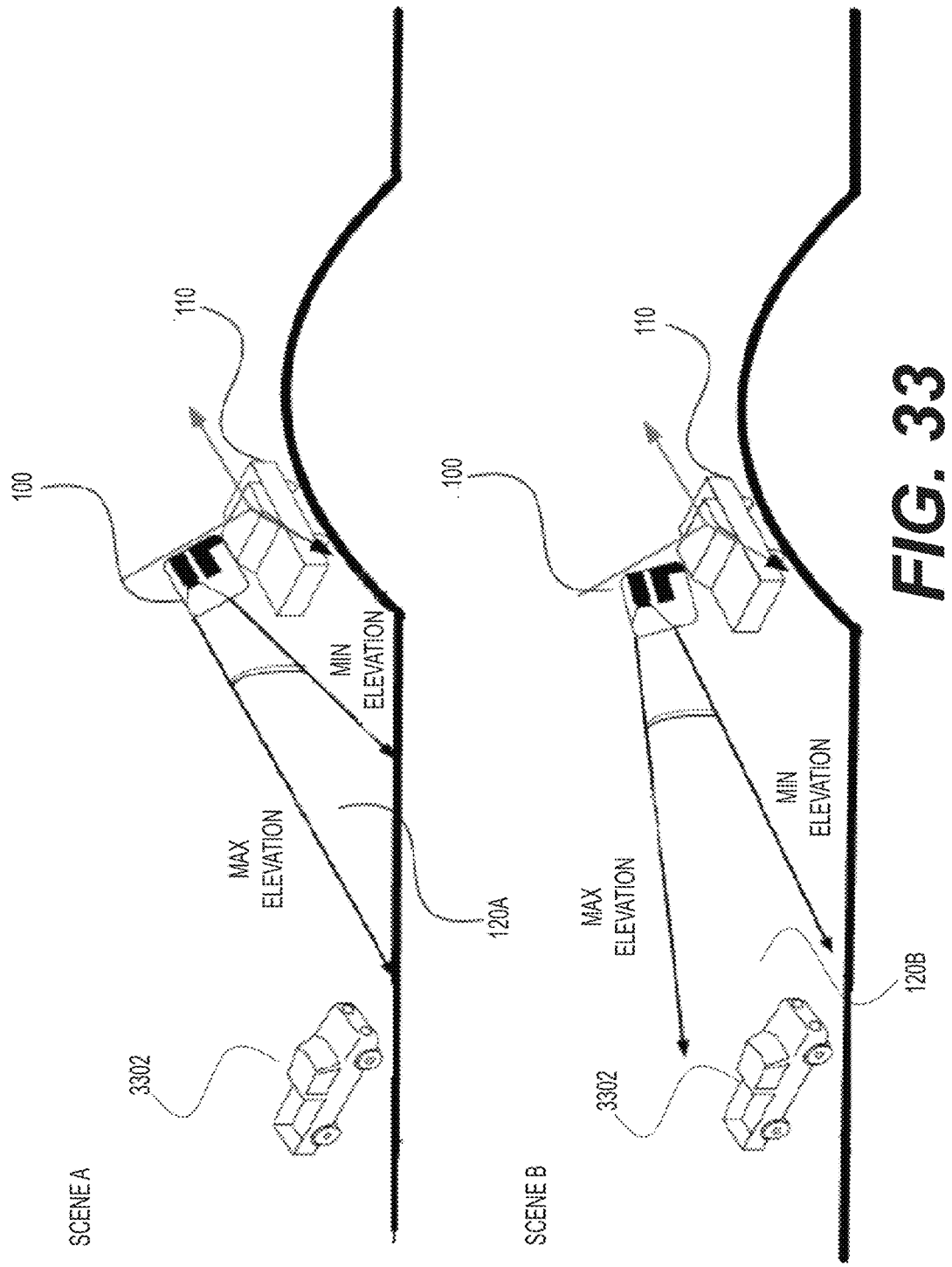

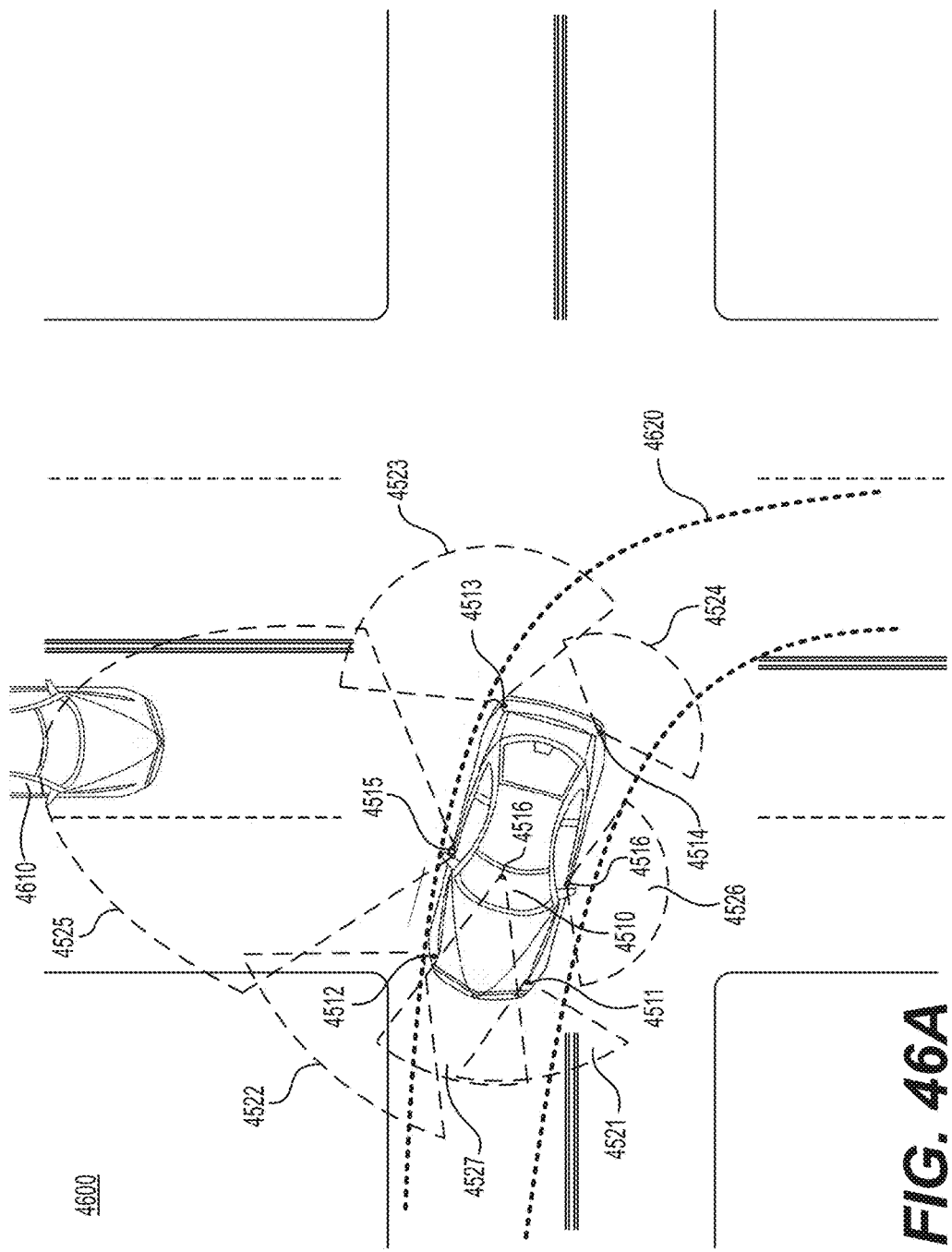

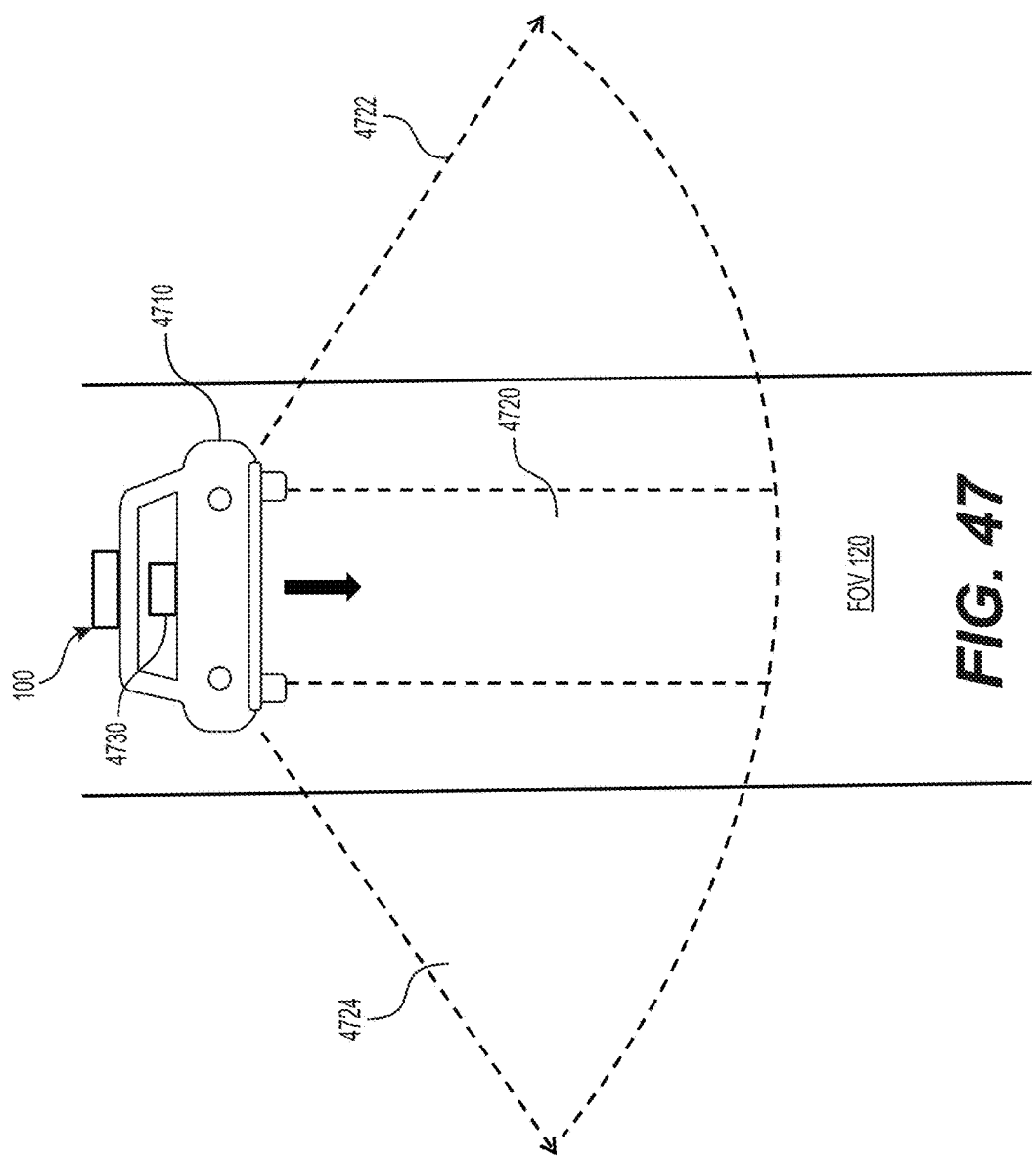

DYNAMIC ILLUMINATION ALLOCATION IN HIGHWAY DRIVING

CROSS REFERENCES TO RELATED APPLICATIONS

This application is a continuation of PCT International Application No. PCT/IB2017/001320, filed Sep. 20, 2017, which claims the benefit of priority of U.S. Provisional Patent Application No. 62/396,858, filed Sep. 20, 2016; U.S. Provisional Patent Application No. 62/396,863, filed Sep. 20, 2016; U.S. Provisional Patent Application No. 62/396,864, filed Sep. 20, 2016; U.S. Provisional Patent Application No. 62/397,379, filed Sep. 21, 2016; U.S. Provisional Patent Application No. 62/405,928, filed Oct. 9, 2016; U.S. Provisional Patent Application No. 62/412,294, filed Oct. 25, 2016; U.S. Provisional Patent Application No. 62/414,740, filed Oct. 30, 2016; U.S. Provisional Patent Application No. 62/418,298, filed Nov. 7, 2016; U.S. Provisional Patent Application No. 62/422,602, filed Nov. 16, 2016; U.S. Provisional Patent Application No. 62/425,089, filed Nov. 22, 2016; U.S. Provisional Patent Application No. 62/441,574, filed Jan. 3, 2017; U.S. Provisional Patent Application No. 62/441,581, filed Jan. 3, 2017; U.S. Provisional Patent Application No. 62/441,583, filed Jan. 3, 2017; and U.S. Provisional Patent Application No. 62/521,450, filed Jun. 18, 2017. All of the foregoing applications are incorporated herein by reference in their entirety.

BACKGROUND

I. Technical Field

The present disclosure relates generally to surveying technology for scanning a surrounding environment, and, more specifically, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. As with any sensing system, in order for a LIDAR-based sensing system to be fully adopted by the automotive industry, the system should provide reliable data enabling detection of far-away objects. Currently, however, the maximum illumination power of LIDAR systems is limited by the need to make the LIDAR systems eye-safe (i.e., so that they will not damage the human eye which can occur when a projected light emission is absorbed in the eye's cornea and lens, causing thermal damage to the retina.)

The systems and methods of the present disclosure are directed towards improving performance of LIDAR systems while complying with eye safety regulation.

SUMMARY

Embodiments consistent with the present disclosure provide systems and methods for using LIDAR technology to detect objects in the surrounding environment.

Consistent with a disclosed embodiment, a LIDAR system may include at least one processor configured to: control at least one light source in a manner enabling light flux to vary over a scan of a field of view using light from the at least one light source; control at least one light deflector to deflect light from the at least one light source in order to scan the field of view; use first detected reflections associated with a scan of a first portion of the field of view to determine an existence of a first object in the first portion at a first distance; determine an absence of objects in a second portion of the field of view at the first distance; following the detection of the first reflections and the determination of the absence of objects in the second portion, alter a light source parameter such that more light is projected toward the second portion of the field of view than is projected toward the first portion of the field of view; and use second detected reflections in the second portion of the field of view to determine an existence of a second object at a second distance greater than the first distance.

Consistent with a disclosed embodiment, a LIDAR system may include at least one processor configured to: control at least one light source in a manner enabling light flux to vary over a scan of a field of view using light from the at least one light source; control projection of at least a first light emission directed toward a first portion of the field of view to determine an absence of objects in the first portion of the field of view at a first distance; when an absence of objects is determined in the first portion of the field of view based on the at least a first light emission, control projection of at least a second light emission directed toward the first portion of the field of view to enable detection of an object in the first portion of the field of view at a second distance, greater than the first distance; and control projection of at least a third light emission directed toward the first portion of the field of view to determine an existence of an object in the first portion of the field of view at a third distance, greater than the second distance.

Consistent with a disclosed embodiment, a LIDAR system may include at least one processor configured to: control at least one light source in a manner enabling light flux to vary over a scan of a field of view, the field of view including a first portion and a second portion; receive on a pixel-by-pixel basis, signals from at least one sensor, wherein the signals are indicative of at least one of ambient light and light from the at least one light source reflected by an object in the field of view combined with noise associated with the at least one sensor; estimate noise in at least some of the signals associated with the first portion of the field of view; alter a sensor sensitivity for reflections associated with the first portion of the field of view based on the estimation of noise in the first portion of the field of view; estimate noise in at least some of the signals associated with the second portion of the field of view; and alter a sensor sensitivity for reflections associated with the second portion of the field of view based on the estimation of noise in the second portion of the field of view, wherein the altered sensor sensitivity for reflections associated with the second portion differs from the altered sensor sensitivity for reflections associated with the first portion.

Consistent with a disclosed embodiment, a LIDAR system may include at least one processor configured to: control at least one light source in a manner enabling light intensity to vary over a scan of a field of view using light from the at least one light source; control at least one light deflector to deflect light from the at least one light source in order to scan the field of view; obtain an identification of at least one distinct region of interest in the field of view; and increase light allocation to the at least one distinct region of interest relative to other regions, such that following a first scanning cycle, light intensity in at least one subsequent second scanning cycle at locations associated with the at least one distinct region of interest is higher than light intensity in the first scanning cycle at the locations associated with the at least one distinct region of interest.

Consistent with a disclosed embodiment, a LIDAR system may include at least one processor configured to: control at least one light source in a manner enabling light flux to vary over scans of a field of view using light from the at least one light source; control at least one light deflector to deflect light from the at least one light source in order to scan the field of view; receive from at least one sensor, reflections signals indicative of light reflected from objects in the field of view; determine, based on the reflections signals of an initial light emission, whether an object is located in an immediate area of the LIDAR system and within a threshold distance from the at least one light deflector, wherein the threshold distance is associated with a safety distance, and when no object is detected in the immediate area, control the at least one light source such that an additional light emission is projected toward the immediate area, thereby enabling detection of objects beyond the immediate area; when an object is detected in the immediate area, regulate at least one of the at least one light source and the at least one light deflector to prevent an accumulated energy density of the light in the immediate area to exceed a maximum permissible exposure.

Consistent with a disclosed embodiment, a LIDAR system may include at least one processor configured to: control light emission of a light source; scan a field of view by repeatedly moving at least one light deflector located in an outbound path of the light source, wherein during a single scanning cycle of the field of view, the at least one light deflector is instantaneously located in a plurality of positions; while the at least one deflector is in a particular instantaneous position, receive via the at least one deflector, reflections of a single light beam spot along a return path to a sensor; receive from the sensor on a beam-spot-by-beam-spot basis, signals associated with an image of each light beam-spot, wherein the sensor includes a plurality of detectors and wherein a size of each detector is smaller than the image of each light beam-spot, such that on a beam-spot-by-beam-spot basis, the image of each light beam-spot impinges on a plurality of detectors; and determine, from signals resulting from the impingement on the plurality of detectors, at least two differing range measurements associated with the image of the single light beam-spot.

Consistent with a disclosed embodiment, a LIDAR system may include at least one processor configured to: control at least one deflector to deflect light from a plurality of light sources along a plurality of outbound paths, towards a plurality of regions forming a field of view while the at least one deflector is in a particular instantaneous position; control the at least one deflector such that while the at least one deflector is in the particular instantaneous position, light reflections from the field of view are received on at least one common area of the at least one deflector, wherein in the at least one common area, at least some of the light reflections of at least some of the plurality of light sources impinge on one another; and receive from each of a plurality of detectors, at least one signal indicative of light reflections from the at least one common area while the at least one deflector is in the particular instantaneous position.

Consistent with a disclosed embodiment, a LIDAR system may include at least one processor configured to: access an optical budget stored in memory, the optical budget being associated with at least one light source and defining an amount of light that is emittable in a predetermined time period by the at least one light source; receive information indicative of a platform condition for the LIDAR system; based on the received information, dynamically apportion the optical budget to a field of view of the LIDAR system based on at least two of: scanning rates, scanning patterns, scanning angles, spatial light distribution, and temporal light distribution; and output signals for controlling the at least one light source in a manner enabling light flux to vary over scanning of the field of view in accordance with the dynamically apportioned optical budget.

Consistent with a disclosed embodiment, a vibration suppression system for a LIDAR configured for use on a vehicle may include at least one processor configured to: control at least one light source in a manner enabling light flux of light from the at least one light source to vary over scans of a field of view; control positioning of at least one light deflector to deflect light from the at least one light source in order to scan the field of view; obtain data indicative of vibrations of the vehicle; based on the obtained data, determine adjustments to the positioning of the at least one light deflector for compensating for the vibrations of the vehicle; and implement the determined adjustments to the positioning of the at least one light deflector to thereby suppress on the at least one light deflector, at least part of an influence of the vibrations of the vehicle on the scanning of the field of view.

Consistent with a disclosed embodiment, a LIDAR system may include at least one processor configured to: control at least one light source in a manner enabling light flux of light from at least one light source to vary over a scanning cycle of a field of view, wherein the light projected from the at least one light source is directed to at least one deflector to scan the field of view; receive from at least one sensor reflections signals indicative of light reflected from objects in the field of view; coordinate light flux and scanning in a manner to cause at least three sectors of the field of view to occur in a scanning cycle, a first sector having a first light flux and an associated first detection range, a second sector having a second light flux and an associated second detection range, and a third sector having third light flux and an associated a third detection range, and wherein the second light flux is greater than each of the first light flux and the third light flux; and detect, based on input from the at least one sensor, an object in the second sector located at a distance beyond the first detection range and the third detection range.

Consistent with a disclosed embodiment, a LIDAR system, may include at least one processor configured to: control at least one light source in a manner enabling light flux of at least one light source to vary over a plurality of scans of a field of view, the field of view including a near-field portion and a far-field portion; control at least one light deflector to deflect light from the at least one light source in a manner scanning the field of view; implement a first scanning rate for first frames associated with scanning cycles that cover the near-field portion and a second scanning rate for second frames associated with scanning cycles that cover the far-field portion, wherein the first scanning rate is greater than the second rate; and control the at least one light source, after projecting light that enables detection of objects in a plurality of sequential first frames associated with the near-field portion, to alter a light source parameter and thereby project light in a manner enabling detection of objects in the second frames associated with the far-field portion.

Consistent with a disclosed embodiment, a LIDAR system for use in a vehicle may include at least one processor configured to: control at least one light source in a manner enabling light flux of at least one light source to vary over scans of a field of view; control at least one light deflector to deflect light from the at least one light source in order to scan the field of view; receive input indicative of a current driving environment of the vehicle; and based on the current driving environment, coordinate the control of the at least one light source with the control of the at least one light deflector to dynamically adjust an instantaneous detection distance by varying an amount of light projected and a spatial light distribution of light across the scan of the field of view.

Consistent with a disclosed embodiment, a LIDAR system for use in a vehicle may include at least one processor configured to: control at least one light source in a manner enabling light flux of light from at least one light source to vary over a scanning cycle of a field of view; control at least one deflector to deflect light from the at least one light source in order to scan the field of view; obtain input indicative of an impending cross-lane turn of the vehicle; and in response to the input indicative of the impending cross-lane turn, coordinate the control of the at least one light source with the control of the at least one light deflector to increase, relative to other portions of the field of view, light flux on a side of the vehicle opposite a direction of the cross-lane turn and encompassing a far lane of traffic into which the vehicle is merging, and causing a detection range opposing the direction of the cross-lane turn of the vehicle to temporarily exceed a detection range toward a direction of the cross-lane turn.

Consistent with a disclosed embodiment, a LIDAR system for use with a roadway vehicle traveling on a highway may include at least one processor configured to: control at least one light source in a manner enabling light flux of light from at least one light source to vary over a scanning cycle of a field of view; control at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway; obtain input that the vehicle is in a mode corresponding to highway travel; and in response to the input that the vehicle is in a mode corresponding to highway travel, coordinate the control of the at least one light source with the control of the at least one light deflector such that during scanning of the field of view that encompasses the central region, the right peripheral region, and the left peripheral region, more light is directed to the central region than to the right peripheral region and to the left peripheral region.

Consistent with a disclosed embodiment, a LIDAR system may include at least one processor configured to: control at least one light source in a manner enabling light flux of light from at least one light source to vary over a scan of a field of view; control at least one deflector to deflect light from the at least one light source in order to scan the field of view; receive from at least one sensor information indicative of ambient light in the field of view; identify in the received information an indication of a first portion of the field of view with more ambient light than in a second portion of the field of view; and alter a light source parameter such that when scanning the field of view, light flux of light projected toward the first portion of the field of view is greater than light flux of light projected toward the second portion of the field of view.

Consistent with a disclosed embodiment, a LIDAR system for use in a vehicle may include at least one light source configured to project light toward a field of view for illuminating a plurality of objects in an environment of a vehicle; at least one processor configured to: control the at least one light source in a manner enabling light flux of light from the at least one light source to vary over scans of a plurality of portions of the field of view, wherein during scanning of the field of view, heat is radiated from at least one system component; receive information indicating that a temperature associated with at least one system component exceeds a threshold; and in response to the received information indicating the temperature exceeding the threshold, modify an illumination ratio between two portions of the field of view such that during at least one subsequent scanning cycle less light is delivered to the field of view than in a prior scanning cycle.

Consistent with a disclosed embodiment, a LIDAR system may include a window for receiving light; a microelectromechanical (MEMS) mirror for deflecting the light to provide a deflected light; a frame; actuators; and interconnect elements that are mechanically connected between the actuators and the MEMS mirror; wherein each actuator comprises a body and a piezoelectric element; and wherein the piezoelectric element is configured to bend the body and move the MEMS mirror when subjected to an electrical field; and wherein when the MEMS mirror is positioned at an idle position, the MEMS mirror is oriented in relation to the window.

Consistent with other disclosed embodiments, a method may include one or more steps of any of the processor-executed steps above and/or include any of the steps described herein.

Consistent with yet other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 2A-2D are diagrams illustrating different configurations of projecting units in accordance with some embodiments of the present disclosure.

FIGS. 4A-4E are diagrams illustrating different configurations of sensing units in accordance with some embodiments of the present disclosure.

FIG. 10A is a diagram illustrating an example first field of view (FOV) and several examples of second FOVs consistent with some embodiments of the present disclosure.

FIG. 10B is a diagram illustrating an example scanning pattern of a second FOV across a first FOV consistent with some embodiments of the present disclosure.

FIG. 10C is a diagram illustrating another example scanning pattern of a second FOV across a first FOV consistent with some embodiments of the present disclosure.

FIG. 31 provides a diagrammatic example of a situation that may justify apportionment of an optical budget in a non-uniform manner consistent with presently disclosed embodiments.

FIG. 32A-32G are a diagrams illustrating a vehicle in accordance with exemplary disclosed embodiments, the vibration compensation system, a steering device, a central processing unit (CPU), actuator-mirror, dual axis mems mirror, single axis mems mirror, and a round mems mirror in accordance with some embodiments.

FIG. 33 is a diagrammatic illustration of a LIDAR system installation capable of compensating for sensed motion along a road, consistent with exemplary disclosed embodiments.

FIGS. 46A and 46B are diagrams illustrating an example of LIDAR detection schemes for cross traffic turns and other situations consistent with some embodiments of the present disclosure.

FIG. 47 provides a diagrammatic illustration of a vehicle travelling in a highway environment with the assistance of a LIDAR system consistent with exemplary disclosed embodiments.

DETAILED DESCRIPTION

Figure 1A:
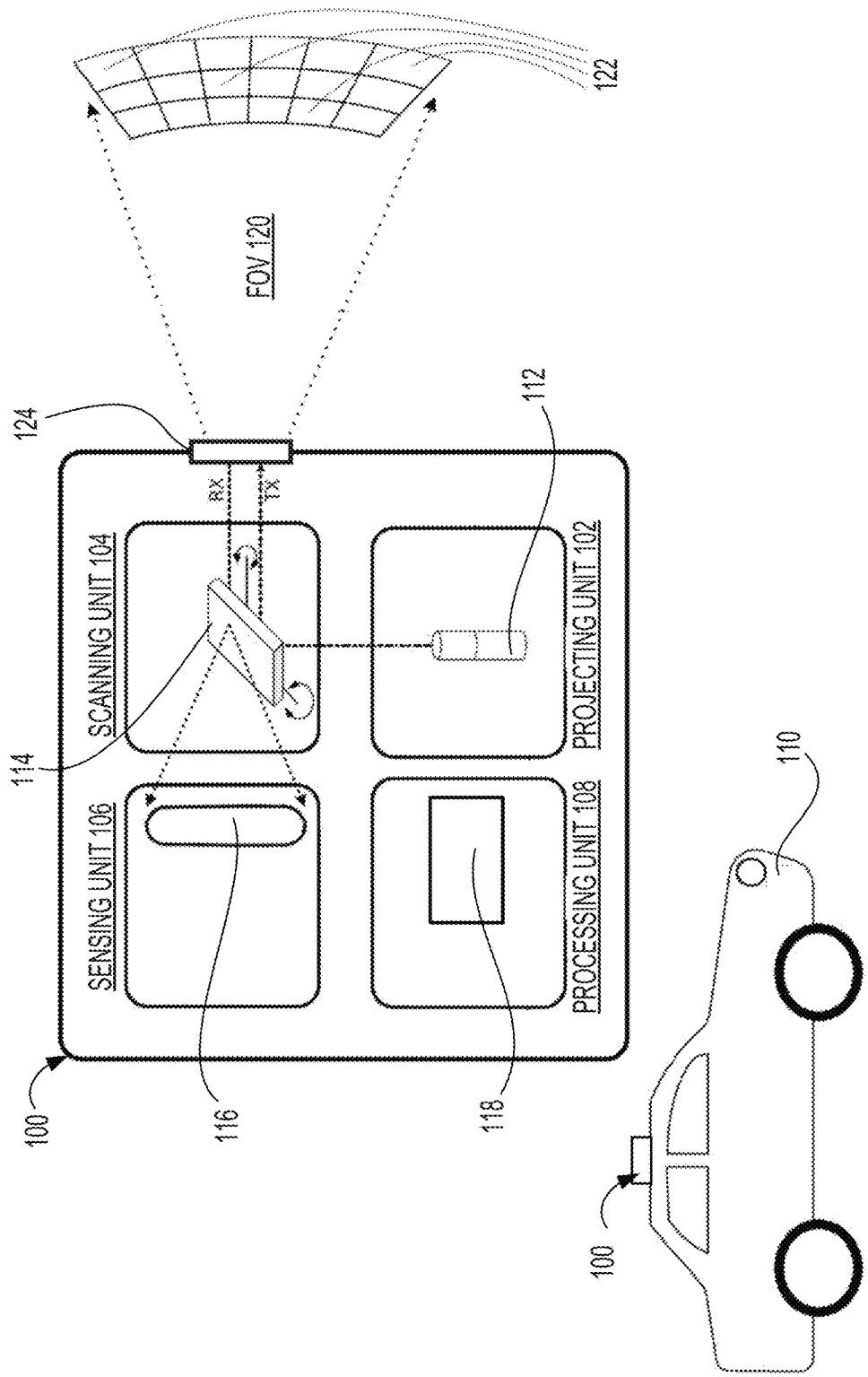
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°.

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g.

laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm$^3$), and whose location may be described by the point cloud model using a set of coordinates (e.g. (X,Y,Z), (r,$\phi$,$\theta$)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree α, change deflection angle by Δα, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differing other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

Figure 1B:
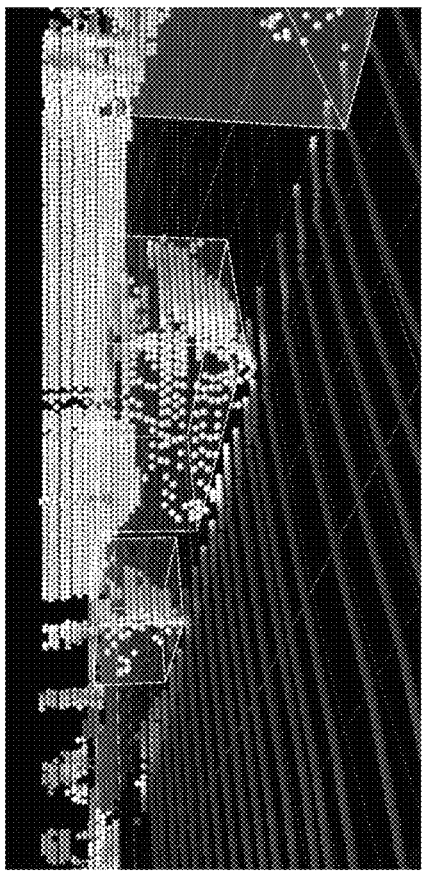
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
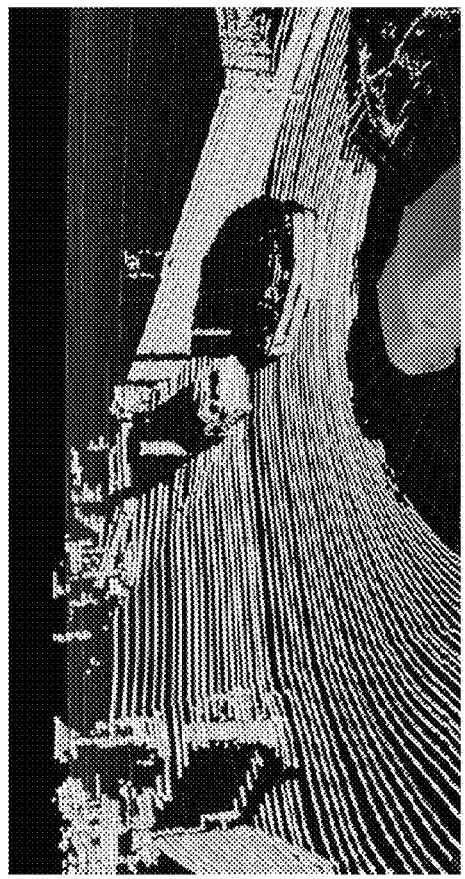
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
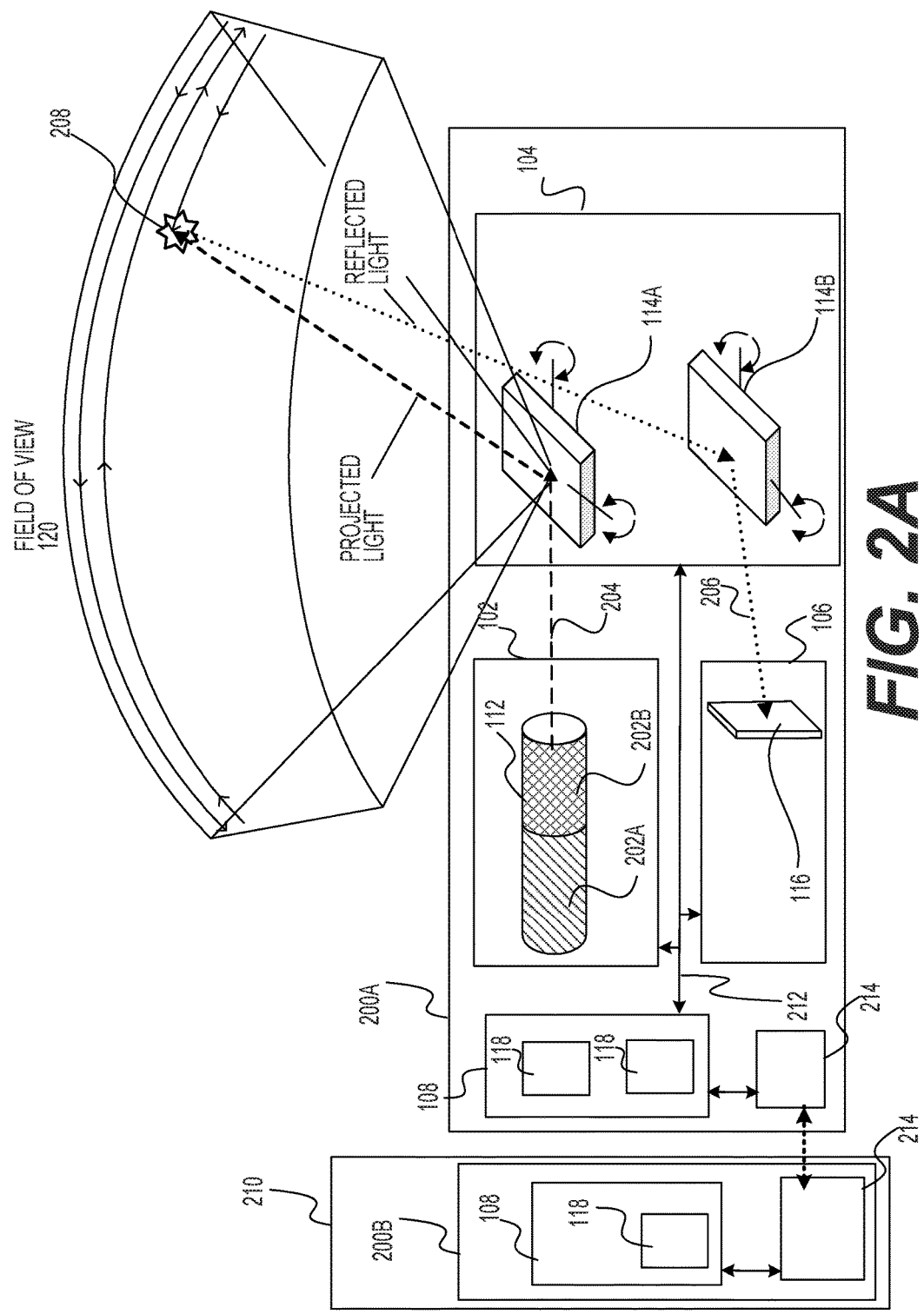
Figure 2B:
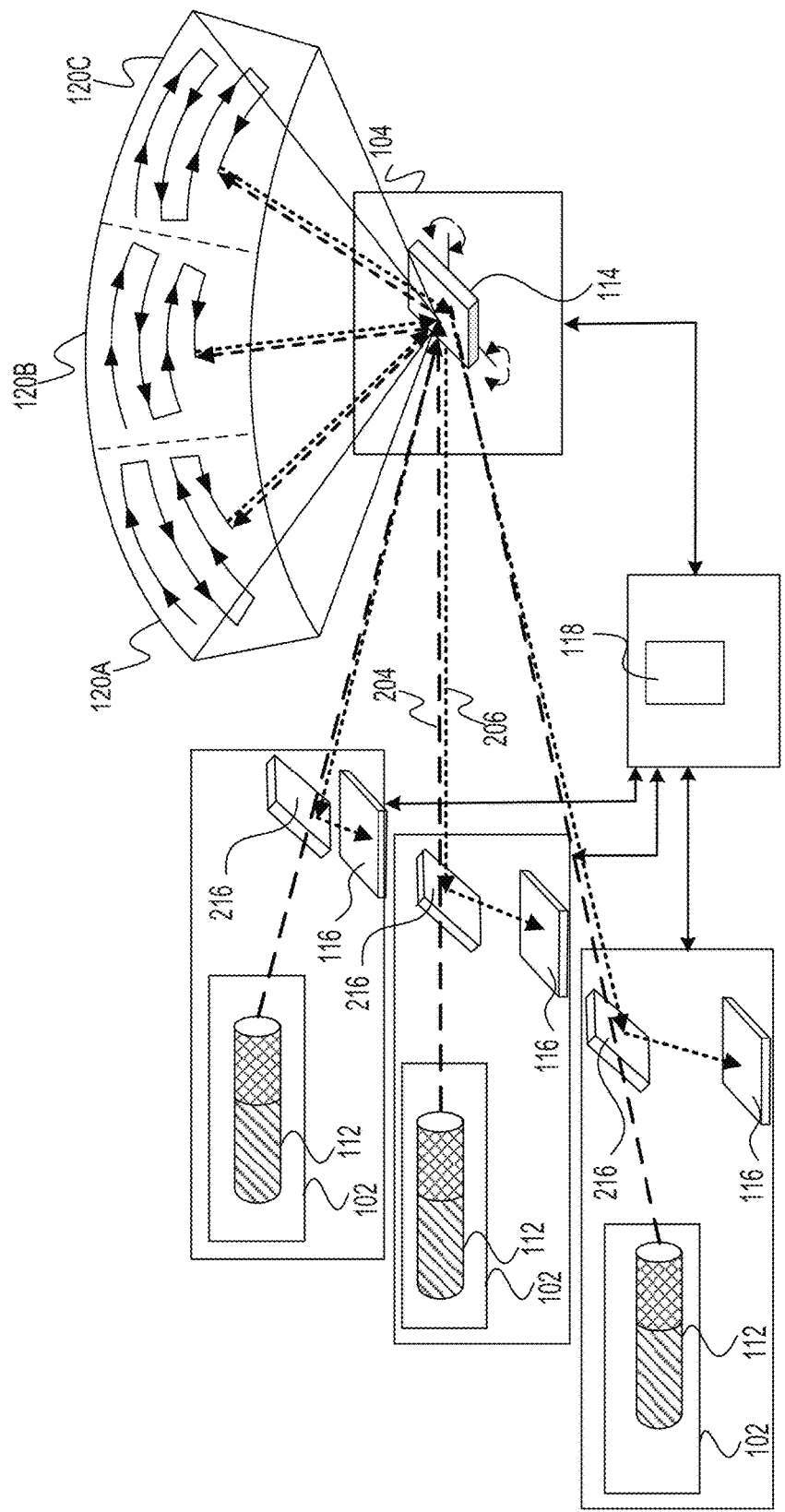
Figure 2D:
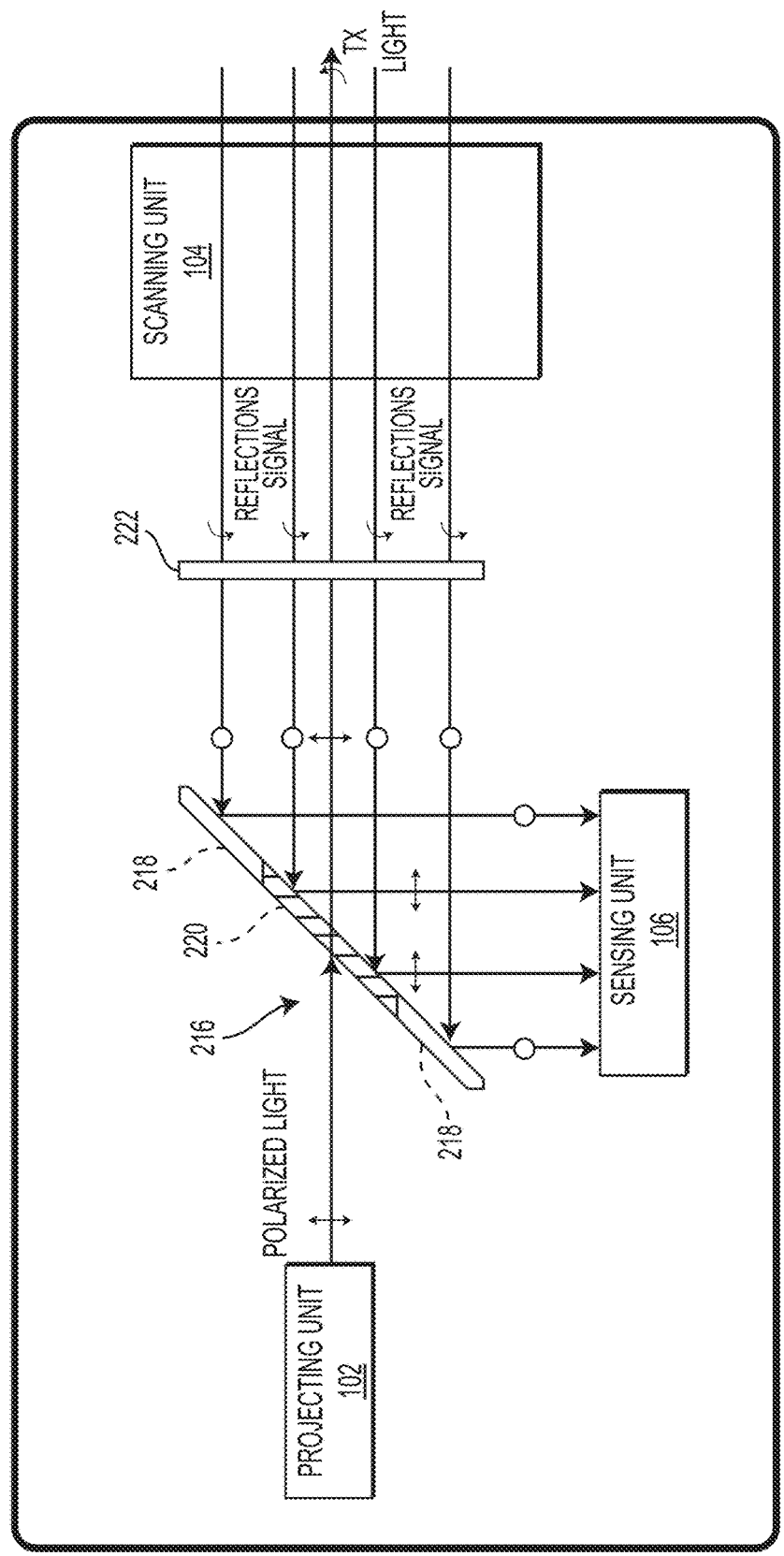

FIGS. 2A-2D depict various configurations of projecting unit 102 and its role in LIDAR system 100. Specifically, FIG. 2A is a diagram illustrating projecting unit 102 with a single light source, FIG. 2B is a diagram illustrating a plurality of projecting units 102 with a plurality of light sources aimed at a common light deflector 114, FIG. 2C is a diagram illustrating projecting unit 102 with a primary and a secondary light sources 112, and FIG. 2D is a diagram illustrating an asymmetrical deflector used in some configurations of projecting unit 102. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through different optical channels. Specifically, the outbound light radiation may pass through a first optical window (not shown) and the inbound light radiation may pass through another optical window (not shown). In the example depicted in FIG. 2A, the Bi-static configuration includes a configuration where scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In such a configuration the inbound and outbound paths differ.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. This embodiment is described in greater detail below with reference to FIG. 7.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated services digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR systems configurations in which the projected light exiting from the LIDAR system and the reflected light entering the LIDAR system pass through at least a partially shared optical path. In one example, the outbound light beam and the inbound light beam may share at least one optical assembly through which both light beams. In another example, the outbound light radiation may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a polarized signal to a linear signal (or vice versa) so that subsequently reflected beams cannot travel through the one-directional slit.

The Scanning Unit

Figure 3A:
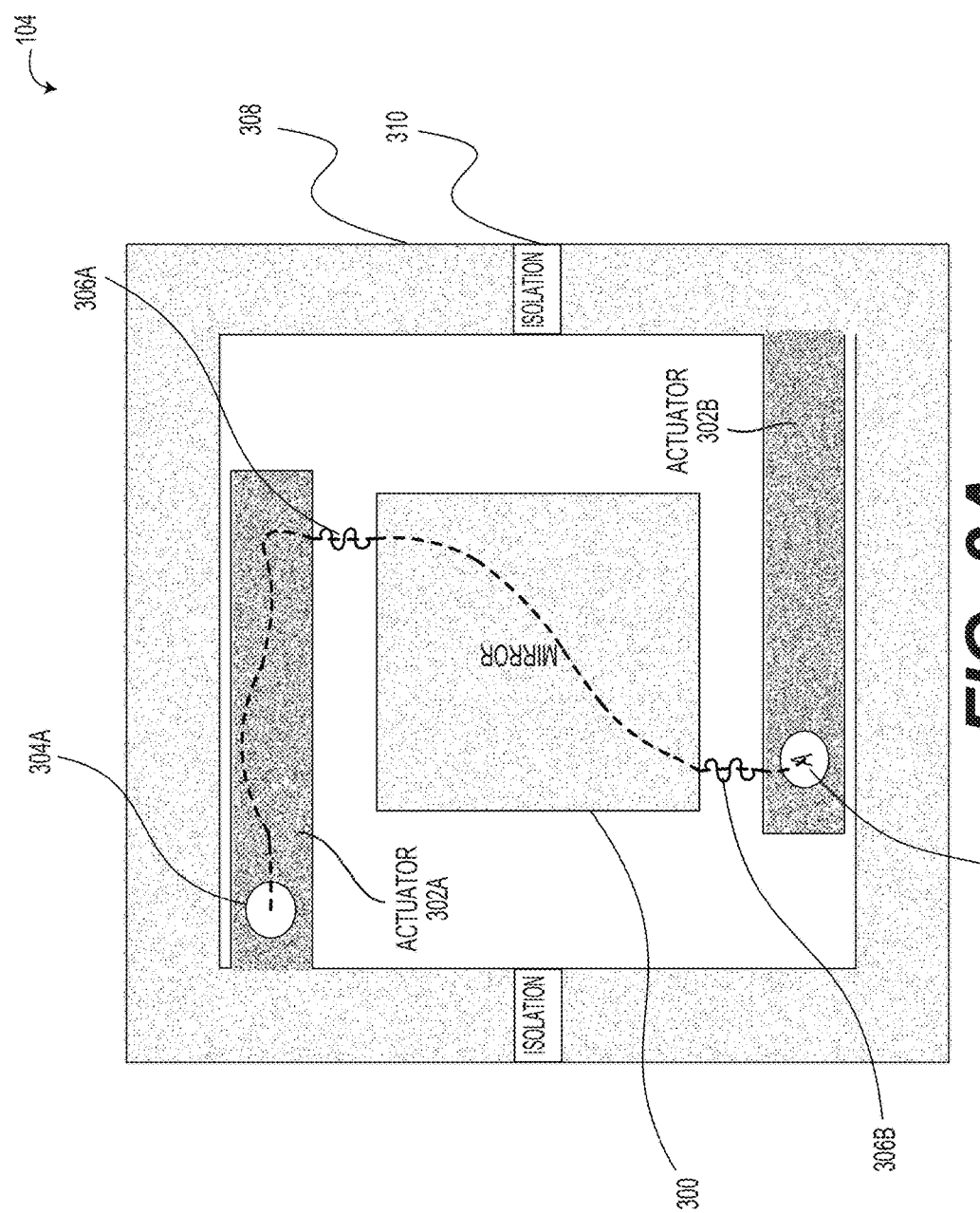
FIGS. 3A-3D are diagrams illustrating different configurations of scanning units in accordance with some embodiments of the present disclosure.
Figure 3B:
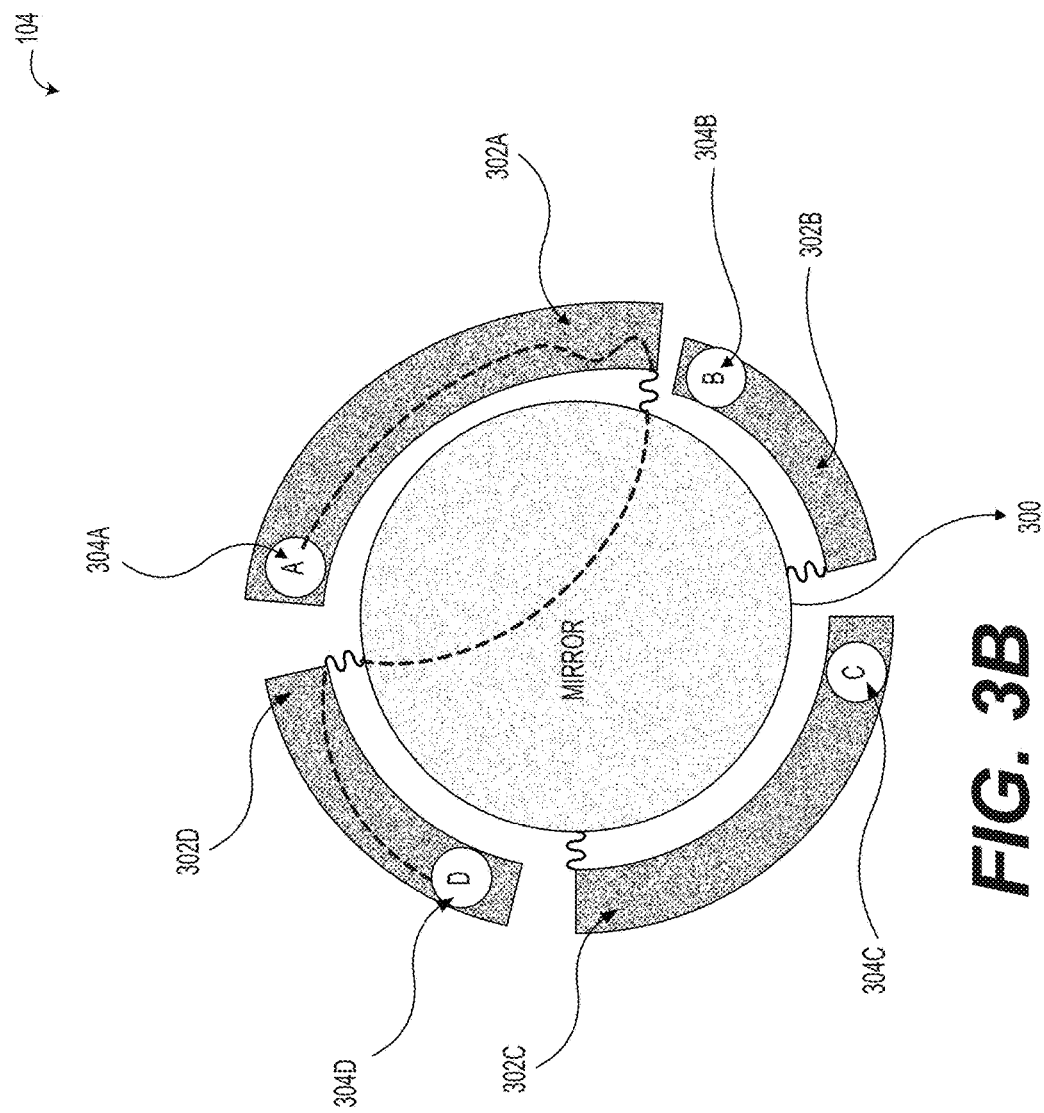
Figure 3C:
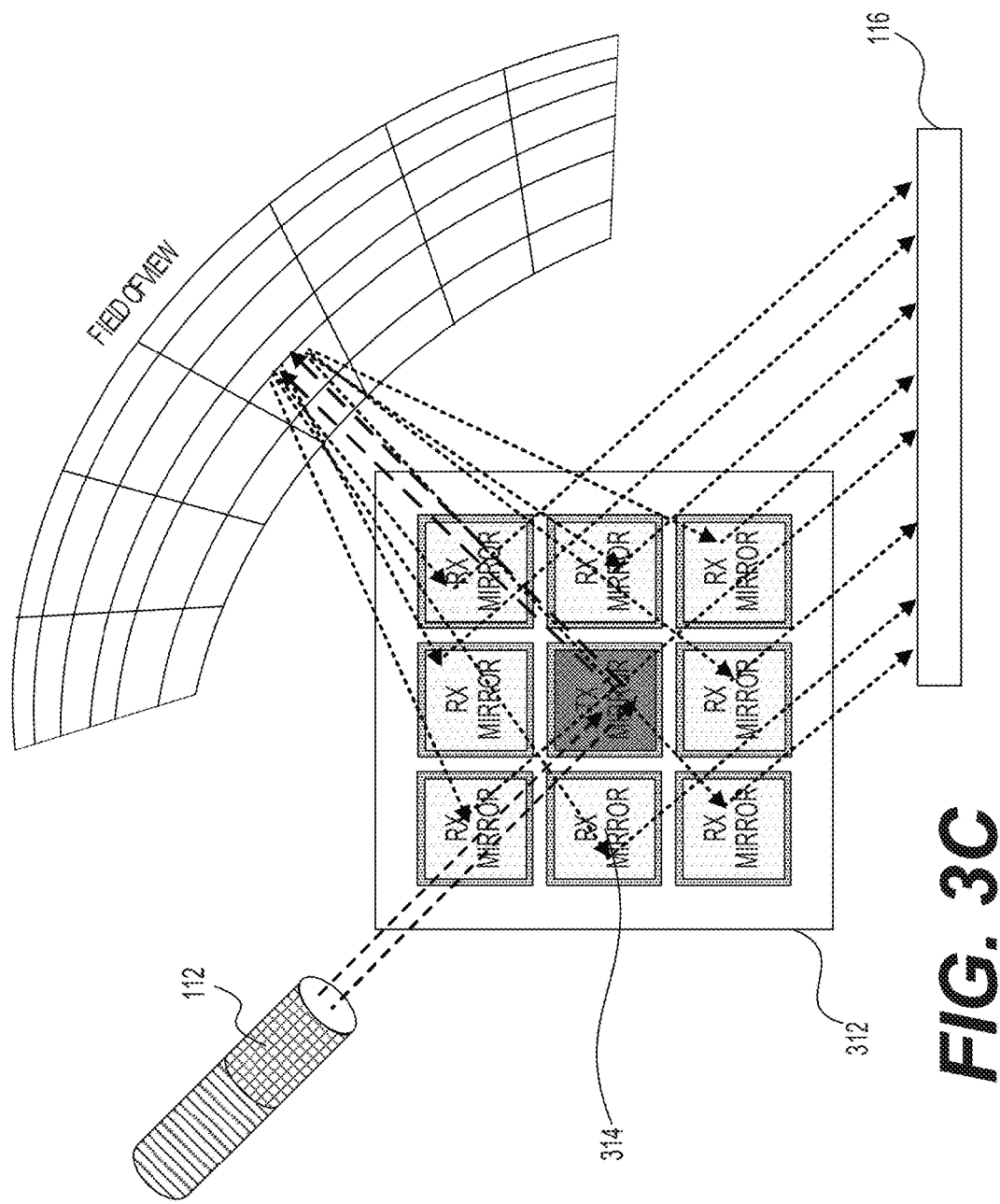
Figure 3D:
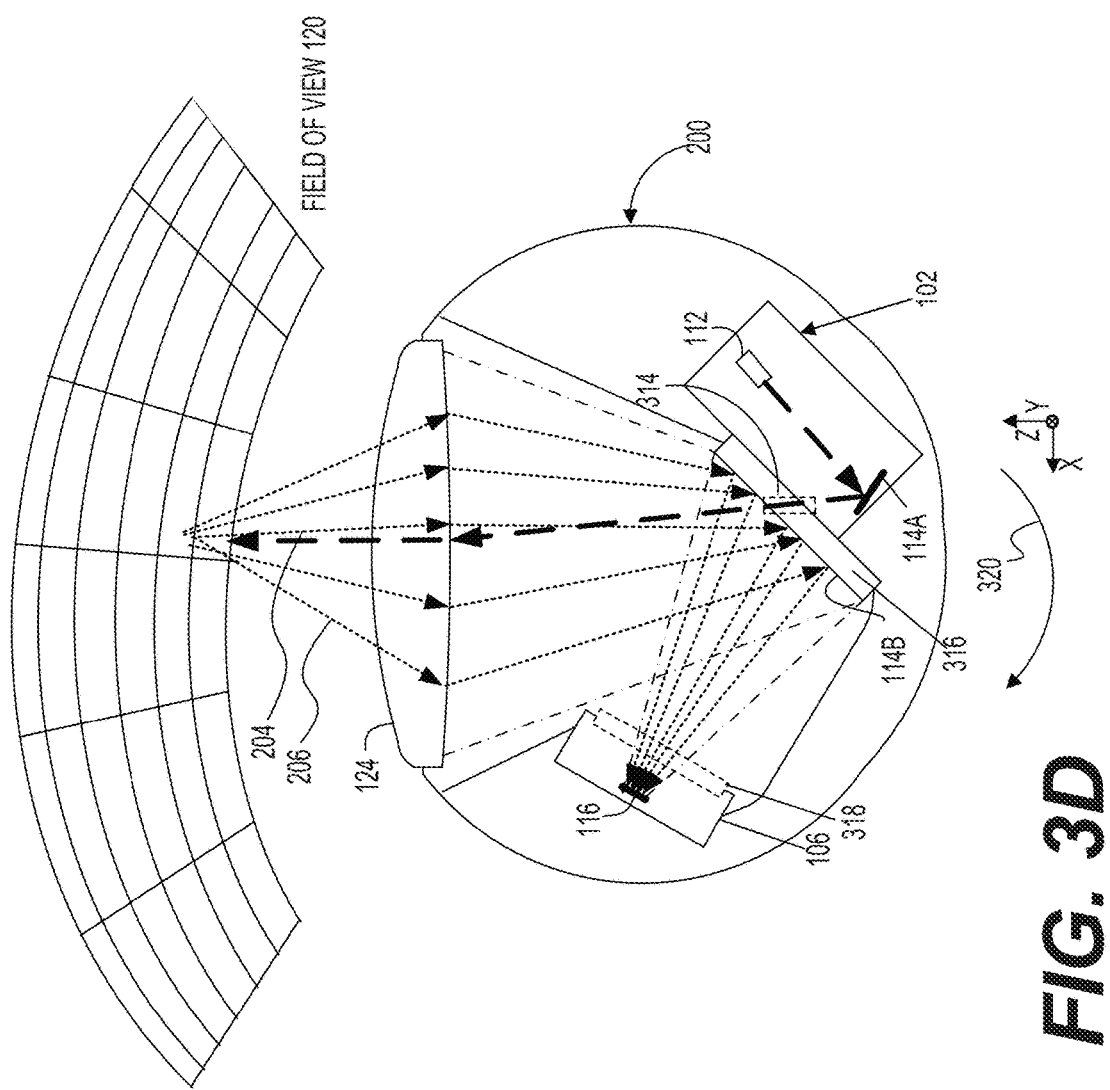

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 maybe connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
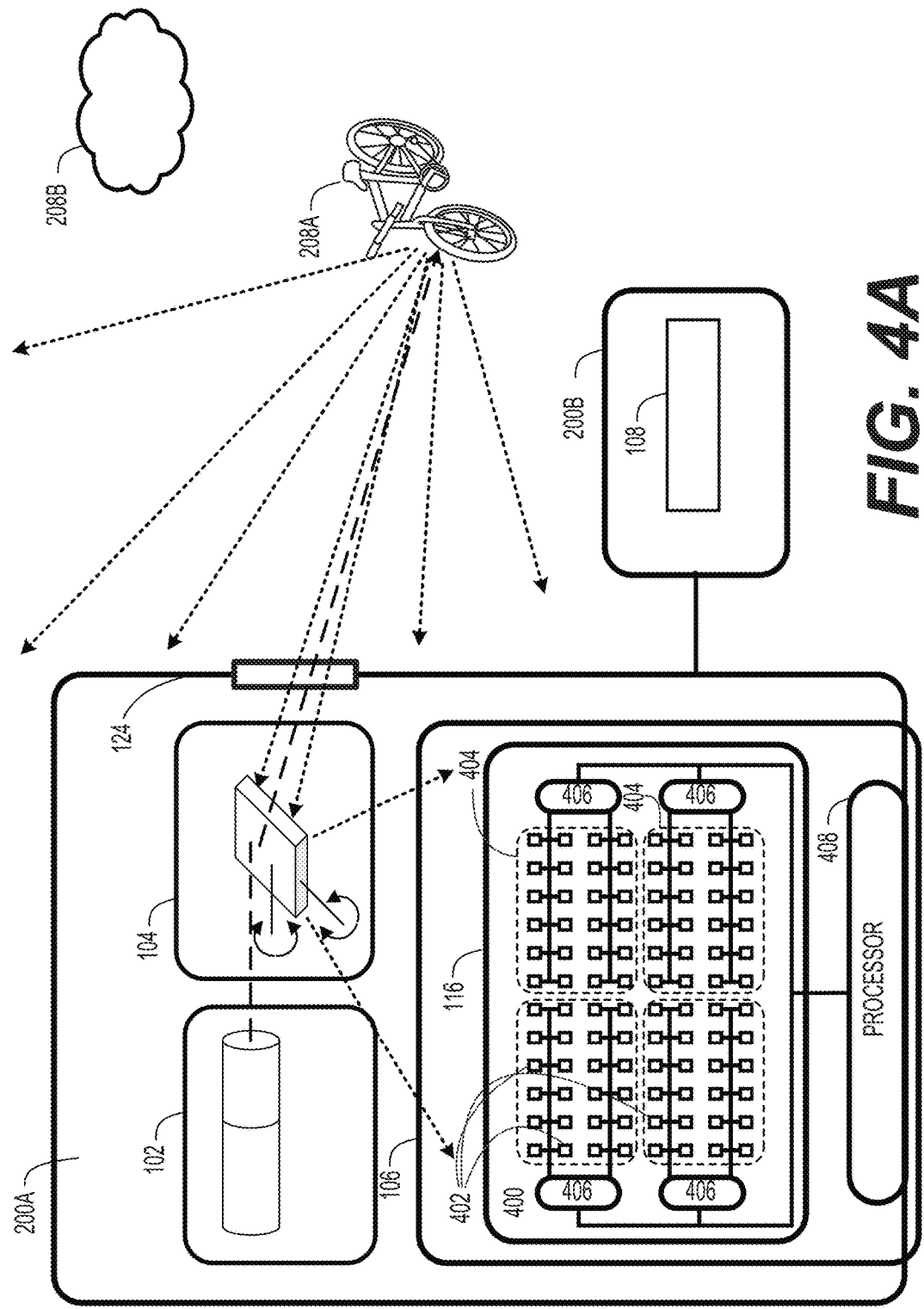
Figure 4C:
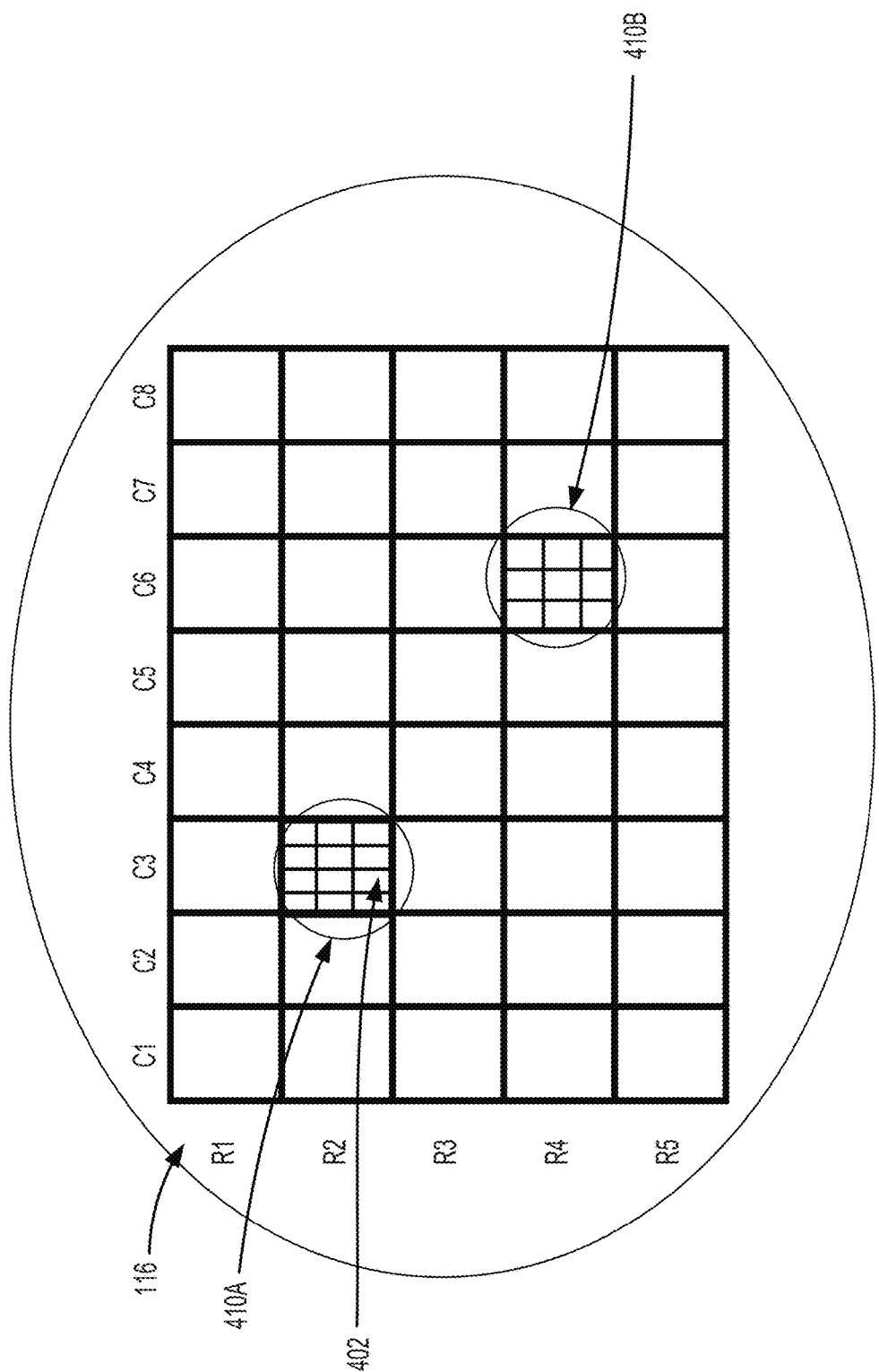
Figure 4D:
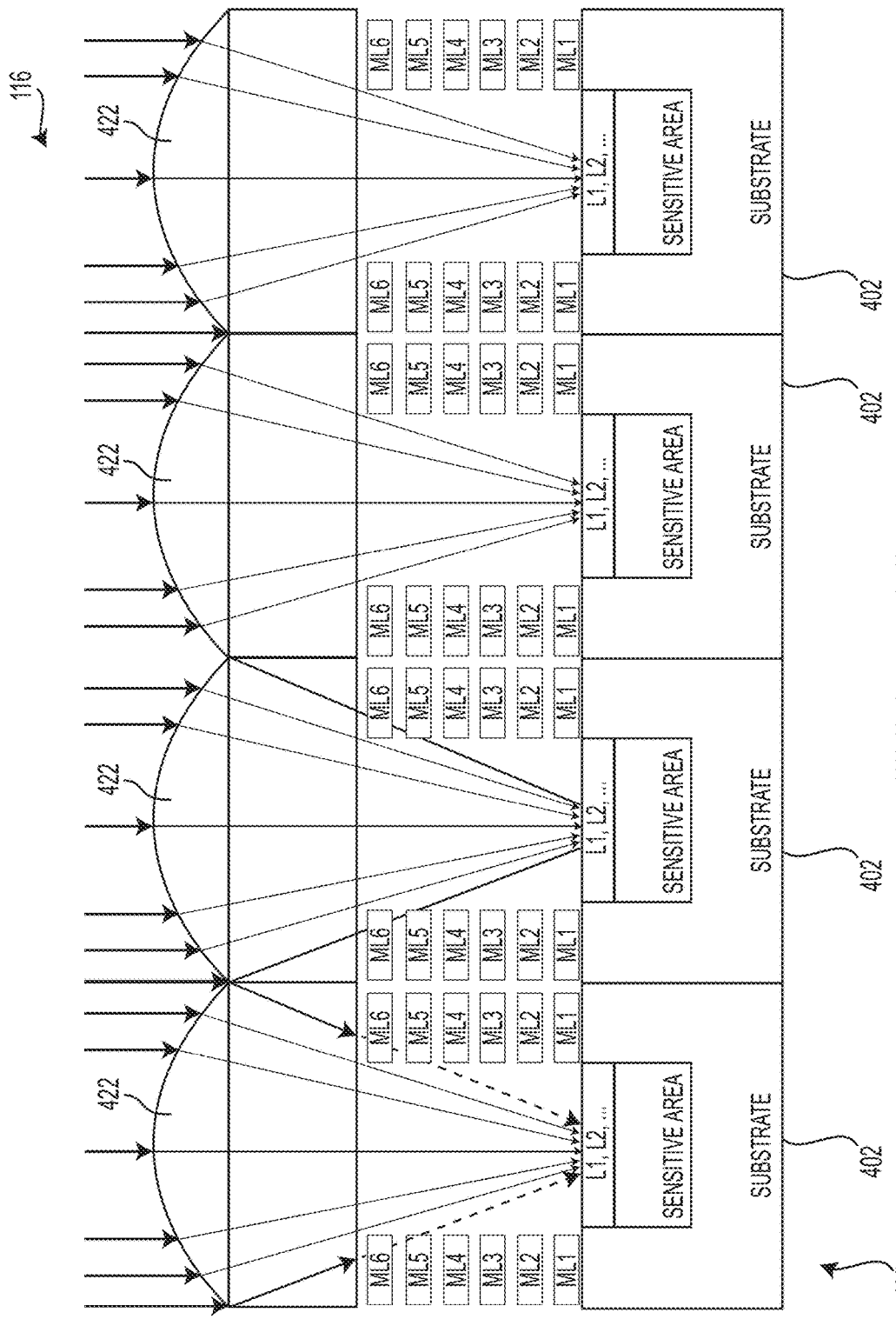

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object).

When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diode (SPAD, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e g summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
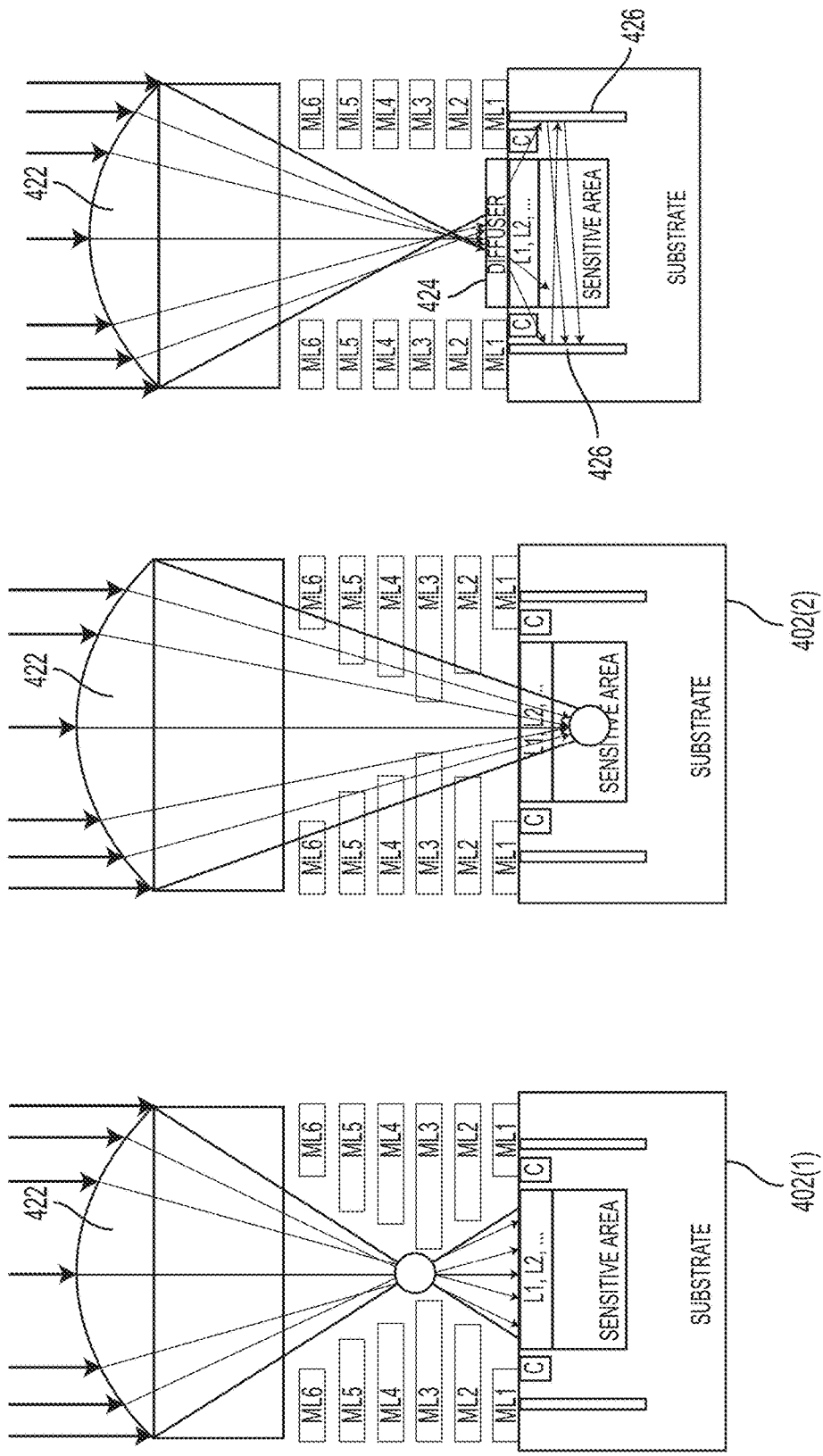

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

The Processing Unit

Figure 5A:
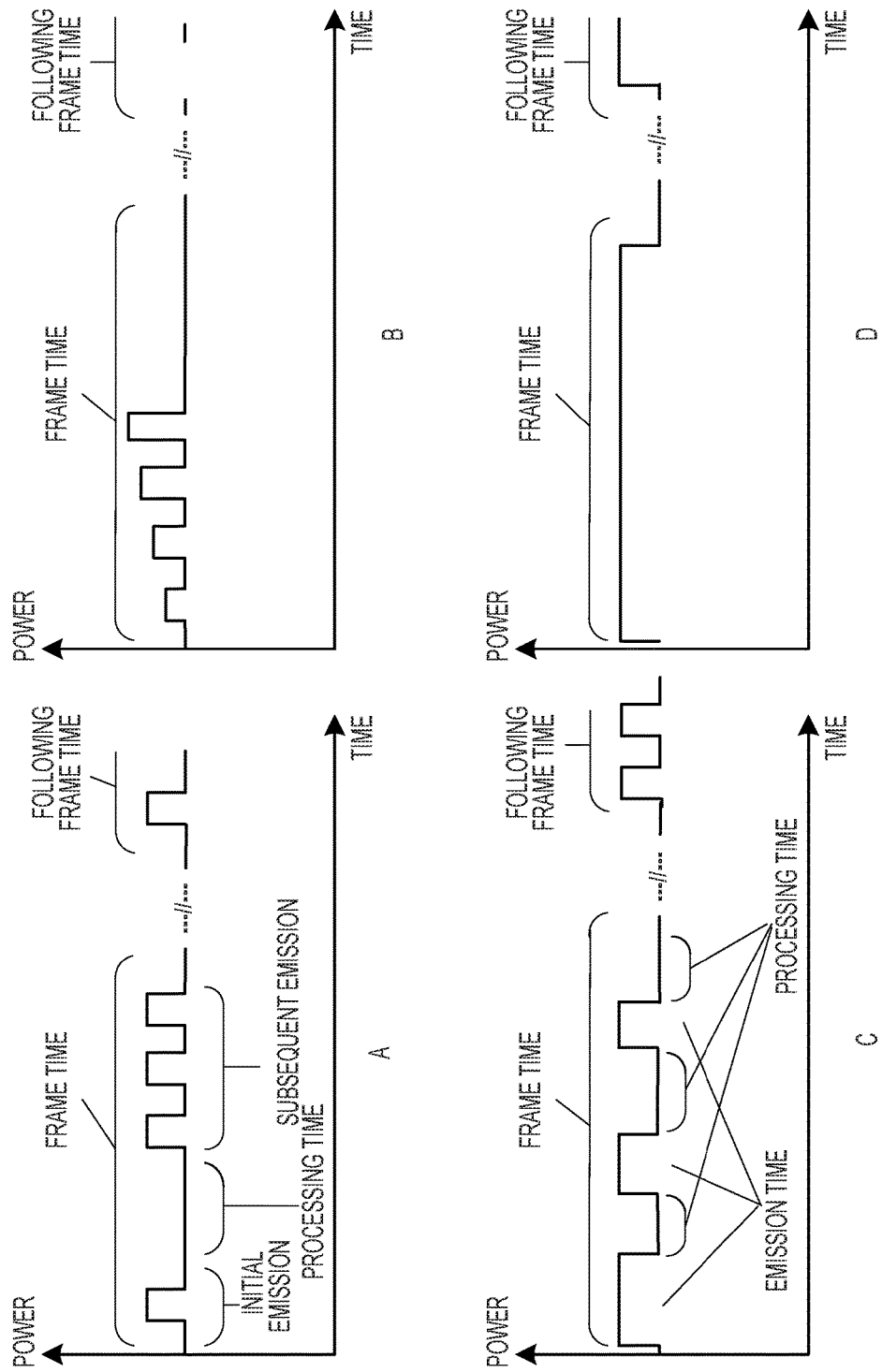
FIG. 5A includes four example diagrams illustrating emission patterns in a single frame-time for a single portion of the field of view.
Figure 5B:
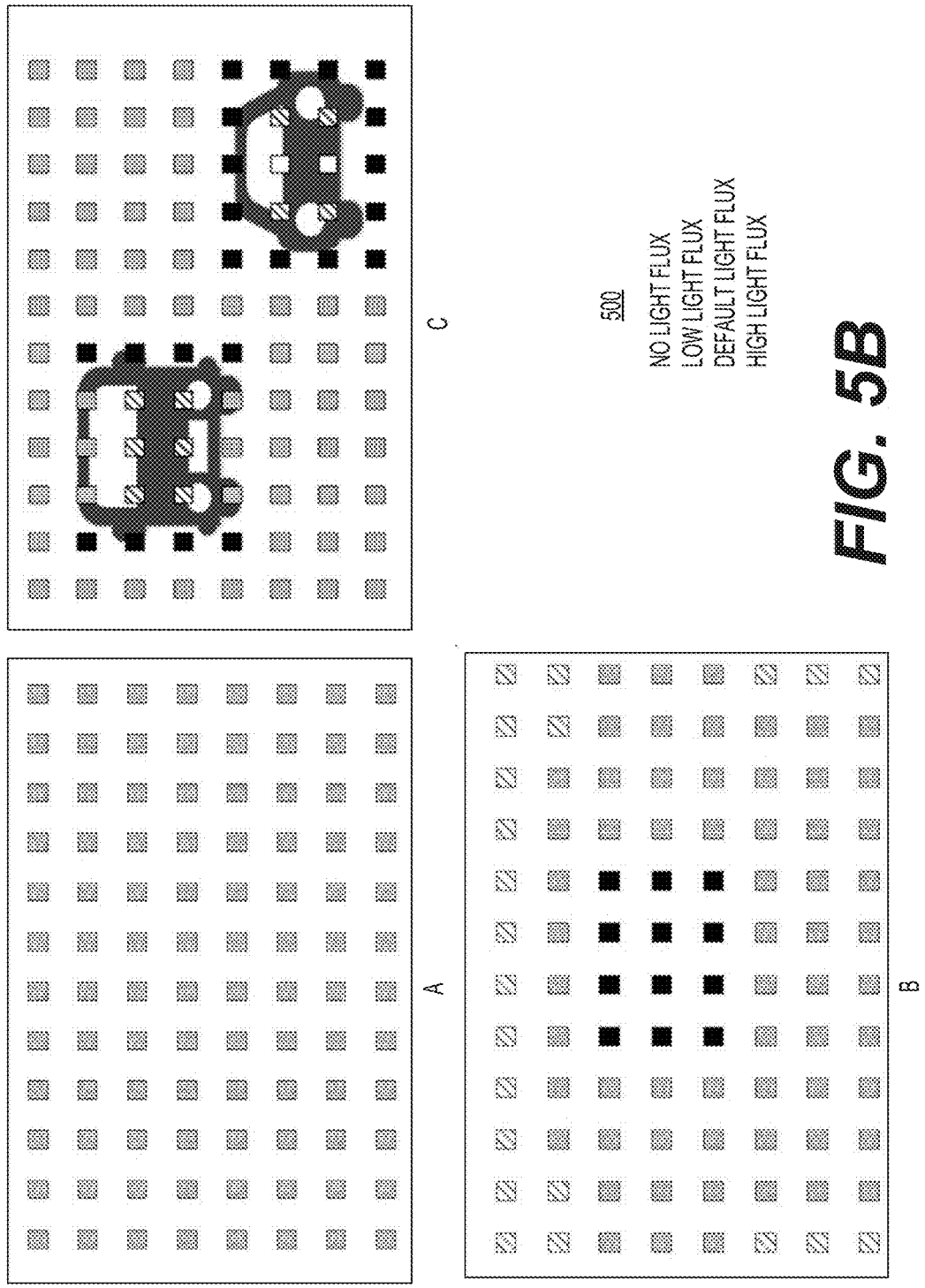
FIG. 5B includes three example diagrams illustrating emission scheme in a single frame-time for the whole field of view.
Figure 5C:
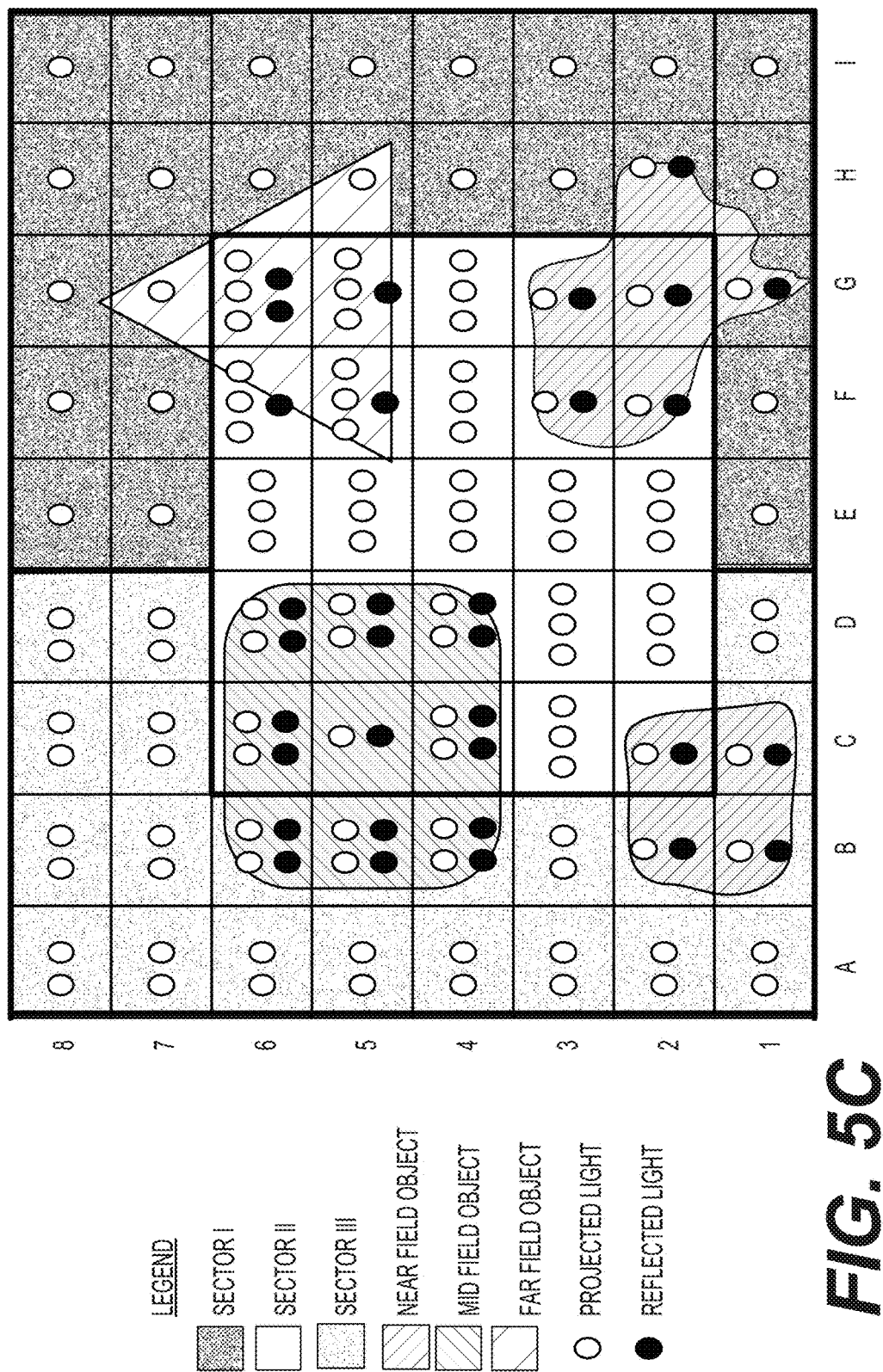
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and. FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame). This embodiment is described in greater detail below with reference to FIGS. 23-25.

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following.

a. Overall energy of the subsequent emission.
  b. Energy profile of the subsequent emission.
  c. A number of light-pulse-repetition per frame.
  d. Light modulation characteristics such as duration, rate, peak, average power, and pulse shape.
  e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. This embodiment is described in greater detail below with reference to FIGS. 11-13. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. This embodiment is described in greater detail below with reference to FIGS. 20-22. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. This embodiment is described in greater detail below with reference to FIGS. 23-25. Allocation of less than maximal amount of pulses may also be a result of other considerations. For examples, in at least some regions, detection of object at a first distance (e.g. a near field object) may result in reducing an overall amount of light emitted to this portion of field of view 120. This embodiment is described in greater detail below with reference to FIGS. 14-16. Other reasons to for determining power allocation to different portions is discussed below with respect to FIGS. 29-31, FIGS. 53-55, and FIGS. 50-52.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
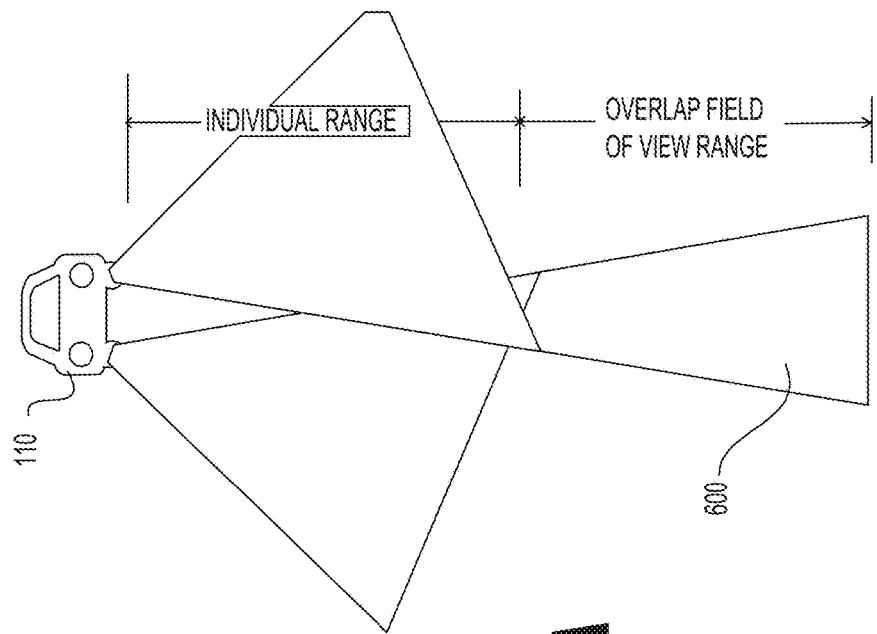
FIGS. 6A-6C are diagrams illustrating a first example implementation consistent with some embodiments of the present disclosure.
Figure 6A:
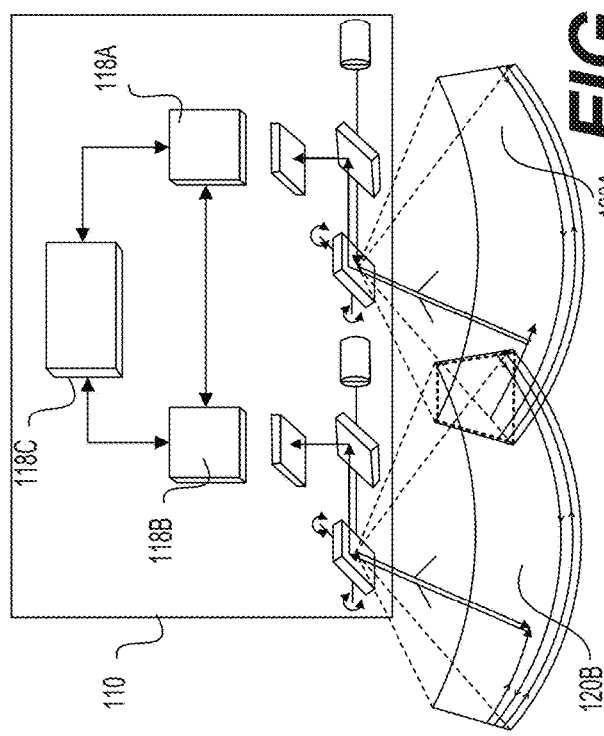
Figure 6B:
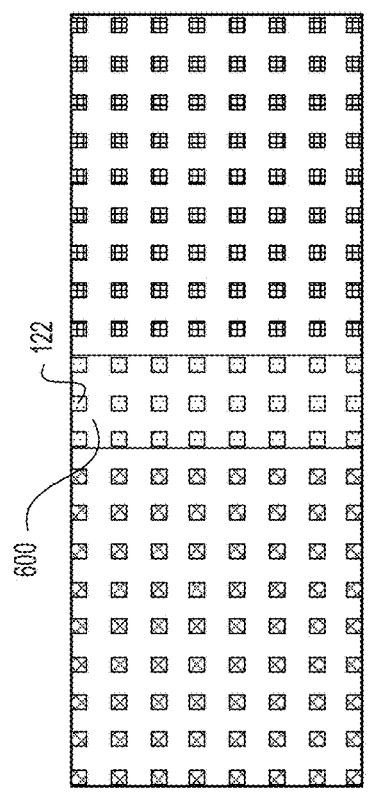

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
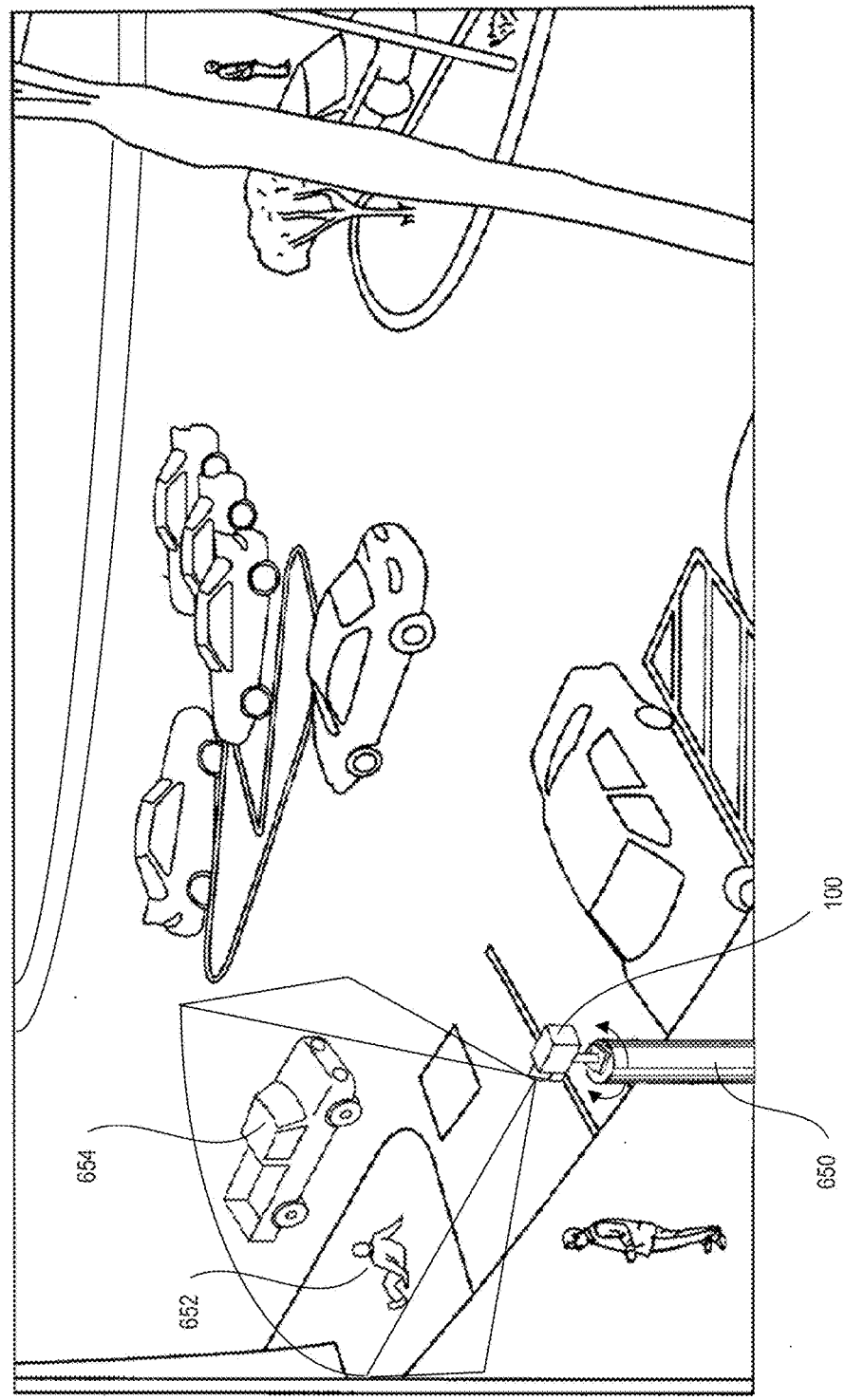
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanisms for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

Detector-Array Based Scanning LIDAR

Many extant LIDAR systems provide for flashing of lasers onto a scene, which then produce reflections and construct images of the scene using the reflections. However, such systems may provide low detail (e.g., low resolution) and may provide no redundancy in measurement.

Systems and methods of the present disclosure may thus allow for the use of a moving (or scanning) laser spot with a plurality of detectors. Accordingly, greater detail may be obtained compared with extant systems in addition to a multiplicity of measurements for each spot. Such multiplicity may provide additional detail and/or provide redundant measurements to use in, for example, error correction.

Figure 7:
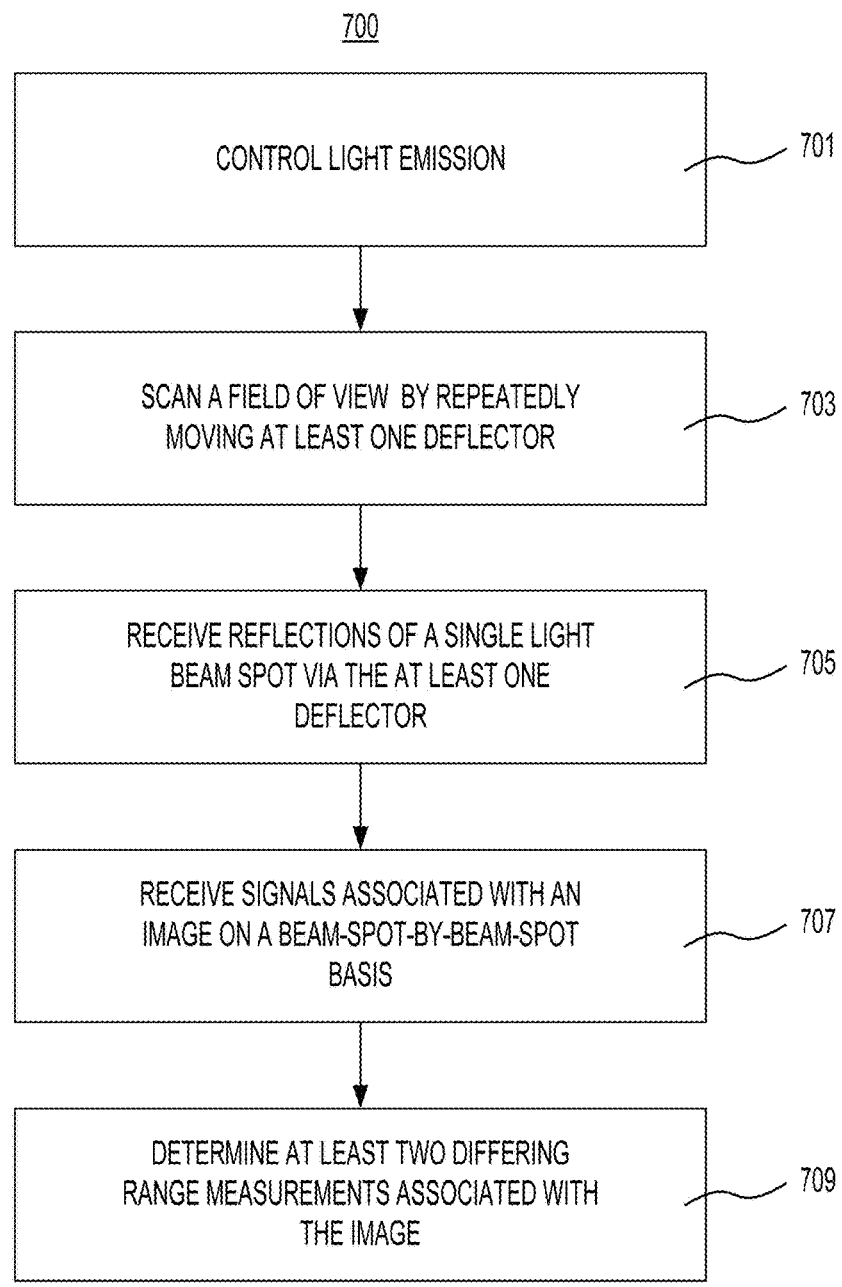
FIG. 7 is a flowchart illustrating an example method for detecting objects using a LIDAR system consistent with some embodiments of the present disclosure.

FIG. 7 illustrates an example method 700 for detecting objects using a LIDAR system. Method 700 may be performed by one or more processors (e.g., at least one processor 118 of processing unit 108 of LIDAR system 100 as depicted in FIG. 1A and/or two processors 118 of processing unit 108 of the LIDAR system 100 depicted in FIG. 2A).

At step 701, processor 118 controls light emission of a light source (e.g., light source 112 of FIG. 1A, laser diode 202 of light source 112 of FIG. 2A, and/or plurality of light sources 102 of FIG. 2B). For example, processor 118 may power up the light source or power down the light source. In addition, processor 118 may vary the timing of pulses from the light source. Alternatively or concurrently, processor 118 may vary the length of pulses from the light source. By way of further example, processor 118 may alternatively or concurrently vary spatial dimensions (e.g., length or width or otherwise alter a cross-sectional area) of light pulses emitted from the light source. In a yet further example, processor 118 may alternatively or concurrently vary the amplitude and/or frequency of pulses from the light source. In yet another example, processor 118 may change parameters of a continuous wave (CW) or quasi-CW light emission (e.g., its amplitude, its modulation, its phase, or the like) from the light source. Although the light source may be referred to as a "laser," alternative light sources may be used alternatively to or concurrently with lasers. For example, a light emitting diode (LED) based light source or likewise may be used as the light source. In some embodiments, the controlling of the light emission may include controlling the operation of other components of the emission path in addition to the light source itself. For example, processor 118 may further control the light source by controlling collimation optics and/or other optical components on the transmission path of the LIDAR system.

At step 703, processor 118 scans a field of view (e.g., field of view 120 of FIGS. 1A and 2A) by repeatedly moving at least one light deflector (e.g., light deflector 114 of FIG. 1A, deflector 114A and/or deflector 114B of FIG. 2A, and/or one-way deflector 114 of FIG. 2B) located in an outbound path of the light source. In some embodiments, the at least one light deflector may include a pivotable MEMS mirror (e.g., MEMS mirror 300 of FIG. 3A).

In some embodiments, processor 118 may move the at least one light deflector such that, during a single scanning cycle of the field of view, the at least one light deflector may be located in a plurality of different instantaneous positions (e.g., the deflector may be controlled such that the deflector moves from or through one instantaneous position to another during the scan of the LIDAR FOV). For example, the at least one light deflector may be moved continuously or non-continuously from one of the plurality of positions to another (optionally with additional positions and/or repetitions) during the scanning cycle. As used herein, the term "move" may refer to a physical movement of the deflector or a modification of an electrical property, an optical property of the deflector (e.g., if the deflector comprises a MEMS mirror or other piezoelectric or thermoelectric mirror, if the deflector comprises an Optical Phased Array (OPA), etc.). The moving of the at least one deflector may also be implemented for a light source which is combined with the at least one deflector. For example, if the LIDAR system includes a vertical-cavity surface-emitting laser (VCSEL) array or any other type of light emitter array, moving the at least one deflector may comprise modifying the combination of active lasers of the array. In such an implementation, the instantaneous position of the deflector may be defined by a specific combination of active light sources of the VCSEL array (or other type of light emitter array).

In some embodiments, processor 118 may coordinate the at least one light deflector and the light source such that, when the at least one light deflector is located at a particular instantaneous position, the outbound path of the light source is at least partially coincident with the return path. For example, as depicted in FIG. 2B, projected light 204 and reflected light 206 are at least partially coincident. In such embodiments, the at least one deflector may include a pivotable MEMS mirror.

Similarly, in some embodiments, an overlapping part of the outbound path and the return path may include a common light deflecting element. For example, as depicted in FIG. 2B, light deflector 114 directs the projected light towards field of view 120 and directs the reflected light towards sensor 116. In some embodiments, the common light deflecting element may be a movable deflecting element (i.e., a deflecting element which can be controllably moved between a plurality of instantaneous positions). In some embodiments, the overlapping part may comprise a part of the surface of the common light deflecting element. Accordingly, in certain aspects, one or more reflections may cover the entire (or almost the entire) area of the common light deflecting element even though the projected light does not impinge on the entire (or almost the entire) area of the common light deflecting element.

Alternatively or concurrently, the at least one light deflector may include at least one outbound deflector and at least one return deflector. For example, as depicted in FIG. 2A, outbound deflector 114A directs the projected light 204 towards field of view 120 while return deflector 114B directs reflected light 206 back from an object 208 within field of view 120. In such an embodiment, processor 118 may receive via the at least one return deflector, reflections of a single light beam-spot along a return path to the sensor that is not coincident with the outbound path. For example, as depicted in FIG. 2A, projected light 205 travels along a path not coincident with reflected light 206.

The optical paths, such as the outbound paths and return paths referenced above, may be at least partly within a housing of the LIDAR system. For example, the outbound paths may include a portion of space between the light source and the at least one light deflector and/or may include a portion of space between the at least one light deflector and an aperture of the housing that are within the housing. Similarly, the return paths may include a portion of space between the at least one light deflector (or separate at least one light deflectors) and an aperture of the housing and/or a portion of space between the sensor and the at least one light deflector (or separate at least one light deflectors) that are within the housing.

At step 705, while the at least one deflector is in a particular instantaneous position, processor 118 receives via the at least one deflector, reflections of a single light beam-spot along a return path to a sensor (e.g., at least one sensor 116 of sensing unit 106 of FIGS. 1A, 2A, 2B, and 2C). As used herein, the term "beam-spot" may refer to a portion of a light beam from the light source that may generate one or more reflections from the field of view. A "beam-spot" may comprise a single pixel or may comprise a plurality of pixels. Accordingly, the "beam spot" may illuminate a part of the scene which is detected by a single pixel of the LIDAR system or by several pixels of the LIDAR system; the respective part of the scene may cover the entire pixel but need not do so in order to be detected by that pixel. Furthermore, a "beam-spot" may be larger in size than, approximately the same size as, or smaller in size than the at least one deflector (e.g., when the beam spot is deflected by the deflector on the outbound path).

At step 707, processor 118 receives from the sensor on a beam-spot-by-beam-spot basis, signals associated with an image of each light beam-spot. For example, the sensor may absorb the reflections of each beam-spot and convert the absorbed beam-spot to an electronic (or other digital) signal for sending to processor 118. Accordingly, the sensor may comprise a SiPM (Silicon photomultipliers) or any other solid-state device built from an array of avalanche photodiodes (APD, SPAD, etc.) on a common silicon substrate or any other device capable of measuring properties (e.g., power, frequency) of electromagnetic waves and generating an output (e.g., a digital signal) relating to the measured properties.

In some embodiments, the sensor may include a plurality of detectors (e.g., detection elements 402 of detection array 400 of FIG. 4A). In certain aspects, a size of each detector may be smaller than the image of each light beam-spot, such that on a beam-spot-by-beam-spot basis, the image of each light beam-spot impinges on a plurality of detectors. Accordingly, as used herein, a plurality of light beam-spots need not include all the spots for which images are projected but rather at least two spots that are larger than a plurality of detectors.

In some embodiments, each detector out of a plurality of detectors of the sensor may comprise one or more sub-detectors. For example, a detector may comprise a SiPM, which may comprise a plurality of individual single-photon avalanche diodes (SPADs). In such an example, the sensor may include a plurality of SiPM detectors (e.g. 5, 10, 20, etc.), and each SiPM may include a plurality of SPADs (e.g. tens, hundreds, thousands). Accordingly, in certain aspects, a detector comprises a minimal group whose output is translated to a single data point in a generated output model (e.g., a single data point in a generated 3D model).

In some embodiments, the LIDAR system may include a plurality of light sources. In such embodiments, processor 118 may concurrently control light emission of a plurality of light sources aimed at a common light deflector. For example, as depicted in FIG. 2B, plurality of light sources 102 are aimed at a common light deflector 114. Moreover, processor 118 may receive from a plurality of sensors, each located along a differing return path, signals associated with images of differing light beam-spots. For example, as further depicted in FIG. 2B, plurality of sensors 116 receive reflections along differing return paths. The plurality of sensors 116 may thus generate signals associated with images of differing light beam-spots. In some embodiments, the reflections may also be deflected by at least one scanning light deflector. For example, as depicted in FIG. 2B, plurality of scanning light deflectors 214 deflect reflections received along differing return paths before reaching plurality of sensors 116.

In some embodiments, the sensor may include a one-dimensional array of detectors (e.g., having at least four individual detectors). In other embodiments, the sensor may include a two-dimensional array of detectors (e.g., having at least eight individual detectors).

At step 709, processor 118 determines, from signals resulting from the impingement on the plurality of detectors, at least two differing range measurements associated with the image of the single light beam-spot. For example, the at least two differing range measurements may correspond to at least two differing distances. In a similar example, the sensor may be configured to detect reflections associated with at least two differing times of flight for the single light beam-spot. In such an example, a time of flight measurement may differ on account of the difference in distance traveled for the light beam-spot with respect to the different detectors. Similarly, a frequency phase-shift measurement and/or a modulation phase shift measurement may differ on account of the difference in distance and/or angle of incidence with respect to the different detectors.

In some embodiments, the at least two differing range measurements may be derived from detection information acquired by two or more detectors of the sensor(s) (e.g., two or more independently sampled SiPM detectors). In addition, the at least two differing range measurements may be associated with two differing directions with respect to the LIDAR system. For example, a first range measurement detected by a first detector of the sensor(s) may be converted to a first detection location (e.g., in spherical coordinates, $\theta_1$, $\phi_1$, $D_1$), and the second range measurement detected from reflections of the same beam spot by a second detector of the sensor(s) may be converted to a second detection location (e.g., in spherical coordinates, $\theta_2$, $\phi_2$, $D_2$), where any combination of at least two pairs of coordinates differ between the first detection location and the second detection location (e.g. $\theta_2 \neq \theta_2$ and $D_1 \neq D_2$ or the like).

In another example in which the at least two differing range measurements correspond to at least two differing distances, the at least two differing range measurements may include a first distance measurement to a portion of an object and a second distance measurement to an element in an environment of the object. For example, if the beam-spot covers both an object (such as a tree, building, vehicle, etc.) and an element in an environment of the object (such as a road, a person, fog, water, dust, etc.), the first range measurement may indicate a distance to a portion of the object (such as a branch, a door, a headlight, etc.), and the second range measurement may indicate a distance to the background element. In yet another example in which the at least two differing range measurements correspond to at least two differing distances, the at least two differing range measurements may include a first distance measurement to a first portion of an object and a second distance measurement to a second portion of the object. For example, if the object is a vehicle, the first range measurement may indicate a distance to a first portion of the vehicle (such as a bumper, a headlight, etc.), and the second range measurement may indicate a distance to a second portion of the vehicle (such as a trunk handle, a wheel, etc.).

Alternatively or concurrently, the at least two differing range measurements associated with the image of the single light beam-spot may correspond to at least two differing intensities. Similarly, then, the at least two differing range measurements may include a first intensity measurement associated with a first portion of an object and a second intensity measurement associated with a second portion of the object.

In some embodiments, processor 118 may concurrently determine a first plurality of range measurements associated with an image of a first light beam-spot and a second plurality of range measurements associated with an image of a second light beam-spot. In certain aspects, the first plurality of range measurements may be greater than the second plurality of range measurements. For example, if the first light beam-spot includes more detail than the second light beam-spot, processor 118 may determine more range measurements from the first light beam-spot than from the second light beam-spot. In such an example, measurements from the first light beam-spot may comprise 8 measurements, and measurements from the second light beam-spot may comprise 5 measurements if, for example, the second light beam-spot is directed to or includes at least partially the sky.

In some embodiments, a number of differing range measurements determined in the scanning cycle may be greater than the plurality of instantaneous positions. For example, processor 118 may determine at least two differing range measurements for each instantaneous position, as explained above with reference to step 709. For example, if the sensor includes N detectors, and the LIDAR system detects ranges in M instantaneous positions of the deflector in each scanning cycle, the number of range measurements determined may be up to N×M. In some embodiments, the number of emitted pulses in each scanning cycle may be lower than the number of generated point-cloud data points (or other 3D model data points) even when a number of pulses is emitted for each portion of the FOV. For example, if P pulses are emitted in each instantaneous position, the number of pulses may be P×M for a scanning cycle, and, in the embodiments described above, P<M.

Method 700 may include additional steps. For example, method 700 may include generating output data (e.g., a 3D model) in which the differing measurements are associated with different directions with respect to the LIDAR. In such an example, processor 118 may create a 3D-model frame (or the like) from the information of different light beams and many pixels from different angles of the FOV.

In certain aspects, the different directions may differ with respect to an optical window or opening of the LIDAR through which reflected signals pass on their way to the at least one detector. For example, in spherical coordinates, at least one of $\phi$ or $\theta$ may be different between the two measurements.

In some embodiments, method 700 may further include generating a plurality of point-cloud data entries from reflections of the single light beam-spot. For example, processor 118 may generate a plurality of point-cloud data entries like those depicted in FIG. 1B from the reflections of the single light beam-spot. Processor 118 may generate a plurality, such as 2, 3, 4, 8, or the like from the single light beam-spot, e.g., using the at least two range measurements from step 709.

The plurality of point-cloud data entries may define a two-dimensional plane. For example, the plurality of point-cloud data entries may form a portion of a point-cloud model, like that depicted in FIG. 1C.

Method 700 may be performed such that different portions of the field of view are detected at different times. Accordingly, one portion of the field of view may be illuminated and result in the determination of a plurality of range measurements while at least one other portion of the field of view is not illuminated by the light source. Accordingly, method 700 may result in a scan of a portion of the field of view, which is then repeated for a different portion of the field of view, resulting in a plurality of "scans within a scan" of the field of view, as depicted in the examples of FIGS. 10B and 10C.

Figure 8A:
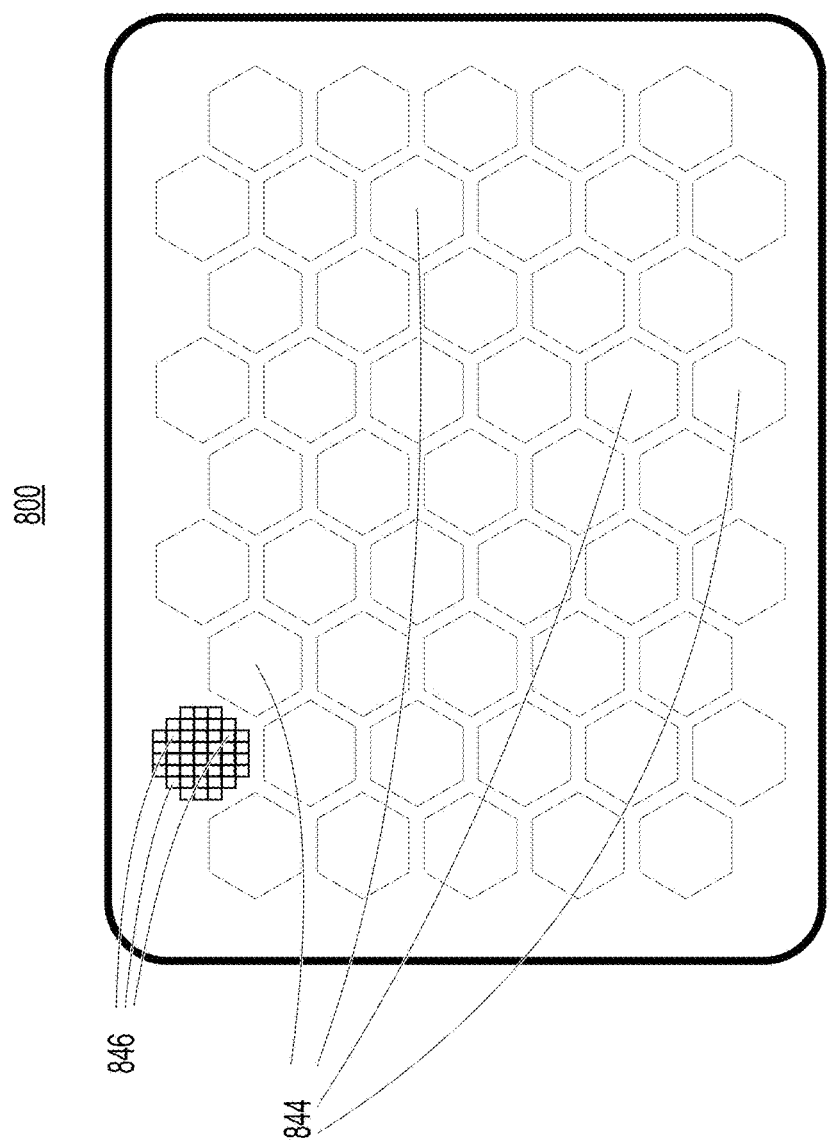
FIG. 8A is a diagram illustrating an example of a two-dimensional sensor consistent with some embodiments of the present disclosure.
Figure 8B:
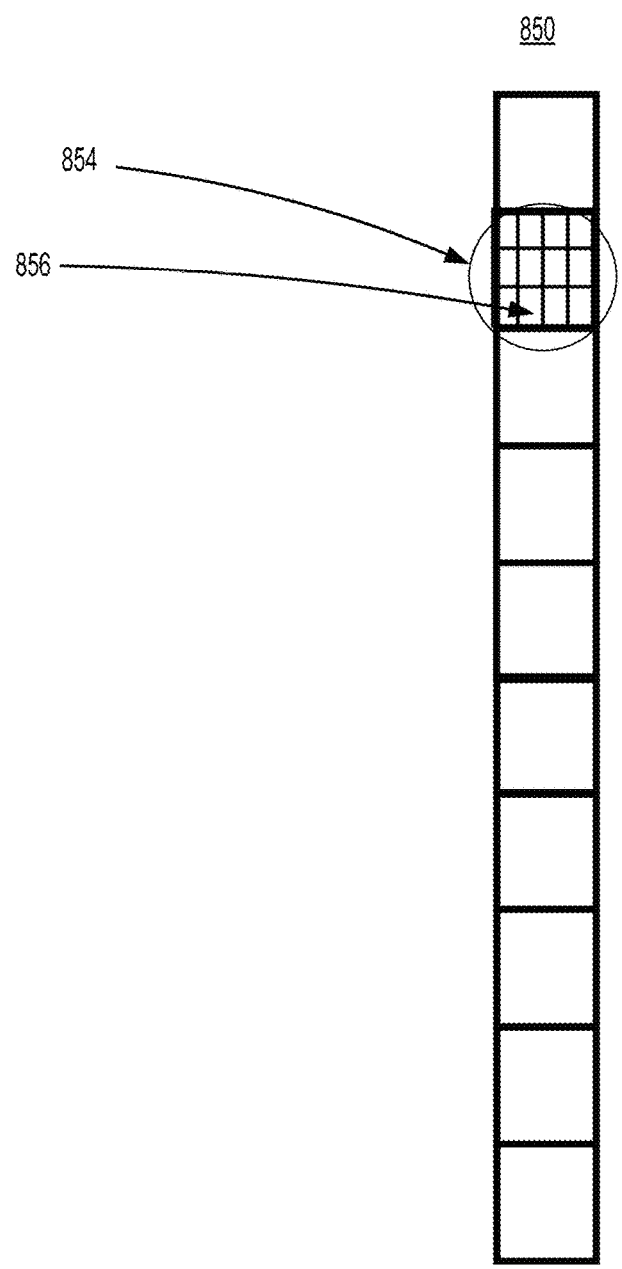
FIG. 8B is a diagram illustrating an example of a one-dimensional sensor consistent with some embodiments of the present disclosure.

As explained above, FIG. 4C is a diagram illustrating an example of a two-dimensional sensor 116 that may be used in method 700 of FIG. 7. FIG. 8A depicts an alternative sensor 800 for use in lieu of or in combination with sensor 116 of FIG. 4C. For example, detectors 410 in the example of FIG. 4C are rectangular while the example of FIG. 8A depicts a plurality of hexagonal pixels (e.g., pixels 844) comprised of individual detectors (such as detectors 846). Similarly, FIG. 8B depicts an alternative one-dimensional sensor 850 for use in lieu of or in combination with sensor 116 of FIG. 4C and/or sensor 800 of FIG. 8A. In the example of FIG. 8B, a one-dimensional column of pixels (e.g., pixel 854) is comprised of individual detectors (such as detector 856). Although depicted as a one-dimensional vertical column in FIG. 8B, another embodiment may include a one-dimensional horizontal row of detectors.

Figure 9A:
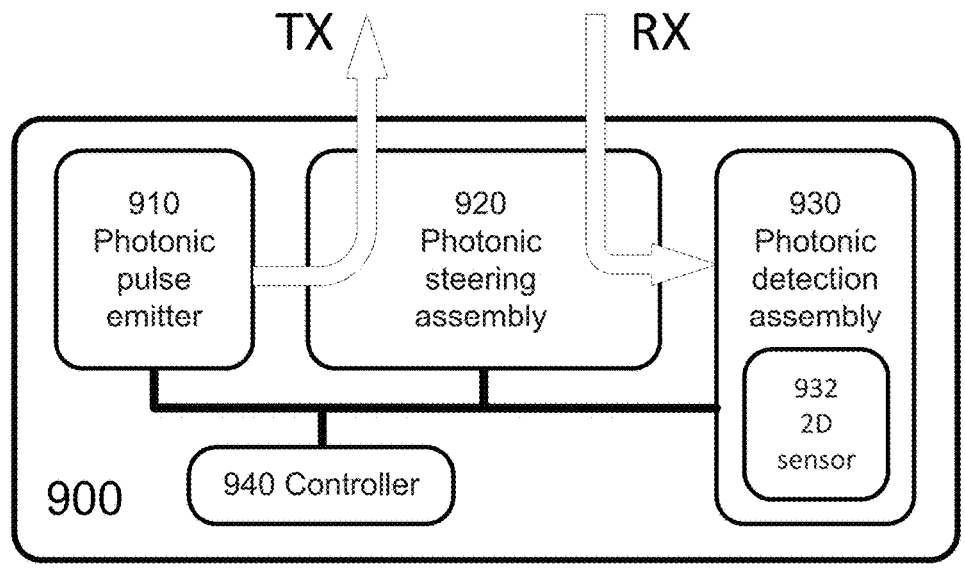
FIG. 9A is a block diagram illustrating an example LIDAR device having alignment of transmission and reflection consistent with some embodiments of the present disclosure.
Figure 9B:
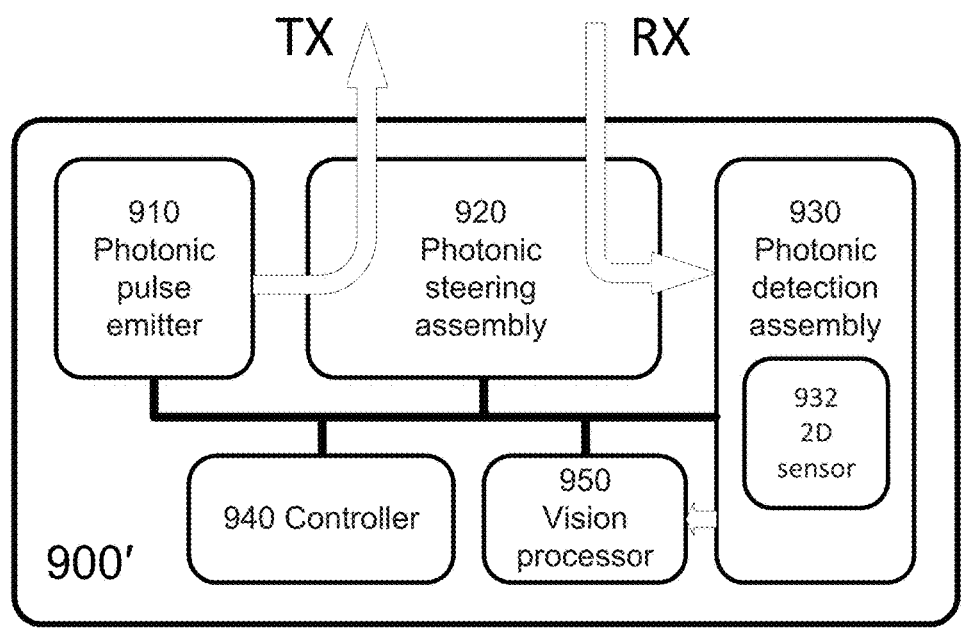
FIG. 9B is another block diagram illustrating another example LIDAR device having alignment of transmission and reflection consistent with some embodiments of the present disclosure.

FIGS. 9A and 9B are block diagrams illustrating example LIDAR devices having alignment of transmission and reflection. LIDAR systems 900 and 900' of FIGS. 9A and 9B represent implementations of LIDAR system 100 of FIG. 1. Accordingly, functionality and modifications discussed with respect to FIGS. 1A-C may be similarly applied to the embodiments of FIGS. 9A and 9B and vice versa. For example, as depicted in FIGS. 9A and 9B, LIDAR 900 and 900' may include at least one photonic pulse emitter assembly 910 for emitting a photonic inspection pulse (or pulses). Emitter 910 may include projecting unit 102 with at least one light source 112 of FIG. 1A, 2A, or 2B.

As further depicted in FIGS. 9A and 9B, LIDAR 900 and 900' may include at least one photonic steering assembly 920 for directing the photonic inspection pulse in a direction of a scanned scene segment, and for steering the reflected photons towards photonic detection assembly 930. Steering assembly 920 may include controllably steerable optics (e.g. a rotating/movable mirror, movable lenses, etc.) and may also include fixed optical components such as a beam splitter. For example, deflectors 114A and 114B of FIG. 2A and/or common light deflector 114 and plurality of scanning light deflectors 214 of FIG. 2B may be included in steering assembly 920. Some optical components (e.g., used for collimation of the laser pulse) may be part of emitter 910, while other optical components may be part of detector 930.

In FIGS. 9A and 9B, LIDAR 900 and 900' may further include at least one photonic detection assembly 930 for detecting photons of the photonic inspection pulse which are reflected back from objects of a scanned scene. Detection assembly 930 may, for example, include a two-dimensional sensor 932, such as sensor 116 of FIG. 4C and/or sensor 800 of FIG. 8. In some embodiments, detection assembly 930 may include a plurality of two-dimensional sensors.

As depicted in FIGS. 9A and 9B, LIDAR 900 and 900' may include a controller 940 for controlling the steering assembly 920, and/or emitter 910 and/or detector 930. For example, controller 940 may include at least one processor (e.g., processor 118 of processing unit 108 of LIDAR system 100 as depicted in FIG. 1A and/or two processors 118 of processing unit 108 of the LIDAR system depicted in FIG. 2A). Controller 940 may control the steering assembly 920, and/or emitter 910 and/or detector 930 in various coordinated manners, as explained both above and below. Accordingly, controller 940 may execute all or part of the methods disclosed herein.

As depicted in FIG. 9B, LIDAR 900' also includes at least one vision processor 950. Vision processor 950 may obtain collection data from photonic detector 930 and may process the collection data in order to generate data therefrom. For example, vision processor 950 (optionally in combination with controller 940) may generate point-cloud data entries from the collection data and/or generate a point-cloud data model therefrom.

In both LIDAR 900 and 900', transmission (TX) and reflection (RX) are coordinated using controller 940 (and optionally visional processor 950 for LIDAR 900'). This coordination may involve synchronized deflection of both transmission and reflection using coordination amongst a plurality of light deflectors and/or synchronized deflection of both transmission and reflection using coordination within a shared deflector. The synchronization may involve physical movement and/or piezoelectrical/thermoelectrical adjustment of the light deflector(s).

FIG. 10A illustrates an example first FOV 1000 and several examples of second FOVs 1002 and 1004. The angular sizes and pixel dimensions of any FOV may differ than the examples provided in FIG. 10A.

FIG. 10B illustrates an example scanning pattern of second FOV 1002 of FIG. 10A across first FOV 1000 of FIG. 10A. As depicted in FIG. 10B, second FOV 1002 may be scanned and then moved right-to-left in a horizontal pattern followed by left-to-right in a diagonal pattern across FOV 1000. Such patterns are examples only; systems and methods of the present disclosure may use any patterns for moving a second FOV across a first FOV.

FIG. 10C illustrates an example scanning pattern of a second FOV 1006 across first FOV 1000 of FIG. 10A. As depicted in FIG. 10C, second FOV 1006 may be scanned and then moved right-to-left in a horizontal pattern across FOV 1000. Such a pattern is an example only; systems and methods of the present disclosure may use any patterns for moving a second FOV across a first FOV. Referring to the examples of FIGS. 10B and 10C, it is noted that the array sizes used in the diagrams are used as non-limiting examples only, just like the non-limiting example of FIG. 10A, and that the number of pixels in each array can be significantly lower (e.g., 2×3, 3×5, etc.), significantly higher (e.g., 100× 100, etc.), or anywhere in between.

In the example of FIG. 10C, second FOV 1006 has a height corresponding to the height of first FOV 1000. Accordingly, as shown in FIG. 10C, by matching at least one corresponding dimension of the second FOV with the first FOV, a lower scan rate of the second FOV across the first FOV may be required. Accordingly, LIDAR systems consistent with the present disclosure may include a 1D sensor array whose dimension corresponds to at least one dimension of the first FOV.

Returning to the example of FIG. 10B, the second FOV 1002 is smaller in both dimensions than the first FOV 1000. This may allow the LIDAR system to concentrate more energy at a smaller area, which may improve the signal-to-noise ration and/or a detection distance.

By scanning a second FOV across a first FOV, systems of the present disclosure may allow for generation of a 3D model with relatively low smear of objects, in part because larger parts of the objects may be detected concurrently by the steerable 2D sensor array. The reduced smear level may be achieved across one or more of the axes of the sensor array (e.g., (X,Y), (φ,θ)), and/or across the depth axis (e.g., Z, r). The low level of smear may result in higher detection accuracy.

Scanning a second FOV across the first FOV may further allow scanning in a relatively low frequency (e.g., moving the mirror at the vertical axis at about 10 times lower frequency if 10 vertical pixels are implemented in the sensor array). A slower scanning rate may allow utilization of a larger mirror.

Scanning a second FOV across the first FOV may further allow the use of a weaker light source than in extant systems, which may reduce power consumption, result in a smaller LIDAR system, and/or improve eye safety and other safety considerations. Similarly, scanning a second FOV across the first FOV may allow for the use of a relatively small sensor as compared with extant systems, which may reduce size, weight, cost, and/or complexity of the system. It may also allow for the use of a more sensitive sensor than in extant systems.

Scanning a second FOV across the first FOV may further allow the collection of less ambient light and/or noise. This may improve the signal-to-noise ration and/or a detection distance as compared with extant systems.

Selective Illumination in Lidar Based on Detection Results

As noted above, LIDAR system 100 may be used to generate depth maps of detected objects within a scene. Such depth maps may include point cloud models, polygon meshes, depth images, or any other type of 3D model of a scene. In some cases, however, less than all of the objects in a particular scene, or within a particular distance range, may be detected by the LIDAR system. For example, while objects relatively close to the LIDAR system may be detected and included in a 3D reconstruction of a scene, other objects (e.g., including objects that are smaller, less reflective, or farther away, etc.) may go undetected for a particular set of operational parameters of the LIDAR system. Additionally, a signal to noise ratio of the system, in some instances, may be less than desirable or lower than a level enabling detection of objects in a field of view of the LIDAR system.

In certain embodiments, the presently described LIDAR system, including any of the configurations described above, may enable variation of one or more operational parameters of the LIDAR system during a current scan of an FOV or during any subsequent scan of the FOV in order to dynamically vary light flux amounts to different sections of the LIDAR FOV. In doing so, LIDAR system 100 may offer an ability to increase a number of detected objects within the FOV. LIDAR system 100 may also enable increases in signal to noise ratios (e.g., a ratio of illumination from the LIDAR system compared with other sources of noise or interference, such as sun light (or other sources of illumination) and electrical noise associated with detection circuitry, for example). Increasing the signal to noise ratio can enhance system sensitivity and resolution. Through such dynamic variation of light flux provided at different regions of the LIDAR FOV, depth maps (or other representations of a scene) from an environment of the LIDAR system may be generated, that include representations of one or more objects that may have otherwise gone undetected.

While there are many different possibilities for dynamically altering light flux to certain areas of a scanned FOV, several examples of which are discussed in more detail below, such dynamic variation of light flux may include reducing or maintaining a light flux level where objects are detected within the scanned FOV and increasing light flux in regions where objects are not detected. Such increases in light flux may enable detection of more distant objects or less reflective objects. Such increases in light flux may also enhance the signal to noise ratio in a particular region of the scanned FOV. As noted, these effects may enable generation of a depth map of objects in an environment of the LIDAR system that offers more complete information. In addition to objects detectable within a certain range associated with a fixed light flux scan, the system may also identify other objects through dynamic adjustment of light flux during scanning.

As noted above, LIDAR system 100 may include a projecting unit 102, including at least one light source 112. Processing unit 108 may be configured to coordinate operation of light source 112 and any other available light sources. In some cases, processing unit 108 may control light source 112 in a manner enabling light flux to vary over a scan of a field of view of the LIDAR system using light from the at least one light source 112. Processing unit 108 may also control deflector 114 of scanning unit 104 in order to deflect light from the at least one light source 112 in order to scan the field of view. And as previously described, processing unit 108 may interact with sensing unit 106 in order to monitor reflections from various objects (e.g., based on signals generated by one or more sensors on which the reflections are incident) in the scanned FOV. Based on the monitored reflections, processing unit 108 may generate depth maps or other reconstructions of a scene associated with the scanned FOV. For example, processing unit 108 may use first detected reflections associated with a scan of a first portion of the field of view to determine an existence of a first object in the first portion at a first distance. During the scan of the FOV, processing unit 108 may determine an absence of objects in a second portion of the field of view at the first distance. For example, processing unit 108 may determine the absence of objects in the second portion by processing sensor detection signals received over a period of time that corresponds with or includes the travel time of light along a distance equal to twice the first distance (as reflected light needs to travel to and back from an object, if one exists within the first range), as measured beginning with the emission of light towards the second portion of the field of view. Following the detection of the first reflections and the determination of the absence of objects in the second portion, the processing unit 108 may alter a light source parameter associated, for example, with the at least one light source 112 such that more light is projected toward the second portion of the field of view than is projected toward the first portion of the field of view. The processing unit 108 may also use second detected reflections in the second portion of the field of view to determine an existence of a second object at a second distance greater than the first distance.

During a scan of the LIDAR system FOV, processor unit 108 may control one or more parameters associated with the available light sources 112 in order to change an amount of light flux provided (e.g., projected) to certain regions of the FOV. In some cases, the change in light flux may include an increase in light flux in one region of the FOV relative to an amount of light flux provided in another region of the FOV. The change in light flux may also include an increase in an amount of light provided over a particular time period relative to another time period (e.g., within a particular region of the FOV). An increase in light flux corresponding to more light being projected or supplied to a particular region may include various quantitative characteristics of projected light. For example, an increase in light flux may result in or may be associated with a corresponding increase in: power per solid angle, irradiance versus FOV portion, a number of projected light pulses, power per pixel, a number of photons per unit time, a number of photons per scan cycle, aggregated energy over a certain period of time, aggregated energy over a single scan cycle, flux density (e.g. measured in W/m²), a number of photons emitted per data point in a generated point cloud model, aggregated energy per data point in a generated point cloud model, or any other characteristic of increasing light flux.

The deflector 114 controlled by processing unit 108 to deflect the light from the at least one light source 112 may include any suitable optical element for changing an optical path of at least a portion of light incident upon the deflector. For example, in some embodiments, deflector 114 may include a MEMS mirror (e.g., a pivotable MEMS mirror). The deflector may include other types of mirrors, prisms, controllable lenses, mechanical mirrors, mechanical scanning polygons, active diffraction elements (e.g., a controllable LCD), Risley prisms, a non-mechanical electro optical beam steerer, polarization gratings, an optical phased array (OPA), or any other suitable light steering element.

Optionally, after the first object is detected, processing unit 108 may control the at least one light source 112 and/or the at least one deflector such that all of the emissions toward the second region of the FOV used in the detection of the second object are emitted before additional light is emitted to the first portion (e.g. at a later scan cycle).

Figure 11:
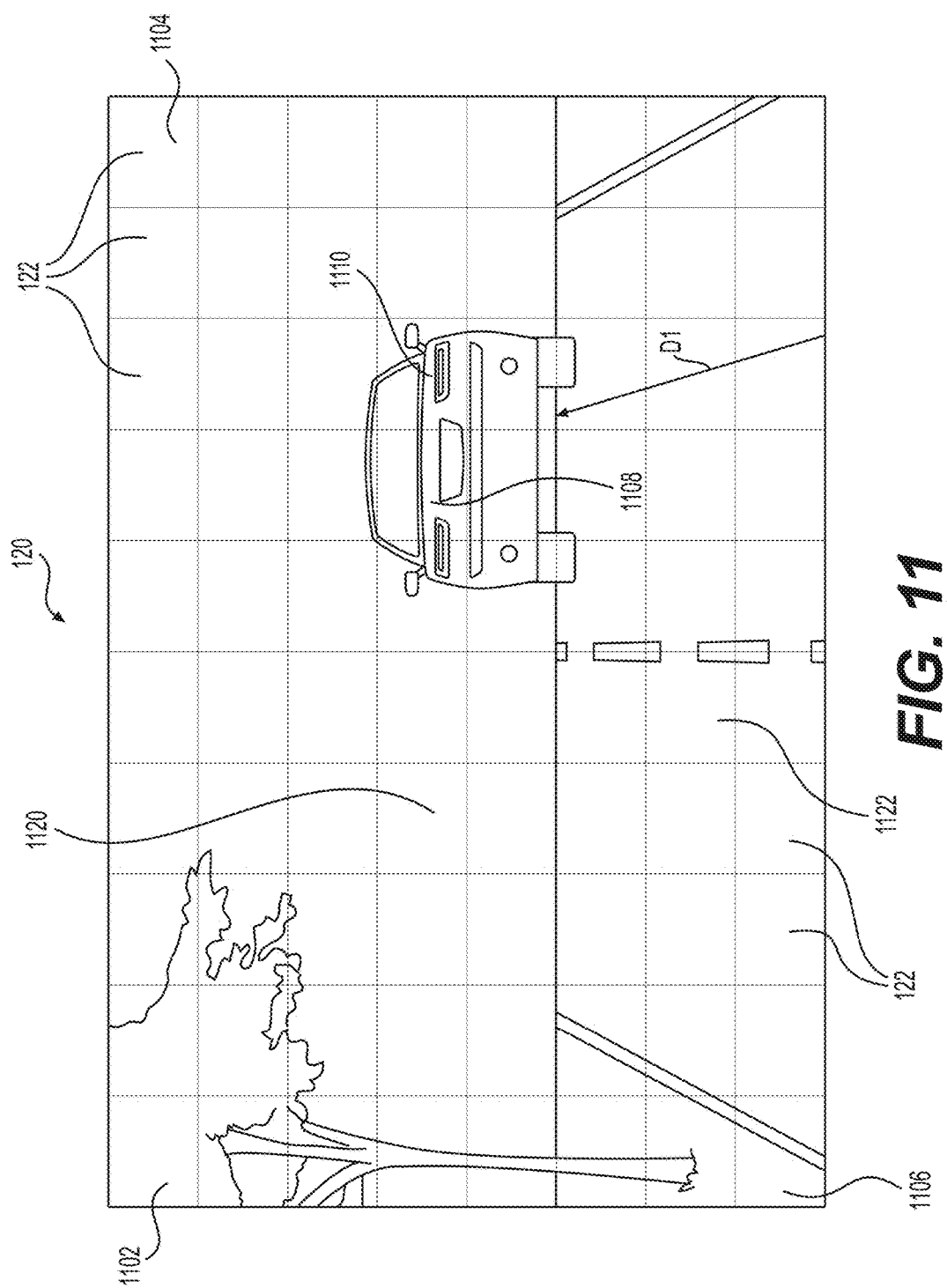
FIG. 11 provides a diagrammatic illustration of a field of view and an associated depth map scene representation associated with a LIDAR system, according to presently disclosed embodiments.
Figure 12:
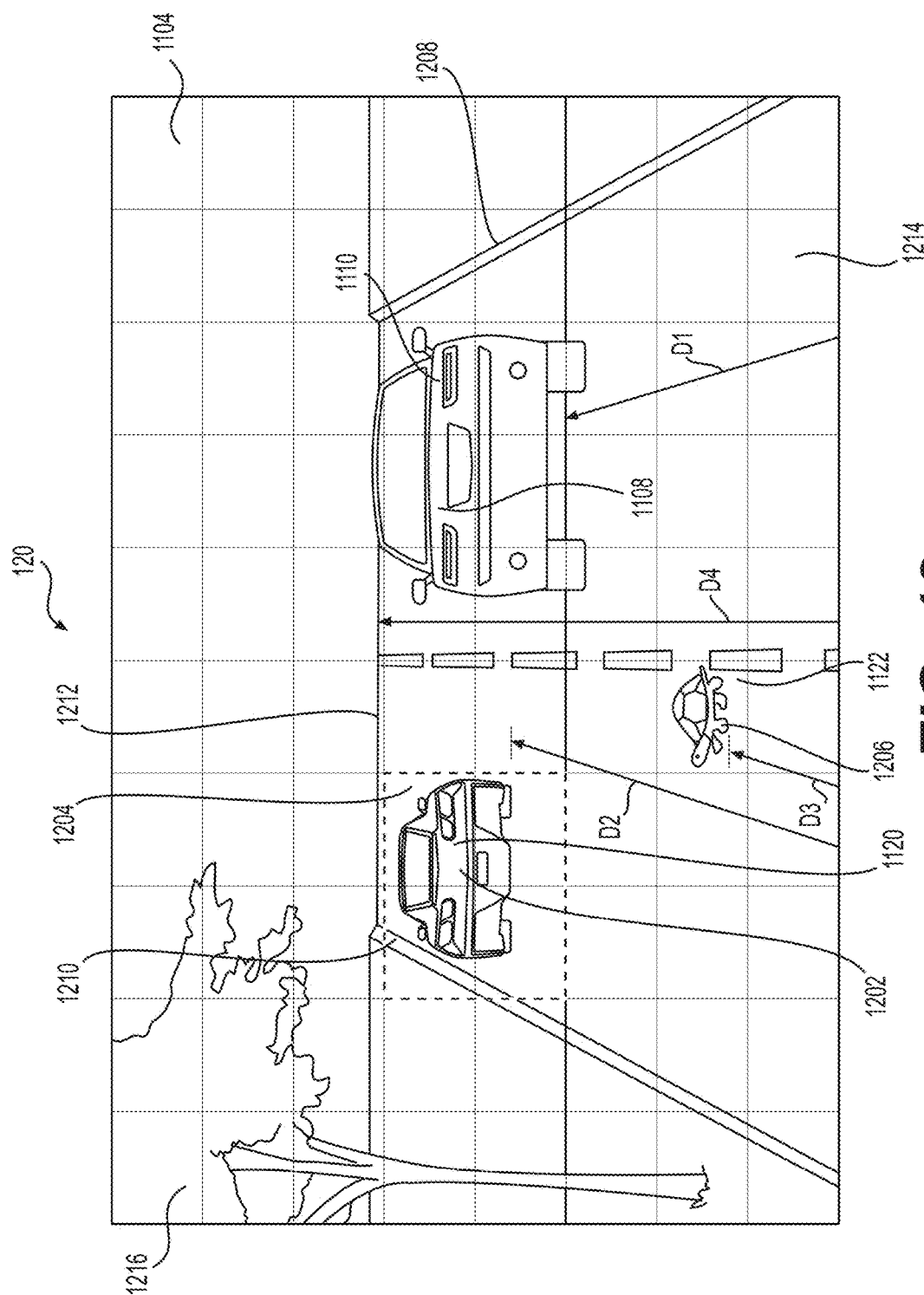
FIG. 12 provides a diagrammatic illustration of a field of view and an associated depth map scene representation generated using a LIDAR system with a dynamically variable light flux capability, according to presently disclosed embodiments.

This technique of scanning a LIDAR FOV and dynamically varying light flux provided to certain regions of the LIDAR FOV will be described in more detail with respect to FIGS. 11 and 12. FIG. 11 provides a diagrammatic illustration of an FOV 120 that may be scanned using processing unit 108 to control the one or more light sources 112 and the at least one deflector 114. For example, as previously described, the FOV may be scanned by moving deflector 114 through a plurality of instantaneous positions, each corresponding with a particular portion 122 of FOV 120. It is noted that FOV 120 may include a plurality of substantially equal-sized portions 122 (e.g. defined by the same solid angle). However, this is not necessarily so. It should be noted that during a scan of FOV 120, deflector 114 may dwell at each instantaneous position for a predetermined amount of time. During that time, light may be projected to a corresponding portion 122 of FOV 120 in a continuous wave, a single pulse, multiple pulses, etc. Also, during the predetermined dwell time at a particular instantaneous position, light reflected from objects in a scene may also be directed to one or more detector units using deflector 114 (e.g., in monostatic embodiments). Alternatively, deflector 114 may move continuously (or semi continuously) through a plurality of instantaneous positions during a scan of FOV 120. During such a continuous or semi-continuous scan, light may be projected to instantaneous portions 122 of FOV 120 in a continuous wave, a single pulse, multiple pulses, etc. Also, during such a continuous or semi-continuous scan, light reflected from objects in a scene may also be directed to one or more detector units using deflector 114 (e.g., in monostatic embodiments).

A scan of FOV 120 may progress, for example, by projecting light from light source 112 to region 1102 of FOV 120, collecting reflected light from region 1102, and performing time of flight analysis based on the projected and reflected light to determine distances to one or more objects within region 1102 that produced the reflections. After collecting the reflected light from region 1102, processing unit 108 may cause deflector 114 to move to another region of FOV 120 (e.g., an adjacent region or some other region) and repeat the process. The entire FOV 120 may be scanned in the manner (e.g., moving from region 1102 to 1104 and then scanning all additional rows to end at region 1106).

While the scanning pattern associated with FIG. 11 may be from left to right and then right to left for each successive row beginning at the top row, any suitable scanning pattern may be used for scanning FOV 120 (e.g., row by row in either or both horizontal directions; column by column in either or both vertical directions; diagonally; or by selection of any individual regions or a subset of regions). And as also described previously, depth maps or any type of reconstruction may be generated based on the reflections and distance to object determinations.

Processing unit 108 may control deflector 114 in any suitable manner for enabling deflector 114 to redirect light from light source 112 to various regions 122 of FOV 120. For example, in some embodiments, the at least one processor 118 may be configured to control the at least one light deflector 114 such that the at least one light deflector is pivoted in two orthogonal axes or along two substantially perpendicular axes. In other embodiments, the at least one processor 118 may be configured to control the at least one light deflector 114 such that the at least one light deflector is pivoted along two linearly independent axes, which may enable a two-dimensional scan. Such deflector movement may be obtained by any of the techniques described above. Additionally, in some cases, processing unit 108 may control a rotatable motor for steering the at least one light deflector.

As the scan of FOV 120 progresses, light reflections from some of the particular regions in the FOV (e.g., regions 122) may be used to determine an existence of an object within a particular region of the FOV. For example, during the scan of region 1108, reflections received from car 1110 may enable processing unit 108 to determine the presence of an object (i.e., the car) within region 1108 and also to determine a distance to that object. As a result of a scan of region 1108, processing unit 108 may determine that an object exists within that region and that the object resides at a distance, D1, relative to a host of the LIDAR system 100. It is noted that optionally, processing unit 108 may determine more than a single distance for a region of the FOV. This may occur, for example, if two or more objects are reflecting light in the same FOV (e.g. in region 1120 of FIG. 12, reflections from both car 1202 and the road may be received and analyzed), or if the reflective object is positioned in a way which reflects light from a range of distances (e.g., from a slanted surface).

Scans of other regions of FOV 120, however, may not result in the return of observable reflections. In such cases, processing unit 108 will not detect the presence of objects within those regions. For example, regions 1120 and 1122 of FOV 120, as illustrated in FIG. 11, have not returned observable reflections during the respective scans of those regions. As a result, a depth map created based on reflections received and distance analysis performed for the regions of FOV 120 will not show the presence of any objects within regions 1120 or 1122. Processing unit 108 may determine, based on the absence of available reflections in regions 1120 and 1122 (and other non-reflecting regions) that there is an absence of objects in those regions at a range of distances at which LIDAR system 100, for a given set of operational parameters, is sensitive. For example, because processing unit 108 may determine that car 1110 (or at least a portion of the car) is present at a distance D1 in region 1108, based on reflections received from that region, processing unit 108 may determine that no objects are present in region 1120 at distance D1 relative to LIDAR system 100. This determination may be based on the presumption that had any objects been present in region 1120 at a distance D1 (and assuming such objects had reflectivity characteristics similar to car 1110), processing unit 108 would have identified the presence of those objects as it did in region 1108.

Notably, a determination of an absence of objects in a particular region of FOV 120 may be based on the detection capabilities of the LIDAR system for a particular set of operational parameters. Changing of those operational parameters, especially in a manner that may increase a detection sensitivity of the LIDAR system (e.g., increasing signal-to-noise ratio), may result in an identification of objects in regions where no objects were detected prior to changing the operational parameters.

In regions of the FOV where processing unit 108 determines an absence of objects at distance D1 (e.g., regions 1120 or 1122), processing unit 108 may alter a light source parameter such that more light is projected toward one or more regions of the FOV than is projected toward regions of the FOV where objects are detected. With respect to the example shown in FIG. 11, after not detecting any objects in region 1120 (either at distance D1 or otherwise), processing unit 108 may alter a light source parameter such that more light is projected to region 1120 than was directed to region 1108 (where a portion of car 1110 was detected). Such an increase in an amount of light provided to region 1120 may increase the signal-to-noise ratio in that area, may increase the LIDAR system sensitivity in that region, may enable the system to detect objects having lower reflectivity, and/or may enable the system to detect objects that may be located farther away (e.g., at distances greater than D1).

Various light source parameters may be altered in order to cause an increase in an amount of light supplied to a particular region of the FOV. For example, processing unit 108 may cause light source 112 to increase a duration of a continuous wave emission, increase a total number of light pulses, increase an overall light energy of emitted light, and/or increase the power (e.g., peak power, average power, etc.) of one or more light pulses projected to a particular region of the FOV. Additionally or alternatively, a light-pulse-repetition number per scan may be increased such that more light pulses are supplied to one region of the FOV as compared to another region of the FOV. More broadly, after determining the absence of objects in a particular region at a particular distance or range of distances, for example, or based on any other criteria relating to detection results relative to a certain region of the FOV, any light source parameter may be adjusted such that the flux of light directed to one portion of the field of view (e.g., region 1120) is different (e.g., greater) than the flux of light directed to another portion of the field of view (e.g., region 1108). As previously noted, references to more light being projected to a particular region may include at least one of: additional power provided per solid angle, increased irradiance relative to a portion size, additional pulses of light, more power per pixel, more photons for a given period of time, an increase in aggregate of energy over a predefined time period, higher flux density, $W/m^2$, a larger number of photons per scan cycle, more aggregated energy over a certain period of time, more aggregated energy over a single scan cycle, a larger number of photons emitted per data point in a generated point cloud model, more aggregated energy per data point in a generated point cloud model, etc.

Alteration of the various light source parameters may occur in response to any observed criteria. For example, at least one pilot pulse may be emitted, and detection results may be observed based on acquired reflections of the at least one pilot pulse. Where the detection results for a particular region in which the at least one pilot pulse was emitted indicate no objects present, no objects present at a particular distance (e.g., D1), fewer than expected objects present, no objects detected beyond a particular distance range, low reflectivity objects detected, low signal to noise ratios (or any other suitable criteria), then processing unit 108 may cause more light to be supplied to the particular region using any of the techniques described above (longer continuous wave, added pulses, higher power, etc.), or any other technique resulting in more light being supplied to the particular region. In some cases, a "pilot pulse" may refer to a pulse of light whose detected reflections are intended for deciding upon following light emissions (e.g., to the same region of the FOV, during the same scan). It is noted that the pilot pulse may be less energetic than pulses of the following light emissions, but this is not necessarily so. In some cases, a pilot pulse may correspond to any initial light pulse (in an emission sequence) provided to a particular region of the LIDAR FOV.

The alteration of the various light source parameters may also occur as part of a predetermined operational sequence. For example, in some embodiments, a predetermined illumination sequence for one or more of the regions 122 of the FOV 120 may include providing a specified series of light pulses toward one or more of the regions 122 of FOV 120. A first light pulse may include a relatively low power, and one or more subsequent pulses may include a higher power level than the first emitted pulse. In some cases, the light pulses may be emitted with progressively increasing power levels. It is nevertheless noted that the series of pulses may be of similar per-pulse power levels, and the increase in light amount is achieved in the accumulative emitted amount during the scan.

Increases in light amounts provided to a particular region of the FOV may occur at various times during operation of LIDAR system 100. In some embodiments, the increases in light supplied to a particular region versus another region of the FOV may occur during a current scan of the FOV. That is, during a particular scan of the FOV, an amount of light supplied to a portion of the FOV associated with a particular instantaneous position of deflector 114 may be greater than an amount of light provided to a portion of the FOV corresponding to a different instantaneous position of deflector 114 during the particular scan of the FOV. Thus, in some embodiments, processing unit 108 may be configured to alter the light source parameter such that more light (e.g., more irradiance per solid angle) is projected toward a particular region of the FOV in a same scanning cycle in which an absence of objects was determined (e.g., at a particular distance) in other region of the FOV.

Alternatively, increases in light supplied to a particular FOV region as compared to another region of the FOV may occur during different scans of the FOV. In other words, a complete scan of the FOV may be performed, and on subsequent scans of the FOV, more light may be supplied to one or more regions of the FOV as compared to other regions of the FOV based on the results of the previous scan of the FOV. In some cases, it may not be necessary to do a complete scan of the FOV before returning to a particular portion of the FOV and increasing the amount of light supplied to the particular region relative to an amount of light supplied to another portion of the FOV. Rather, such an increase may occur even after a partial scan of the FOV before returning to a particular region of the FOV and increasing an amount of light supplied there, either relative to an amount of light that was supplied to that region during a previous scan (or partial scan) or relative to an amount of light provided to another region of the FOV.

An increase in an amount of light supplied to a particular region of the FOV, such as region 1120, may result in additional reflections from which object detection may be possible. In view of the increased amount of light supplied to the particular region, it may be possible to increase the signal to noise ratio for light collected from that region. As a result of an improved signal to noise ratio and/or in view of additional light available for detection (including, at least in some instances, higher power light) it may be possible to detect the presence of objects at distances further from the LIDAR system than what was possible based the use of lower amounts of light in a particular FOV region.

As an illustrative example, in some embodiments a scan of FOV 120 in FIG. 11 may commence using a predetermined or default amount of light supplied to each specific region 122 of the FOV. If an object is detected in a particular region, such as region 1108, for example, then processing unit 108 may move deflector 114 to another instantaneous position in order to examine another area of FOV 120, without additional light being emitted to the aforementioned region (e.g. region 1108). Where no objects are detected in a particular region, such as region 1120, processing unit 108 may cause an additional amount of light to be supplied to that region. The increased amount of light may be provided during a current scan of the FOV and before deflector 114 is moved to a new instantaneous position. Alternatively, the increase in an amount of light, e.g., to region 1120, may be made during a subsequent scan or partial scan of FOV 120. In some cases, the increase in the amount of light supplied to a region, such as region 1120 may result in the detection of objects that were not detected during examination of the particular FOV region using a lower amount of light. An example in which additional light is provided during a partial scan of the FOV 120 is that pilot pulses are emitted to each region of a row while scanning in a first direction, and additional light is emitted while scanning back in the opposite directions to regions in which absence of objects were determined, and only than a scanning of another row is initiated.

In the illustrative example, if based on one or more pilot pulse no object is detected in region 1120 or no objects are detected in region 1120 beyond a certain distance (e.g., distance D1 at which car 1110 was determined to be located), then an amount of light may be increased to region 1120 using any of the previously described techniques. For example, in one embodiment, one or more additional light pulses (optionally, at higher power levels than the pilot pulse) may be provided to region 1120. These additional light pulses may each result in subsequent reflections detectable by sensing unit 106. As a result, as shown in FIG. 12, an object, such as a car 1202, may be detected. In some cases, this object, such as car 1202, may be located at a distance D2 greater than a distance at which objects were previously detected in the same region or in different regions (e.g., car 1110 located at a distance D1 and occupying region 1108 and nearby regions of the FOV). Thus, in the specific (and non-limiting) illustrative example, an initial pilot pulse of light provided to region 1120 and its subsequent reflection may not result in detection of any objects at a distance D1—the distance at which car 1110 was detected in region 1108 based on a pilot pulse, e.g., provided to region 1108. In response to an observed absence of objects at distance D1 in region 1120, one or more additional pulses (optionally higher powered pulses or a lengthened continuous wave, etc., but not necessarily so) may be supplied to region 1120 in order to provide more light to region 1120. Based on these one or more additional pulses provided to region 1120 and their respective, subsequent reflections, the existence of an object, such as car 1202, may be determined at a distance D2 greater than distance D1, where car 1110 was detected in region 1108.

It should be noted that an increase in an amount of light and the specific protocol selected for providing the increase in the amount of light may be unique to a particular region of the FOV, such as region 1120, which may correspond to a particular instantaneous position of deflector 114. Alternatively, a specific protocol selected for increasing light may not be limited to a particular region of the FOV, such as region 1120, but rather may be shared by a plurality of regions of the FOV. For example, region 1204 of FOV 120 (surrounded by dashed lines in FIG. 12) may include four particular regions of the FOV each corresponding to a different instantaneous position of deflector 114. In some embodiments, a selected protocol for increasing light to any of the sub-regions of FOV region 1204 may be the same across all of the subregions. As a result, application of a common light-increasing protocol to each of the sub-regions of FOV region 1204 may result in multiple objects or a single object being detected in the sub-regions at similar distances or distance ranges. For example, as shown in FIG. 12, through application of a common light-increasing protocol across the sub-regions of FOV region 1204, portions of car 1202 (e.g., at a distance D2 greater than a distance D1 where car 1110 was detected) may be detected in each of the different sub-regions of FOV region 1204. It should be noted, optionally the decision of whether to increase light emission in one region of the FOV may be dependent (at least in part) on reflection detection information of another region of the FOV.

In addition to providing an ability to detect more distant objects through addition of light to a particular region of the FOV, other objects may also be detected as a result of the increase in light. For example, as shown in FIG. 11, a pilot pulse of light supplied to region 1122 may not result in detection of any objects in region 1122. A subsequent increase in light supplied to region 1122 and at least one resulting reflection, however, may enable detection of an object in region 1122, such as a turtle 1206, as shown in FIG. 12. While turtle 1206 may be located at a distance D3 less than D1 (e.g., closer to the LIDAR system than car 1110), turtle 1206 may have a lower reflectivity than car 1110 and, therefore, may have gone undetected in response to the initial pilot pulse supplied to region 1122 (the lower reflectivity of turtle 1206 may be a result, for example, of its partial size relative to region 112 and/or of the lower reflectivity factor of its shell). One or more subsequent light pulses, for example, provided to region 1122 along with their respective reflections may enable detection of the lower reflectivity turtle 1206. Such an approach of increasing light to regions of the FOV may enable detection of various objects not detected based on an initial amount of light supplied to a region of the FOV. For example, objects such as distant curbs 1208 and 1210 and/or a horizon 1212 (at distance D4 greater than D1, D2, and D3) of a road 1214 may be detected using this technique. At the same time, for regions of the FOV where objects such as car 1110 or tree 1216 are detected using an initial pulse (or a portion of an available light budget), additional light increases may not be needed, and the FOV scan may be continued at a different instantaneous position of deflector 114.

While deflector 114 may be moved to a new instantaneous position without further light emission after detecting an object in a particular region of the FOV, in some cases, additional light may be emitted while the deflector still directs light toward the corresponding particular region of the FOV. Reflections resulting from the supplemental light can provide further information about the particular region of the FOV and/or confirm detections made based on lower levels of light provided to the same region. For example, in the illustrative example of FIGS. 11 and 12, deflector 114 may be positioned in order to provide a pilot pulse to region 1120. A resulting reflection may not result in detection of any objects in region 1120. Next, a second pulse may be provided to region 1120 (e.g. at a higher power level than the pilot pulse). A reflection from the second pulse may enable detection of car 1202 at a distance D2 greater than a distance D1 at which car 1110 was detected based on a reflection of a pilot pulse provided to region 1108. Rather than moving on from region 1120 after detecting car 1202 in that region, however, deflector 114 may remain in its instantaneous position corresponding to region 1120. A third pulse (optionally at a higher power than the second pulse) may be provided to region 1120. A subsequent reflection of the third pulse may not result in the detection of any additional objects in region 1120 (although it could). But, the reflection of the third pulse may enable confirmation of the determination (e.g., based on the reflection of the second pulse) that no objects are present in region 1120 at distance D1. The reflection of the third pulse may also enable confirmation of the detection of car 1202 at distance D2, as determined based on the reflection of the second pulse supplied to region 1120. It is noted that possibly, none of the reflections of the first, second and third pulses may enable detection of an object in the respective region, while a combination of all of the reflections could. This may be the result of SNR improvement. Another example would be decision algorithms, which may check for consistency in detection across several pulses.

It should be noted that increases in an amount of light provided to a particular region of FOV 120, whether relative to amounts of light provided to other regions of the FOV or relative to an amount of light provided to the particular region of the FOV during the same or earlier scan of the FOV, may proceed according to any desired protocol. Such a protocol may be applicable to all regions in the FOV, some of the regions of the FOV, or a single region of the FOV. A protocol for selectively increasing light to any portion of the FOV may be predetermined or may be developed during a scan of the FOV, based, for example, on various criteria encountered during the FOV scan (e.g., detection of objects in a particular region, etc.). Where objects are detected in a particular region as a result of a particular projected light amount, during subsequent scans of the FOV, a similar amount of light may be provided to the particular region. Such an approach may speed object detection and scans of the FOV by potentially eliminating a need to search for objects using increasing amounts of light. In some cases, however, it may be desirable to return to an application of lower levels of light to a particular FOV region in subsequent scans of the FOV. For example, where the LIDAR system is moving toward a previously detected object, it may be possible to detect the object again, not at the higher light amount used for its original detection, but instead using a lower amount of light.

By varying amounts of light provided to different regions during a scan of the LIDAR system FOV, the detection capability and/or resolution of the LIDAR system may be improved. And based on the objects detected in each of the different regions of the FOV, a three-dimensional map or reconstruction of the scene associated with the FOV may be generated using any suitable technique. For example, in some embodiments, a point cloud may be generated that shows some or all of the detected objects within the FOV. Returning to the example of FIG. 12, the point cloud (or other 3D construction) may show car 1110 at distance D1, car 1202 at distance D2, and turtle 1206 at distance D3, where D3<D1<D2. Each detected object represented in the 3D construction may be associated with a particular detection direction ($\phi\backslash\theta$ or x\y) or range of angles.

The selective emission of light towards different parts of the FOV based on detection of objects and absence of objects in the different parts of the FOV may allow LIDAR system 100 to achieve several abilities such as any one or more of the following: (a) speeding object detection and scans of the FOV by potentially eliminating a need to search for objects using increasing amounts of light, (b) reduce the overall energy used for detection across the FOV, (c) allow diversion of energy allotment to regions where it can be of greater impact, (d) reduce the environmental effect of the LIDAR system, e.g. by reducing excessive light emission in direction where objects are known to be present, and (e) reducing processing requirements for processing superfluous detected signals.

Figure 13:
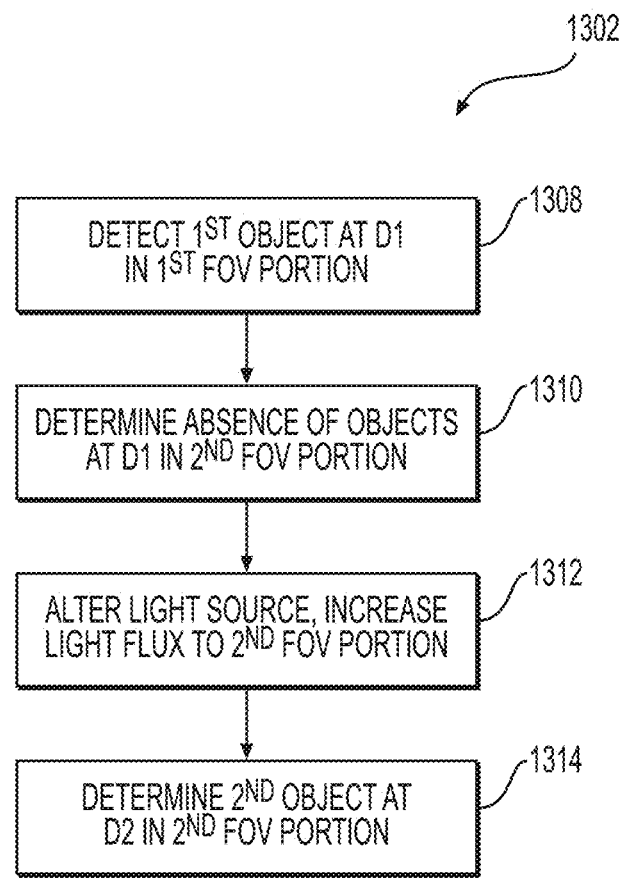
FIG. 13 provides a flow chart representation of a method for dynamically varying light flux over a scanned field of view of a LIDAR system, according to presently disclosed embodiments.

FIG. 13 provides a flow chart representation of a method 1302 for detecting objects using a LIDAR system. During operation of LIDAR system 100 in a manner consistent with the presently disclosed embodiments, any or all steps may include controlling at least one light source in a manner enabling light flux to vary over a scan of a field of view using light from the at least one light source. Any or all operational steps may also include controlling at least one light deflector to deflect light from the at least one light source in order to scan the field of view. At step 1308, method 1302 may include using first detected reflections associated with a scan of a first portion of the field of view to determine an existence of a first object in the first portion at a first distance. At step 1310, method 1302 may include determining an absence of objects in a second portion of the field of view at the first distance. At step 1312, method 1302 may include altering a light source parameter such that more light is projected toward the second portion of the field of view than is projected toward the first portion of the field of view following the detection of the first reflections and the determination of the absence of objects in the second portion. At step 1314, method 1302 may include using second detected reflections in the second portion of the field of view determine an existence of a second object at a second distance greater than the first distance. It should be noted that an increase in light flux in order to detect the second object in the second portion may be made during a current scan of the FOV or during a subsequent scan of the FOV. Optionally, if stages 1310, 1312 and 1314 are executed after the detection of stage 1308, all of the emissions toward the second FOV portion used in the detection of the second object are emitted before additional light is emitted to the first portion (e.g. at a later scan cycle).

In some embodiments, the method may include scanning of FOV 120 over a plurality of scanning cycles, wherein a single scanning cycle includes moving the at least one light deflector across a plurality of instantaneous positions. While the at least one light deflector is located at a particular instantaneous position, the method may include deflecting a light beam from the at least one light source toward an object in the field of view, and deflecting received reflections from the object toward at least one sensor.

Incremental Flux Allocation for Lidar Detection

As described above, light flux may be varied to a second region of the LIDAR FOV when no objects are detected in that region at a first distance D1, where one or more objects were detected in a different region of the LIDAR FOV. Additionally, however, in some embodiments light flux may be varied to a particular region of the LIDAR FOV based on whether objects are detected in that region at any distance. For example, based on a first amount of light provided to a particular region of a LIDAR FOV, processor 118 may make a determination that no objects reside in that region within a distance S1 from the LIDAR system 100. In response to such a determination, processor 118 may cause more light to be provided to the particular portion of the FOV. With the increase in light, processor 118 may make a determination that no objects reside in the particular region within a distance S2 from the LIDAR system 100, where S2>S1. In response to such a determination, even more light may be provided to the particular region of the LIDAR FOV, and in response to this increase in light, processor 118 may detect the presence of one or more objects at a distance S3 from the LIDAR system 100, where S3>S2>S1. Thus, such increases in light provided to a particular region of the LIDAR FOV may enhance the detection capabilities of the LIDAR system within the particular region. Furthermore, using the disclosed gradual illumination scheme allows to achieve detection at long range at a limited power consumption.

Figure 14:
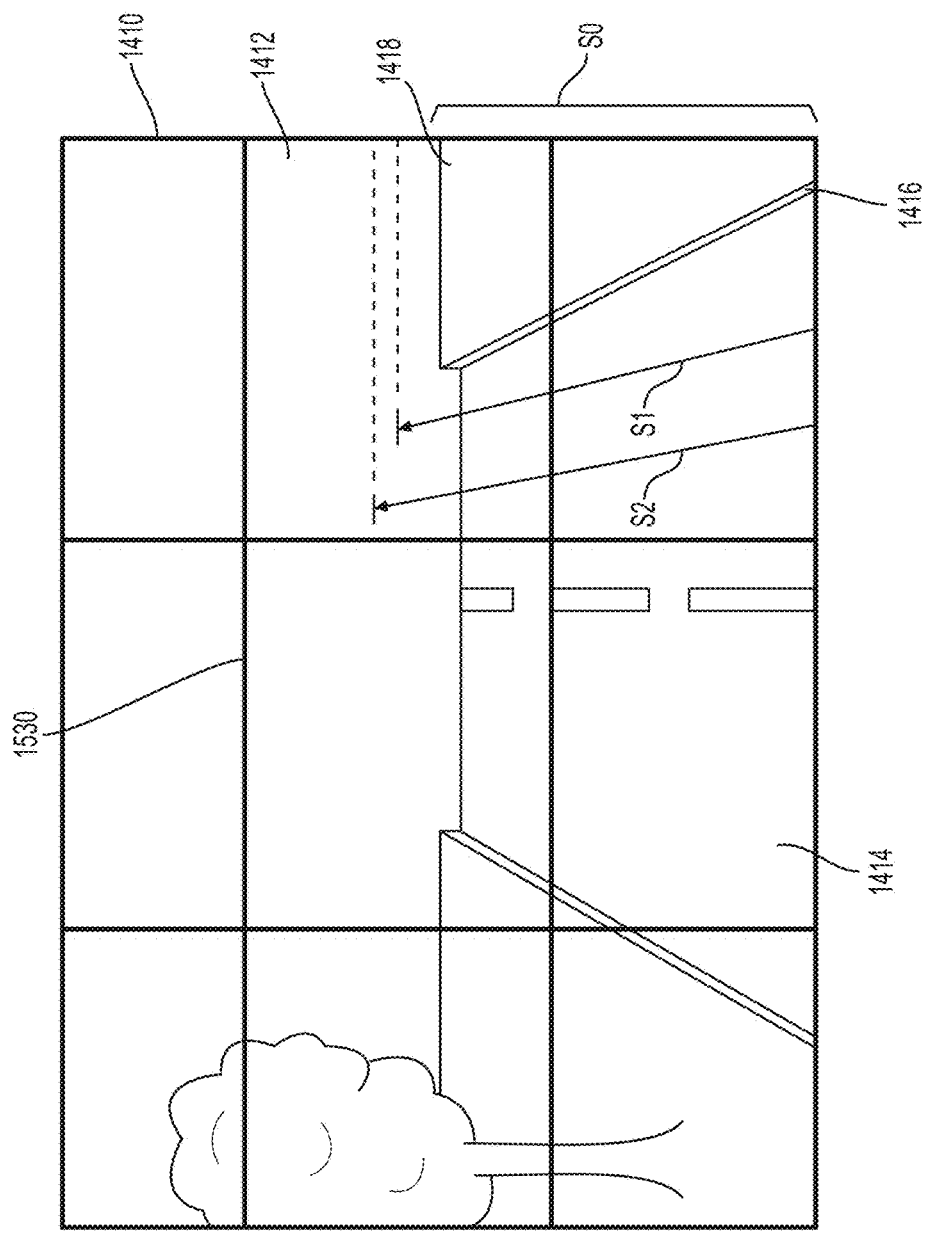
FIG. 14 provides a diagrammatic illustration of a field of view and an associated depth map scene representation associated with a LIDAR system, according to presently disclosed embodiments.

FIG. 14 provides a diagrammatic illustration of a LIDAR field of view 1410 and an associated depth map scene representation that may be generated by LIDAR system 100. As shown, at distances within a range, S0, relatively close to LIDAR system 100 (the point of view in FIG. 14), objects in the scene may be detected. Range S0 may cover varying distance intervals depending on the operational parameters of LIDAR system 100. In some cases, S0 may represent a range of between 0 m and 10 m. In other cases, S0 may correspond to a range of 0 m to 20 m, 30 m, 50 m, etc.

In some instances, LIDAR system may determine an absence of detected objects in a first portion of the field of view at a first distance, S1. For example, as shown in FIG. 14, based on light projected to a particular region 1412 of LIDAR FOV 1410 (e.g., a first light emission), LIDAR system may identify various foreground objects, such as a surface of a road 1414, a curb 1416, and/or a surface of a sidewalk 1418. Processor 118 of LIDAR system 100, however, may not detect any objects in region 1412 at a distance S1. That is, processor 118 may make a determination that there is an absence of objects in region 1412 at distance S1 (and possibly beyond). In some embodiments, distance S1 may be greater than distance S0. For example, S0 may include a range of between 0 m up to distance S1 at 20 m. In some examples, S1 may be equal to distance S0 and/or smaller than distance S0. For example, if the first light emission in the relevant scenario (e.g. ambient light conditions) would allow detection of given-reflectivity objects of up to about 40 meters from the LIDAR system, the first light emission may allow the system to determine absence of objects of at least such reflectivity in distances 20 m, 30 m, 39 m, and possibly even 40 m.

There may be several reasons that LIDAR system 100 does not detect objects at distance S1 in region 1412. For example, in some cases, there may not be any objects present in that region at distance S1. In other cases, however, the amount of light projected to region 1412 may be insufficient to detect objects at distance S1, whether because those objects are characterized by low reflectance or whether distance S1 is beyond the operational range of LIDAR system 100 for a particular set of operational parameters (e.g., duration, intensity, power level, etc. of light projected to region 1412).

Rather than giving up on detection of objects at distance S1 in region 1412 when no objects are detected there based on a first light emission, processor 118 may cause additional light flux to be supplied to region 1412 in order to detect, if possible, objects at distances beyond S1. In other words, when processor 118 determines an absence of objects detected in the first portion 1412 of the field of view 1410 based on the first light emission, processor 118 may control projection of at least a second light emission directed toward region 1412 of the field of view 1410 to enable detection of an object in region 1412 at a second distance, S2, greater than the first distance, S1. Not only may the second emission potentially increase a capability for detecting objects at distance S2, but the second emission may also increase the potential for LIDAR system 100 detecting objects at distance S1.

Figure 15:
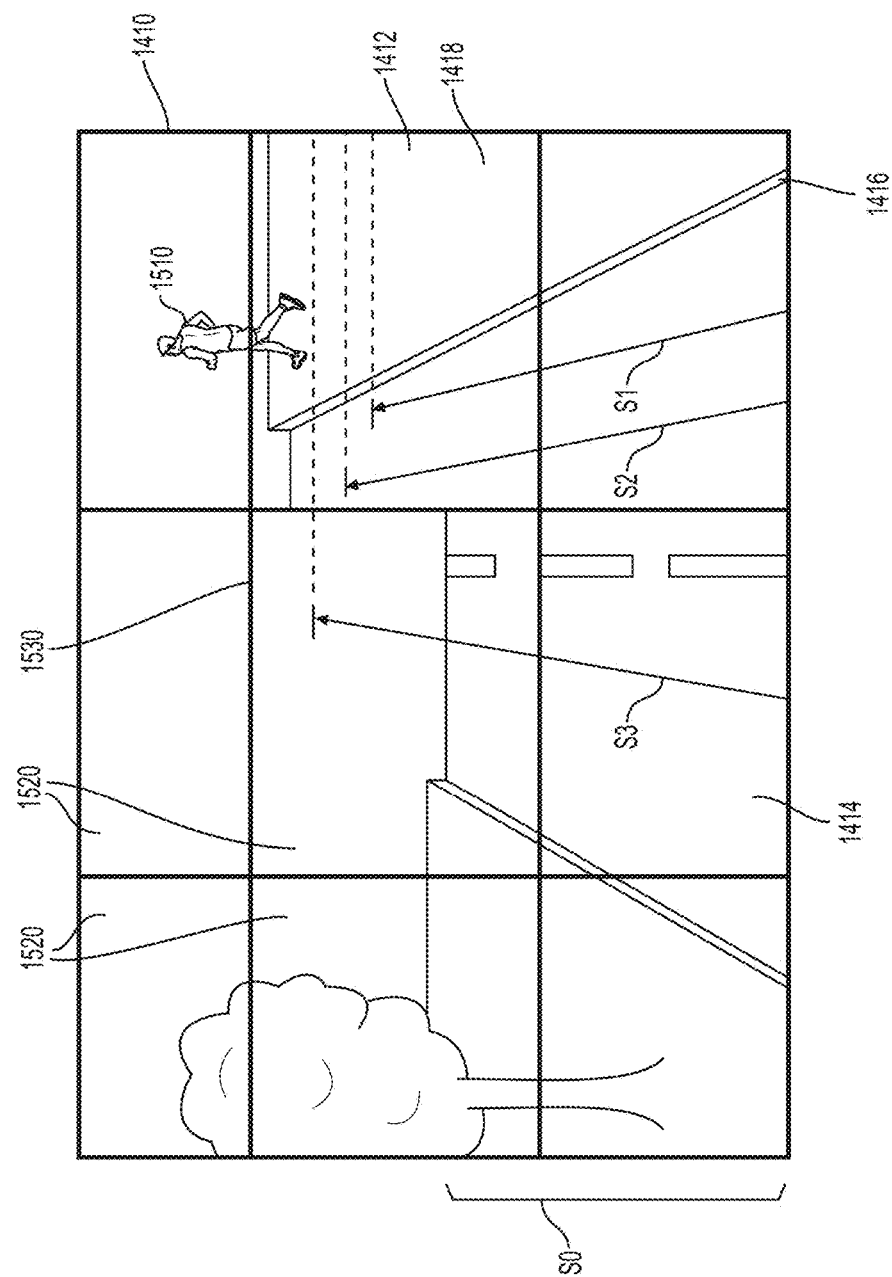
FIG. 15 provides a diagrammatic illustration of a field of view and an associated depth map scene representation generated using a LIDAR system with a dynamically variable light flux capability, according to presently disclosed embodiments.

In some cases, processor 118 may cause light projector 112 and deflector 114 to project additional light toward region 1412. For example, processor 118 may control projection of at least a third light emission directed toward region 1412 of the field of view 1410 to determine an existence of an object in region 1412 at a third distance S3 greater than the second distance S2, which is greater than distance S1. As shown in FIG. 15, a third light emission to region 1412 may enable detection of a pedestrian 1510 (or at least a part thereof) at distance S3 from LIDAR system 100. While pedestrian 1510 may not have been detected in response to the first or second light emissions directed toward region 1412, the third emission to region 1412 enabled determination of the presence of pedestrian 1510 at distance S3. Moreover, the second and third light emissions enabling detection of objects in region 1412 at a second distance, S2, or at a third distance, S3, respectively, may have enabled LIDAR system 100 to detect objects (e.g., curb 1416, road surface 1414, and/or sidewalk 1418) beyond a distance range S0. For example, as shown in FIG. 15, such objects have been detected and mapped for distances up to and beyond distance S3.

Thus, as described above, processor 118 may cause additional light emissions to be projected toward a particular region of the LIDAR FOV based on whether objects are detected in that region at various distances. For example, in one embodiment processor 118 may be configured to control projection of at least a third light emission directed toward a particular portion/region of the LIDAR FOV when, based on detection of at least one of a first light emission and a second light emission, the absence of objects is determined in the portion of the LIDAR FOV at a first distance (e.g., S1 in FIG. 14). Additionally, processor 118 may be configured to control projection of at least a third light emission toward a particular region/portion of the LIDAR FOV when, based on detection of at least a second light emission, the absence of objects is determined in that portion of the LIDAR FOV at s second distance (e.g., distance S2 in FIG. 14).

Distances S1, S2, and S3 may depend on the particular operational parameters of LIDAR system 100, which may be selected to suit a particular deployment of LIDAR system 100 (e.g., on a vehicle, building, aircraft, etc.), to suit particular weather conditions (e.g., clear weather, rain, snow), or to suit any other environmental conditions (e.g., rural vs. urban environments, etc.). In some embodiments, however, distance S1 may be 20 m or less from LIDAR system 100. Distance S3 may include distances greater than 100 m, and distance S2 may fall between distance S1 and S3. As discussed in greater detail with respect to the notion of detection distances of the LIDAR system, it is noted that the aforementioned detection distances (S0, S1, S2, S3) are not necessarily defined in advance, and that these distances may be a determined based on light emission energy schemes used by the LIDAR system. Furthermore, the detection distances may also depend on other factors such as weather, ambient light conditions, visibility, targets reflectivity, and so on. It is further noted that in FIGS. 14 and 15, the detection range S0 has been illustrated, for the sake of simplicity, as uniformly extending from a vertical plane on which the LIDAR system is located. However, as noted, any of the detection ranges are not necessarily uniform across different portions of the FOV, and the distances may be measured radially from a point located on an optical window of the LIDAR, rather than from a zero-distance plane (as illustrated).

Here and relative to any of the disclosed embodiments, a particular portion or region of the LIDAR FOV may refer in some embodiments to a single pixel of the scan of the FOV. In those embodiments, the particular portion of the FOV may correspond to a single instantaneous position of deflector 114 as it is moved through a range of positions/orientations in order to scan the LIDAR FOV. With reference to FIG. 14, for example, region 1412 (e.g., a portion of the LIDAR FOV) may represent a single pixel of LIDAR FOV 1410. In other embodiments, however, a particular region of the LIDAR FOV may include multiple pixels. For example, a region 1520 of the LIDAR FOV may include multiple pixels each corresponding to a different instantaneous position of deflector 114. The individual pixels included in a region or portion of the FOV may be contiguous, such as the pixels included in region 1520, or they may be discontinuous. In some cases, a portion of the FOV may represent a particular region of interest within the LIDAR FOV, may be subjected to similar light emission protocols, etc.

In some embodiments, the relative position of a particular portion of the LIDAR FOV within the LIDAR FOV may vary. For example, in some cases, deflector 114 may be continuously moved (e.g. in a sweeping pattern, in a raster pattern, randomly, pseudo-randomly) through a plurality of instantaneous positions, each corresponding to a particular region of the LIDAR FOV. In the process described above, there may exist some amount of time between the first light emission to a particular portion of the FOV and the second light emission to the same portion of the FOV. During that time, deflector 114 may move such that the exact instantaneous position of the deflector during the first emission may be different from its exact instantaneous position during the second emission. Similarly, an exact instantaneous position of deflector 114 during the third emission may be different from its exact instantaneous positions during the first and second emissions. As a result the regions of the LIDAR FOV illuminated by the first, second, and third emissions may differ slightly with respect to one another. For purposes of this disclosure, however, grouped light emissions or light emissions projected toward substantially overlapping regions of the LIDAR FOV will be considered as directed to the same region of the LIDAR FOV. In other words, in some embodiments, a particular portion of the LIDAR FOV may correspond to a single instantaneous position of deflector 114. In other embodiments, a particular portion of the LIDAR FOV may correspond to two or more instantaneous positions of deflector 114.

As noted above, by monitoring and/or processing the output of one or more sensors, such as sensor 116, processor 118 may determine both the presence of objects within a particular region of the LIDAR FOV or the absence of objects within the same region. For example, as shown in FIG. 14 reflections of light projected to FOV region 1412 may enable detection and depth mapping of objects such as road surface 1414, curb 1416, or sidewalk 1418, especially at distances within the S0 range. On the other hand, the same projection of light to region 1412 may not result in detection or depth mapping ability for objects at a distance S1 or at a further distance S2 from the LIDAR system. In such cases, based on the information obtained from the available reflections of light from region 1412, processor 118 may make a determination that there is an absence of objects in region 1412 at distances beyond S0, S1, S2, etc.

A determination of an absence of objects may not mean there are actually no objects present in a particular region of the LIDAR FOV. Rather, as described above, such a determination may be made when detector 116 receives insufficient light reflections from a particular region to detect an object in that region. A determination of an absence of an object may also be made, for example, if reflections are collected, but insufficient information exists from which to determine ranging information to the at least one source of the reflections or to generate a depth map based on the received reflection(s). Increasing light flux levels to a particular region of the FOV, as described with respect to FIGS. 14 and 15, however, may result in the detection of objects that previously went undetected. And object detection may not involve a binary process (e.g., either a reflection from an object is received or no reflections are received). Rather, detection may require that detector 116 receives sufficient light reflections for processor 118 to recognize the presence of an object in a particular region where light was projected. Thus, whether detection occurs or not may depend on various factors, such as object reflectivity, distance to an object, etc. As described herein, light projections that are described as enabling detection at one distance or another may constitute light projections that result in positive detections in a certain percentage of instances (e.g., at least in 50%, 75%, 90%, 99% or more of instances involving light projections of a certain set of characteristics) involving objects having a certain level of reflectivity (e.g., reflectivity levels of at least 2.5%, 5%, 10%, etc.).

Using the process described above for increasing light flux to a particular region of the LIDAR FOV based on whether objects are detected in that region at various distances, a scan of a LIDAR FOV may be performed in which multiple objects may be detected using light projections from anywhere within a light projection sequence associated with a particular FOV region. For example, in some instances objects may be detected in one region of a LIDAR FOV using only a first light emission. Scanning of other portions of the LIDAR FOV may result in objects being detected in those regions only after a second light emission, a third light emission, etc. is provided to those regions. In the exemplary embodiment represented by FIGS. 14 and 15, a first light emission to FOV region 1530 may result in detection of a surface of road 1414. In region 1412, a first light emission may result in the detection of objects such as sidewalk 1418, curb 1416, and road 1414 at least up to a certain range (S0 or S1, as shown in FIG. 14). A subsequent (e.g., second) light emission directed toward region 1412 may result in detection of sidewalk 1418, curb 1416, and road 1414 at a longer range (e.g., S2). A third light emission directed toward region 1412 may result in detection of a pedestrian 1510 at distance S3 Similar results may be obtained for one or more other regions in FOV 1410. Of course, some regions may receive only one light emission (or even no light emission at all), while other regions may receive multiple light emissions. As a result, a particular scan of the LIDAR FOV may include objects detected based on first light emissions, second light emissions, and/or third light emissions, etc. depending on how many light emissions were projected toward a particular region.

There are various techniques that may be used to increase light flux to a particular region of the LIDAR FOV, including any described above or below. In some instances, in order to vary light flux to a particular region of the FOV, processor 118 may control light projector 112 (e.g., its aiming direction, power level, light intensity, wavelength, pulse width, duration of continuous wave application, etc.). In other cases, processor 118 may control the at least one light deflector 114 in order to vary light flux (e.g., by controlling an orientation and therefore a direction of projection toward a particular region of the FOV, controlling an amount of time light is projected to a certain region of the FOV etc.).

Further, processor 118 may control at least one aspect of both the light projector 112 and at least one aspect of the deflector 114 in order to control an amount of light received by a particular region of the FOV. For example, in some embodiments, processor 118 may control light projector 112 to emit multiple emissions of light energy. Processor 118 may also control light deflector 114 such that a first light emission, a second light emission, and a third light emission provided by the light projector 112 are all projected toward a particular portion of the LDIAR FOV that corresponds with a single instantaneous position of light deflector 114 (or at least closely spaced instantaneous positions of the deflector). Each of the first, second, and third light emissions may have similar characteristics (e.g., power level, duration, number of pulses, wavelength, etc.). Alternatively, one or more of the first, second, and third light emissions may have different characteristics. For example, one or more of the emissions may exhibit a higher power level than the others. In some embodiments, a power level associated with the first, second, and third light emissions may progressively increase with each emission. And in some embodiments, processor 118 may be configured to control the light projector 112 (which may include a multi-wavelength source or multiple sources each capable of emitting light at a different wavelength) such a first light emission projected toward a particular region of the FOV has a wavelength different from both a second light emission and a third light emission directed toward the particular region of the FOV. In some examples, each one of the first light emission, second light emission and third light emission includes a single pulse (optionally, these pulses may be of similar characteristics). In some examples, each one of the first light emission, second light emission and third light emission includes the same number of pulses (optionally, these pulses may be of similar characteristics). In some examples, each one of the first light emission, second light emission and third light emission includes one or more pulses (optionally, these pulses may be of similar characteristics).

In some embodiments, each of the light emissions projected toward a particular region of the LIDAR FOV may have a similar light intensity (e.g., substantially the same light intensity). In other embodiments, however, processor 118 may cause the light intensity of the various light emissions from light projector 112 to vary. For example, processor 118 may be configured to control light projector 112 such that a second light emission has a light intensity greater than a light intensity of a first light emission provided by light projector 112 relative to a particular region of the FOV. Similarly, processor 118 may control light projector 112 such that a third light emission from light projector 112 relative to a particular region of the FOV has a light intensity greater than a light intensity of the second light emission.

Similarly, each of the light emissions projected toward a particular region of the LIDAR FOV may have a similar power level. In other embodiments, however, processor 118 may cause the light power level of the various light emissions from light projector 112 to vary. For example, processor 118 may be configured to control light projector 112 such that a second light emission has a power level greater than a power level of a first light emission provided by light projector 112 relative to a particular region of the FOV. Similarly, processor 118 may control light projector 112 such that a third light emission from light projector 112 relative to a particular region of the FOV has a power level greater than a power level of the second light emission. In still other cases, a power level associated with one or more light emissions following a first light emission to a particular region of the LIDAR FOV may be lower than a power level associated with the first light emission. As a result of additional light emissions provided to a particular region of the LIDAR FOV, the accumulated light energy may increase with each subsequent emission, which may increase the chances of object detection in that area, including at progressively longer distances.

In view of the cumulative effect of light energy provided to a particular portion of the LIDAR FOV, different light emissions or pulses may be used together with one another to detect objects in that portion of the FOV. For example, in some embodiments, processor 118 may use a third light emission projected toward a particular region of the FOV along with either or both of a first light emission or a second light emission projected toward that region in order to determine the existence of an object in that portion of the FOV. Further, the cumulative light energy may enable an increased detection distance. By using both the first emission and either or both of the second or third emissions, processor 118 may be enabled to detect an object at a distance (e.g., S3) that is larger than a detection distance associated with either the second emission alone (e.g., S2) or the first emission alone (e.g., S0).

In addition to using multiple light emissions to detect an object, the multiple light emissions may also be used in creating data points for use in generating a depth map representative of objects in a scene. For example, in some embodiments a data point for a depth map may be created based solely on a first light emission projected toward a particular region of the LIDAR FOV. In other embodiments, data points for a depth map may be created based on a combination of the first emission and a second emission and/or a third emission (or more) projected toward the particular region of the FOV.

Moreover, a particular object may be detected at different times (e.g., in different scans of the LIDAR FOV) using different combinations of light emissions. In some cases, at time T0, multiple light emissions may be required in combination (e.g., two, three, or more emissions) to detect the presence of pedestrian 1510 (FIG. 15). As the distance to pedestrian 1510 decreases (e.g., as a vehicle on which LIDAR system 100 is deployed approaches pedestrian 1510), fewer light emissions may be required to detect pedestrian 1510. For example, when a distance to pedestrian 1510 is less than S0, pedestrian 1510 may be detected during a subsequent FOV scan based on a single light emission to a particular region of the LIDAR FOV.

In the described embodiments for dynamically varying an amount of light flux provided to particular regions of the LIDAR FOV during scans of the FOV, more light may be projected to a particular region of the FOV than is projected to one or more other regions of the LIDAR FOV during a scan of the FOV. For example, processor 118 may be configured to alter a light source parameter associated with light projected to a first portion of the LIDAR FOV such that during a same scanning cycle of the FOV, light flux of light directed to the first portion is greater than light flux of light directed to at least one other portion of the LIDAR FOV. Processor 118 may also monitor amounts of light provided to various regions of the FOV to ensure compliance with applicable regulations. For example, processor 118 may be configured to control light projector 112 such that an accumulated energy density of the light projected to any particular portion of the LIDAR FOV does not exceed a maximum permissible exposure limit (either within any single scan of the FOV or over multiple scans of the FOV).

For example, processing unit 108 may control gradual projection of light onto a portion of the LIDAR FOV, intermittently determining when an object is detected in the respective portion of the LIDAR FOV, and when an object is detected processing unit 108 control the light emission to that portion of the FOV to remain within a safe light emission limit, which would not cause harm to the detected object. These techniques may be implemented in a complimentary fashion: in each of one or more portions of the FOV, processing unit 108 may implement together a stopping condition (preventing excision of a maximum permissible exposure limit) while continuously checking in a complimentary fashion whether additional light is needed (e.g. by determining that the light projected so far toward the portion of the LIDAR FOV is insufficient for a valid detection of an object).

It is noted that LIDAR system 100 may include preliminary signal processor (not illustrated) for processing the reflections signals of an early light emission (e.g., the first light emission, the second light emission) in a fast manner, in order to allow quick decision regarding following emission of light (e.g., the second light emission, the third light emission)—especially if the following emission of light is to be executed within the same scanning cycle, and particularly if the following emission of light is to be executed while the light deflector is still in substantially the same instantaneous position. The quick decision regarding the following emission may include a decision whether any further emission is required (e.g., the second emission, the third emission), and may also include determination of parameters for the subsequent emission for each segment. It is noted that some or all of the circuitry of preliminary signal processor may be different than the circuitry of the range estimation module which is used to determine ranges of points in the 3D model. This is because the quick decision does not necessarily need an exact range estimation (for example, just a determination of a presence or absence of object may suffice). Another reason for using different circuitry is that the main range estimation circuitry may not be fast enough to make decision in the rate required for emitting further light emissions in the same instantaneous position of the at least one light deflector. It is noted that the processing results of such a preliminary signal processor may possibly be insufficient for range estimation. Optionally, the preliminary signal processor may be an analog processor which processes analog detection signals (e.g. voltages), while the main range estimator module may be (or include) a digital processing module, which process the detection-information after it have been converted from analog to digital. It is further noted that the same (or a similar) preliminary signal processing module may be implemented in LIDAR system 100, and used for detection of objects in an immediate area of the LIDAR system, to prevent emission of excessive light energy (e.g. for reasons of eye safety), as discussed below in greater detail.

Increases in light flux provided to a particular portion of the LIDAR FOV may proceed according to any suitable protocol. For example, in some embodiments, as described above, first, second, and third light emissions (or more or fewer emissions) may be projected to a particular region of the LIDAR FOV before deflector 114 is moved to a different instantaneous position for scanning a different region of the FOV. In other words, processor 118 may be configured to control deflector 114 such that a first light emission, a second light emission, and a third light emission are projected toward a particular portion of the LIDAR FOV in a single scanning cycle.

In other cases, multiple light emissions designated for a particular region of the LIDAR FOV may be projected toward that portion of the FOV during different scans of the FOV. For example, processor 118 may be configured to control deflector 114 such that one or more of a first light emission, a second light emission, and a third light emission are each projected toward a particular portion of the LIDAR FOV in different scanning cycles.

Figure 16:
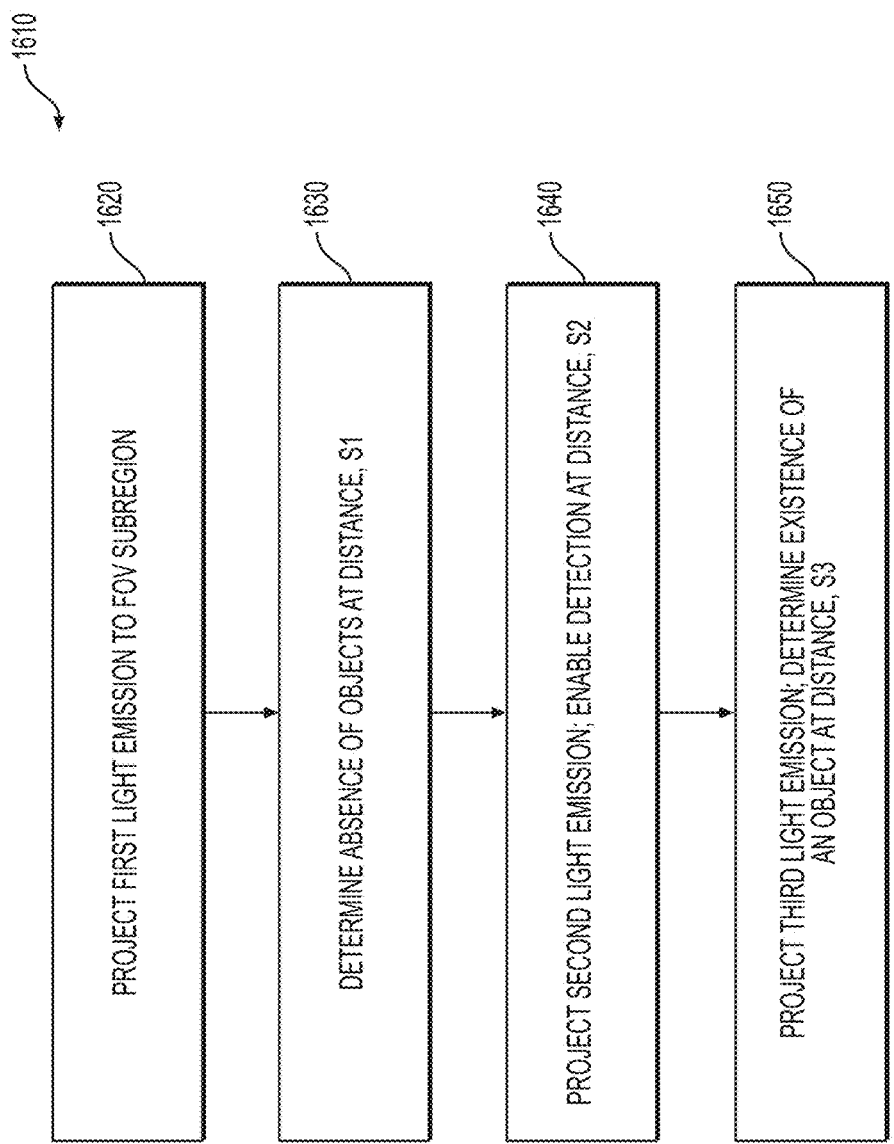
FIG. 16 provides a flow chart representation of a method for dynamically varying light flux over a scanned field of view of a LIDAR system, according to presently disclosed embodiments.

Disclosed embodiments may be used to perform a method for detecting objects using a LIDAR system. For example, as described above, detecting objects with LIDAR system 100 may include controlling at least one light source in a manner enabling light flux to vary over a scan of a LIDAR field of view using light from the at least one light source. As shown in FIG. 16, a method for detecting objects with LIDAR system 100 may also include controlling projection of at least a first light emission directed toward a first portion of the field of view (step 1620) to determine an absence of objects in the first portion of the field of view at a first distance (step 1630). The method may also include controlling projection of at least a second light emission directed toward the first portion of the field of view to enable detection of an object in the first portion of the field of view at a second distance, greater than the first distance, when an absence of objects is determined in the first portion of the field of view based on the at least a first light emission (step 1640). And the method may include controlling projection of at least a third light emission directed toward the first portion of the field of view to determine an existence of an object in the first portion of the field of view at a third distance, greater than the second distance (step 1650).

Adaptive Noise Mitigation for Different Parts of the Field of View

In a LIDAR system consistent with embodiments of the present disclosure, the captured signals may include noise. Noise may result from a variety of sources. For example, some noise may arise from the detector (e.g., sensing unit 106 of FIGS. 4A-4C) and may include dark noise, amplification noise, etc. In addition, some noise may arise from the environment and may include ambient light or the like. For example, ambient noise may be strong with respect to the reflection signal if the LIDAR system projects light into the sky, toward objects very far away, or toward other areas where reflection is minimal. On the other hand, ambient noise may be lower with respect to the reflection signal if the LIDAR system projects light onto object positioned in dark areas of a field of view. In one example, ambient light may comprise light arriving to the LIDAR system directly from an external source of light (e.g. the sun, headlights of a car, electric lighting apparatus). By way of further example, ambient light may comprise light from an external source of light arriving to the LIDAR system after being deflected (e.g., reflected) by an object in the FOV (e.g., reflections of the light from metallic or non-metallic surfaces, deflections by atmosphere, glass or other transparent or semitransparent objects, or the like).

Systems and methods of the present disclosure may collect data on a pixel-by-pixel basis (e.g., relative to sensing unit 106). Additionally, a LIDAR system consistent with embodiments of the present disclosure may address noise resulting from various sources and may do so also on a pixel-by-pixel basis.

As used herein, the term "pixel" is used broadly to include a portion of the FOV of the LIDAR system which is processed to an element of a resulting model of objects in the FOV. For example, if the detection data of the sensor is processed to provide a point cloud model, a "pixel" of the FOV may correspond to a portion of the FOV which is translated into a single data point of the point cloud model. In one example, the dimensions of a pixel may be given using a solid angle, or two angles of its angular size (e.g., φ and θ). In some embodiments, a single "pixel" of the FOV may be detected by a plurality of sensors (e.g., multiple SiPM detectors) to provide a corresponding plurality of data points of the 3D model. In a scanning system, a pixel of the FOV may be substantially of the same angular size as the beam of laser projected onto the scene or may be smaller than the angular size of the beam (e.g., if the same beam covers several pixels). A pixel being the same size of the laser beam spot means that most of the photons of the laser beam (e.g., over 50%, over 70%, over 90%, etc.) emitted within the part of the FOV are defined as the respective pixel. In some embodiments, any two pixels of the FOV may be completely nonoverlapping. However, optionally, some pairs of pixels may partly overlap each other.

Figure 17:
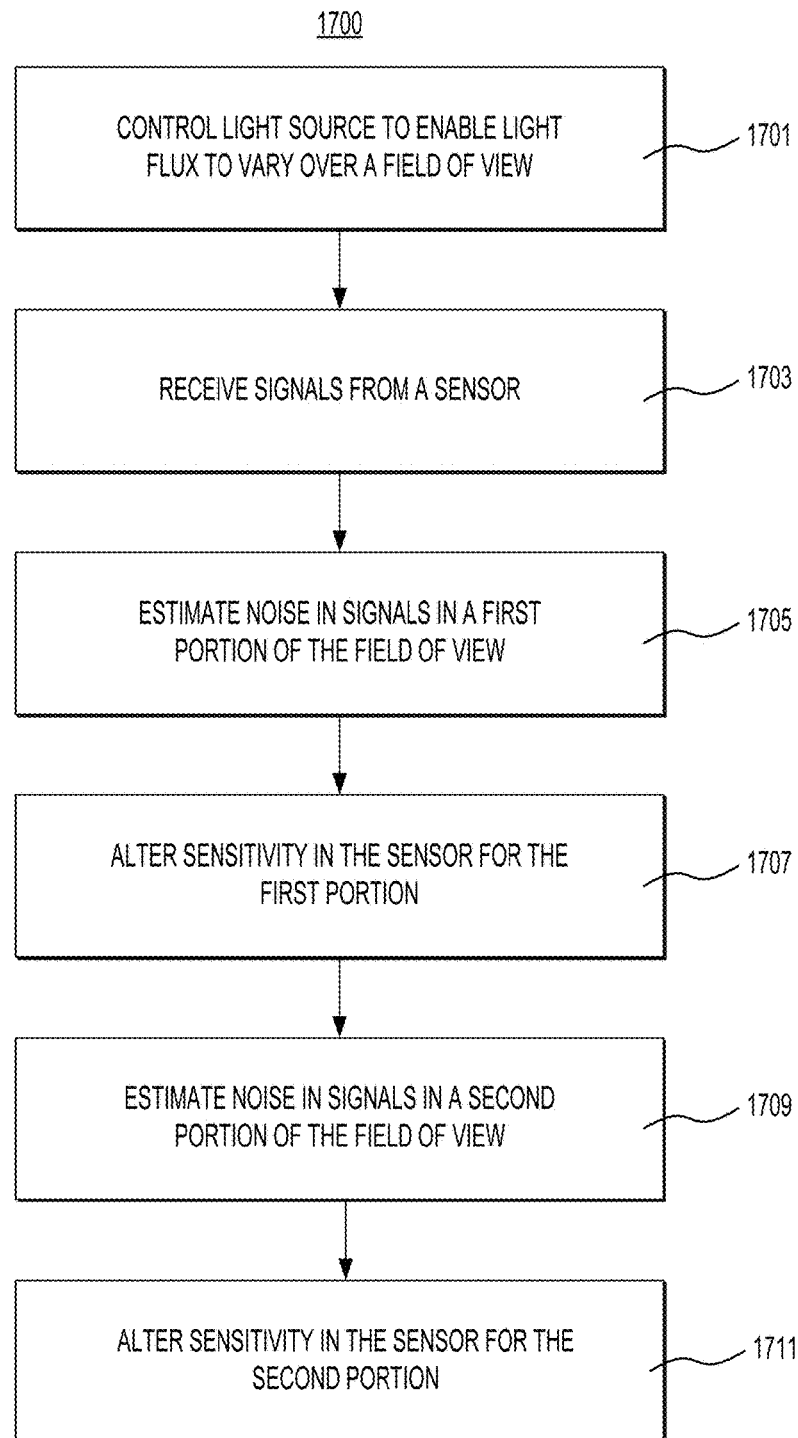
FIG. 17 is a flowchart illustrating an example method for altering sensor sensitivity in a LIDAR system consistent with some embodiments of the present disclosure.

Systems and methods of the present disclosure may allow for noise estimation, mitigation, and possibly cancellation, for example, by altering the sensitivity of the detector (e.g., sensing unit 106 of FIGS. 4A-4C). FIG. 17 illustrates an example method 1700 for altering sensor sensitivity in a LIDAR system. Method 1700 may be performed by at least one processor (e.g., processor 118 of processing unit 108 of LIDAR system 100 as depicted in FIG. 1A and/or two processors 118 of processing unit 108 of the LIDAR system depicted in FIG. 2A).

At step 1701, processor 118 controls at least one light source (e.g., light source 112 of FIG. 1A, laser diode 202 of light source 112 of FIG. 2A, and/or plurality of light sources 102 of FIG. 2B) in a manner enabling light flux to vary over a scan of a field of view (e.g., field of view 120 of FIGS. 1A and 2A). For example, processor 118 may vary the timing of pulses from the at least one light source. Alternatively or concurrently, processor 118 may vary the length of pulses from the at least one light source. By way of further example, processor 118 may alternatively or concurrently vary a size (e.g., length or width or otherwise alter a cross-sectional area) of pulses from the at least one light source. In a yet further example, processor 118 may alternatively or concurrently vary the amplitude and/or frequency of pulses from the at least one light source. In yet another example, processor 118 may change parameters of a continuous wave (CW) or quasi-CW light emission (e.g., its amplitude, its modulation, its phase, or the like).

In some embodiments, the field of view (e.g., field of view 120 of FIGS. 1A and 2A) may include at least a first portion and a second portion. For example, the first portion and the second portion may comprise halves, fourths, or other fractions of the area covered by the field of view. In other examples, the first portion and the second may portion may comprise irregular, rather than symmetric and/or fractional, portions of the area covered by the field of view. In still other examples, the first portion and the second may portion may comprise discontinuous portions of the area covered by the field of view. In some examples, the first portion of the FOV may be one FOV pixel, and the second portion of the FOV may be another pixel. In yet other examples, the first portion of the FOV may include a number of FOV pixels, and the second portion of the FOV may include a different group of the same number of pixels. In some embodiments, the first portion and the second portion of the FOV may be partly overlapping. Alternatively, the first portion and the second portion may be completely nonoverlapping.

Step 1701 may further include controlling at least one light deflector (e.g., light deflector 114 of FIG. 1A, deflector 114A and/or deflector 114B of FIG. 2A, and/or one-way deflector 214 of FIG. 2B) in order to scan the field of view. For example, processor 118 may cause mechanical movement of the at least one light deflector to scan the field of view. Alternatively or concurrently, processor 118 may induce a piezoelectric or thermoelectrical change in the at least one deflector to scan the field of view.

In some embodiments, a single scanning cycle of the field of view may include moving the at least one deflector such that, during the scanning cycle, the at least one light deflector is located in a plurality of different instantaneous positions (e.g., the deflector is controlled such that the deflector moves from or through one instantaneous position to another during the scan of the LIDAR FOV). For example, the at least one light deflector may be moved continuously or non-continuously from one of the plurality of positions to another (optionally with additional positions and/or repetitions) during the scanning cycle.

In such embodiments, processor 118 may coordinate the at least one light deflector and the at least one light source such that, when the at least one light deflector is located at a particular instantaneous position, a light beam is deflected by the at least one light deflector from the at least one light source towards the field of view and reflections from an object in the field of view are deflected by the at least one light deflector toward at least one sensor. Accordingly, the at least one light deflector may direct a light beam toward the field of view and also receive a reflection from the field of view. For example, FIGS. 1A, 2B, and 2C depict examples in which a deflector both directs a light beam towards the field of view and also receives a reflection from the field of view. In certain aspects, the reflection may be caused by the light beam directed toward the field of view. In other embodiments, a light beam from the at least one light source may be directed towards the field of view by at least one light deflector separate from at least one other light deflector that receives a reflection from the field of view. For example, FIG. 2A depicts an example in which one deflector directs a light beam towards the field of view and a separate deflector receives a reflection from the field of view.

At step 1703, processor 118 receives, on a pixel-by-pixel basis, signals from at least one sensor (e.g., sensing unit 106 of FIGS. 4A-4C). For example, the signals may be indicative of at least one of ambient light and light from the at least one light source reflected by an object in the field of view. As explained above, in certain aspects, for example, aspects in which the object is dark and/or far away, the ambient light may account for a greater portion of the signal than the reflected light. In other aspects, for example, aspects in which the object is bright and/or close by, the ambient light may account for a smaller portion of the signal than the reflected light.

The received signals may further be indicative of at least one of ambient light and light from the at least one light source reflected by an object in the field of view combined with noise associated with the at least one sensor. For example, dark noise, amplification noise, and/or the like may be combined in the signals with ambient light and/or reflected light. In particular, the signals from at least one sensor may include noise that originates from amplification electronics.

The received signals may be associated with various portions of the field of view. For example, at least one signal may be associated with a first portion of the field of view while at least one other signal may be associated with a second portion of the field of view. In some embodiments, each signal may be associated with a particular portion of the field of view. In other embodiments, some and/or all signals may be associated with multiple portions of the field of view (e.g., in embodiments where portions of the field of view have overlapping sections).

In some embodiments, step 1703 may further include receiving signals for different pixels in different times. For example, if the at least one deflector is moved during a scanning cycle, as discussed above, processor 118 may receive signals corresponding to different pixels at differing times that depend on when the at least one deflector is in a particular instantaneous location.

At step 1705, processor 118 estimates noise in at least one of the signals associated with the first portion of the field of view. Processor 118 may use a variety of noise estimation techniques, either individually or in combination, to estimate noise in the at least one signal. Examples of noise estimation techniques are discussed below with references to FIGS. 18 and 19.

In some embodiments, processor 118 may estimate the noise in each portion of the field of view based on reflections associated with a single position of the at least one light deflector (each portion may be less than 10%, 5%, 1%, 0.1% etc. of the field of view). For example, processor 118 may extrapolate the estimated noise from the single position to other positions in the same portion. In some embodiments, the extrapolation may comprise copying the estimated noise from the single positions to other positions.

In other embodiments, the extrapolation may comprise applying one or more functions to the estimated noise from the single positions to generate outputs of estimated noise for other positions. For example, the function may depend on the distance between the other positions and the single position, a difference between an actual and/or predicted brightness of the other positions and of the single position, a difference between a previously estimated noise in the other positions and the currently estimated noise in the single position, or the like. The function may output estimates for the other positions directly, may output adjustment factors (e.g., for adding, subtracting, multiplying, or the like) for transforming the estimated noise for the single position to estimates for the other positions, or may be convolved with or otherwise operate on the estimated noise for the single position to produce estimates for the other positions or adjustment factors. Likewise, in some examples, processor 118 may estimate the noise for a single position based on noise estimates (or on the original signals) of a plurality of other portions of the FOV, e.g., by averaging the noise estimates from locations surrounding the FOV portion.

In some embodiments, each portion may comprise less than 10% of the field of view. In certain aspects, each portion may comprise less than 5% of the field of view. For example, each portion may comprise less than 1% of the field of view.

By way of further example, each portion may comprise less than 0.1% of the field of view.

Alternatively or concurrently, processor 118 may estimate a noise in signals associated with a particular portion of the field of view based on a comparison of signals associated with the particular portion of the field of view received in at least one previous scanning cycle. For example, processor 118 may apply one or more functions to at least one previous signal to generate outputs of estimated noise for other positions. For example, the function may depend on the time between the previous signals and the current signals, a difference between an actual and/or predicted brightness of the previous signals and of the current signals, the previously estimated noise in the previous signals, or the like. The function may output noise estimates for the current signals directly, may output adjustment factors (e.g., for adding, subtracting, multiplying, or the like) for transforming the estimated noise for the previous signals to estimates for the current signals, or may be convolved with or otherwise operate on the estimated noise for the previous signals to produce estimates for the current signals or adjustment factors.

At step 1707, processor 118 may alter a sensor sensitivity for reflections associated with the first portion of the field of view based on the estimation of noise in the first portion of the field of view. For example, sensor sensitivity may be based on a signal-threshold. In some embodiments, processor 118 may increase the signal-threshold for the first portion relative to the signal-threshold for the second portion. Processor 118 may do so, for example, when the noise estimation in the first portion is higher than the noise estimation in the second portion. Accordingly, the higher signal-threshold in the first portion the more of the estimated noise that may be filtered out.

In some embodiments, the sensor sensitivity may be altered in the detector(s) of the sensor. Alternatively or concurrently, the sensor sensitivity may be altered in processor 118. For example, the signal-threshold may be altered with respect to the pre-processed data or the post-processed data. In one example, the sensor may output analog data, which may be converted to a digital sampling (e.g., amplitude in time, or the like). After correlating (e.g., convoluting, or the like) the digital sampling to a function representing an expected signal (as described below with respect to FIG. 18), the signal-threshold may be applied to the output of the correlation.

In some embodiments, processor 118 may alter a sensor sensitivity for reflections associated with a portion of the FOV by altering an operational parameter of processor 118. The alteration of the operational parameter in such cases may modify the sensor sensitivity by changing the sensitivity of the detection to the signal level and/or noise level acquired by the at least one sensor. For example, processor 118 may alter the sensor sensitivity (e.g., in steps 1707 and/or 17011) by changing a post-convolution threshold, as discussed in the previous paragraph. However, other operational parameters of processor 118 may additionally or alternatively be altered by processor 118 in response to the noise levels in order to alter the sensor sensitivity.

By way of additional example, processor 118 may estimate a level of noise on account of dark noise and/or amplification noise and alter a sensor sensitivity such that the sensitivity has a minimum threshold higher than the estimated level of noise. Accordingly, the estimated noise may be minimized, if not cancelled or eliminated, by setting the minimum threshold accordingly.

In some embodiments, processor 118 may alter a sensor sensitivity for reflections associated with a portion (e.g., the first portion) of the field of view corresponding to a single instantaneous position of the at least one light deflector. For example, processor 118 may alter the sensor sensitivity only during times at which the at least one light deflector is in a particular instantaneous position. In other embodiments, processor 118 may alter a sensor sensitivity for reflections associated with a portion (e.g., the first portion) of the field of view corresponding to a plurality of instantaneous positions of the at least one light deflector. For example, processor 118 may alter the sensor sensitivity for varying times at which the at least one light deflector is in different positions from among the plurality of instantaneous positions. In certain aspects, the altered sensitivity for the plurality of instantaneous positions may be equivalent—that is, processor 118 may, during times at which the at least one light deflector is in one of the plurality of instantaneous positions, alter the sensor sensitivity in the same manner. In other aspects, the altered sensitivity may be different for the plurality of instantaneous positions—that is, processor 118 may, during times at which the at least one light deflector is in one of the plurality of instantaneous positions, alter the sensor sensitivity in a manner different from when the at least one light deflector is in another of the plurality of instantaneous positions.

Alternatively or concurrently, step 1707 may further include individually altering the sensor sensitivity for reflections associated with the first and second portions such that, for a same amount of light projected toward the first portion and the second portion, a detection distance associated with the first portion is higher than a detection distance associated with the second portion (e.g., by a factor of at least 50%). Accordingly, the sensor sensitivity of the first portion may be increased (and/or a minimum threshold decreased and/or a maximum threshold increased) to increase the detection distance.

Alternatively or concurrently, step 1707 may further include individually altering the sensor sensitivity for reflections associated with the first and second portions such that, for a same amount of light projected toward the first portion and the second portion, a resolution associated with the first portion is higher than a resolution associated with the second portion. Accordingly, the sensor sensitivity of the first portion may be increased (and/or a minimum threshold decreased and/or a maximum threshold increased) to increase the resolution.

In some embodiments, step 1707 may be performed only after step 1705 is finalized. Furthermore, in some embodiments, the alteration of sensor sensitivity for a portion of the FOV (e.g., steps 1707 and 1711) may be performed after the corresponding noise estimation for the respective part of the FOV on which the alteration is based (e.g., steps 1705 and 1709, respectively) without any measurement for any other part of the FOV. Similarly, in some embodiments, the alteration of sensor sensitivity for a portion of the FOV (e.g., steps 1707 and 1711) may be performed after the corresponding noise estimation for the respective part of the FOV on which the alteration is based (e.g., steps 1705 and 1709, respectively) without moving the at least one deflector to another instantaneous position.

At step 1709, processor 118 estimates noise in at least some of the signals associated with the second portion of the field of view. As discussed above, processor 118 may use a variety of noise estimation techniques, either individually or in combination, to estimate noise in at least some of the signals. Processor 118 may use the same noise estimation technique(s) in steps 1705 and 1709 or may use different noise estimation technique(s) in steps 1705 and 1709. In certain aspects, processor 118 may determine that a particular noise estimation technique is more suitable for the first portion and that a different noise estimation technique is more suitable for the second portion. For example, processor 118 may determine that the first portion has a larger noise contribution from amplification because, for example, the amplification is higher on account of the first portion being darker than the second portion. In such an example, processor 118 may use a different technique to estimate noise in the first portion to account for the larger amplification noise. Examples of noise estimation techniques are discussed below with references to FIGS. 18 and 19. Optionally, the estimation of noise in the second portion of the FOV in step 1709 may depend on the results of step 1705. Alternatively, the estimations of noises in the first portion and in the second portion of the FOV (steps 1705 and 1709, respectively) may be completely unrelated and independent of each other.

In some embodiments, processor 118 may report the noise estimations generated in steps 1705 and/or 1709 to another system (e.g., an external server). Furthermore, processor 118 may report one or more noise indicative parameters and/or one or more noise related parameters based on the respective noise estimation obtained by processor 118. The respective parameter may be specific to the respective portion of the FOV, or to a larger part of the FOV that includes the respective portion of the FOV. Examples of reported parameters include, but are not limited to, a noise estimation, one or more sensitivity settings, a detection distance, a detection quality indicator, and the like. In some embodiments, the report may also include one or more parameters indicative of the altered sensor sensitivity from steps 1707 and/or 1711.

At step 1711, processor 118 alters a sensor sensitivity for reflections associated with the second portion of the field of view based on the estimation of noise in the second portion of the field of view. For example, sensor sensitivity may include a signal-threshold. In some embodiments, processor 118 may increase the signal-threshold for the second portion relative to the signal-threshold for the first portion. Processor 118 may do so, for example, when the noise estimation in the second portion is higher than the noise estimation in the first portion. Accordingly, the higher signal-threshold in the first portion may filter out more of the estimated noise.

By way of example, processor 118 may estimate a level of noise on account of dark noise and/or amplification noise and alter a sensor sensitivity such that the sensitivity has a minimum threshold higher than the estimated level of noise. Accordingly, the estimated noise may be minimized, if not cancelled or eliminated, by setting the minimum threshold. The altered sensor sensitivity for reflections associated with the second portion may differ from the altered sensor sensitivity for reflections associated with the first portion.

In some embodiments, as discussed above, processor 118 may alter a sensor sensitivity for reflections associated with a portion (e.g., the second portion) of the field of view corresponding to a single instantaneous position of the at least one light deflector. In other embodiments, as discussed above, processor 118 may alter a sensor sensitivity for reflections associated with a portion (e.g., the second portion) of the field of view corresponding to a plurality of instantaneous positions of the at least one light deflector.

In some embodiments, processor 118 may alter the sensor sensitivity for first reflections associated with the first portion received in a first scanning cycle and alter the sensor sensitivity for the second reflections associated with the second portion in a second scanning cycle. For example, steps 1705 and 1707 may be performed in a first scanning cycle, and steps 1709 and 1711 may be performed in a second scanning cycle. In certain aspects, the first scanning cycle may occur temporally before the second scanning cycle. Alternatively, the second scanning cycle may occur temporally before the first scanning cycle.

In other embodiments, processor 118 may alter the sensor sensitivity for first reflections associated with the first portion and second reflections associated with the second portion, where the first and second reflections are received in a single scanning cycle. For example, steps 1705 and 1707 may be performed in the same scanning cycle as steps 1709 and 1711.

Steps 1707 and/or steps 1711 may further include, after detecting an external light source at a first distance in the first portion, altering the sensor sensitivity differently for reflections associated with the first portion and the second portion to enable detection of an object at a second distance greater than the first distance in the second portion. Accordingly, the sensor sensitivity of the second portion may be increased (and/or a minimum threshold decreased and/or a maximum threshold decreased) to compensate for the external light source in the first portion that may result in noise in the second portion. In another example, after detecting an object at a first distance in the first portion, processor 118 may alter the sensor sensitivity to enable detection beyond the object in the second portion. In yet another example, processor 118 may alter the sensor sensitivity to enable detection of an object in the second portion that was not visible in the first portion on account of the increased noise in the first portion.

By way of further example, steps 1707 and/or 1711 may further include, after detecting an external light source at a first distance in the second portion, altering the sensor sensitivity differently for reflections associated with the first portion and the second portion to enable detection of an object at a second distance greater than the first distance in the first portion. Accordingly, the sensor sensitivity of the first portion may be increased to compensate for the external light source in the second portion that may result in noise in the first portion.

Alternatively or concurrently, step 1711 may further include individually altering the sensor sensitivity for reflections associated with the first and second portions such that, for a same amount of light projected toward the first portion and the second portion, a detection distance associated with the second portion is higher than a detection distance associated with the first portion. Accordingly, the sensor sensitivity of the second portion may be increased (and/or a minimum threshold decreased and/or a maximum threshold increased) to increase the detection distance.

Alternatively or concurrently, steps 1707 and 1711 may further include individually altering the sensor sensitivity for reflections associated with the first and second portions such that, for a same amount of light projected toward the first portion and the second portion, a resolution associated with the second portion may be higher than a resolution associated with the first portion. Accordingly, the sensor sensitivity with respect to the second portion may be increased (and/or a minimum threshold decreased and/or a maximum threshold increased) to increase the resolution.

For each portion of the FOV to which processor 118 altered the sensitivity setting (e.g., in steps 1707 and/or 1711), processor 118 may also detect an object in the respective portion of the FOV using the altered sensitivity setting. For each portion of the FOV to which processor 118 altered the sensitivity setting, processor 118 may also generate a data point in a model of the scene included in the FOV (e.g., a 2D or 3D model, such as a point-cloud model, etc.).

Method 1700 may include additional steps. For example, method 1700 may further include altering the sensor sensitivity for reflections associated with a third portion of the field of view differing from the first portion and the second portion based on the estimation of noise in the first portion. For example, as explained above, processor 118 may extrapolate the estimated noise from the first portion to the third portion. Alternatively, method 1700 may further include altering the sensor sensitivity for reflections associated with a third portion of the field of view differing from the first portion and the second portion based on the estimation of noise in the first portion and the second portion.

In some embodiments, the extrapolation may comprise copying the estimated noise from the first portion and/or second portion to the third portion. In other embodiments, the extrapolation may comprise applying one or more functions to the estimated noise from the first portion and/or second portion to generate outputs of estimated noise for the third portion. For example, the function may depend on distances between the first portion and/or the second portion and the third portion, a difference between an actual and/or predicted brightness of the first portion and/or second portion and of the third portion, a difference between a previously estimated noise in the third portion and the currently estimated noise in the first portion and/or second portion, or the like. The function may output estimates for the third portion directly, may output adjustment factors (e.g., for adding, subtracting, multiplying, or the like) for transforming the estimated noise for the first portion and/or second portion to estimates for the third portion, or may be convolved with or otherwise operate on the estimated noise for the first portion and/or second portion to produce estimates for the third portion or adjustment factors.

In addition to altering a sensor sensitivity, processor 118 may also alter one or more operational characteristic of the at least one light source for a portion of the FOV based on the estimation of noise in the respective portion of the FOV. For example, processor 118 may alter a light source parameter (e.g., pulse timing, pulse length, pulse size, pulse amplitude, pulse frequency, and/or the like) associated with the first portion such that light flux directed to the first portion is greater than light flux directed to at least one other portion of the field of view. Alternatively, processor 118 may alter a light source parameter associated with the first portion such that light flux directed to the first portion is lesser than light flux directed to at least one other portion of the field of view. Processor 118 may alter the light source parameter based on the noise estimation of step 1705 and/or step 1709. For example, processor 118 may determine that light flux directed to the first portion may be lessened because reflections from the first portion contain less noise. By way of further example, processor 118 may determine that light flux directed to the first portion may be increased because reflections from the first portion contain more noise. Accordingly, either individually or in combination with altering the sensor sensitivity, processor 118 may further account for noise by varying the light flux directed to a portion of the field of view.

By way of further example, processor 118 may increase an amount of light projected toward the first portion relative to an amount of light projected toward the second portion. Processor 118 may do so, for example, when the noise estimation in the first portion is higher than the noise estimation in the second portion. As explained above, processor 118 may thus account for noise by varying the amount of light projected. Alternatively, processor 118 may decrease an amount of light projected toward the first portion relative to an amount of light projected toward the second portion. Processor 118 may do so, for example, when the noise estimation in the first portion is higher than the noise estimation in the second portion. As explained above, processor 118 may thus account for noise by varying the amount of light projected.

Figure 18:
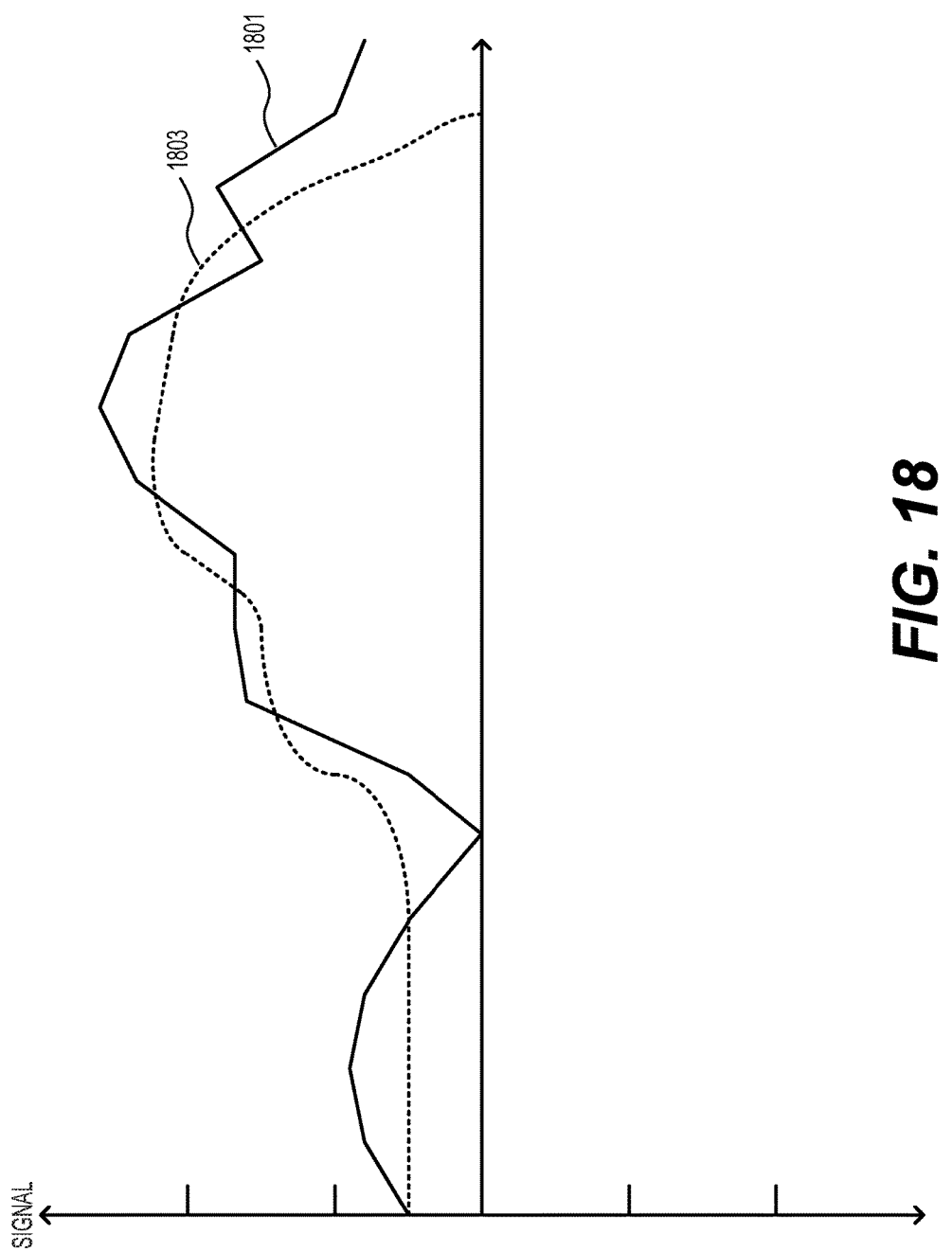
FIG. 18 is a diagram illustrating an example of received signals with a function for estimating expected signals consistent with some embodiments of the present disclosure.

Numerous noise estimation techniques may be used with method 1700 of FIG. 17. FIG. 18 depicts one example of received signals with a function for estimating expected signals. As depicted in FIG. 18, received signals 1801 represent the total signal for a portion of a field of view that includes noise which is received. Received signals 1801 are discretized measurements and therefore represented as a function with discontinuous points of slope.

As further depicted in FIG. 18, function 1803 may represent an estimation of the expected signal without noise. For example, function 1803 may be developed based on past measurements and/or on known properties that are being measured. For example, function 1803 may be developed by processor 118 based on previously received signals in the portion of the field of view and/or based on properties of objects in the portion of the field of view (e.g., known locations of objects, known brightness of objects, etc.). Processor 118 may derive the properties of objects based on previously received signals.

To adjust received signals 1801 to account for noise, processor 118 may fit received signals 1801 to function 1803. In other embodiments, function 1803 may represent a function that may be convolved with or otherwise operate on received signals 1801 to remove noise.

Figure 19:
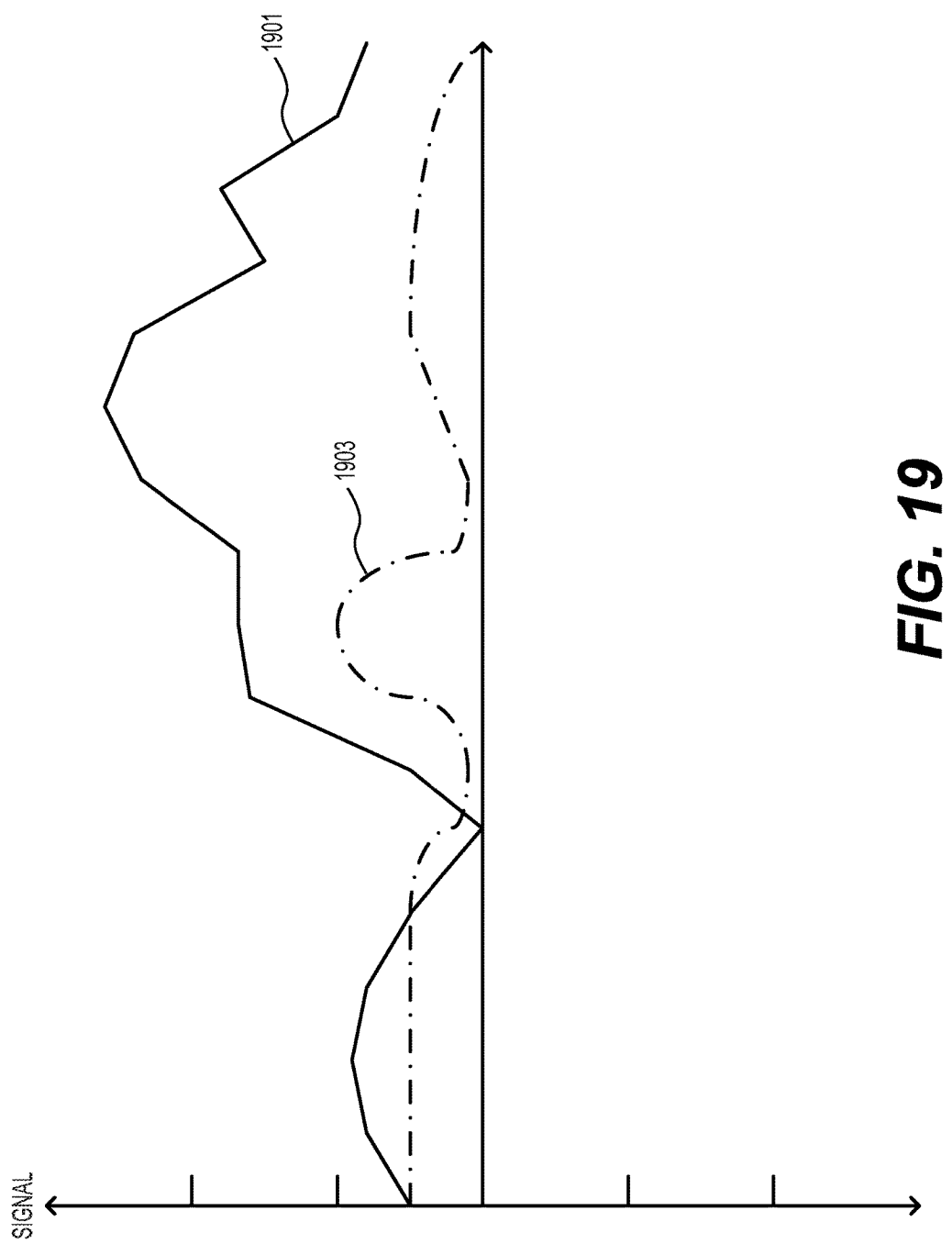
FIG. 19 is a diagram illustrating an example of received signals with a function for estimating noise consistent with some embodiments of the present disclosure.

FIG. 19 depicts one example of received signals with a function for estimating expected signals. As depicted in FIG. 19, and similar to FIG. 18, received signals 1901 represent the total signal that includes noise which is received. Received signals 1901 are discretized measurements and therefore represented as a function with discontinuous points of slope.

As further depicted in FIG. 19, function 1903 may represent an estimation of the expected noise. For example, function 1903 may be developed based on past measurements and/or on known properties of the at least one sensor. For example, function 1903 may be developed by processor 118 based on previously received signals in the portion of the field of view and/or based on properties of the at least one sensor (e.g., known dark noise, known amplification noise, etc.). Processor 118 may derive the properties of the at least one sensor based on manufacturing specification and/or on previous measurements.

To adjust received signals 1901 to account for noise, processor 118 may subtract function 1903 from received signals 1901. In other embodiments, function 1903 may represent a function that may be convolved with or otherwise operate on received signals 1901 to estimate the noise from received signals 1901.

Systems and methods consistent with the present disclosure may include any appropriate noise estimation techniques and are not limited to the examples of FIGS. 18 and 19.

Variable Flux Allocation within a Lidar FOV to Improve Detection in a Region of Interest By detecting laser beam reflections from real-world surroundings in its environment, LIDAR system 100 can create a 3-D reconstruction of objects in the environment within the FOV of the LIDAR system. Such LIDAR systems may have applications across a wide range of technologies. One such technology, among many, is the field of autonomous and semi-autonomous vehicles. As interest in self-driving technology continues to increase, LIDAR systems are increasingly being viewed as important components for the operation of self-driving vehicles. For a LIDAR system to be adopted by the automotive industry, the system should provide reliable reconstructions of the objects in the surroundings. Thus, improvements in the operational capabilities of LIDAR systems may solidify the LIDAR as an important contributor to realization of autonomous navigation. Such improvements may include increases in scanning resolution, increases in detection range, and/or increases in the sensitivity of the receiver. Such performance gains may be realized through use of high energy lasers. Currently, however, use of high energy lasers may be impractical for different reasons, such as cost, working temperature in the automotive environment, and that the maximum illumination power of LIDAR systems is limited by the need to make the LIDAR systems eye-safe (e.g., avoiding the possibility of damage to the retina and other parts of the eye that may be caused when projected light emissions are absorbed in the eye). Thus, there is a need for a LIDAR system that complies with eye safety regulations, but at the same time provides performance characteristics that enhance the system's usefulness to the technological platform in which it is incorporated (e.g., self-driving vehicles, etc.).

Generally, the disclosed LIDAR systems and methods may improve system performance while complying with eye safety regulations. For example, through allocation of variable light power across a field of view of the LIDAR system, the disclosed systems may exhibit improvements in the quality of detections and in subsequent reconstructions in a region of interest (ROI). By allocating power to a field of view based on a level of interest in a certain ROI, efficiency of the system may also be improved even while maintaining high quality and useful data from the ROI. In addition, separating FOV into different level of ROIs and allocating power to a field of view based on a level of interest in a certain ROI may bring forth many advantages. For example, it may enable LIDAR system to utilize an optical budget more efficiently by avoiding expenditure of light projection and detection resources in areas of lower interest. It may also reduce the interferences to the surrounding environments (e.g. other LIDAR systems or pedestrians on the street.). Furthermore, it may simplify the computational complexity of preparing and analyzing the results and may reduce the cost associated with it. A region of interest may constitute any region or sub-region of a LIDAR FOV. In some cases, an ROI may be determined to include a rectangular region of a LIDAR FOV, or a region of the FOV having any other shape. In some embodiments, an ROI may extend in an irregular pattern, which may include discontiguous segments, over the LIDAR FOV. Additionally, an ROI need not be aligned with any particular axis of the FOV, but rather may be defined in a free-form manner relative to the FOV.

Figure 22:
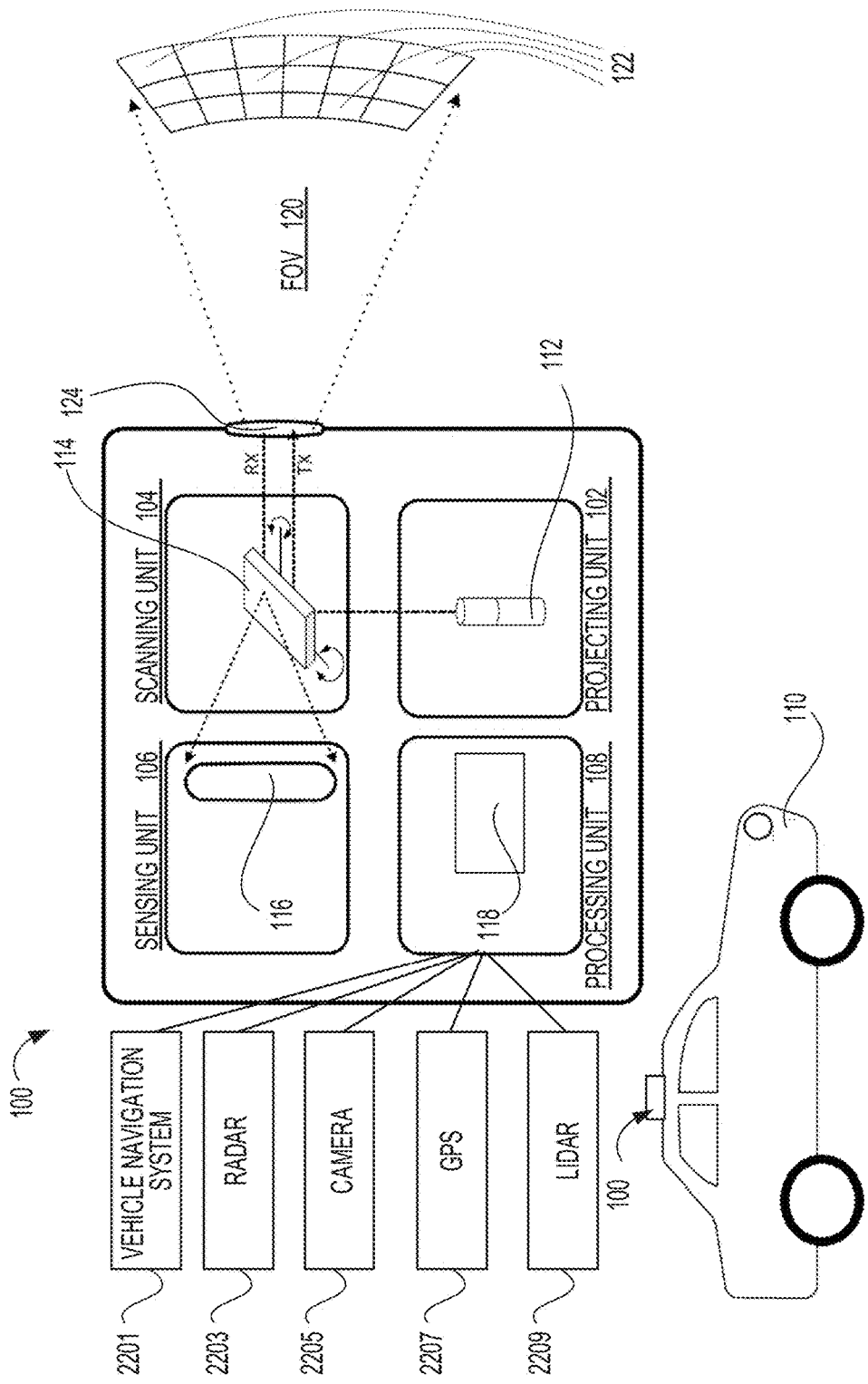
FIG. 22 is another diagram illustrating an exemplary LIDAR system consistent with disclosed embodiments.

Consistent with disclosed embodiments, in FIG. 22, LIDAR system 100 may include at least one processor 118, e.g., within a processing unit 108. The at least one processor 118 may control at least one light source 102 in a manner enabling light intensity to vary over a scan of a field of view 120 using light from the at least one light source. The at least one processor 118 may also control at least one light deflector 114 to deflect light from the at least one light source in order to scan the field of view 120. Furthermore, in some embodiments (e.g., as shown in FIG. 3), at least one light deflector 114 may include a pivotable MEMS mirror 300. The at least one processor 118 may obtain an identification of at least one distinct region of interest in the field of view 120. Then, the at least one processor 118 may increase light allocation to the at least one distinct region of interest relative to other regions, such that following a first scanning cycle, light intensity in at least one subsequent second scanning cycle at locations associated with the at least one distinct region of interest is higher than light intensity in the first scanning cycle at the locations associated with the at least one distinct region of interest. For example, light intensity may be increased by increasing power per solid angle, increasing irradiance versus FOV portion, emitting additional light pulses, increasing power per pixel, emitting additional photons per unit time, increasing the aggregated energy over a certain period of time, emitting additional photons per data point in a generated point cloud model, increasing aggregated energy per data point in a generated point cloud model, or any other characteristic of increasing light flux.

Disclosed system, such as LIDAR system 100, the at least one processor 118 may control the at least one light source 112. For example, the at least one processor 118 can cause the at least one light source 112 to generate higher or lower light flux, e.g., in response to a level of interest associated region of interest the LIDAR FOV. Portions of field of view 120 that have lower interest (e.g., such as regions 30 meters away from the road or the skyline) may be allocated with lower levels of light flux or even no light flux at all. In other regions of higher interest, however, (e.g., such as regions includes pedestrians or a moving car) may be allocated with higher light flux levels. Such allocations may avoid expenditure of light projection and detection resources in areas of lower interest, and may enhance resolution and other performance characteristics in areas of greater interest. It may also be possible to vary light allocation not on an object-by-object basis, but rather on an object-portion by object-portion basis. For example, in some cases, it may be more important and useful to have well-defined information regarding the location of an edge of an object (such as the outer edge or envelope of the object, such as a vehicle). Thus, it may be desirable to allocate more light flux toward FOV regions where edges of the vehicle reside and less light flux toward FOV regions that include portions of the object residing within the external envelope. As just one illustrative example, as shown in FIG. 5C, the at least one processor 118 may be configured to cause emission of two light pulses of projected light for use in analyzing FOV regions including edges of an object (e.g., the rounded-square object in coordinates units (B,1), (B,2), (C,1), (C,2) of FIG. 5C). On the other hand, for FOV regions associated with an interior of an object, or at least within an envelope defined by detected outer edges, such as the middle region (in coordinates (C,5)) within the rounded-square object shown in FIG. 5C, less light flux may be supplied to those regions. As another illustrative example shown in FIG. 5C, after a first scan cycle, only one light pulse is supplied to the interior region of the rounded-square shape. It should be noted that any suitable technique for increasing light flux may be used relative to a particular region of interest. For example, light flux may be increased by emitting additional light pulses, emitting light pulses or a continuous wave of a longer duration, increasing light power, etc.

The at least one processor 118 can control various aspects of the motion of at least one light deflector 114 (e.g., an angular orientation of the deflector, an angle of rotation of the deflector along two or more axes, etc.) in order to change an angle of deflection, for example. Additionally, the at least one 118 may control a speed of movement of the at least one deflector 114, an amount of time the at least one deflector dwells at a certain instantaneous position, translation of the at least one deflector, etc. By controlling the at least one light deflector 114, the at least one processor 118 may direct the projected light toward one or more regions of interest in the LIDAR FOV in a specific way, which may enable the LIDAR system to scan the regions of interest in the field of view with desired levels of detection sensitivity, signal to noise ratios, etc. As noted above, light deflector 114 may include a pivotable MEMS mirror 300, and the at least one processor 118 may control an angle of deflection of the MEMS mirror, speed of deflection, dwell time, etc., any of which can affect the FOV range and/or frame rate of the LIDAR system. It is noted that the controlling of the at least one light deflector 114 by the processing unit 108 may change an angle of deflection of light emitted by the LIDAR system 100 and/or of light reflected towards the LIDAR system 100 back from the scene in the FOV.

During operation, the at least one processor 118 may obtain an identification or otherwise determine or identify at least one region of interest in the field of view 120. The identification of the at least one region of interest within the field of view 120 may be determined through analysis of signals collected from sensing unit 106; may be determined through detection of one or more objects, object portions, or object types in FOV 120; may be determined based on any of various detection characteristics realized during a scan of FOV 12; and/or may be based on information received (directly or indirectly) from host 210; or based on any other suitable criteria.

As shown in FIG. 22, processing unit 108 may receive information not only from sensing unit 106 and other components of LIDAR system 100, but may also receive information from various other systems. In some embodiments, processing unit 108, for example, may receive input from at least one of a GPS 2207, a vehicle navigation system 2201, a radar 2203, another LIDAR unit 2209, one or more cameras 2205, and/or any other sensor or informational system. In addition to determining one or more particular regions of interest within FOV 120 based on detections, etc. from LIDAR system 100, processing unit 108 may also identify one or more regions of interest in FOV 120 based on the outputs of one or more of GPS 2207, vehicle navigation system 2201, radar 2203, LIDAR unit 2209, cameras 2205, etc. The at least one region of interest may include portions, areas, sections, regions, sub-regions, pixels, etc. associated with FOV 120.

After obtaining identification of at least one region of interest within the field of view 120, the at least one processor 118 may determine a new scanning scheme or may change an existing scanning scheme associated with light projection and subsequent detections relative to the at least one region of interest. For example, after identification of at least one region of interest, the at least one processor 118 may determine or alter one or more light-source parameters associated with light projector 112 (as described above). For example, the at least one processor 118 may determine an amount of light flux to provide to a particular region of interest, a number of light pulses to project, a power level of light projection, a time of projection for a continuous wave, or any other characteristic potentially affecting an amount of light flux provided to a particular, identified region of interest.

The at least one processor 118 may determine particular instantaneous positions through which deflector 114 may be moved during a scan of the at least one region of interest.

Processing unit 108 may also determine dwell times associated with the determined instantaneous positions and/or movement characteristics for moving deflector 114 between the determined instantaneous positions.

Prior to identifying a region of interest in the LIDAR FOV, in some embodiments, a default amount of light may be projected in each region of the FOV during a scan of the FOV. For example, where all portions of the FOV have the same importance/priority, a default amount of light may be allocated to each portion of the FOV. Delivery of a default amount of light at each region of the FOV may involve controlling the available light source such that a similar number of light pulses, for example, having a similar amplitude are provided at each FOV region during a scan of the FOV. After identification of at least one region of interest, however, the at least one processor 118 may increase an amount of light supplied to at least one region within the region of interest relative to one or more other regions of the FOV. In the illustrative example of FIG. 5C, sector II may represent an identified region of interest (e.g., because sector II is determined to have a high density of objects, objects of a particular type (pedestrians, etc.), objects at a particular distance range relative to the LIDAR system (e.g., within 50 m or within 100 m etc.), objects determined to be near to or in a path of a host vehicle, or in view of any other characteristics suggesting a region of higher interest than at least one other area within FOV 120). In view of sector II's status as a region of interest, more light may be supplied to the sub-regions included in sector II than the rest of the regions within the FOV. For example, as shown in FIG. 5C, sub-regions within sector II (other than regions determined to be occupied by objects) may be allocated three light pulses. Other areas of less interest, such as sector I and sector III may receive less light, such as one light pulse or two light pulses, respectively.

In some embodiments, a region of interest designation may depend on a distance that a target object resides relative to the LIDAR system. The farther away from the LIDAR system that a target object resides, the longer the path a laser pulse has to travel, the larger the potential laser signal loss may be. Thus, a distant target may require higher energy light emissions than a nearby target in order to maintain a desired signal to noise ratio. Such light energy may be achieved by modulating the power output of source 112, the pulse width, the pulse repetition rate, or any other parameter affecting output energy of light source 112. Nearby objects may be readily detectable and, therefore, in some cases such nearby objects may not justify a region of interest designation. On the other hand, more distant objects may require more light energy in order to achieve suitable signal to noise ratios enabling detection of the target. Such distant objects may justify a region of interest designation and an increase in light energy being supplied to respective regions of the FOV in which those objects reside. For example, in FIG. 5C, a single light pulses may be allocated to detect a first object at a first distance (e.g., either of the near field objects located near the bottom of FIG. 5C), two light pulses may be allocated to detect a second object at a second distance greater than the first distance (e.g., the mid-field object with the rounded-square shape), and three light pulses may be allocated to detect a third object (e.g., far field triangle object) at a third distance greater than both the first distance and the second distance.

On the other hand, however, an available laser energy level may be limited by the eye safety regulations along with potential thermal and electrical limitations. Thus, to ensure eye safety while using the LIDAR system 100, the at least one processor 118 may cap accumulated light in the at least one distinct region of interest based on eye safety thresholds. For example, the at least one processor 118 may be programmed to limit an amount of light projected within a distinct region of the FOV (e.g., over a particular time duration) in order to comply with eye safety limits. As used here, a cap may refer to a threshold light amount over a particular time duration corresponding to an upper light amount eye safety limit (or a limit set below the upper limit to provide a margin of safety). The at least one processor 118 may control the at least one light source 112 such that the cap is not exceeded during operation of LIDAR system 100. Thus, for example, a region of lower interest may be defined in an area in which eyes are likely to be found—e.g. in the driver area of a vehicle, in certain heights above sidewalks and bicycle lanes, etc. The lower interest in the context of such regions does not necessarily mean that detection is less important in those regions compared to other regions, but rather that detection is of lower importance (or interest) than maintaining safe operation of the system.

The at least one processor 118 may determine the identification of the at least one distinct region of interest based on information received from any suitable source. In some embodiments, the at least one processor 118 may receive identification of at least one region of interest from at least one sensor configured to detect reflections of light associated with the first scanning cycle. Such a sensor may include, e.g., sensing unit 106, which may include one or more light sensitive objects and one or more logic devices (e.g., processors, DSPs, gate arrays, etc.) configured to generate at least one identifier of a region of interest or a potential region of interest. In some embodiments, the at least one processor 118 may identify a region of interest based on an output of sensing unit 106, for example. In other embodiments, the at least one processor 118 may receive an identification of a region of interest or at least one indicator of a region of interest from one or more sources peripheral to LIDAR system 100. For example, as shown in FIG. 22, such an identification or indicator may be received from vehicle navigation system 2201, radar 2203, camera 2205, GPS 2207, or another LIDAR 2209. Such indicators or identifiers may be associated with mapped objects or features, directional headings, etc. from the vehicle navigation system or one or more objects, clusters of objects, etc. detected by radar 2203 or LIDAR 2209 or camera 2205, etc. Optionally, the at least one processor 118 may determine the identification of the at least one distinct region of interest based on information received from a remote source, located outside a platform on which Lidar system 100 is installed. For example, if the LIDAR system 100 is used for mapping of an environment by a plurality of vehicles, definitions on how to determine regions of interest may be received from a server which coordinates the operations of the different vehicles.

In some examples, regions of interest may be determined during or subsequent to a first scan of the FOV, and light increases to the identified regions of interest may be accomplished in one or more subsequent scans of the FOV. As a result, light intensity in at least one subsequent second scanning cycle at locations associated with at least one distinct region of interest may be higher than light intensity in the first scanning cycle at the locations associated with the at least one distinct region of interest. In some examples, at least one subsequent second scanning cycle of the FOV includes a plurality of subsequent second scanning cycles. In such cases, an aggregate light intensity over a plurality of second scanning cycles in an area of at least one distinct region of interest in the FOV may be greater than an aggregate light intensity in other non-regions of interest over the plurality of second scanning cycles.

By identifying regions of interest and increasing amounts of light supplied to those regions relative to regions of lower interest, more objects and/or more distant objects may be detected in the regions of interest as compared to regions of less interest. For example, in a region of interest, reflections of projected light may result in determination of an existence of a first object in the at least one distinct region of interest at a first distance. And this first distance may be greater than a second distance at which an object in a non-region of interest was not detected.

The at least one processor 118 may modify illumination resolution to the at least one distinct region of interest relative to other regions. The spatial resolution of a 3D representation of the at least one distinct region of interest in the at least one subsequent second scanning cycle is higher than spatial resolution of a 3D representation of the at least one distinct region of interest in the first scanning cycle. In addition, the at least one processor 118 may also modify illumination timing to the at least one distinct region of interest relative to other regions, such that temporal resolution of a 3D representation of the at least one distinct region of interest in the at least one subsequent second scanning cycle is higher than temporal resolution of a 3D representation of the at least one distinct region of interest in the first scanning cycle. Wherein, for example, a higher temporal resolution may be attained by, but not limited to, increasing the frame rate; vice versa.

As aforementioned examples, when more light is allocated to the at least one region of interest, a higher spatial and/or temporal resolution may also be acquired. On the other hand, for the regions of non-interest and low interest, light allocation toward those regions may be reduced, and, in turn, a lower spatial and/or temporal resolution may be attained. An increase in spatial and/or temporal resolution may be achieved by, but not limited to, using the higher light intensity (e.g. narrowing the area of the region of interest, so that more light flux per area is allocated.) Similarly, a decrease in spatial and/or temporal resolution may be achieved by, but not limited to, using the lower light intensity (e.g. broadening the area of the regions of non-interest, so that less light flux per area is allocated.)

Figure 20:
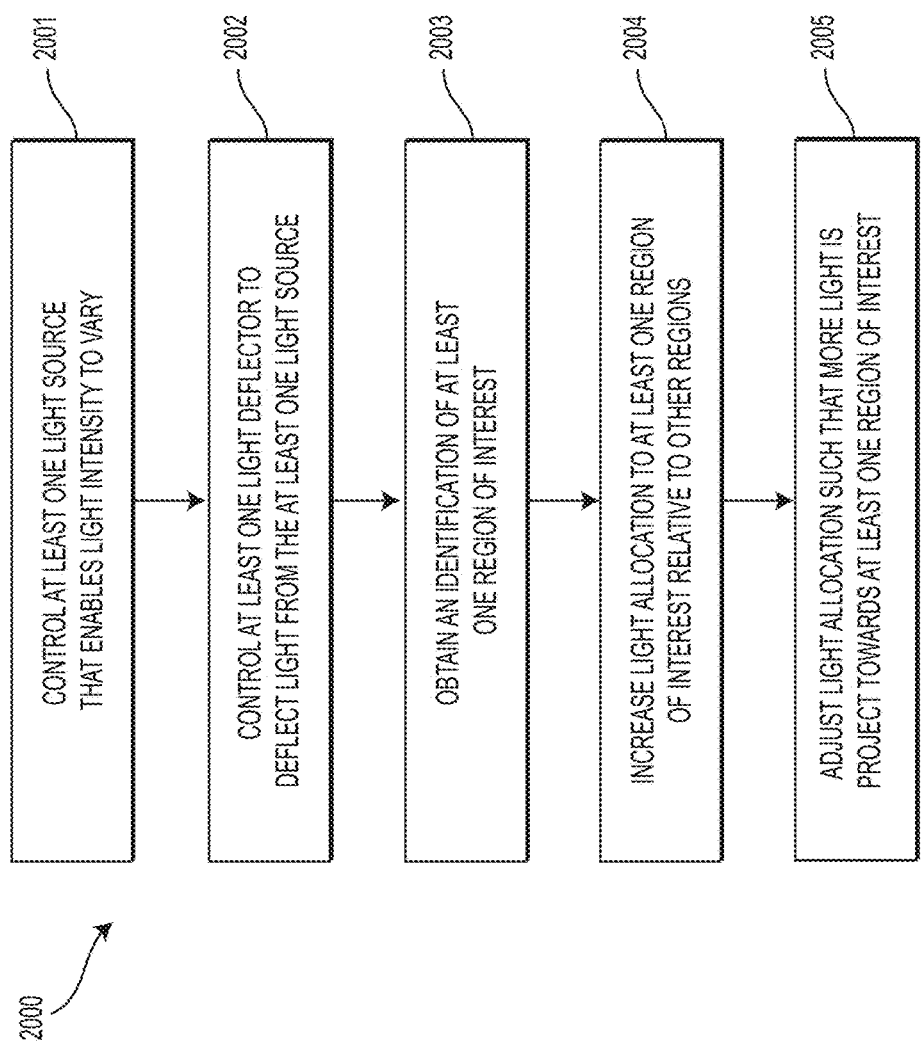
FIG. 20 is a flow chart illustrating a first example of method for detecting objects in a region of interest using a LIDAR system.

FIG. 20 is a flowchart of example method 2000 for detecting objects in a region of interest using a LIDAR system. In step 2001, a processor (e.g., processor 118) controls at least one light source (e.g., light source 112) in a manner enabling light intensity to vary over a scan of a field of view (e.g., field of view 120) using light from the at least one light source. In step 2002, a processor (e.g., processor 118) controls at least one light deflector (e.g., light deflector 114) to deflect light from the at least one light source (e.g., light source 112) in order to scan the field of view (e.g., field of view 120). The deflection of the at least one light source in step 2002 may also affect deflection of reflected light arriving from the field of view (e.g., field of view 120) in direction of at least one sensor (e.g., sensor 116). In step 2003, a processor (e.g., processor 118) obtains an identification of at least one distinct region of interest in the field of view (e.g., field of view 120). In addition, the obtained identification of at least one distinct region of interest in the field of view (e.g., field of view 120) may come from at least one sensor (e.g., sensing unit 106) configured to detect reflections of light associated with the first scanning cycle. Furthermore, in some embodiments, the obtained identification of at least one distinct region of interest in the field of view (e.g., field of view 120) may be based on a current driving mode of a vehicle in which the LIDAR system is deployed. In some embodiments, the obtained identification of at least one distinct region of interest in the field of view (e.g., field of view 120) may be based on an object detected in at least one distinct region of interest. In some embodiments, the obtained identification of at least one distinct region of interest in the field of view (e.g., field of view 120) may come from at least one of a GPS, a vehicle navigation system, a radar, a LIDAR, and a camera.

In step 2004, a processor (e.g., processor 118) increases light allocation to the at least one distinct region of interest relative to other regions, such that following a first scanning cycle, light intensity in at least one subsequent second scanning cycle at locations associated with the at least one distinct region of interest is higher than light intensity in the first scanning cycle at the locations associated with the at least one distinct region of interest. In addition, the at least one subsequent second scanning cycle includes a plurality of subsequent second scanning cycles, and an aggregate light intensity in an area of the at least one distinct region of interest over a plurality of second scanning cycles is greater than an aggregate light intensity in other non-regions of interest over the plurality of second scanning cycles.

In step 2005, a processor (e.g., processor 118) adjusts light allocation such that in a single scanning cycle more light is projected towards the at least one distinct region of interest relative to the other regions. In some circumstances, a processor (e.g., at least one processor 118) may allocate less light in the at least one subsequent second scanning cycle to a plurality of regions identified as non-regions of interest relative to an amount of light projected towards the plurality of regions in the first scanning cycle.

Figure 21:
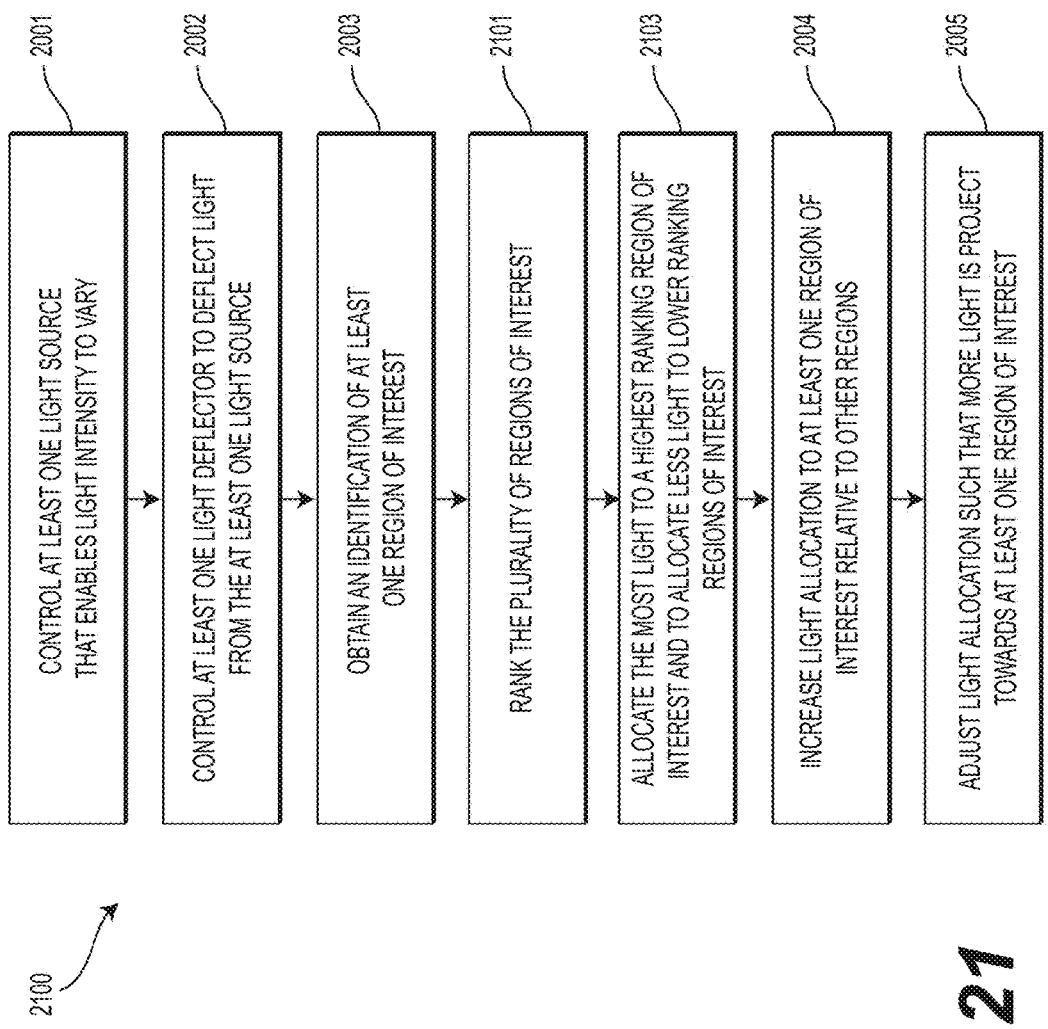
FIG. 21 is a flow chart illustrating a second example of method for detecting objects in a region of interest using a LIDAR system.

FIG. 21 is a flowchart of example method 2100 for detecting objects in a plurality of regions of interest using a LIDAR system. In step 2001, a processor (e.g., processor 118) controls at least one light source (e.g., light source 112) in a manner enabling light intensity to vary over a scan of a field of view (e.g., field of view 120) using light from the at least one light source. In step 2002, a processor (e.g., processor 118) controls at least one light deflector (e.g., light deflector 114) to deflect light from the at least one light source (e.g., light source 112) in order to scan the field of view (e.g., field of view 120). In step 2003, a processor (e.g., at least one processor 118) obtains an identification of at least one distinct region of interest in the field of view (e.g., field of view 120). In addition, the obtained identification of at least one distinct region of interest in the field of view (e.g., field of view 120) may come from at least one sensor (e.g., sensing unit 106) configured to detect reflections of light associated with the first scanning cycle. Furthermore, in some embodiments, the obtained identification of at least one distinct region of interest in the field of view (e.g., field of view 120) may be based on a current driving mode of a vehicle in which the LIDAR system is deployed. In some embodiments, the obtained identification of at least one distinct region of interest in the field of view (e.g., field of view 120) may be based on an object detected in at least one distinct region of interest. In some embodiments, the obtained identification of at least one distinct region of interest in the field of view (e.g., field of view 120) may come from at least one of a GPS, a vehicle navigation system, a radar, a LIDAR, and a camera.

In step 2101, a processor (e.g., processor 118) may rank the plurality of regions of interest. For example, a scene may be scanned by a LIDAR system. The regions of interest of the scene may be designated as either being a region of non-interest (RONI) or a region of interest (ROI) that has a level of interest between low and high. For example, road delimiters and vertical planes of buildings may be designated as being regions of high interest (R2), pedestrians and moving cars may be designated within regions of medium interest (R1), and the rest of the scene may be generally considered a region of low interest (R0). The skyline may be designated as a RONI (R3).

In step 2103, a processor (e.g., processor 118) allocates light based on the ranking, wherein an amount of light allocated to a highest ranking region of interest may be greater than an amount of light allocated to lower ranking regions of interest. For example, the power or resource allocation for the illustrative scene described above may be determined by a processor. Based on the rank, the processor may allocate most power to the region of highest interest R2, then to the region of medium interest R1 and may provide the lowest allocation to the low interest region R0. Some power may also be allocated to RONI R3 in order to periodically confirm that it is still a RONI. In this example, region 2 (R2) may be defined as the most interesting region. It may be attributed with the highest quality of service, largest laser power, highest receiver sensitivity, highest angular scan resolution, highest range resolution, highest frame rate, etc. implying the longest range detection capability.

In step 2004, a processor (e.g., processor 118) may increase light allocation to the at least one distinct region of interest relative to other regions, such that following a first scanning cycle, light intensity in at least one subsequent second scanning cycle at locations associated with the at least one distinct region of interest may be higher than light intensity in the first scanning cycle at the locations associated with the at least one distinct region of interest. In addition, the at least one subsequent second scanning cycle may include a plurality of subsequent second scanning cycles, and an aggregate light intensity in an area of the at least one distinct region of interest over a plurality of second scanning cycles may be greater than an aggregate light intensity in other non-regions of interest over the plurality of second scanning cycles.

In step 2005, a processor (e.g., processor 118) adjusts light allocation such that in a single scanning cycle more light is projected towards the at least one distinct region of interest relative to the other regions. In some circumstances, a processor (e.g., processor 118) may allocate less light in the at least one subsequent second scanning cycle to a plurality of regions identified as non-regions of interest relative to an amount of light projected towards the plurality of regions in the first scanning cycle.

Adaptive Lidar Illumination Techniques Based on intermediate Detection Results

Figures 23, 24:
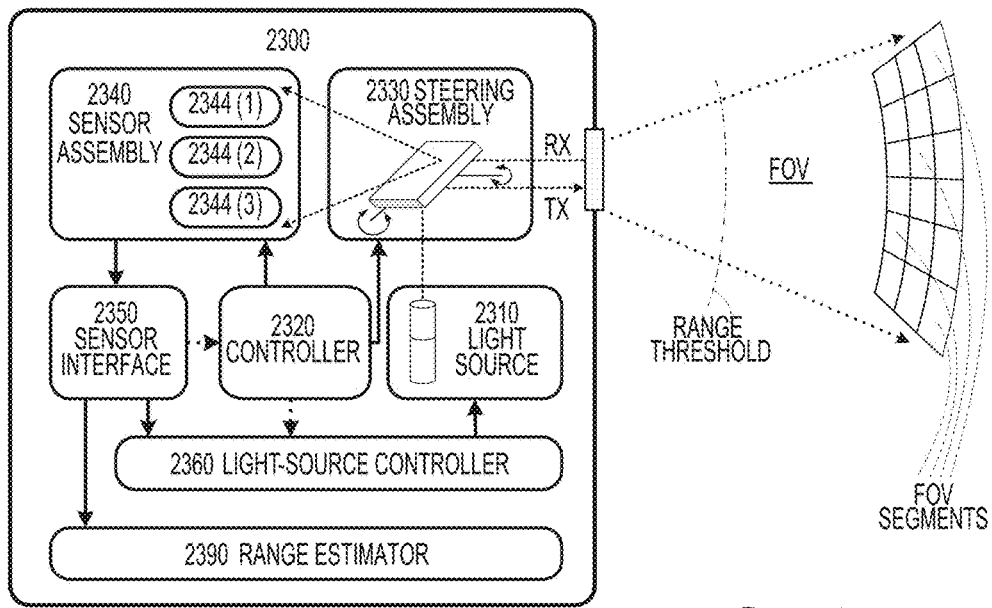
FIG. 23 is a diagrammatic illustration of a LIDAR system consistent with embodiments of the present disclosure.
FIG. 24 is a flow chart of an exemplary process for controlling light emissions consistent with embodiments of the present disclosure.

FIG. 23 illustrates an exemplary embodiment of a LIDAR system 2300 that emits light and detects photons reflected from a field-of-view of the LIDAR. In some embodiments, LIDAR system 2300 may operate as described above with reference to LIDAR system 100. Based on the detection results, the LIDAR may generate a sequence of depth maps. As previously described, the LIDAR may be operable to generate depth maps of one or more different types, such as any one or more of the following types: point cloud model (PC), polygon mesh, depth image (holding depth information for each pixel of an image or of a 2D array), or any other type of 3D model of a scene.

The generated depth maps may include a temporal characteristic. For example, the depth maps may be generated in a temporal sequence, in which different depth maps are generated at different times. Each depth map (interchangeably "frame") of the sequence may be generated within the duration of a scan of the LIDAR FOV. In some embodiments, such scans may occur within a period of several seconds, within about 1 second, or less than a second.

In some embodiments, LIDAR system 2300 (interchangeably "the LIDAR") may have a fixed frame rate over the sequence (e.g. 10 frames per second—FPS-25 FPS, etc.) or a dynamic frame rate. The frame-times of different frames are not necessarily identical across the sequence. For example, a 10 FPS LIDAR may generate one depth map in 100 milliseconds (the average), the next frame in 92 milliseconds, a third frame at 142 milliseconds, and additional frames at a wide variety of rates averaging to the 10 FPS specification.

The frame time may refer to the span of time starting with the first projection of light whose detection gives rise to the detection information of the frame and ending with the finalization of the respective depth map ("frame"). A "frame-illumination-duration" is the span of time starting with the first projection of light whose detection gives rise to the detection information of the frame, and ending when the last photon whose detection impacts the detection information of the frame is emitted (i.e. the "frame-illumination-duration" is the first part of the respective frame-time, followed by a duration of at least some processing of detection information of the frame to yield the respective depth-map). In some embodiments, all actions, processes or events which are described in the present disclosure as happening in the same frame-time, may be required to happen in the same frame-illumination-duration (i.e. stricter time-constrains may be implemented).

In some embodiments, the frame-times may partly overlap (e.g. the processing of an $N^{th}$ depth-map may extend into the lighting of an $(N+1)^{th}$ frame), but optionally may be completely nonoverlapping. In some embodiments, there may be time gaps between the frame-times of different frames.

The number of depth maps in the sequence may be equal or greater than 3, even though significantly longer sequences of frames may be generated by the LIDAR. For example, the sequence may include more than 10 depth maps. For example, the sequence may include more than 100 depth maps. For example, the sequence may include more than 1,000 depth maps. It is noted that the sequence does not necessarily include all of the frames which are generated by the LIDAR. Optionally, the sequence of depth maps may include all of the depth maps generated by the LIDAR between the first and the last depth maps of the sequence.

System 2300 may include at least sensor-interface 2350 and light source controller 2360, but may also include additional components, such as (but not limited to) the ones discussed below. Sensor-interface 2350 may be configured and be operable to receive from one or more sensors of the LIDAR (e.g. sensors 2344(1), 2344(2) and 2344(3)) detection-information which is indicative of amount (or amounts) of light detected by the respective sensor(s) (e.g. number of detected photons, accumulated energy of detected light, etc.). The light detected by the sensors may include—for at least some of the segments of the field-of-view (FOV) of the LIDAR—photons emitted by the LIDAR and reflected back from a scene toward one or more detectors of the LIDAR.

The FOV of the LIDAR may include several segments (two or more, up to the hundreds or thousands, and possibly more) that are illuminated in different timings. Each segment may include one or more items of the depth map (e.g. one or more polygons, one or more point-cloud points, one or more depth image pixels), and may be covered by one or more sensors (generating one or more detection signals). In some embodiments, the segments of the FOV may include non-overlapping segments. In other embodiments, some of the segments of the FOV may partly overlap each other. Optionally, the depth map may not include an item for one or more segments (e.g. because no photons reflected within the allowed time frame, or the SNR was too low for detection). In such cases, the depth map may include a corresponding indication of lack of data, but not necessarily so.

In some embodiments, the depth map generated by the LIDAR may include depth information based on detection of light from segments which are illuminated without processing of preliminary illumination (e.g. as may be implemented with regard to the optional distinction between central segments and circumference segments). The depth map generated by the LIDAR may include depth information also for parts (or segments) of the FOV which are not illuminated and/or which is not based on detection of light. For example, some items of the depth map (pixel, PC point, polygon or part thereof) may be based on interpolation or averaging of detection-based values determined for illuminated parts of the FOV.

In an exemplary embodiment, sensor-interface 2350 is operable to receive (from one or more sensors of the LIDAR), in each of the frame-times of the sequence and for each segment out of a plurality of segments of a field-of-view of the LIDAR, preliminary detection-information of light emitted by the LIDAR during the respective frame-time and reflected (or otherwise scattered) from the respective segment. For some of the segments, no light projected by the LIDAR may be reflected (e.g. if no target is within a detection range of the LIDAR), but for at least some of the segments the preliminary detection-information may be indicative of amount of projected light that is reflected from the scene and detected by one or more sensors of the LIDAR. Along with the detection-information provided by the one or more sensors (including the preliminary detection-information), the signals generated by the one or more sensors may include contributions from, for example, external radiation (e.g. sunlight, flashlights, and other sources of light/radiation other than the LIDAR system 100) and sensor noise (e.g. dark current).

The preliminary detection-information may be obtained as a single signal (based on the outputs of one or more sensors—e.g. one or more SPADs, one or more APDs, one or more SiPMs, etc.) or as a plurality of signals (e.g., the outputs of multiple sensors). The preliminary detection-information may include analog and/or digital information. The preliminary detection-information may include a single value and/or a plurality of values (e.g. for different times and/or parts of the segment). The preliminary detection-information may pertain to one or more items of the depth map (e.g. to one or more polygons, to one or more point-cloud points, to one or more depth image pixels, etc.). It is noted that the preliminary information may be later used for the determining of the distance to at least one object in the FOV.

Light-source controller 2360 may be configured and operable to control a light source 2310 of the LIDAR, and especially to control emission of light by the light source 2310. Light-source controller 2360 may be the only entity which controls emission of light by the light source 2310 of the LIDAR, but this is not necessarily so. If the LIDAR includes more than one light sources, light-source controller 2360 may be configured and operable to control one or more of these light sources, possibly all of them. Additionally, various controllers other than controller 2360 may control or influence at least one operational aspect of a light source associated with LIDAR system 100.

In some embodiments, light-source controller 2360 is configured to control, in each of the frame-times of the sequence, subsequent emission of light by the LIDAR. The subsequent emission is emitted (if its emission is permitted by light-source controller 2360) after the emission of the preliminary light emission (the emission which is used for the preliminary detection-information). If the LIDAR emits pulsed light, than the subsequent emission of light may include one or more pulses of light.

Light-source controller 2360 may be configured to control in each of the frame-times of the sequence, based on the preliminary detection-information of each segment out of the plurality of segments, subsequent emission of light by the LIDAR to the respective segment during the respective frame-time. That is—in each frame time, light-source controller 2360 may control subsequent emission of light in each segment out of a plurality of segments—based on detection and processing of light which was emitted by the LIDAR in the same frame-time, and which was detected in the same segment.

The controlling of the emission of subsequent light per segment of the FOV allows differentiation in the projecting of light to different segments of the LIDAR's FOV, based on detection of reflected light from the same frame—indicative of detection results (e.g. of targets in different parts of the FOV) with almost instantaneous inputs. This differentiation may be used to accomplish various goals, such as—
  a. Eye safety (and other safety consideration such as skin safety, safety of optical systems, safety of sensitive materials and objects on so on): it is possible to limit emitted power levels in one or more portions of the LIDAR FOV where safety is a consideration, while emitting higher power levels (thus potentially improving signal-to-noise ratio and detection range) to other parts of the FOV.
  b. Power Management: It may be possible to direct more energy towards parts of the LIDAR FOV were it will be of greater use (e.g. regions of interest, further distanced targets, low reflection targets, etc.) while limiting lighting energy delivered to other parts of the FOV. Such light allocation for either eye safety or power management (or any other purpose) may be based on detection results from a current frame or any preceding frame.

In some embodiments, controlling of the emission of subsequent projections of light to a particular segment or region of the FOV may include controlling (e.g., altering) one or more parameters of the light source to impact subsequent light emissions. Such alterations may impact various characteristics of the projected light, such as (though not limited to) any one of the following:
  a. increasing, reducing, limiting, or precluding light projection to any one or more LIDAR FOV segments during a current scan of the FOV or during subsequent scans of the FOV;
  b. overall light energy supplied to across the FOV or to any portion of the FOV;
  c. an energy profile of light supplied to any portion of the FOV;
  d. a duration of light emissions;
  e. wave properties of the light projected to any portion of the FOV, such as polarization, wavelength, etc.

In addition, FIG. 23 illustrates a plurality of segments of the FOV. It will be clear to a person who is skilled in the art that each segment may represent a three-dimensional conic section (in essence a cone or a truncated cone). For simplicity of illustration, only a cross section of each segment is illustrated. Additionally, the number of segments and their spatial configuration may be significantly different. For example, the segments in the illustration are arranged in a 3 by 6 2D rectangular array, but other non-rectangular arrangements may be used instead, as well as 1D arrangements.

System 2300 may be adapted to control inspection of (and possibly also to inspect) regions or segments of a scene (shown here is a specific field of view (FOV) being scanned) using light pulses (or other forms of transmitted light such as CW laser illumination). The characteristics of the illumination (initial illumination, subsequent illumination, or any other illumination by the LIDAR) may be selected (possibly also during operation of the LIDAR) as a function of any one or more of the following parameters (among others):

a. Optical characteristics of the scene segment being inspected.
b. Optical characteristics of scene segments other than the one being inspected.
c. Scene elements present or within proximity of the scene segment being inspected.
d. Scene elements present or within proximity of scene segments other than the one being inspected.
e. An operational mode of the scanning or the steering device.
f. A situational feature/characteristic of a host platform with which the scanning or the steering device is operating.

The light source 2310 of the LIDAR (interchangeably "emitter" and "emitter assembly") may include one or more individual emitters (e.g. one or more lasers, one or more LEDs), which may operate using similar or different operational parameters (e.g. wavelength, power, focus, divergence, etc.). Light-source controller 2360 may control one, some or all of the individual emitters of light-source 2310. In some embodiments, the light source 2310 may be operable to emit photonic inspection pulses toward the FOV. In some embodiments, the light source and deflector may be combined. For example, the LIDAR system may include a vertical-cavity surface-emitting laser or an optical phased array.

The sensor assembly 2340 of the LIDAR (interchangeably "sensor array", "sensor", "detector array" and "detector assembly") may include one or more light sensitive detectors 2344, each of which may include individual sensing units. For example, each detector 2344 may be a Silicon photomultiplier (SiPM) which includes a plurality of Single-photon avalanche diodes (SPADs). The sensor assembly detects photons emitted by the LIDAR which are reflected back from objects of a scanned scene.

In some embodiments, the LIDAR may further include a steering assembly 2330 for directing the emitted light in a direction of a scanned scene segment, and/or for steering the reflected photons towards the sensor array 2340. The steering assembly 2330 may include controllably steerable optics (e.g. a rotating/movable mirror, rotating/movable lenses, etc.), and may also include fixed optical components such as beam splitters, mirrors and lenses. Some optical components (e.g. used for collimation of the laser pulse) may be part of the emitter, while other optical components may be part of the detector assembly. In some embodiments the steering assembly 2330 may contain an array of mirrors.

In some embodiments, light-source controller 2360 may be connected to the light-source 2310 in different ways, such as by electrical circuitry or other wired connection, by wireless connection, etc. Light-source controller 2360 may also be connected to steering assembly 2330, for controlling a steering direction of emitted and/or reflected light, based on analysis of the preliminary detection information. For example, if no subsequent illumination is needed for a given segment, the steering assembly may be instructed to immediately change to another steering state, in order to illuminate another segment of the scene.

A controller 2320 of the LIDAR may be implemented for controlling the sensing array 2340, the steering assembly 2330 and/or other components of the LIDAR. Controller 2320 may include light-source controller 2360, but light-source controller 2360 may also be external and/or independent of controller 2320 (e.g. host 230). In the latter case, it is possible that the light-source may be controlled by both controller 2320 and light-source controller 2360. Controller 2320 may optionally be used in order to regulate operation of the emitter 2310, the steering assembly 2330 and the sensor assembly 2340 in a coordinated manner and optionally in accordance with scene segment inspection characteristics (e.g. based on internal feedback, host information, or other sources).

According to some embodiments, inspection of a scene segment by the LIDAR may include illumination of a scene segment (interchangeably "segment", "region" and "scene region") with transmitted light (e.g. a pulse of photons). The emitted light may have known parameters such as: duration, angular dispersion, wavelength, instantaneous power, photon density at different distances from the emitter, average power, power intensity, pulse width, pulse repetition rate, pulse sequence, duty cycle, wavelength, phase, polarization and more.

Inspection of the region may also include detecting reflected photons, and characterizing various aspects of these reflected inspection photons. The reflected inspection photons may include photons of the emitted light reflected back towards the LIDAR from an illuminated element present within the scanned scene segment.

The reflected photons may result from inspection photons and the scene elements they are reflected from, and so the received reflected signal may be analyzed accordingly. By comparing characteristics of emitted light with characteristics of a corresponding reflected and detected signal, a distance and possibly other physical characteristics (such as reflected intensity) of one or more scene elements present in the scanned scene segment may be estimated. By repeating this process across multiple parts of the FOV (e.g. in a raster pattern, Lissajous pattern or other patterns), an entire scene may be scanned in order to produce a depth map of the scene.

A "scene segment" or "scene region" may be defined, for example, using angles in a spherical coordinate system, for example, corresponding to a beam of light in a given direction. The light beam having a center radial vector in the given direction may also be characterized by angular divergence values, spherical coordinate ranges of the light beam and more.

In some embodiments, the different segments as defined in the context of illumination are not necessarily identical to the size of FOV portions or parts which are differentiated in the context of detection (e.g. "pixels" or the depth map). For example, the LIDAR may generate an N by M depth map (e.g. a 100 by 100 depth image), but partition the same FOV into less segments (e.g. 10 by 10 or 20 by 1) for the illumination. In another example, an illumination segment may be narrower in at least one dimension than the angular resolution of detection.

In some embodiments, range estimator 2390 obtains detection information acquired by the sensor array 2340, and processes the information in order to generate the depth map. The processing may be based on time-of-flight analysis, or in any other way known in the art.

The preliminary detection-information may be based on detection by a plurality of detectors (e.g. pixels, SiPMs) of a concurrent emission (e.g. one or more pulses, or a spatially continuous illumination). Light-source controller 2360 may determine, based on the preliminary detection-information generated by the plurality of detectors (e.g. 2340), how to collectively control subsequent emission which is detectable by all of the respective detectors. In some embodiments, the light-source controller 2360 may block any subsequent emission to an entire segment—even if only one or some of the detectors (but not all) indicate that projecting to the respective segment is not safe.

FIG. 24 is a flow chart illustrating an example of method 2400, in accordance with presently disclosed embodiments. Method 2400 is a method for controlling operation of a Light Detection and Ranging device (LIDAR) which generates a sequence of depth maps. Each depth map of the sequence may be generated in a corresponding subsecond frame-time. In some embodiments, method 2400 may be executed on a pixel-by-pixel or beam-spot by beam-spot basis.

Referring to the examples set forth with respect to the previous drawings, method 2400 may be executed by system 2300. Method 2400 may include executing any functionality, process, capability, etc. discussed with respect to system 2300, even if not explicitly stated. Likewise, system 2300 may be configured, adapted and/or operable to incorporate any step or variation of method 2400, even if not explicitly stated.

Method 2400 may include executing in each of the frame times of the sequence, for each segment out of a plurality of segments of a field-of-view of the LIDAR, at least stages 2440 and 2450. In some embodiments, method 2400 may or may not include executing stages 2440 and 2450 for all of the segments in the FOV. In other embodiments, method 2400 may or may not include executing stages 2440 and 2450 for all of the illuminated segments of the FOV.

Stage 2440 may include: obtaining preliminary detection-information (e.g. in one or more signals) based on light emitted by the LIDAR during the respective frame-time and reflected from the respective segment. Obtaining preliminary detection-information may include obtaining detection information for a single pixel of the depth image (or an item of another type of depth map, such as a PC point or a polygon, surface, face, edge or vertex of a polygon mesh), or for more than one pixel (or item). Referring to the examples set forth with respect to the previous drawings, stage 2440 may be executed by sensor interface 2350 and/or by sensor assembly 2340.

Stage 2450 may include: selectively controlling, based on the preliminary detection-information (of stage 2440, for the same segment in the same frame-time), subsequent emission of light by the LIDAR to a respective segment during the same respective frame time. Referring to examples set forth with respect to the previous drawings, stage 2450 may be executed, e.g., by light source controller 2360. The controlling of stage 2450 may include, for example, any form of controlling discussed with respect to light source controller 2360. In some embodiments, stage 2450 may include controlling a steering assembly of the LIDAR (e.g. steering assembly 2330) to direct the subsequent emission to the respective segment.

In some embodiments, in each frame-time the obtaining of the preliminary detection-information and the selective controlling (for all of the segments) are executed within the same frame-illumination-duration (which is the time between the emissions of the first photon in the frame-time to the emission of the last photon whose detection affects the depth map of the frame). Optionally, the selective controlling and the subsequent emission are finished before a processing of detection information for the generation of the depth map of the frame-time begins.

In some embodiments, different orders in which different segments are illuminated and analyzed may be implemented. For example, preliminarily illuminating each segment, obtaining the respective preliminary detection information (stage 2440) and selectively controlling the subsequent illumination to the same segment (stage 2450) may proceed before proceeding to execute the same steps for another segment.

In another embodiment, between a preliminary illumination of a first segment to its subsequent illumination (with the respective subsequent emission), another segment may be illuminated. In some embodiments, the subsequent emission for a single segment is preceded by a segment dark-time of the single segment (i.e. during which the LIDAR does not project any light to that segment), during which another segment of the plurality of segments is illuminated by the LIDAR.

Method 2400 may be used for ensuring that LIDAR system 100 is eye-safe (e.g. operates according to the requirements of any relevant eye safety regulations). In some embodiments, the selective controlling illumination is preceded by a stage (not illustrated) of determining—based on the preliminary detection-information—that a projection field (e.g. spherical sector, a cone or a truncated cone) is clear of people at least within an eye-safety range for at least a predetermined number of frames. This way, LIDAR system 100 may prevent subsequent emission whose power exceeds a safety threshold for portions of the FOV that were not clear of people. The eye-safety range (e.g. "range threshold" of FIG. 23) may be a predetermined range, but not necessarily so. In some cases, processor 118 may be configured to adjust the threshold associated with the safety distance based on reflections signals received based on one or more light projections to a particular region of the LIDAR FOV (either based on an initial light projection or a subsequent light projection having at least one characteristic altered with respect to the initial light projection).

Depending on the detected conditions or scenario, the selective controlling of stage 2450 may include controlling projection of subsequent light emissions to the projection field that do or do not fall below an eye safety illumination limit, but in all cases controlling of the illumination may be performed in a manner which complies with eye safety regulations. For example, where LIDAR detection indicate a lack of eye bearing individuals (human or otherwise) in a particular region or regions of the LIDAR FOV, subsequent light projections within that region or regions may proceed at levels that would not ordinarily be eye-safe. Should an eye bearing individual be subsequently detected, e.g., entering the region or regions not previous occupied by such individuals, then one or more parameters of the light projector may be altered such that subsequent light emissions to the occupied region may be performed in a manner safe for the individual's eyes. In other cases, one or more eye bearing individuals may be detected within a particular region of the LIDAR FOV, but at a distance beyond an eye safety threshold (e.g., an ocular hazard distance). In such cases, light may be projected to that region in a manner that may not be eye-safe within the eye safety threshold, but that is eye-safe beyond the eye-safety threshold where the individuals are detected. In still other cases, humans and/or animals may be detected at a range within an immediate area of the LIDAR system (e.g., within a predetermined eye safety threshold distance). In such cases, light projections may be altered to maintain eye safety in those regions in the immediate area of the LIDAR where one or more eye bearing individuals are detected. Eye-safety protocols may define a maximum power level or a threshold of accumulated energy over time. If a subsequent light emission includes a group of pulses, for example, eye safety compliance may require that the aggregate energy of those pulses not exceed a predetermined threshold level. In some cases, when an object (e.g., a person) is detected in an immediate area of the LIDAR system, processor 118 may be configured to prevent any further light emission toward a portion of the immediate area associated with the detected object. In other cases, when an object is detected in the immediate area, the at least one processor may be further configured to regulate at least one of the at least one light source and the at least one light deflector to emit visible light toward the immediate area. It is noted that the visible light may be emitted by a separate light source that the light source whose light is used in the determination of distances.

The term "immediate area" is widely used in the art, and should be broadly construed to include an area in proximity to the LIDAR system. The size of the immediate area may depend on the power settings of the LIDAR system (which effect the potential hazard distance of the LIDAR system). The immediate area may be of substantially the same diameter in all directions of the FOV (to which light may be emitted by the LIDAR system)—for example having differences of up to 50%—but this is not necessarily so. Optionally, the immediate area of the LIDAR system is defined in all directions of the FOV to which light may be emitted by the LIDAR system.

In some embodiments, based on light projected to selected regions of the LIDAR FOV, a processor, such as processor 118, may receive from at least one sensor reflections signals indicative of light reflected from objects in the LIDAR FOV. Processor 118 may determine, based on the reflections signals resulting from an initial light emission, whether an object is located in an immediate area of the LIDAR system (e.g., in a region associated with a particular segment of the LIDAR FOV or group of segments of the FOV and within a threshold distance from the at least one light deflector). The threshold distance may be associated with a safety distance, such as an eye safety distance. When no object is detected in the immediate area of the FOV, processor 118 may control the at least one light source such that an additional light emission may be projected toward the immediate area, thereby enabling detection of objects beyond the immediate area. In such cases, for example, the at least one processor may be configured to use an initial light emission and an additional light emission to determine a distance of an object located beyond the immediate area. It is noted that the term "reflections signals" should be broadly interpreted to include any form of reflection and of scattering of light, including specular reflections, diffuse reflections, and any other form of light scattering.

When an object is detected in the immediate area, processor 118 may regulate at least one of the at least one light source and the at least one light deflector to prevent an accumulated energy density of the light projected in the immediate area to exceed a maximum permissible exposure. For example, various parameters of the light projecting unit and/or the light deflecting unit may be altered to provide an additional light emission to a particular LIDAR FOV segment that is different from an initial light emission in at least one aspect (e.g., differing in at least one aspect relating to an eye safety parameter). The additional light emission may be made to the particular LIDAR FOV segment either during the same FOV scan as when the initial light emission is made or during any subsequent FOV scan.

As LIDAR systems may be capable of determining distance values to detected objects, this information may be leveraged by the LIDAR system for compliance with eye safety regulations. For example, once an object is detected, processor 118 may determine a distance to the object (e.g., based on time of flight analysis, etc.). Processor 118 may calculate an intensity of projected light at the detected object (e.g., based on the detected distance and known characteristics of the light projected from source 112/deflector 114). Based on this calculation, processor 118 may determine a light exposure time that is eye-safe at the distance to the object. Processor 118 may then control at least one of light source 112 and deflector 114, to ensure that the light exposure time is not exceeded. Similarly, processor 118 may be configured to determine a value associated with the maximum permissible exposure, and this determination may be based on a determined distance between the at least one light deflector and the object detected in the immediate area of the LIDAR system.

In addition or instead to determination of exposure time, processor 118 may determine a permissible light energy that is eye-safe at the distance to the object based on the aforementioned calculation of the intensity. For both exposure time and permissible light energy, it is noted that in some examples, processor 118 may determine the respective parameter indirectly, by determining a value which is indicative of the respective parameter. It is noted that the determination of permissible light energy (if implemented) may be used in the same way the determined exposure time is used, mutatis mutandis, even if not explicitly elaborated.

It is also noted that the distance between the at least one light deflector and the object may be determined directly or indirectly. Indirect determination of that distance may be achieved, for example, by determining another distance, such as the distance between at least one light source to the object.

In embodiments where the LIDAR FOV is divided into segments or sectors for performing scans of the FOV, for example, each segment or sector may be associated with a different immediate area relative to the LIDAR system. That is, each segment or sector, along with an eye safety threshold distance, may define a separate immediate area in the vicinity of the LIDAR system. In some embodiments, processor 118 may be configured to determine, based on reflections signals resulting from initial light emissions to each sector, whether an object is located in each of the immediate areas associated with the plurality of sectors. In some cases and based on reflections signals received from a particular sector via the sensor unit, processor 118 may be configured to detect an object in a first immediate area associated with a first sector. Similarly, processor 118 may be configured to determine an absence of objects in a second immediate area associated with a second sector. In such as case, the at least one processor 118 may be configured to control (e.g., in a single scanning cycle) the at least one light source such that an additional light emission is projected toward the second immediate area. Further, processor 118 may regulate at least one of the light source and/or the light deflector to prevent an accumulated energy density of the light in the first immediate area to exceed a maximum permissible exposure.

In some embodiments where the LIDAR FOV is divided into sectors, processor 118 may be configured to determine, based on reflections signals associated with an initial light emission from each sector, whether an object is located in each of the immediate areas associated with the plurality of sectors. Upon detecting an object in a first immediate area associated with a first sector and determining an absence of objects in a second immediate area associated with a second sector, processor 118 may control the at least one light source such that in a single scanning cycle, an additional light emission may be projected toward the second immediate area. Processor 118 may also regulate at least one of the at least one light source and the at least one light deflector to prevent an accumulated energy density of the light in the first immediate area to exceed the maximum permissible exposure.

It should be noted that any of the LIDAR system embodiments described above may be used in conjunction with the eye safety light projection protocols described here. For example, in some embodiments an eye safe LIDAR may include a monostatic deflector configuration such that a deflector steers projected light toward a particular segment of the field of view while light reflected from objects in the particular segment of the field of view is directed toward one or more sensors by the same deflector. Additionally, the light deflector may include a plurality of light deflectors, and processor 118 may be configured to cause the plurality of light deflectors to cooperate to scan the LIDAR FOV. In some embodiments, the at least one light deflector may include a single light deflector, and the at least one light source may include a plurality of light sources aimed at the single light deflector.

Various different light sources may be employed in the LIDAR system 100. For example, in some cases, the light source may be configured to project light at a wavelength less than 1000 nm, between 800 nm and 1000 nm, etc.

In some embodiments, LIDAR system 100 may include more than one light source. In such cases, each light source may be associated with a differing area of the LIDAR FOV. Processor 118 may be configured to coordinate operation of the at least one light deflector and the plurality of light sources such that when one object is detected in a first area of the field of view at a distance greater than the safety distance, energy density of light projected by a different light source to a second area of the field of view does not surpass a maximum permissible exposure associated with the second area of the field of view.

Additionally, processor 118 may be configured to coordinate the at least one light deflector and the at least one light source such that when another object is detected in another area at a distance greater than the safety distance, energy density of light projected by the at least one light source to the another portion of the field of view does not surpass a maximum permissible exposure associated with the another portion of the field of view. In some embodiments, the safety distance is a Nominal Ocular Hazard Distance (NOHD).

In some embodiments, the selective controlling of stage 2450 may include preventing—in at least one segment during at least one frame-time—subsequent emission whose power exceeds a safety threshold, for projection fields which were not clear of people for at least a predetermined number of frame-times. In some embodiments, the selective controlling for at least one FOV segment in at least one frame-time may include maintaining or even increasing a light projection power level, while at the same time decreasing an accumulated energy amount provided to the at least one FOV segment. For example, in a pulsed laser example, the pulse (or pulses) of a preceding illumination may have the same peak power (or even a lower power level) as the pulse (or pulses) of one or more subsequent emissions. Still, however, an accumulated energy of the subsequent illumination may nevertheless be lower than the accumulated energy of the preceding emission or emissions. In such a manner, it may be possible to increase a signal to noise ratio and/or a detection range while still operating in compliance with eye safety regulations. Of course, in other instances, it may be possible to vary the power level, accumulated energy characteristics, or any other light emission parameter in any combination in order to accomplish LIDAR detection goals while complying with eye safety regulations.

In some embodiments, the selective controlling of stage 2450 may include stopping (or preventing) a subsequent light emission to a particular FOV segment or group of segments within any given frame-time to comply with eye safety regulations. Such control may also be implemented to reduce or eliminate a risk of saturation of the detector, or any other component of the detection and/or processing chain. Such control can also support power conservation considerations (e.g. not spending energy where it is not required, e.g. if an object can be detected and/or a range can be determined based on previous emissions and without continued emissions).

In some embodiments, the selective controlling for at least one segment of the LIDAR FOV in at least one frame-time may include preventing emission of any subsequent emission if the preliminary detection-information fulfills a predetermined detection criterion. In some embodiments, the selective controlling may be followed by further processing of the preliminary detection information (without any further subsequent detection information for the respective segment), to yield depth information for the segment.

Regarding eye safety (for example), method 2400 may be used to prevent illumination of potentially harmful emissions to FOV regions where one or more objects are detected based on a determined likelihood that the one or more objects includes a human and/or animal. Potentially harmful emissions to the particular FOV region may be suspended even if there is only a low likelihood that the one or more objects includes an eye bearing individual. Potentially harmful emissions to a particular FOV may also be suspended (or otherwise altered) even in situations where no individuals (or even objects) are detected if the FOV region is determined (e.g., based on detected context, such as near a stopped bus, near a cross walk, near a sidewalk, near a building entrance, etc.) to be a region where eye bearing individuals are commonly found. In other regions of the FOV not determined to include eye bearing individuals or expected/predicted to include such individuals, higher power emissions may be provided to those regions. As a result, a generated depth map may benefit from detections in those areas not subject to eye safety limitations (e.g., because of higher power emissions, etc.), such that the overall quality of the depth map may be higher than if every light emission across the entire FOV was made at power levels etc. that assumed the presence of eye bearing individuals.

Method 2400 may include executing within a single frame-time of the sequence: selectively controlling subsequent emissions to different FOV segments having power levels that differ from one another by at least a factor of 2 or more (e.g., a subsequent emission to one FOV segment may have a power level at least twice as high as the subsequent emission to another segment, in the same frame-time), based on the corresponding preliminary-detection information. A depth-map for this frame-time may be generated (e.g. in stage 580). This may allow, for example, high SNR, or long distance detection, in some parts of the FOV, while maintaining eye safety compliance in other regions of the FOV or even across the entire FOV (e.g., in view of accumulated energy thresholds).

In some embodiments, stage 2450 may include selectively controlling the subsequent emission to prevent saturation of a detection path by which the sensor detection information is obtained. This may include the sensor, or any component of the LIDAR in the detection and/or processing path—e.g. amplifier, analog-to-digital converter, etc. The prevention of saturation may be leveraged in advanced processing of the detection results (e.g. for estimating reflectivity level of a detected target).

Method 2400 may include limiting (or otherwise managing) the emission levels to a given FOV segment in a given frame-time based on detection results in a preceding frame (or frames)—either of the same segment or of other segments. Method 2400 may include limiting (or otherwise managing) the emission levels to a given segment in a given frame-time based on detection results of another segment (either in the same frame-time, or in preceding frame-time).

Method 2400 may include controlling subsequent emissions to a segment of the FOV (e.g. in the same frame-time), based on preliminary detection-information of the same FOV segment or another segment of the FOV which was obtained in the same frame-time. For example, detection in a particular FOV segment of a target, especially one corresponding to an eye bearing individual, within an immediate area of the LIDAR may affect subsequent light emissions provided to the same FOV segment and or provided to one or more surrounding FOV segments. Such targets, for example, may span two or more FOV segments or may be expected to move to neighboring FOV segments.

Method 2400 may include selectively controlling preliminary emission to a particular FOV segment, prior to the obtaining of the preliminary detection-information, based on detection-information collected during a previous frame-time. In some embodiments different light sources may be used for the preliminary illumination and for the subsequent illumination. For example—while the subsequent emission may be projected by the main light source of the LIDAR, the preliminary illumination may be projected by another light source (e.g. visible light source, or even a light source of another system). Optionally, the preliminary detection information is based on detection of at least one photon emitted by at least one light source of the LIDAR which is not projecting during the respective subsequent emission. The different light sources may be controlled by a single light-source controller, or by different controllers.

The detection of the preliminary detection-information and of the subsequent detection-information may be executed by different sensors. For example, the preliminary detection information may be based on detection by least one sensor optimized for close range detection, while method 2400 also includes processing detection information of reflected photons of the subsequent emission detected by at least one other sensor optimized for larger range detection. The use of sensors of different types may be combined with use of light sources of different types (e.g. optimized for the different sensors or vice versa), but this is not necessarily so. In one example, sensor 116 may include an Avalanche Photo Diode (APD) detector for close range objects detection in addition to (or alternatively to) the array of Single Photon Avalanche Diodes (SPADs).

A preliminary illumination of an FOV segment may be used in some segments of the FOV (e.g. if the preliminary illumination is below a threshold level—e.g. eye safety threshold). Illumination to other segments of the FOV (e.g. with energy level exceeding the threshold level) may be governed by analysis of the preliminary detection-information of the relevant frames. For example—the circumference of the FOV may be analyzed using preliminary low level investigatory signals, while the center of the FOV may be scanned using higher power light projections, if the regions of the FOV around the circumference of the FOV return an indication of low risk to eye bearing individuals.

Method 2400 may include executing within a frame-time of the FOV scan steps including, e.g., obtaining circumference detection-information based on light emitted by the LIDAR during the frame-time and reflected from one or more objects in at least one segment located at a circumference of the FOV. The steps may also include selectively controlling light emission to segments located at a center of the FOV based on the circumference detection-information.

Referring to method 2400 as a whole, and to any variation of which is discussed above, it is noted that method 2400 may be embodied into a computer readable code (a set of instructions) which can be executed by a processor (e.g. a controller of a LIDAR). A non-transitory computer-readable medium for controlling operation of a Light Detection and Ranging device (LIDAR) which generates a sequence of depth maps is hereby disclosed (each depth map of the sequence being generated in a corresponding subsecond frame-time). That non-transitory computer-readable medium may include instructions stored thereon, that when executed on a processor, may perform steps including: (a) obtaining preliminary detection-information of light emitted by the LIDAR during the respective frame-time and reflected from the respective segment; and (b) selectively controlling, based on the preliminary detection-information, subsequent emission of light by the LIDAR to the respective segment during the respective frame-time. Any other step of method 2400 may also be implemented as instructions stored on the computer-readable medium and executable by the processor.

Figure 25A:
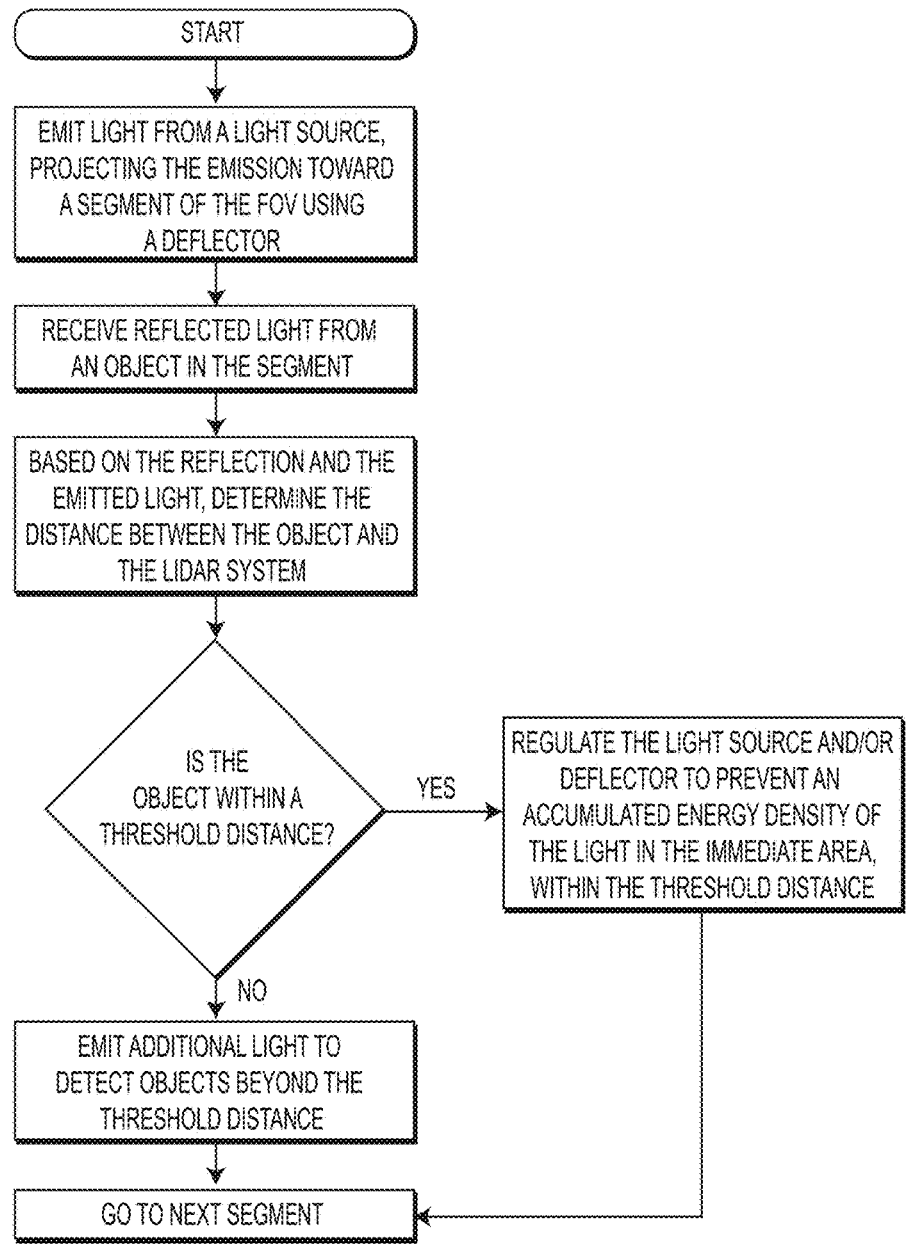
FIG. 25A is a flow chart of an exemplary implementation of the process illustrated by FIG. 24, consistent with embodiments of the present disclosure.

FIG. 25A is a flow chart illustrating an example of method 2500, in accordance with the presently disclosed subject matter. Method 2500 is one possible implementation of method 2400. As exemplified in FIG. 25A, optionally the selective control of further emission of light by the LIDAR (in a given segment in a given frame-time) based on detection results from the same frame-time can be repeated several times in the safe frame-time. For example, this sequence of emitting, detecting, analyzing and selective controlling may be repeated with respect to each pulse emitted relative to a particular FOV segment.

Method 2500 may include, in some embodiments, steps for detecting an object within a range threshold of the LIDAR and setting the subsequent light emission based on whether or not an object has been detected. LIDAR system 100, or the LIDAR as described above with reference to FIG. 23, may control one or more light sources 112 to emit a light pulse toward the immediate area. The light pulse may be directed toward a particular segment of the FOV by one or more deflectors 114. If an object is within the particular segment of the FOV, the LIDAR system 100 may receive light reflected from that object via one or more sensors 116 or a sensor array. A processor 118 or range estimator 2390 may use the reflected light to determine the distance between the object and the LIDAR system 100. If the object is within a threshold distance, processor 118 may regulate at least one of the light sources 112 and at least one of the light deflectors 114 to prevent an accumulated energy density of the light projected in the immediate area to exceed a maximum permissible exposure. If no object is detected, a subsequent pulse of light may be emitted in the same segment to detect if there is an object beyond the immediate area.

For example, if a pedestrian is detected, then subsequent light emission characteristics may be determined to account for the presence of the pedestrian. In some embodiments, light emissions to a particular FOV segment or segments in which the pedestrian is determined to reside may be limited to power levels, aggregated energy levels, time durations, etc. to comply with applicable eye safety regulations. Advantages of this embodiment include increased safety to pedestrians or other people in the area of the LIDAR by reducing the emission power to within a range deemed safe by local or federal regulations.

Figure 25B:
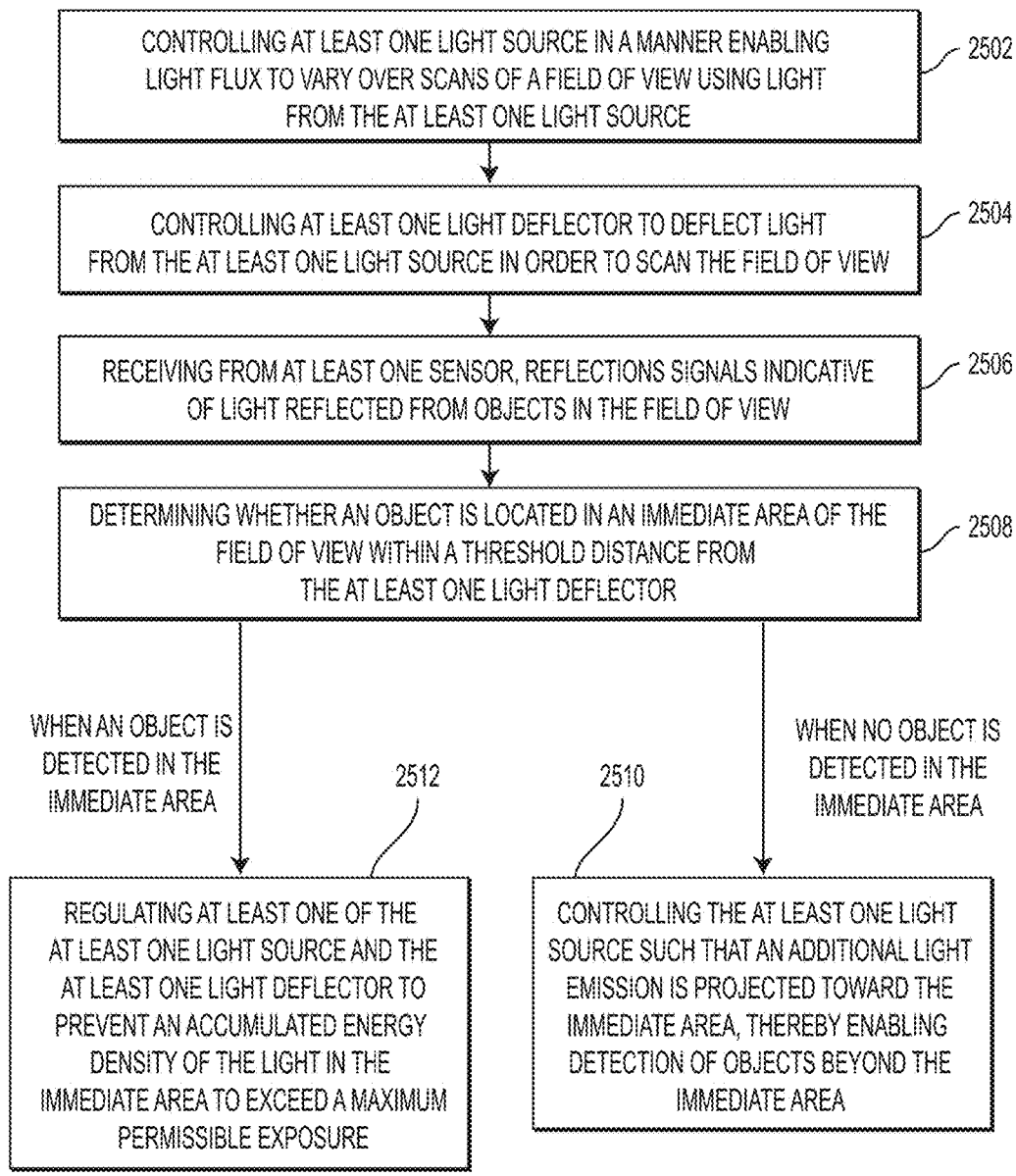
FIG. 25B is a flow chart illustrating an example method for detecting objects, consistent with some embodiments of the present disclosure.

FIG. 25B illustrates an example method 2500 for detecting objects. Method 2500 may be performed by at least one processor (e.g., processor 118 of processing unit 108 of LIDAR system 100 as depicted in FIG. 1A and/or two processors 118 of processing unit 108 of the LIDAR system depicted in FIG. 2A). At step 2502, processor 118 controls at least one light source (e.g., light source 112 of FIG. 1A, laser diode 202 of light source 112 of FIG. 2A, and/or plurality of light sources 102 of FIG. 2B) in a manner enabling light flux of light from at least one light source to vary over a scanning cycle of a field of view (e.g., field of view 120 of FIGS. 1A and 2A). For example, processor 118 may vary the timing of pulses from the at least one light source. Alternatively or concurrently, processor 118 may vary the length of pulses from the at least one light source. By way of further example, processor 118 may alternatively or concurrently vary a size (e.g., length or width or otherwise alter a cross-sectional area) of pulses from the at least one light source. In a yet further example, processor 118 may alternatively or concurrently vary the amplitude and/or frequency of pulses from the at least one light source.

Step 2504 may further include processor 118 controlling at least one deflector (e.g., light deflector 114 of FIG. 1A, deflector 114A and/or deflector 114B of FIG. 2A, and/or one-way deflector 214 of FIG. 2B) to deflect light from the at least one light source in order to scan the field of view. For example, processor 118 may cause mechanical movement of the at least one light deflector to scan the field of view. Alternatively or concurrently, processor 118 may induce a piezoelectric or thermoelectrical change in the at least one deflector to scan the field of view.

At step 2506, processor 118 may receive from at least one sensor (e.g., sensor 116 of FIG. 1A), reflections signals indicative of light reflected from objects in the field of view. In one embodiment, the reflections signals may be associated with a single portion of the field of view (e.g., second FOV 414 of FIG. 4B). At step 2508, processor 118 may determine, based on the reflections signals of an initial light emission, whether an object is located in an immediate area of the field of view within a threshold distance from the at least one light deflector. Consistent with one embodiment, the threshold distance may be associated with an ocular hazard distance. In other words, processor 118 may determine if the amount of light projected may damage an individual located in the immediate area. Consistent with another embodiment, the threshold distance may be associated with a sensor saturation distance. In other words, processor 118 may determine if the amount of light projected may cause the reflected light to overflow sensor 116.

When no object is detected in the immediate area, i.e., at step 2510, processor 118 may control the at least one light source such that an additional light emission is projected toward the immediate area, thereby enabling detection of objects beyond the immediate area. Additionally, when an object is detected in the immediate area, i.e., at step 2512, processor 118 may include regulating at least one of the at least one light source and the at least one light deflector to prevent an accumulated energy density of the light in the immediate area to exceed a maximum permissible exposure. In accordance with the two embodiments described above, the maximum permissible exposure may be associated with the amount of light projected that may damage an individual located in the immediate area; or the amount of light projected that may cause the reflected light to overflow sensor 116 such that it may damage its functionally.

Parallel Scene Scanning in Lidar Using a Common Steerable Deflector

In a LIDAR system consistent with embodiments of the present disclosure, a plurality of light sources may be used. For example, using a plurality of light sources may allow for concurrent scanning of different portions of a field of view and/or for scanning of the field of view using light of differing wavelength, intensity, etc. Furthermore, a LIDAR system consistent with embodiments of the present disclosure may use a common deflector to aim light from the plurality of light sources. For example, a LIDAR system consistent with embodiments of the present disclosure may concurrently aim light from the plurality of light sources toward different directions in the FOV using a single deflector. By using a common deflector, the size, cost, and/or complexity of the LIDAR system may be reduced. In some embodiments, a LIDAR system consistent with embodiments of the present disclosure may use the same deflector to aim light from the plurality of light sources and to aim reflections received from the field of view. In some embodiments, a light source of the plurality of light sources may include a plurality of individual light sources which operate in unison (e.g., in order to increase flux, etc.). Such a plurality may include similar individual light sources but may also include individual light sources of different kinds and/or with differing properties.

Figure 26A:
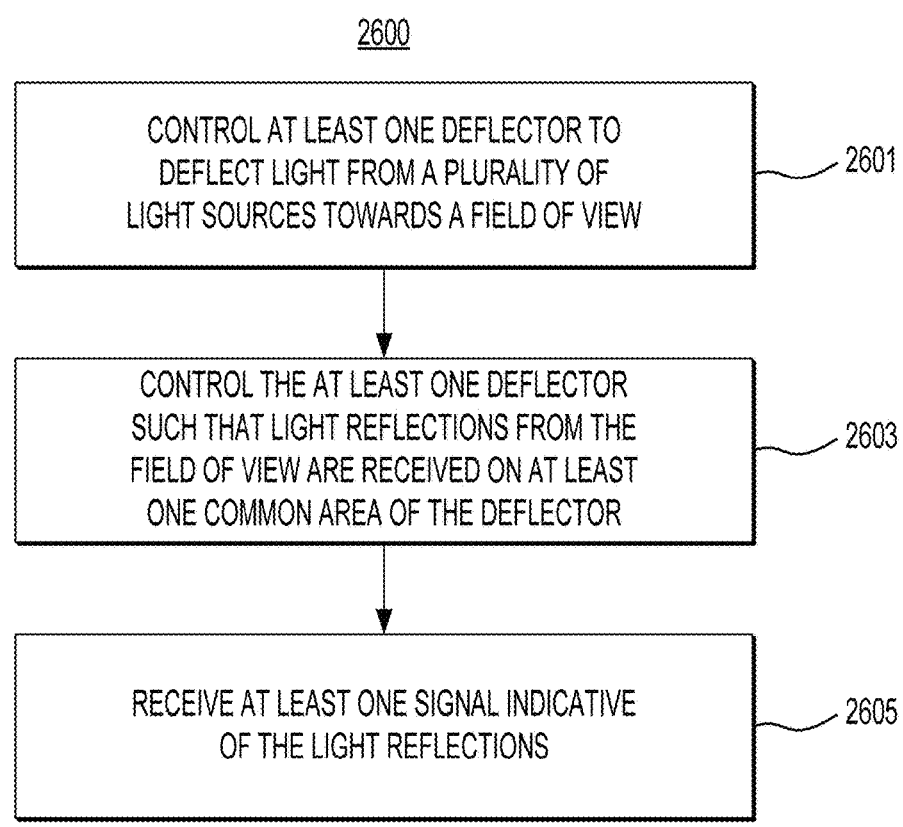
FIG. 26A is a flowchart illustrating an example method for detecting objects using a LIDAR consistent with some embodiments of the present disclosure.
Figure 26B:
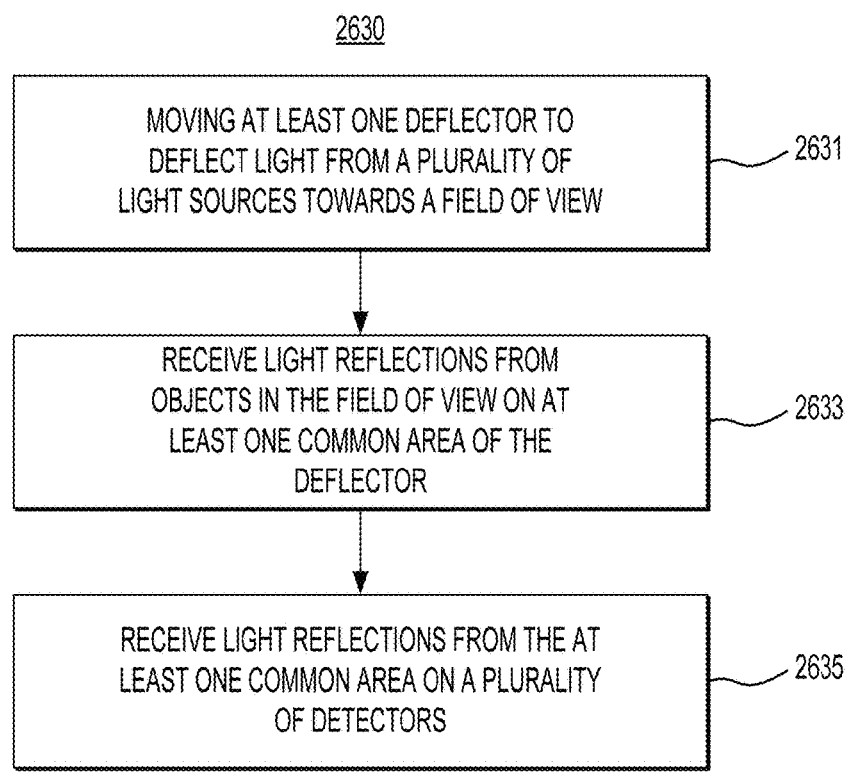
FIG. 26B is a flowchart illustrating another example method for detecting objects using a LIDAR consistent with some embodiments of the present disclosure.
Figure 26C:
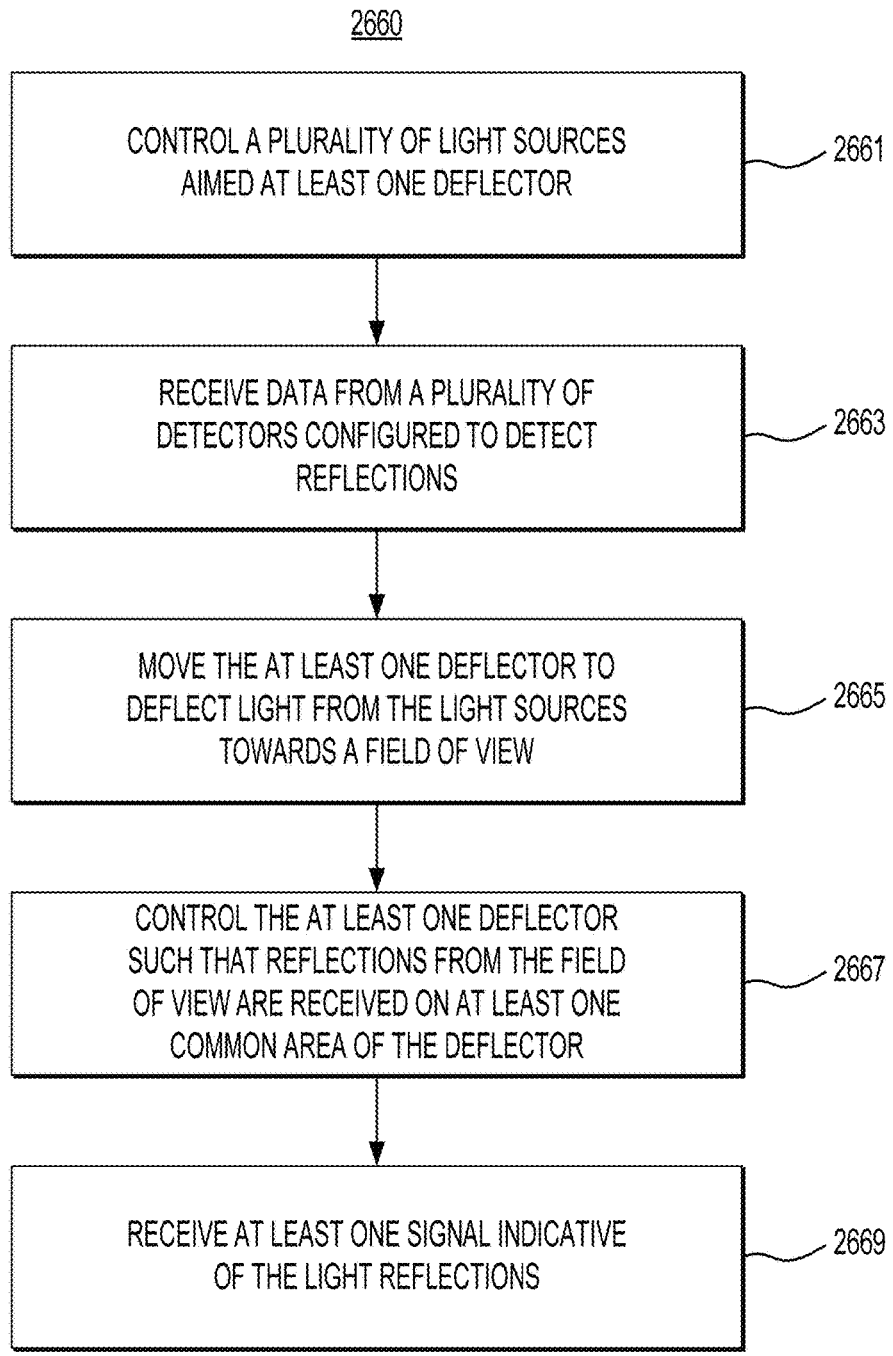
FIG. 26C is a flowchart illustrating yet another example method for detecting objects using a LIDAR consistent with some embodiments of the present disclosure.

FIGS. 26A, 26B, and 26C illustrate methods 2600, 2630, and 2660 (respectively), for detecting objects using LIDAR (in particular—one with a common deflector), in accordance with examples of the presently disclosed subject matter. Any one of methods 2600, 2630 and 2660 may be performed by at least one processor (e.g., processor 118 of processing unit 108 of LIDAR system 100 as depicted in FIG. 1A, two processors 118 of processing unit 108 of the LIDAR system depicted in FIG. 2A, at least one processor 2702 of LIDAR system 2700 of FIG. 27, and/or at least one processor 2802 of LIDAR system 2800 of FIG. 28). The at least one processor may be located within the body of a vehicle (e.g., vehicle 4201 of FIG. 42A, vehicle 4205 of FIG. 42B, vehicle 4209 of FIG. 42C, or the like, as described below). Any combination of methods 2600, 2630, and/or 2660 may also be implemented by the at least one processor. Such combinations may include any combination of two or more steps from any of methods 2600, 2630, and/or 2660, discussed below. Furthermore, methods 2600, 2630, and/or 2660 may optionally be executed by any LIDAR system consistent with the disclosed embodiments. Any discussion pertaining to the components of the LIDAR system in the context of any one of these methods (2600, 2630, and 2660) is also applicable in a non-limiting way, mutatis mutandis, for the other two methods.

Figure 27:
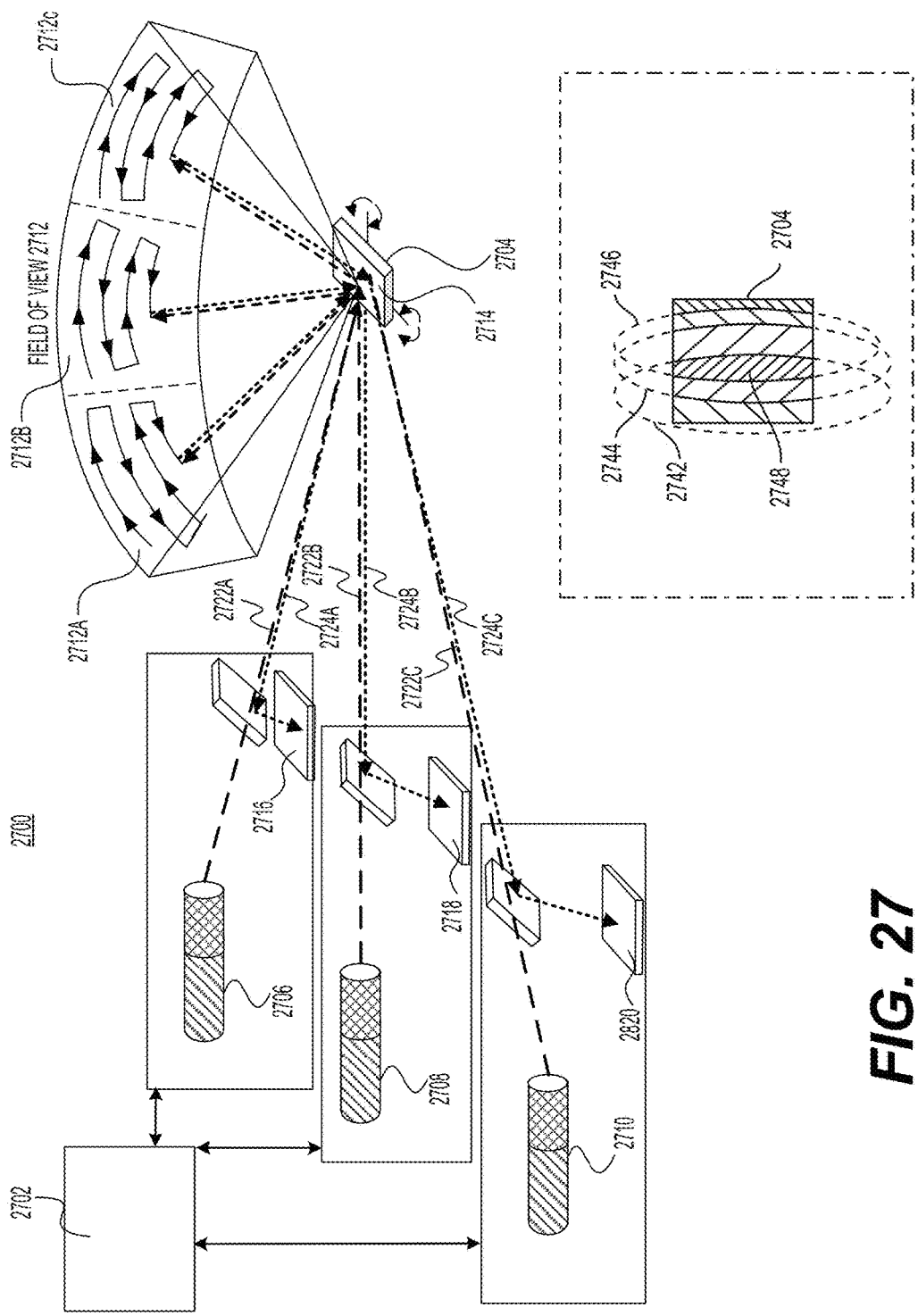
FIG. 27 is a diagram of a LIDAR system having a plurality of light sources and a common deflector consistent with some embodiments of the present disclosure.
Figure 28:
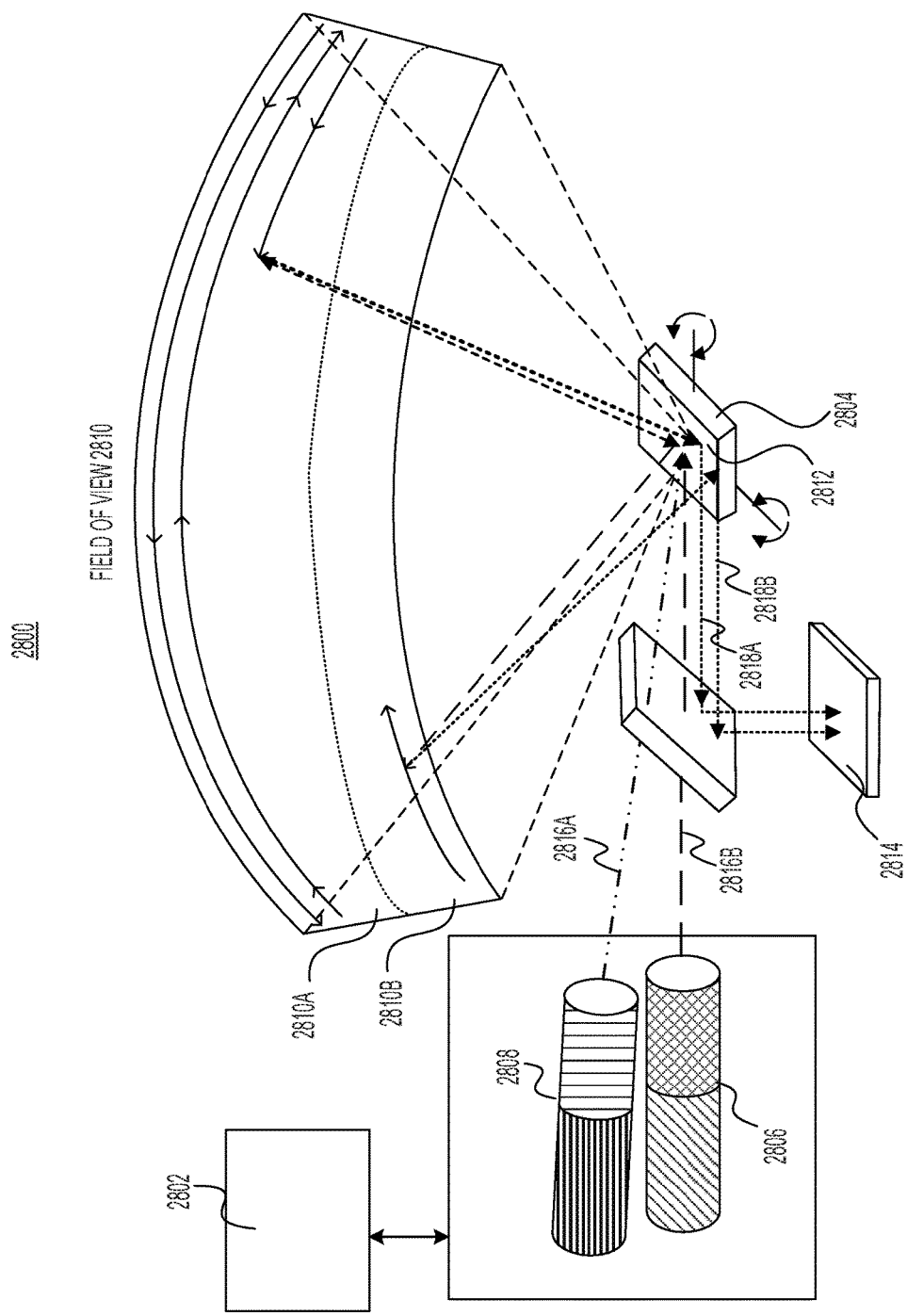
FIG. 28 is a diagram of another LIDAR system having a plurality of light sources and a common deflector consistent with some embodiments of the present disclosure.

At step 2601, at least one processor 118 or 2702 or 2802 controls at least one deflector (e.g., deflector 2704 of LIDAR system 2700 of FIG. 27 and/or deflector 2804 of LIDAR system 2800 of FIG. 28) to deflect light from a plurality of light sources (e.g., light sources 2706, 2708, and 2710 of LIDAR system 2700 of FIG. 27 and/or light sources 2806 and 2808 of LIDAR system 2800 of FIG. 28) along a plurality of outbound paths, towards a plurality of regions (e.g., regions 2712*a*, 2712*b*, and 2712*c* of FIG. 27 and/or regions 2810*a* and 2810*b* of FIG. 28) forming a field of view (e.g., field of view 2712 of FIG. 27 and/or field of view 2810 of FIG. 28) while the at least one deflector is in a particular instantaneous position. For example, at each instantaneous position of the at least one deflector, the light of each of the different light sources may be directed to a portion of the corresponding region as, for example, depicted in FIGS. 2B, 27, and 28. The aforementioned plurality of regions (e.g., 2712*a*, 2712*b*) may form the field of view by spanning over a larger field of view that is larger than any of the respective regions. In some embodiments, the formed FOV may be continuous (e.g., as exemplified in FIGS. 27 and 28). Alternatively or concurrently, the formed FOV may include two or more separated FOV regions.

One or more properties of the plurality of light sources may vary. For example, as explained below, the wavelength of emitted light from at least two of the plurality of light sources may differ. By way of further example, the max power, duty cycle, pulse timing, pulse length, or the like of at least two of the plurality of light sources may differ. On the other hand, one or more properties of the plurality of light sources may be the same or at least substantially similar between the light sources.

For example, the plurality of light sources may include at least three separate light sources, as depicted in FIG. 27. In some embodiments, the angles between light from the plurality of light sources may be fixed throughout the scanning. For example, light from a first light source may impinge on a surface of the deflector at angle $\alpha_1(t)$ at different times t, and light from a second light source may impinge on the same surface of the deflector at angle $\alpha_2(t)$ at the different times t, and $\alpha_1(t)$-$\alpha_2(t)$ may be constant for all different times t. In embodiments where the light sources are not arranged on a single plane, two angles may be used to identify the incidence angle of each light source on the surface of the deflector. In some embodiments, each light source may be generally associated with a differing region of the field of view. For example, at least a first region of the field of view (e.g., region 2712*a* of FIG. 27) may be adjacent to at least a second region (e.g., region 2712*b* of FIG. 27) and spaced from at least a third region (e.g., region 2712*c* of FIG. 27). Alternatively or concurrently, in such an example, at least each region of the field of view may be associated with a differing angular portion of the field of view. In some embodiments, the different regions may be of similar size (e.g., similar angular size or the like), which may be defined, for example, by the range of instantaneous positions of the respective deflector 114 of FIG. 1A.

In some embodiments, the at least one deflector may include a single deflector configured to pivot along two separate axes, as depicted in FIGS. 27 and 28. Accordingly, the single deflector may steer and/or deflect light along the two separate axis. Alternatively or concurrently, the at least one deflector may include a deflector array with a plurality of deflectors configured to pivot individually, as depicted in FIG. 3B. As used herein, the term "pivot" may refer to a mechanical movement of the deflector or of reflectors within the deflector but may also refer to any other way of moving between differing instantaneous positions, as discussed in greater detail with respect to deflector 114 of FIG. 1A (e.g., with respect to OPAs, VCSEL arrays, MEMS arrays, or the like).

In certain aspects, during a scanning cycle, the at least one light deflector may be located in a plurality of different instantaneous positions. For example, the at least one light deflector may be moved in a continuous sweeping motion between different instantaneous positions. Alternatively, the at least one light deflector may be moved during the scanning cycle between a plurality of discreet instantaneous positions rather than being moved in a continuous sweep.

In some embodiments, the at least one deflector may be two-dimensional and thus define two axes. In such embodiments, the regions of the field of view may be arranged over one axis of the at least one deflector, or over both. Alternatively or concurrently, two, three, or more regions of the FOV may be arranged along a straight line, parallel to each other, e.g., each covering substantially the same area. Accordingly, scanning within a scanning cycle may occur in parallel in another (substantially perpendicular) direction to the at least one axis.

In some embodiments, the at least one light deflector may be contained within the same housing as at least one of the plurality of light sources. In other embodiments, the at least one light deflector may be contained within a housing separate from the plurality of light sources.

At step 2603, at least one processor 118 or 2702 or 2802 controls the at least one deflector such that, while the at least one deflector is in the particular instantaneous position, light reflections from the field of view are received on at least one common area (e.g., common area 2714 of deflector 2704 of FIG. 27, common area 2748 of FIG. 27, and/or common area 2812 of deflector 2804 of FIG. 28) of the at least one deflector. In certain aspects, in the at least one common area, at least some of the light reflections of at least some of the plurality of light sources impinge on one another. For example, the area on which one light reflection is received may overlap, at least in part, with the area on which another light reflection is received. Such impinging may be simultaneous or may occur at differing times. For example, light reflections traveling from differing distances may arrive at distinct times. By way of further example, light from the plurality of light sources may be emitted at different timings, thereby generating reflections at different times. Such timing may vary across the plurality of light sources.

At step 2605, at least one processor 118 or 2702 or 2802 receives, from each of a plurality of detectors (e.g., detectors of sensors 2716, 2718, and 2720 of FIG. 27 and/or detectors of sensor 2814 of FIG. 28), at least one signal indicative of light reflections from the at least one common area while the at least one deflector is in the particular instantaneous position. For example, the plurality of detectors may absorb the light reflections and convert the absorbed reflections to an electric signal, to a digital signal, etc., for sending to at least one processor 118 or 2702 or 2802. Accordingly, the plurality of detectors may comprise any photosensitive devices capable of measuring properties (e.g., power, frequency) of electromagnetic waves and generating an output (e.g., a digital signal) relating to the measured properties. In certain aspects, the received light reflections may be from the common impingement area, that is, from the area in which the reflections from two or more light sources strike, as explained above.

In some embodiments, the plurality of detectors may be part of a single sensor configured to measure at least two differing distances associated with a particular position of the at least one light deflector, e.g., as depicted in FIG. 28. For example, the at least two differing distances may be associated with at different parts of the FOV. Alternatively or concurrently, the at least two differing distances may be determined in the same pixel, e.g., by photons reflected from different targets partly hiding each other. In other embodiments, the plurality of detector may be part of different sensors separated from one another and located in different locations within the LIDAR system.

In examples where the plurality of light sources include at least three separate light sources (and in some in which the plurality of light sources includes two light sources), each light source may be associated with a differing region of the field of view, and at least a first region of the field of view may be located adjacent at least a second region and spaced from at least a third region, the plurality of detectors may be associated with at least three separate sensors (or two, for examples with two light sources). In such embodiments, each of the at least three separate sensors may be associated with a differing light source, e.g., as depicted in FIG. 27. Furthermore, in such embodiments, the plurality of detectors may be configured to concurrently detect a first object located in the first region of the field of view and a second object located in the third region of the field of view. Such detection may be concurrent, for example, within the scanning time of one of the pixels of the first region. However, such concurrence may not be instantaneously concurrent. For example, as explained above light reflections traveling from differing distances may arrive at distinct times. By way of further example, light from the plurality of light sources may be emitted at different timings, thereby generating reflections at different times.

Method 2600 may include additional steps. For example, method 2600 may further include scanning the field of view by repeatedly moving the at least one deflector, as explained above. During a single scanning cycle of the field of view, the at least one deflector may be located in a plurality of different instantaneous positions (at different times). Accordingly, in different instantaneous positions the deflection of light from the plurality of light sources and/or of reflections may also be different. Accordingly, the light may be directed at and/or the reflections may be received from different regions of the field of view.

By way of further example, method 2600 may include determining, based on the light reflections from the at least one common area, a plurality of distance measurements associated with differing regions of the field of view. For example, one distance measurement may be to a first vehicle in a first region, and another distance measurement may be to a second vehicle in a second region. By way of further example, one distance measurement may be to a vehicle in a first region, and another distance measurement may be to a road in a second region (which may, for example, be behind, ahead of, or next to the vehicle). By way of yet a further example, one distance measurement may be to a first vehicle in a first region, and another distance measurement may be to an object in a second region (which may, for example, be on the side of a road). In certain aspects, some objects may be detected in different regions, e.g., because the regions partly overlap and/or because the object is located on a border between those two regions.

Method 2600 may further include controlling the plurality of light sources so that a first light source emits more light flux toward the at least one deflector than a second light source at a first instantaneous position of the at least one deflector (i.e., while the at least one deflector remains in the first instantaneous position), and the second light source emits more light flux toward the at least one deflector than the first light source at a second instantaneous position of the at least one deflector. By way of example, at least one processor 118 or 2702 or 2802 may increase the light flux from a first light source at a first instantaneous position when the light from the first light source is directed straight ahead and may increase the light flux from a second light source at a second instantaneous position when the light from the second light source is directed straight ahead. Accordingly, more energy may be expended viewing objects directly ahead than objects to the side. As explained above, at least one processor 118 or 2702 or 2802 may vary the timing of pulses from the plurality of light sources, vary the length of pulses from the plurality of light sources, vary a size (e.g., length or width or otherwise alter a cross-sectional area) of pulses from the plurality of light sources, vary the amplitude and/or frequency of pulses from the plurality of light sources, and/or change parameters of a continuous wave (CW) or quasi-CW light emission (e.g., its amplitude, its modulation, its phase, or the like) from the plurality of light sources. In some embodiments, flux management in the different regions (by the different light sources) may be managed independently of the other regions. Alternatively or concurrently, at least one processor 118 or 2702 or 2802 may balance between the optical budget and/or power budget of two or more regions together (e.g., in order not to exceed a maximal power consumption).

Referring to method 2630 which is illustrated in FIG. 26B, at step 2631, at least one processor 118 or 2702 or 2802 moves at least one deflector to deflect light from a plurality of light sources along a plurality of outbound paths, towards a plurality of regions forming a field of view while the at least one deflector is in a particular instantaneous position. The term "move" should be construed broadly, as discussed in greater detail and with several examples above. For example, at each instantaneous position of the at least one deflector, the light of each of the different light sources may be directed to a portion of the corresponding region as, for example, depicted in FIGS. 2B, 27, and 28.

One or more properties of the plurality of light sources may vary, as explained above with reference to method 2600 of FIG. 26A. In addition, as with method 2600 of FIG. 26A, the plurality of light sources may include at least two (e.g., as depicted in FIG. 28), at least three (e.g., as depicted in FIG. 27), or more separate light sources. In such an example, each light source may be generally associated with a differing region of the field of view. Alternatively or concurrently, the regions may at least partly overlap (e.g., in order to improve performance, to increase maximal flux in that area, to calibrate between two areas, to allow for backup in case of failure in important parts of the FOV, when operating in different wavelengths, etc.). Furthermore, in such an example, at least a first region of the field of view may be adjacent at least a second region and spaced from at least a third region. Alternatively or concurrently, in such an example, at least each region of the field of view may be associated with a differing angular portion of the field of view.

In some embodiments, as with method 2600 of FIG. 26A, the at least one light deflector may be contained within the same housing as at least one of the plurality of light sources. In other embodiments, the at least one light deflector may be contained within a housing separate from the plurality of light sources.

At step 2633, while the at least one deflector is in the particular instantaneous position, the at least one deflector may receive, on at least one common area of the at least one deflector, light reflections of the plurality of light sources from objects in the field of view. In certain aspects, in the at least one common area, at least some of the light reflections impinge on one another. For example, as explained above with reference to method 2600 of FIG. 26A, the area on which one light reflection is received may overlap, at least in part, with the area on which another light reflection is received. Such impinging may be simultaneous or may occur at differing times. For example, light reflections traveling from differing distances may arrive at distinct times. By way of further example, light from the plurality of light sources may be emitted at different timings, thereby generating reflections at different times. Such timing may vary across the plurality of light sources.

At step 2635, each of a plurality of detectors (e.g., detectors of sensors 2716, 2718, and 2720 of FIG. 27 and/or detectors of sensor 2814 of FIG. 28) may receive light reflections from the at least one common area when the at least one light deflector is in the instantaneous position. For example, as explained above with reference to method 2600 of FIG. 26A, the plurality of detectors may comprise any photosensitive devices capable of measuring properties (e.g., power, frequency) of electromagnetic waves and generating an output (e.g., a digital signal) relating to the measured properties. In certain aspects, the received light reflections may be from the common impingement area, that is, from the area in which the reflections from two or more light sources strike, as explained above.

In some embodiments, as with method 2600 of FIG. 26A, the plurality of detectors may be part of a single sensor configured to measure at least two differing distances associated with a particular position of the at least one light deflector, as depicted in FIG. 28. For example, the at least two differing distances may be associated with at different parts of the FOV. Alternatively or concurrently, the at least two differing distances may be determined in the same pixel, e.g., by photons reflected from different targets partly hiding each other.

Method 2630 may include additional steps, such as (though not limited to) any combination of one or more steps discussed with respect to method 2600.

Referring to method 2660 which is illustrated in FIG. 26C, at step 2661, at least one processor 118 or 2702 or 2802 controls a plurality of light sources aimed at least one deflector. For example, as with step 2601 of method 2600, at least one processor 118 or 2702 or 2802 may control the timing of pulses from the plurality of light sources, control the length of pulses from the plurality of light sources, control a size (e.g., length or width or otherwise alter a cross-sectional area) of pulses from the plurality of light sources, control the amplitude and/or frequency of pulses from the plurality of light sources, and/or control parameters of a continuous wave (CW) or quasi-CW light emission (e.g., its amplitude, its modulation, its phase, or the like) from the plurality of light sources.

At step 2663, at least one processor 118 or 2702 or 2802 receives data from a plurality of detectors configured to detect reflections from the plurality of light sources. In some embodiments, as with method 2600 of FIG. 26A, the plurality of detectors may be part of a single sensor configured to measure at least two differing distances associated with a particular position of the at least one light deflector, as depicted in FIG. 28. For example, the at least two differing distances may be associated with at different parts of the FOV. Alternatively or concurrently, the at least two differing distances may be determined in the same pixel, e.g., by photons reflected from different targets partly hiding each other.

At step 2665, at least one processor 118 or 2702 or 2802 moves the at least one deflector to deflect light from the plurality of light sources along a plurality of outbound paths towards a plurality of regions forming a field of view while the at least one deflector is in a particular instantaneous position. The term "move" should be construed broadly, as discussed in greater detail and with several examples above.

As with method 2600 of FIG. 26A, the plurality of light sources may include at least three separate light sources, as depicted in FIG. 27. In such an example, each light source may be generally associated with a differing region of the field of view. Furthermore, in such an example, at least a first region of the field of view may be adjacent at least a second region and spaced from at least a third region. Alternatively or concurrently, in such an example, at least each region of the field of view may be associated with a differing angular portion of the field of view.

At step 2667, at least one processor 118 or 2702 or 2802 controls the at least one deflector such that while the at least one deflector is in the particular instantaneous position, light reflections from the field of view are received on at least one common area of the at least one deflector. In certain aspects, in the at least one common area, at least some of the light reflections of at least some of the plurality of light sources may impinge on one another. Illustrative examples are provided above with reference to method 2600 of FIG. 26A.

At step 2669, at least one processor 118 or 2702 or 2802 receives, from each of a plurality of detectors, at least one signal indicative of light reflections from the at least one common area while the at least one deflector is in the particular instantaneous position. Illustrative examples are provided above with reference to method 2600 of FIG. 26A.

Method 2660 may include additional steps, such as (though not limited to) any combination of one or more steps discussed with respect to methods 2600 and/or 2630.

By way of further example, as with method 2600 of FIG. 26A, method 2660 may include determining, based on the light reflections from the at least one common area, a plurality of distance measurements associated with differing regions of the field of view. Method 2660, similar to method 2600 of FIG. 26A, may further include controlling the plurality of light sources so that a first light source emits more light flux toward the at least one deflector than a second light source at a first instantaneous position of the at least one deflector, and the second light source emits more light flux toward the at least one deflector than the first light source at a second instantaneous position of the at least one deflector.

Although described as using fully separate regions forming a field of view, methods 2600, 2630, and/or 2660 may be implemented with at least one pair of partly overlapping FOV regions. This may be implemented for different uses, such as (although not limited to): in order to improve performance, to increase maximal flux in that area, to calibrate between two or more areas, to allow for backup in case of failure in important parts of the FOV, when operating in different wavelengths, etc. Some of these uses are discussed in further detail below.

In embodiments where the plurality of light sources may include at least two separate light sources, each light source may be configured to project light at a differing wavelength (e.g. the light sources of FIGS. 27 and 28). A light source which operates in a given wavelength may emit light in a wavelengths band, which may be a narrow band (for example, a light source having a wavelength of 600 nm may emit light in non-negligible amounts within a bandwidth of ±2 nm, i.e., between 598-602 nm). In certain aspects, a light source of LIDAR systems 100, 200, 2700, and/or 2800 may be coupled with a filter, e.g., in order to limit the range of projected light wavelengths. In some embodiments, at least a first light source may configured to project light at a wavelength between 400-800 nm and/or between 800-1000 nm and at least a second light source is configured to emit light in a wavelength greater than 800 nm (or 850 nm or 900 nm, etc.) and/or greater than 1500 nm. In certain aspects, the first light source may be configured to project light at a wavelength such that light from the first light source and light from the second light source are both completely beyond visible range.

In such embodiments, the at least two light sources may be configured to project light in substantially overlapping regions of the field of view. The use of differing wavelengths in substantially overlapping regions may allow for the detection of objects with one wavelength that were not visible (or at least not as visible) with another wavelength.

In addition, in embodiments where the plurality of light sources may be configured to project light at the same (or substantially the same) wavelength, the plurality of light sources may still be configured to project light in substantially overlapping regions of the field of view. This overlapping may allow for the alignment of results such that errors in calibration or detection may be reduced and/or that noise from one light source may be lessened when using a second light source. Moreover, such overlapping may allow for detection of faulty equipment, such as faulty light sources, detectors, or the like.

Although described as using fully separate light sources, the plurality of light sources used in methods 2600, 2630, and/or 2660 may comprise a single light source coupled with beam splitters. Accordingly, the beam splitters may project beam of light onto the at least one deflector from different directions, thereby functioning like fully separate light sources.

FIG. 27 is a diagram illustrating an example LIDAR system 2700 having a plurality of light sources and a common deflector. As depicted in FIG. 27, light from the plurality of light sources may impinge on an overlapping area of the at least one light deflector. Additionally or alternatively, light originating from the plurality of light sources and reflected back from the scene may impinge on an overlapping area of the at least one light deflector. As depicted in FIG. 27, system 2700 at least one processor 2702 that controls at least one deflector 2704. At least one deflector 2704 may be in a particular instantaneous position during a scan cycle. At least one processor 2702 may further control a plurality of light sources (e.g., light sources 2706, 2708, and 2710).

The plurality of light sources 2706, 2708, and 2710 may be directed toward field of view 2712. As depicted in FIG. 27, field of view 2712 includes a first region 2712a adjacent a second region 2712b and spaced from a third region 2712c. Although depicted as nonoverlapping in FIG. 27, some embodiments may include two or more regions with substantially overlapping areas.

The insert of FIG. 27 depicts a surface of deflector 2704 (e.g., a single rectangular mirror) and the illumination of light beams from three light sources 2706, 2708 and 2710 impinging on surface—illustrated as light beam cross sections 2742, 2744 and 2746. The different shading levels represent the accumulated illumination level of each area of deflector 2704—illuminated by a single light source, illuminated by two light sources or illuminated by three light sources (e.g., area 2748). As depicted in the insert, in area 2748, light from three light sources 2706, 2708 and 2710 impinge on a common area of the deflector (possibly, but not necessarily, concurrently). As further depicted in the insert, some light from one or more of light sources 2706, 2708 and 2710 may not strike the deflector (as represented by the dashed ellipses). For example, a light beam may exceed the dimensions of the surface (as depicted in the vertical axis) and thus may also be smaller than the corresponding dimension of the surface. The insert further depicts that light beams 2742, 2744 and 2746 may differ in size and/or may be at least partly misaligned to one another. In some embodiments, because the reflection wave front may be much larger than an optical opening of the LIDAR system (e.g., system 2700), deflector 2704 may be sized and/or positioned such that light reflected from a plurality of light sources impinges on the entire active deflective area of the deflector.

In the embodiment of FIG. 27, at least one deflector 2704 has a common area 2714. The plurality of light sources 2706, 2708, and 2710 may be aimed at common area 2714. Thus, plurality of light sources 2706, 2708, and 2710 may emit a corresponding plurality of light beams along outbound paths (e.g., paths 2722a, 2722b, and 2722c) towards regions 2712a, 2712b, and 2712c. The plurality of light beams may cause a plurality of corresponding reflections traveling along return paths (e.g., paths 2724a, 2724b, and 2724c) from field of view 2712 (or from objects therein). As further depicted in the example of FIG. 27, each reflection may be directed to a corresponding sensor (e.g., sensors 2716, 2718, and 2720) using common area 2714 of at least one deflector 2704. As depicted in the example of FIG. 27, none of outbound paths 2722a, 2722b, and 2722c are coincident and none of return paths 2724a, 2724b, and 2724c are coincident. In other embodiments, at least two outbound paths and/or at least two return paths may be coincident.

FIG. 28 is a diagram illustrating another example LIDAR system 2800 having a plurality of light sources and a common deflector. As depicted in FIG. 28, light from the plurality of light sources may impinge on an overlapping area of the at least one light deflector. Additionally or alternatively, light originating from the plurality of light sources and reflected back from the scene may impinge on an overlapping area of the at least one light deflector. As depicted in FIG. 28, system 2800 at least one processor 2802 that controls at least one deflector 2804. At least one deflector 2804 may be in a particular instantaneous position during a scan cycle. At least one processor 2802 may further control a plurality of light sources (e.g., light sources 2806 and 2808). In the example of FIG. 28, light sources 2806 and 2808 may have different wavelengths. In other embodiments, light sources 2806 and 2808 may have different max power, duty cycle, pulse timing, pulse length, or the like.

Light sources 2806 and 2808 may be directed toward field of view 2810. As depicted in FIG. 28, field of view 2810 includes a first region 2810a and a second region 2810b. Although depicted as nonoverlapping in FIG. 28, some embodiments may include two or more regions with substantially overlapping areas.

In the embodiment of FIG. 28, at least one deflector 2804 has a common area 2812. Light sources 2806 and 2808 may be aimed at common area 2812. Thus, light sources 2806 and 2808 may emit a corresponding plurality of light beams along outbound paths (e.g., paths 2816a and 2816b) towards regions 2810a and 2810b. The plurality of light beams may cause a plurality of corresponding reflections traveling along return paths (e.g., paths 2818a and 2818b) from field of view 2810 (or from objects therein). As further depicted in the example of FIG. 28, each reflection may be directed to a single sensor 2814 using common area 2812 of at least one deflector 2804. As depicted in the example of FIG. 28, none of outbound paths 2816a and 2816b are not coincident, but return paths 2818a and 2818b are coincident. In other embodiments, at least two outbound paths may be coincident and/or at least two return paths may not be coincident.

In some examples, the at least one deflector 2704, 2804, 114, or the like may include an array of deflectors (e.g. an array of pivoting mirrors, such as an array of pivoting piezo-electric mirrors, or the like), e.g. as illustrated in FIG. 3B. If such an array of deflector is used for both projection and detection (both transmission and reception paths), any combination of allocation of the individual deflections for transmission, reception, and/or bi-directional use may be used. By way of example, in an array comprising ten mirrors used by three light sources to illuminate different portions of the FOV, three mirrors may be used for transmission corresponding to one light source each, and the remaining seven mirrors may be used for reception. Alternatively, one or two mirrors may be used for transmission of all of the light sources (e.g., by utilizing overlapping areas of those mirrors, an example of which is depicted in FIG. 27), and all ten mirrors may be used for reception. Any other combination may also be used. In certain aspects, some or all of the individual deflectors of a deflector array may be synchronized to deflect light at substantially the same angles. In certain aspects, some or all of the individual deflectors of a deflector array may be synchronized to deflect light in different directions with fixed angles between them.

Optical Budget Apportionment in Lidar

As described herein, one function of a LIDAR system may be to generate three-dimensional depth maps of an environment surrounding of the LIDAR system by projecting light to the environment and then collecting and analyzing light reflections from objects in the environment. In general, the usefulness of a LIDAR system and its depth maps may increase with the level of information that can be gleaned from the collected light and with the resolution of the generated depth maps. But, practical limitations may exist that may preclude the generation of higher resolution depth maps simply by ramping up the amount of light energy emitted to the environment by the LIDAR system. First, eye safety is a primary constraint that may limit an amount of light energy that can be output by the LIDAR. To ensure eye safety, and to comply with applicable regulations, a LIDAR system may be limited to light projections that do not exceed a certain energy density over a certain time period. Moreover, even if eye safety was not a concern, there may be other practical limitations that prohibit unmitigated light emission to the environment of the LIDAR. For example, the LIDAR system may have finite optical budget and/or computational budget that may limit the LIDAR system's ability to increase detection resolution simply through blanket increases in light emissions to the LIDAR FOV. Conceptually, the optical budget and computational budget may reflect maximum capabilities of the LIDAR system over a particular period of time in terms of available light output power and computing power. The LIDAR system may also be constrained by technical constrains such as power restrictions, overheating, output of the light sources, etc.

That is not to say, however, that depth maps generated by the LIDAR system must be restricted to an absolute resolution level over all areas of the LIDAR FOV. Rather, as discussed below and throughout the various sections of this disclosure, the optical budget and computational budget of a LIDAR system may be apportioned in such a way that more resources (e.g., more of the optical budget and/or computational budget) may be devoted to certain areas of the LIDAR FOV than to other areas of the LIDAR FOV. As a result, it may be possible to generate corresponding depth maps that have high resolution in some areas (e.g., areas corresponding to regions of interest) and lower resolution in other areas (e.g., regions of lower interest or non-interest). The description below and throughout many sections of the present disclosure addresses various scenarios, conditions, situations, etc. for which non-uniform apportionment of optical budget and/or computational budget may be desirable. The description below and throughout also provides examples for how the available optical budget and/or computational budget may be dynamically allocated in order to aid in the generation of depth maps potentially offering increased levels of information in one or more areas of interest covered by the depth maps.

Figure 29:
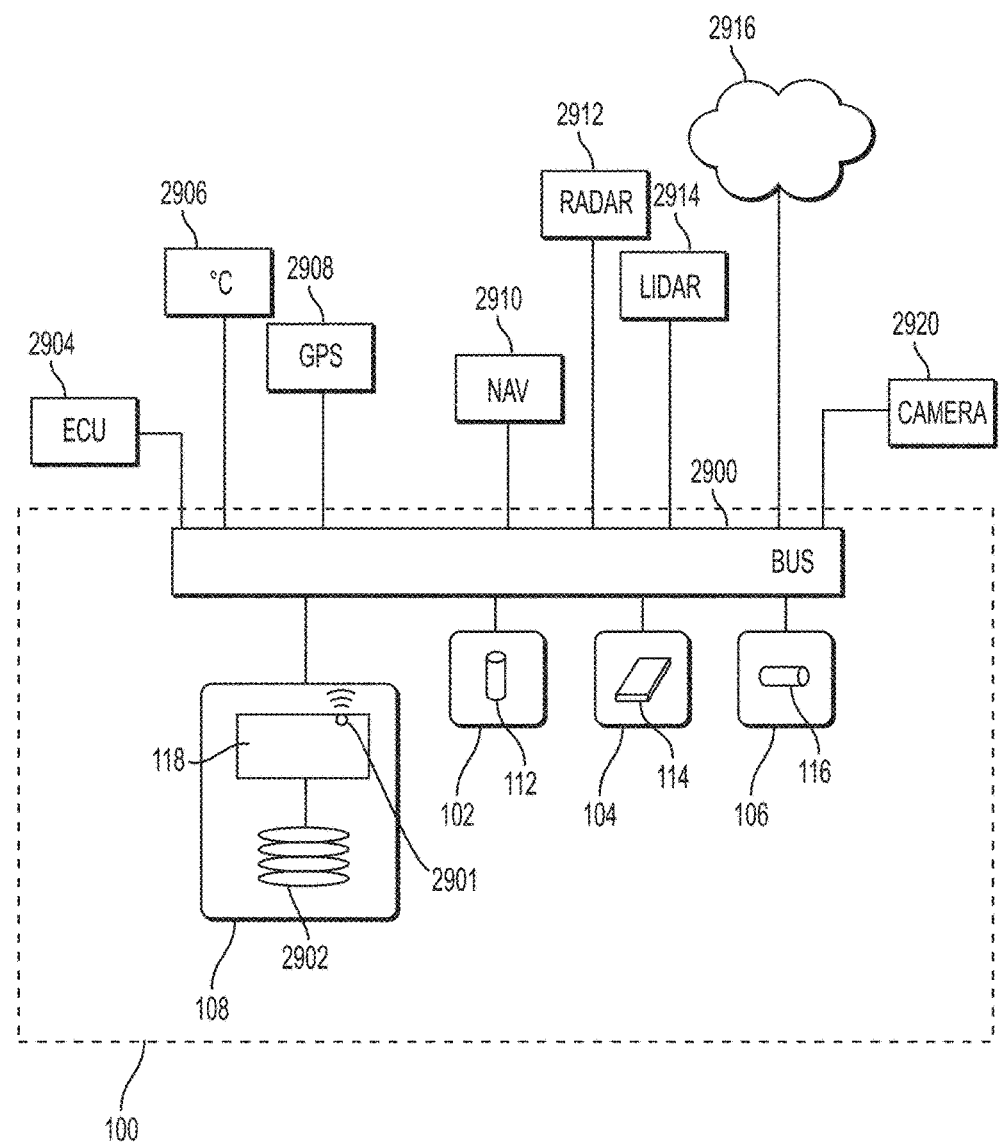
FIG. 29 provides a block diagram representation of a LIDAR system 100 along with various sources of information that LIDAR system 100 may rely upon in apportioning an available optical budget and/or computational budget.

FIG. 29 provides a block diagram representation of a LIDAR system 100 along with various sources of information that LIDAR system 100 may rely upon in apportioning an available optical budget and/or computational budget. In some embodiments, LIDAR system 100 may include at least one processor 118 configured to access an optical budget (or any information indicative of at least one aspect of an optical budget or from which an optical budget may be derived or determined) stored in memory 2902, the optical budget being associated with at least one light source 112 and defining an amount of light that is emittable in a predetermined time period by the at least one light source. Memory 2902 may be associated with processing unit 108 of LIDAR system 100, as shown in FIG. 29. In some embodiments, however, memory 2902 may be associated with a host (e.g., a vehicle, a vehicle-computer) on which LIDAR system 100 is deployed. For example, in some cases, memory 2902 may be associated with electronic control unit 2904 of a host vehicle and may be accessible by processor 118 over data bus 2900. In other embodiments, memory 2902 may be associated with a system or systems located remotely with respect to LIDAR system 100 (or its host). For example, in some embodiments, memory 2902 may be associated with a remote server (not shown) and may be accessible, e.g., via cloud 2916 (e.g., an Internet connection) or using a wireless transceiver 2901.

Processor 118 may also be configured to receive information indicative of a platform condition for the LIDAR system (e.g., from any of information sources 2904, 2906, 2908, 2910, 2912, 2914, 2916, 2918, 2920, or from any other suitable information source). A platform condition for the LIDAR system may refer to any operational parameter, parameter value, observed condition, instruction, informational item, etc., relating to one or more aspects of a LIDAR system, the environment surrounding the LIDAR system, the host on which the LIDAR system is deployed, etc. that may justify allocating more light to at least one group of LIDAR FOV portions or in one scanning cycle than is provided to another group of LIDAR FOV portions or in another scanning cycle over a particular period of time.

While the received information may be obtained from one or more sources outside of LIDAR system 100, information indicative of a platform condition for the LIDAR system may also include information obtained from sources internal to system 100 (e.g., via one or more components of the system, including light projector 112, deflector 114, detector 116, feedback elements, etc.). Based on the received information, processor 118 may dynamically apportion the optical budget to a field of view of LIDAR system 100 using, for example, two or more operational parameters associated with the light source 112 and/or deflector 114, including, for example, scanning rates, scanning patterns, scanning angles, spatial light distribution, and/or temporal light distribution. Processor 118 may further output signals for controlling light source 112 and/or deflector 114 in a manner enabling light flux to vary over scanning of the field of view of LIDAR system 100 in accordance with the dynamically apportioned optical budget.

An optical budget may be expressed relative to any parameter, value, or set of parameters or values related to an amount of light that can be emitted to a LIDAR FOV over a certain time period (e.g., in terms of LIDAR scanning cycles; time measurements in milliseconds, seconds, etc., or any other indicator of a time period). In some embodiments, an optical budget of a LIDAR system may depend on the capabilities of one or more light sources included in the LIDAR system. For example, an optical budget of LIDAR system 100 may be associated with light source 112 and may define an amount of light that is emittable in a predetermined time period by light source 112. Defining an amount of light may refer to any parameter or parameter relationship indicative of an amount of light (e.g., power, luminosity, light flux, intensity, number of photons, number of light pulses, duty cycle, pulse width, pulse amplitude, illumination duration, etc.) relative to some measure of time (e.g., microseconds, milliseconds, seconds, minutes, etc.).

In some cases, an average optical budget for light source 112 may be between about 10 milliwatts and 1,000 milliwatts. Additionally or alternatively, an optical budget may reference an amount of light emittable in a single scanning cycle of the LIDAR FOV. For example, an optical budget for LIDAR system 100 may be between 10,000 pulses per scanning cycle per light source and 50,000 pulses per scanning cycle per light source (e.g., for covering 1,000-10,000 beam locations, each associated with one or more pixels). In some embodiments, the optical budget may be expressed in terms of power available for use by light source 112 (e.g., from a vehicle or other host on which LIDAR system 100 is deployed). An optical budget may also be defined by an amount of light that is emittable by light source 112 (or any available light sources of system 100) in a standard unit of time (e.g., milliseconds, seconds, minutes, etc.).

In some cases, an optical budget may remain fixed. In other cases, an optical budget stored in memory 2902 may be modified and updated. Such modification may occur, for example, based on at least one of an operational parameter of the LIDAR system and detection information provided by the LIDAR system.

Additionally, in some embodiments an optical budget may correspond to only a single LIDAR system having a single light source. In other cases, an optical budget may refer to a single LIDAR system including a plurality of light sources. In still other cases, an optical budget may apply to a plurality of LIDAR systems deployed at different locations (e.g., at different locations around a vehicle), each including a single light source or a plurality of light sources. In any case, the optical budget may define an amount of emittable light available to be apportioned from a plurality of light sources (or plurality of LIDAR systems in the aggregate) in a predetermined time period. Processor 118 may dynamically apportion the optical budget of a single LIDAR system/light source. In other cases, processor 118 may dynamically apportion the optical budget associated with multiple light sources/LIDAR systems.

In addition to an optical budget, LIDAR system 100 (or a combination of a plurality of LIDAR systems) may have a computational budget that may be apportioned. The computational budget may refer generally to the processing capability of a LIDAR system or systems over a particular period of time. The processing capability may depend on the number of processors available (e.g., for controlling the various aspects of the LIDAR system, for receiving and processing detected reflections, for generating depth maps, for processing depth map for detecting object and other higher-level and scene-understanding information, and for performing any other function associated with a LIDAR system or group of LIDAR systems). The processing capability may depend not only on the number of processor available, but may also depend on other parameters such as the portion of processing capability of one or more processors that is dedicated to certain functions of the LIDAR system (e.g., generation of the depth maps, controlling scans of the FOV, object detection, identification and/or classification, etc.), the processing speed of one or more available processors, data transfer rates (e.g., across bus 2900), the number of calculations per unit time that can be performed by one or more available processors, etc.

While the description below includes details relating to apportionment of an optical budget, a computational budget may be apportioned in analogous ways to those described relative to optical budget apportionment. For example, in some cases a computational budget may pertain an amount of computational resources available to process point clouds in order to determine what the LIDAR has detected. In some cases, processing relating to the point clouds can require significant computing resources—a limited resource. Thus, in some cases, it may be desirable to determine whether certain areas may be of higher interest/importance than other areas for processing the associated point clouds. For example, much of the available processing power may be dedicated to processing point clouds and generating depth maps for a region in front of a vehicle, as that area may have the most importance, especially for a forward moving car. On the other hand, while still important, detections occurring in a field of view extending from the side of a vehicle, in some instances, may have less importance than the front of a vehicle (unless, for example, the vehicle is turning, stopped, etc.). In such cases, even if grouped detections have been detected by the LIDAR from reflections signal reflected from a highly reflective object located 130 meters away from the host vehicle, processor 118 may decide to only process the associated point cloud up to a distance of 40 m (or some distance less than 130 m) from the vehicle to conserve the computational budget (e.g., because it may be too costly from a computational standpoint to process the full point cloud including the grouped detections at 130 m, especially if the computational expenditure, as in this side-of-the-vehicle example, is not justified by the importance of the detected objects).

A computational budget may be apportioned not only among available LIDAR systems, such that one LIDAR system may be provided with more computation capability than another, for example, through dedication of the computational capacity of one or more centralized processors more to one LIDAR system than to another. In another example, the processors of two or more LIDAR systems may be aggregated/networked and the aggregate processing capabilities may be allocated such that a processor from one LIDAR system may be dedicated at least in part to computational tasks of different LIDAR system. For example, the processing capacity from a plurality of available LIDAR systems may be dedicated to computational tasks associated with a region forward of a host vehicle, a region where high resolution object detection and depth mapping may be desired.

A computational budget may also be apportioned relative to calculations associated with a particular LIDAR FOV such that computational tasks associated with one portion of the FOV may receive more of the computation budget than computational tasks associated with another portion of the FOV. Some examples of how a computation budget may be apportioned include, for example—detection/clustering (object level from point cloud points); tightening bounding boxes of objects ("bounding boxes"); classification of objects/object type; tracking of objects (e.g., between frames); determining object characteristics (e.g., size, direction, velocity, reflectivity, etc.). A computational budget may be expressed in terms that relate processing capacity to time (e.g., GMACs, Gflops, power, etc.). It is noted that the budget apportionment to different parts of the FOV—especially but not only computational budget—may refer to FOV portioning in 3D, and not just in 2D. For example, the computational budget may be allocated that for a given sector of the FOV (e.g. a given 1° by 0.5° sector), 70% of the computational budget is allocated for processing detections in ranges which exceeds 70 m, 30% of the computational budget is allocated for processing detections in ranges closer to the LIDAR than 40 m, and no computational budget is allocated for the ranges between 40 and 70 m.

Returning to the optical budget, an available optical budget may be apportioned in any manner enabling more light to be selectively provided to one group of LIDAR FOV portions than to another group of LIDAR FOV portions within a particular time period. In this context, a group of LIDAR FOV portions may refer to a one or more portions of a particular LIDAR FOV (e.g., one or more pixels, regions, sub-regions, etc. of a particular LIDAR FOV) or may refer to one or more full LIDAR FOVs (e.g., where an optical budget may apportioned across multiple LIDAR systems). References to more light may refer to increased light flux, increased light density, increased number of photons, etc., e.g., as exemplified above in greater detail.

In some cases, apportionment of the optical budget may be accomplished through variation of a scanning rate associated with a particular LIDAR FOV, a scanning pattern, a scanning angle, a spatial light distribution (e.g., providing more light to one or more groups of LIDAR FOV portions than to one or more other LIDAR FOV portions), and/or a temporal light distribution. Temporal light distribution may involve, e.g., controlling or otherwise changing light flux or an amount of light applied to groups of LIDAR FOV portions over time such that an overall amount of light projected in a first scanning cycle is higher than an overall amount of light projected in a second subsequent scanning cycle. In some cases, apportionment of an optical budget may be accomplished by varying two or more of: a scanning rate associated with a particular LIDAR FOV or a particular LIDAR FOV portion, a scanning pattern, a scanning angle, a spatial light distribution, or a temporal light distribution. Such variations may be made with respect to more than one LIDAR FOV, one LIDAR FOV, a portion of a LIDAR FOV (e.g., a region of interest), one scanning cycle, multiple scanning cycles, etc.

At least part of the dynamic apportionment of the optical budget (e.g., changing or updating an apportionment based on feedback or other information received relating to at least one platform condition for a LIDAR system) may be performed by determining a scanning rate for one or more LIDAR systems. For example, at least one processor may be configured to determine a scanning rate for at least one of: a near-field portion of a LIDAR FOV, a far-field portion of a field of view, a narrow-angle sector of a field of view, and/or a wide-angle sector of a field of view.

As noted, optical apportionment may also be accomplished, at least in part, by determining a scanning pattern for at least one scanning cycle of one or more LIDAR systems. The scanning pattern may be determined based on recognition of at least one of the following scenario types: driving on highways, driving off-road, driving in rain, driving in snow, driving in fog, driving in urban areas, driving in rural area, driving through a tunnel, driving in an area close to a predefined establishment, turning left, turning right, crossing a lane, approaching a junction, and approaching a crosswalk.

The optical budget apportionment may be accomplished by any suitable processor. In some cases, processor 118 of LIDAR system 100 may apportion an optical budget based on information from one or more sources. Alternatively, or additionally, processors from other LIDAR systems may be used to apportion an optical budget (e.g., an optical budget associated with a group of LIDAR systems) and/or one or more processors associated with a LIDAR system host (e.g., a vehicle ECU, etc.) may be used. Any other available processors may also be used to apportion an optical budget.

As noted, optical budget apportionment may result in more light being applied to one group of LIDAR FOV portions than to another. Such changes in applied light amounts, for example, may be achieved by varying a ratio of optical budget apportionment relative to a first light source within a plurality of light sources versus an optical budget apportionment relative to a second light source within the plurality of light sources (or a similar ratio between LIDAR detectors). Optical apportionment may also be applied for different reasons relative to different LIDAR FOV portions or at different times. For example, in some portions of a LIDAR FOV or at some times during a scanning cycle, optical apportionment may be directed to increasing resolution, detection quality, etc. n a particular FOV portion or in a particular time period. In other situations, optical apportionment may be directed to increasing detection detection range associated with a particular FOV portion, a particular FOV sub-region, or in a particular time period. In general, an optical/power budget may be used to achieve different goals in acquiring different frames or different portions of acquired frames. This way a LIDAR system may provide a series of useful or high quality frames for different ROIs, each being useful for different reasons. In this way, the optical budget may be expended in ways determined as having a high probability for returning useful information to the host platform (e.g., a navigational system of a vehicle).

Regarding controls, any suitable parameter or information element may be used in determining whether and/or how to apportion and optical budget. In some embodiments, a platform condition for the LIDAR system may be used as the basis for optical budget apportionment. As noted above, a platform condition for a LIDAR system may refer to any operational parameter, parameter value, observed condition, instruction, informational item, etc., relating to one or more aspects of a LIDAR system, the environment surrounding the LIDAR system, the host on which the LIDAR system is deployed, etc. that may justify providing more light to at least one group of LIDAR FOV portions or in one scanning cycle than is provided to another group of LIDAR FOV portions or in another scanning cycle over a particular period of time.

Such platform conditions for a LIDAR system may be determined in various ways and using any suitable source of information. In some cases, a platform condition of a LIDAR system may be determined internal to the LIDAR system. For example, based on acquired light reflections, reflectivity signatures, depth maps, etc., processor 118 may determine one or more characteristics associated with an environment in which the LIDAR system is deployed. In other cases, a platform condition for a LIDAR system (PCLS) may be determined based on information received from one or more sources separate from LIDAR system 100. For example, as shown in FIG. 29 a PCLS may be determined based on information from one or more of an electronic control unit 2904 of a host vehicle, one or more temperature sensors 2906, a GPS receiver 2908, a vehicle navigation system 2910, a RADAR unit 2912, one or more other LIDAR systems 2914, an Internet or other network connection 2916, a camera 2920, or any other suitable source.

In some cases, information indicative of a PCLS may establish one or more regions of a LIDAR FOV as a region of interest that may justify higher proportions of an optical or computational budget as compared to other regions (e.g., regions of less interest or non-interest). A region of interest may be identified based on a sensed current driving mode of a vehicle in which the LIDAR system is deployed, which may be determined based on one or more outputs of any of information sources 2904, 2906, 2908, 2910, 2912, 2914, 2916, 2920, or from LIDAR system 100, or any combination of these. In one example, a region of interest based on a sensed current driving mode may include a one or more portions of a LIDAR FOV overlapping an area that a host vehicle is turning toward (as conveyed by navigation system 2910, GPS receiver 2908, etc.). In another example, a region of interest may correspond to one or more portions of a LIDAR FOV in which LIDAR system 100 has detected an object, such as another vehicle, a pedestrian, obstacle, etc. Other examples of regions of interest and how such regions are identified are included in other sections of this disclosure.

Information indicative of a PLCS on which optical apportionment (or computational budget) may be determined may include, among other things, at least one of a vehicle operational parameter, an environmental condition, a driving decision, a navigational state of a vehicle, or a power management mode.

Examples of a vehicle operational parameter or a navigational state of a vehicle upon which optical apportionment (or computational budget) may be based may include current speed (e.g., from ECU 2904, GPS 2908), a current vehicle heading (e.g., from GPS 2908, navigation system 2910), a current braking or accelerating condition (e.g., from GPS 2908, ECU 2904), whether the host vehicle is navigating a cross-lane situation (e.g., from navigation system 2908, camera 2920, GPS 2908, etc.). Vehicle operational parameters may also relate to the condition or state of any components associated with a vehicle platform on which LIDAR system 100 is deployed or the condition or state of any components of LIDAR system 100 itself. Such conditions may include a temperature of at least one component of the LIDAR system, whether a portion of the FOV is blocked (e.g., by rain, mud, debris, etc.), whether a lens is scratched, whether deflector 114 is impeded from reaching certain instantaneous positions, whether more internal reflections exist at some angles compared to other angles. A navigational state of the vehicle may also include a position of the host vehicle relative to three-dimensional maps, partial maps, 2-D maps, landmarks, or any combination of map and landmarks, etc. Maps may be pre-stored, received via a communication channel, or generated (e.g. by SLAM).

Examples of an environmental condition may include at least one of a weather condition (e.g., rain, snow, fog, etc. determined based on information from camera 2920, cloud 2916, navigation system 2910); a lighting condition (e.g., determined based on information from LIDAR system 100 (ambient light, type of light source, etc.)); an environmental temperature (e.g., based on an output from temperature sensor 2906); and/or a proximity to a predefined type of establishment (e.g., a school as determined based on input from navigation system 2910, GPS 2908, camera 2920, etc.). Additional examples of environmental conditions upon which optical budget (or computational budget) apportionment may be based may include weather conditions, positions or distribution of detected objects in space (e.g., relative to LIDAR system 100 and/or a host vehicle), detected characteristics of objects in space (e.g. shape, reflectivity, characteristics affecting SNR), type/class of objects (e.g., pedestrian, building, vehicle, light post), a relative position of the sun or other light sources, a state of traffic (e.g., jammed vs. open highway), a state of other host vehicle systems (e.g., driving related or other sensors—in some cases LIDAR system 100 may compensate for a malfunctioning camera 2920), conditions of the road itself (e.g., bumpiness, roughness, going up/down, curving, its reflectivity), map/GPS based data (e.g., road location and orientation in the scene, building location and orientation in scene—(a region of lower interest may be established relative to a building or other obstacle, as LIDAR may not expect to receive reflections from objects on a far side of a building), ambient temperature around LIDAR system 100, ambient temperature of a host vehicle environment, data analysis from previous collected FOV frames (e.g., point clouds, normal to surfaces, reflectivity, confidence levels, etc.). In general, an optical/power budget may be allocated based on knowledge about the environment. For example, GPS data, map data, processed LIDAR information of previous frames, data from other sensors of the vehicle, or any other source may indicate a presence of a building in a part of the FOV, in a given range (e.g. 15 m). While that building may be in a region of high interest (e.g. directly in front of the vehicle), the processor may nevertheless allocate relatively low power to this part of the FOV and allocate the surplus energy to other portions of the LIDAR FOV, so as not to waste budget on parts of the FOV which are hidden behind the building (e.g. beyond 15 m), and cannot be reached, regardless of the amount of light which can be allocated to that direction in the FOV.

Examples of a driving decision upon which optical apportionment (or computational budget) may be based may include at least one of a rural-related indication, an urban-related indication, a current speed of a vehicle containing the LIDAR system, a next driving maneuver, a conditional driving maneuver (a maneuver that may be completed only in the presence of additional environmental information indicating it is safe to do so), a driving navigation event, a manual-driving indication, and an autonomous-driving indication. Such information may be acquired based on outputs provided, for example, by LIDAR system 100 or 2914, navigation system 2910, ECU 2904, GPS 2908, any combinations of those sources or other potential sources of an indicator of a PCLS.

Examples of a power management mode upon which optical apportionment (or computational budget) may be based may include at least one of an indication a normal power operation mode and a power saving mode. Such information may be obtained from ECU 2904, for example, and may reflect an amount of power available from the host vehicle. Other indicators of a power management mode may be based on a sensed condition of one or more components of LIDAR system 100 (e.g., whether any components are overheating or in danger of overheating).

Several examples may further illustrate the collection of a PCLS upon which optical or computation budget apportionment may be based. For example, during operation, processor 118 may receive input indicative of a current driving environment of the vehicle. For example, processor 118 may receive input that includes at least one of a rural-related indication and an urban-related indication. By way of further example, processor 118 may receive input that includes at least one rural-related indication, urban-related indication, information associated with a light condition, information associated a weather condition, and information associated with a velocity of the vehicle.

In some embodiments, processor 118 may receive the input from a determination performed by processor 118 itself. In such an example, processor 118 may determine the current driving environment based on information from one or more previous (and/or the current) scans of the field of view. For example, the processor may determine that the current driving environment is urban based on the presence of numerous vehicles and/or buildings in close proximity to the vehicle. By way of further example, the processor may determine that the current driving environment is rural based on the presence of numerous trees and/or open land. Processor 118 may alternatively or concurrently determine the current driving environment based on a speed of the vehicle and/or based on map information (which may be stored or received and may include updated traffic information). For example, processor 118 may determine that the current driving environment is an interstate or highway based on sustained, high speeds of the vehicle and/or based on a location of the vehicle aligning with a known interstate or highway. By way of further example, processor 118 may determine that the current driving environment is a traffic jam based on frequent stopping of the vehicle with sustained, low speeds and/or based on known traffic information.

Alternatively or concurrently, processor 118 may receive the input from a host vehicle processing unit (e.g., ECU 2904). The central computer may determine the current driving environment using the techniques described above with respect to processor 118. Similarly, processor 118 may additionally or alternatively receive the input from a remote system. For example, processor 118 may receive an indication of the weather from a weather server or other source of updated weather information. Similarly, processor 118 may receive an indication of the traffic from a traffic server or other source of updated traffic information.

In some embodiments, processor 118 may receive the input indicative of the current driving environment from at least one of a GPS, a vehicle navigation system, a vehicle controller, a radar, a LIDAR, and a camera, as shown in FIG. 29. For example, as explained above, processor 118 may use the vehicle's location as determined by the GPS and/or the vehicle navigation system in combination with maps and/or traffic information to derive the current driving environment. In such an example, processor 118 may align the vehicle's GPS location with a map to determine that the vehicle is on an interstate or may align the vehicle's GPS location with traffic information to determine that the vehicle is in a traffic jam. Similarly, processor 118 may use the speed, heading, or the like from the vehicle controller to derive the current driving environment, as explained above. Additionally or alternatively, processor 118 may use information from radar, LIDAR, and/or a camera to derive the current driving environment. For example, processor 118 may identify one or more objects using radar, LIDAR, and/or a camera, such as fields, trees, buildings, medians, or the like, and use the identified objects to derive the current driving environment.

Once the optical or computational budget has been allocated and a plan for applying the apportioned budgets, processor 118 (or other processing devices) may implement the plan. For example, processor 118 may output signals for controlling the at least one light source 112 and/or light deflector 114, or any other component affecting light flux (spatial or temporal) to a LIDAR FOV, in a manner enabling light flux to vary over scanning of the LIDAR FOV in accordance with the dynamically apportioned optical budget. In some cases, application of the apportioned optical budget may result in more light flux to certain portions (e.g., ROIs) of one or more LIDAR FOVs, which, in turn, may require reduced light flux to other areas (e.g., regions of lower interest or non-interest). To execute a plan for implementing an allocated optical budget, processor 118 may be configured to control the at least one light deflector 114 in order to scan the FOV, and during a scanning cycle the at least one light deflector 114 may be located in a plurality of different instantaneous positions. Further, processor 118 may coordinate the at least one light deflector 114 and the at least one light source 112 (e.g., synchronize their operation) such that when the at least one light deflector is located at a particular instantaneous position, a portion of a light beam is deflected by the at least one light deflector from the at least one light source towards an object in the field of view, and reflections of the portion of the light beam from the object are deflected by the at least one light deflector toward at least one sensor 116. In some cases, LIDAR system 100 may include a plurality of light sources aimed at the at least one light deflector 114, and processor 118 may be configured to control the at least one light deflector 114 such that when the at least one light deflector 114 is located at a particular instantaneous position, light from the plurality of light sources is projected towards a plurality of independent regions of the LIDAR FOV. Generally, processor 118 may coordinate the at least one light source 112 and the at least one light deflector 114 in accordance with the dynamically apportioned optical budget. More light per unit time may be applied to regions of higher interest, and less light per unit time may be applied to regions of lower interest through application of the apportioned optical budget. Moreover, based on detections of objects in one or more portions of a LIDAR FOV, processor 118 may prevent an accumulated energy density of light projected to the a particular portion (e.g., whether a region of interest or a region of less interest) to exceed a maximum permissible exposure.

Figure 30A:
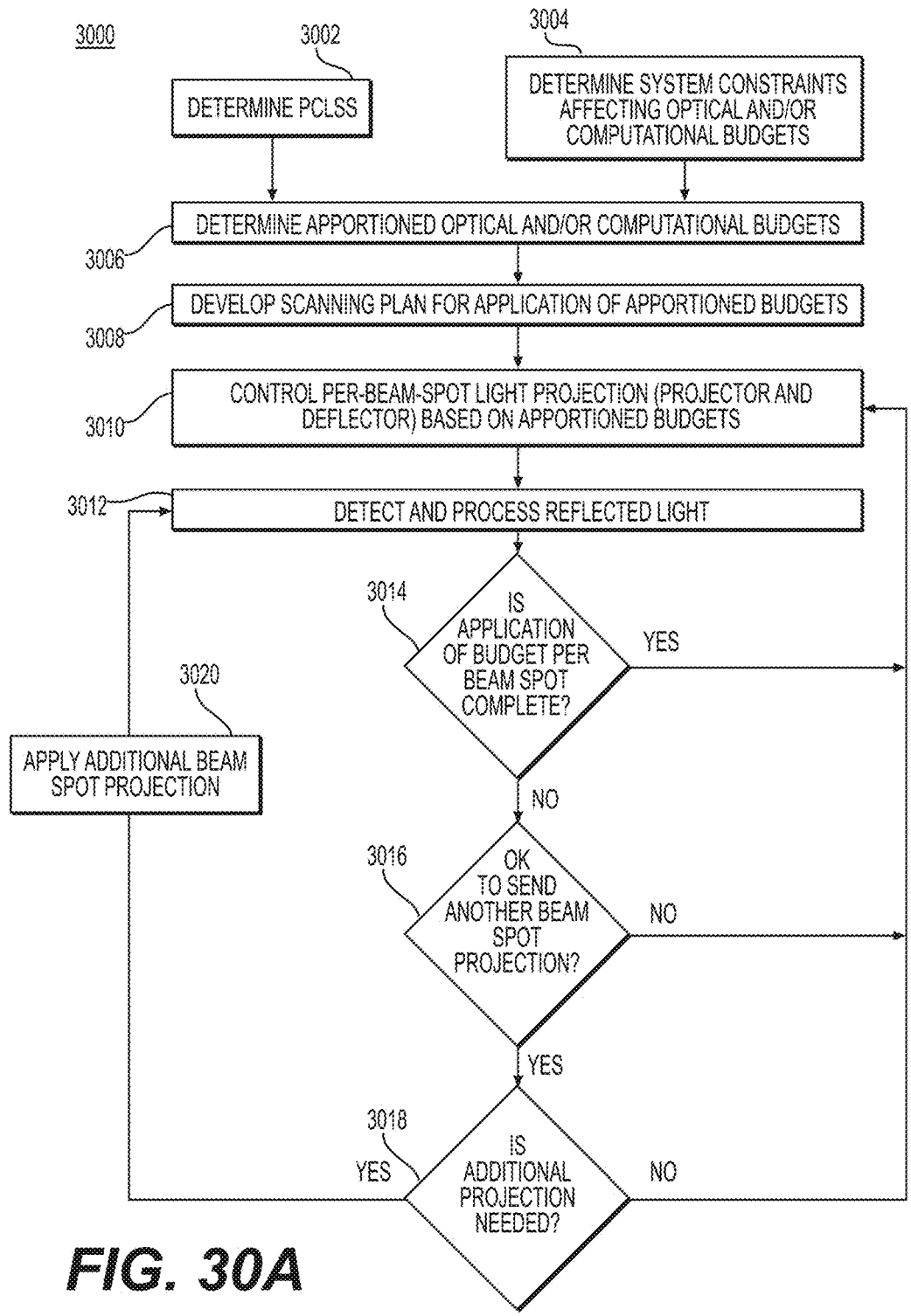
FIG. 30A provides a flow chart providing an example of a method 3000 for controlling a LIDAR system based on apportioned budgets consistent with the disclosed embodiments.

FIG. 30A provides a flow chart providing an example of a method 3000 for controlling a LIDAR system based on apportioned budgets consistent with the disclosed embodiments. For example, at step 3002, processor 118 (or other available processing devices) may receive information indicative of one or more platform conditions of the LIDAR system (PCLS). As described above, these PCLSs may include any conditions associated with the LIDAR system 100 or the platform host on which it is deployed for which a non-uniform light apportionment may be desired. At step 3004, processor 118 may determine system constraints that may in part aid in defining an optical or computational budget (e.g., light output capabilities of available light sources, processing capabilities of available CPUs, etc.). Based on the information acquired at steps 3002 and 3004, processor 118 may determine an apportioned optical budget and/or an apportioned computational budget at step 3006. At step 3008, processor 118 may develop a scanning plan for application of the apportioned budgets to the operation of one or more LIDAR systems. At step 3010, processor 118 may control the per-beam-spot light projection (e.g., light projection from a particular instantaneous position of deflector 114) by, for example, controlling the operation of light source 112 and deflector 114 based on the apportioned budgets. For example, more light flux per unit time may be provided to regions of interest than is applied to regions of less interest. At step 3012, processor may detect and process reflected light based on an output of detector 116, for example. At step 3014, processor 118 may determine whether a prescribed application of the apportioned optical budget for a particular beam spot is complete. If so, the process may return to step 3010 for continued control of light project at another beam spot. If not, then at step 3016, processor 118 may determine whether another beam spot projection is permissible (e.g., whether another projection would comply with eye safety regulations, whether a maximum permissible amount of light flux for a particular beam spot would be exceeded, etc.). If another projection is not permitted, the process may return to step 3010 for continued control of light project at another beam spot. If another projection is permitted, then at step 3018, processor 118 may determine whether another projection at the particular beam spot is needed (e.g., whether sufficient data or detections have already been obtained based on previous projections associated the particular beam spot or previously illuminated pixels). If an additional projection is not needed, the process may return to step 3010 for continued control of light project at another beam spot. Optionally, processor 118 may decide to redistribute the remaining unused power allocated to the present beam spot for at least one other beam-spot in the same scanning cycle. If an additional projection is warranted, then at step 3020, processor 118 may cause an additional light projection at the particular beam spot, before returning to step 3012 for detection and processing of reflected light.

Figure 30B:
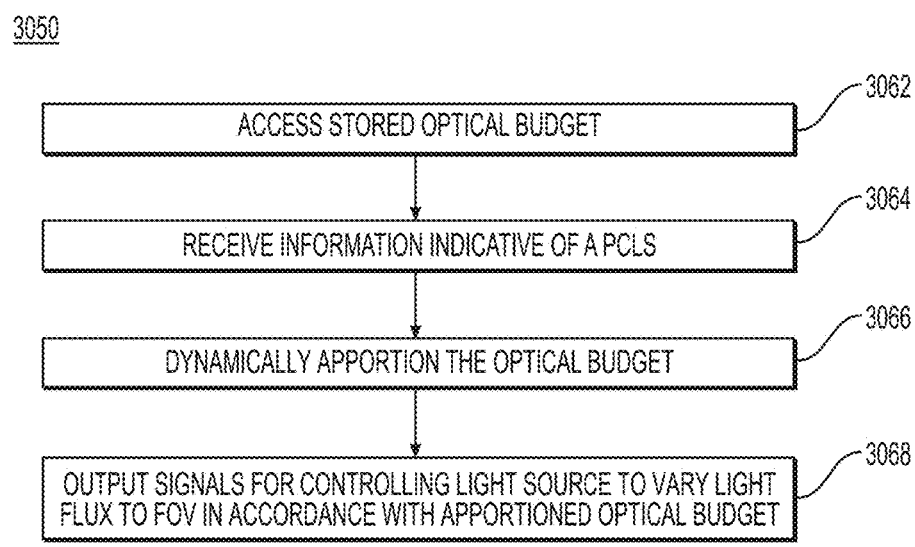
FIG. 30B provides a flow chart representation of an exemplary method for controlling a LIDAR system according to the presently disclosed embodiments.

FIG. 30B provides a flow chart representation of an exemplary method 3050 for controlling a LIDAR system according to the presently disclosed embodiments. Step 3062 may include accessing an optical budget stored in memory, the optical budget being associated with at least one light source and defining an amount of light that is emittable in a predetermined time period by the at least one light source. Step 3064 may include receiving information about a vehicle operational parameter, including at least one of: an environmental condition, a driving decision, and a power management mode. Based on the received information, step 3066 may include dynamically apportioning the optical budget to a field of view of the LIDAR system based on at least two of: scanning rates, scanning patterns, scanning angles, spatial light distribution, and temporal light distribution. Step 3068 may include outputting signals for controlling the at least one light source in a manner enabling light flux to vary over scanning of the field of view in accordance with the dynamically apportioned optical budget.

In some embodiments, dynamically apportioning the optical budget based on spatial light distribution may include projecting, during a single scanning cycle, more light towards a first portion of the field of view than towards a second portion of the field of view. In a following scanning cycle, dynamically apportioning the optical budget based on spatial light distribution may include projecting, during that following scanning cycle, more light towards the second portion of the field of view than towards the first portion of the field of view. The method may further include obtaining an identification of the first portion as a region of interest and an identification of the second portion as a region of non-interest (or lower interest). The method may also include determining an existence of an object in the second portion and preventing an accumulated energy density of the light in the second portion from exceeding a maximum permissible exposure.

In another example for how an apportioned optical budget may be applied during operation of a LIDAR system, processor 118 may be configured to apportion more of an optical budget (e.g., more flux/FOV) to a particular LIDAR system installed on a vehicle based a PCLS indicative of a failure of another LIDAR system on the same vehicle. Such apportionment may at least partly compensate for the failed LIDAR system. For example, the apportionment to the working LIDAR system may include emitting pulses to parts of that LIDAR's FOV where during normal operation no pulses (or few pulses) are usually sent. Such apportionment may also include changing deflector parameters in order to scan a wider FOV, for example.

To further illustrate this example, FIG. 31 provides a diagrammatic illustration of a vehicle including seven installed LIDAR systems positioned at different locations in the vehicle. Each individual LIDAR device may exhibit different parameters in terms of field of view, range, resolution, accuracy, etc. The installed LIDAR systems may be connected by a bus (e.g. CAN bus) that provides communication access between the systems and potentially other components as shown in FIG. 29. During operation, the various LIDAR devices may broadcast their operational parameters to one another as part of a capability exchange booting phase or on-demand status request. This exchange of information may enable the processor of another LIDAR system, such as LIDAR system #7 to recognize that LIDAR system #2 has failed (e.g., based on received error messages, health status indicators, etc.). In some cases, a faulty device on the bus may not be able to report (for example it lost its power supply). In that case the non-reporting system is no longer connected to the shared bus and is assumed to be failed.

One or more other LIDAR systems may take an action to at least partially compensate for the failed LIDAR device. For example, as shown in FIG. 31, failure of LIDAR system #2 may result in a blind spot for the vehicle sensory system. A monitoring layer in HW or FW (main controller or a designated master LiDAR device connected to the bus) would detect that LiDAR #2 is non-functional and would designate another LiDAR in the system to compensate for loss of coverage. In this specific example LiDAR #7 was found to be the best choice for compensating the loss of coverage, given its extended capabilities. LiDAR #7 is designated to operate in a backup mode and extend its field of view in order to cover up for LIDAR #2 field of view. Increasing the scanning range of LiDAR #7 may occur at the expense of some of its capabilities, decreased total range, resolution or frame rate. The full system at the level of the vehicle main controller would be notified of the updated sensors state with a reduced set of performance parameters and compensate for the vehicle behavior. Similar to a narrow spare tire that limits the vehicle to 80 Km/h, the vehicle might be limited at top speed. The compensation of faulty sensors is ultimately driven by the need of an autonomous vehicle to maintain a minimum autonomic level in order to be able to safely reach a service location without human intervention.

It is noted that optionally, computational resources may be shared by a plurality of sensors of two or more types (e.g. LIDAR, camera, ultrasound sensor, radar) or allocated to the processing of detection information arriving from sensors of different types. This may be implemented, for example, by a host computer which integrates information from different sensors in a vehicle, such as an autonomous car. The methods and processes disclosed above for apportionment of computational budget (e.g. method 3000) may be extended may to apportion computational budget between processing information collected by sensors of different types. Optionally, this may be further extended to allocate the computational budget differently between FOV portion of each sensor out of a plurality of sensors of different types, while also shifting computational resources between the different types of detection data, based on various parameters, such as platform condition of the vehicle, or any system installed in it. Such parameter may include, for example, any combination of one or more of the following: vehicle operational parameter, an environmental condition, a driving decision, a navigational state of a vehicle, or a power management mode, system parameter of one or more detection system (such as LIDAR, radar, etc.). It is that the apportionment of computational budget for processing of a first sensor of a first type may be based on the processing of another sensor of another type.

For example, if a camera detected a suspected object in one of its ROI, the apportioning processor may apportion more of the LIDAR computational budget for processing of detection information from that of the FOV, on the expense of processing LIDAR detection information from other parts of the FOV. In another example, the apportioning processor may apportion the computational budget based on detection results and/or platform parameters such that some parts of the FOV (which can of course be defined in 3D, not just in 2D) would be primarily analyzed using detection information from a first type of sensors, while others parts of the FOV would primarily be analyzed using detection information from a second type of sensors. In yet more advanced allocation scheme, the host (or another processor) may also shift power allocation between sensors of different types, e.g., based on any one of the previously disclosed parameters, and according to any one of the aforementioned considerations, mutatis mutandis.

It is noted that many of the methods, processes and techniques for a LIDAR system which are discussed throughout the disclosure, when taken considered together with method 3000 (and with the entire discussion of budget apportionment), can be a part of a wider budget apportionment scheme, which combines any two or more of the disclosed methods, processes and techniques. Such methods, processes and techniques may fit to different places in the disclosed budget allocation scheme. For example, some of these methods, processes and techniques may be used to as determining factors by which to allocate the budget to different portions of the FOV; some of these methods, processes and techniques may be used to as determining factors by which to restrict allocation of the budget to different portions of the FOV; some of these methods, processes and techniques may be used for making use of the budget allocated to different portions of the FOV, and so on.

According to some embodiments, a LIDAR system 100 may include:
a. A photonic emitter assembly (PTX) such as projection unit 102 (or a part thereof), to produce pulses of inspection photons wherein the pulses are characterized by at least one pulse parameter;
b. A photonic reception and detection assembly (PRX) to receive reflected photons reflected back from an object, the PRX including a detector (e.g. detector 116) to detect the reflected photons and to produce a detected scene signal (e.g. by processor 118). The photonic reception and detection assembly may include sensing unit 106 (or a part thereof) and processing unit 108 (or a part thereof);
c. A photonic steering assembly (PSY) such as scanning unit 104 (or a part thereof) functionally associated with both the PTX and the PRX to direct the pulses of inspection photons in a direction of an inspected scene segment and to steer the reflection photons back to the PRX; and
d. a closed loop controller (herein below also "controller") which may be implemented by processing unit 108 (or a part thereof, such as at least one processor 118), to: (a) control the PTX, PRX and PSY, (b) receive the detected scene signal from the detector and (c) update the at least one pulse parameter at least partially based on the detected scene signal.

According to some embodiments, at least one pulse parameter may be selected from the following group: pulse power intensity, pulse width, pulse repetition rate pulse sequence, pulse duty cycle, wavelength, phase and/or polarization.

According to some embodiments, the controller may include a situational assessment unit to receive the detected scene signal and produce a scanning/work plan. The work plan may include some or all of a determined budget allocation, and may also include additional operational decisions (e.g., scanning pattern). The situational assessment unit may receive a photonic steering assembly feedback from the photonic steering assembly. The situational assessment unit may receive information stored on a memory. Optionally, the information may be selected from the following list: laser power budget (or any other form of optical budget), electrical operational characteristics and/or calibration data. The situational assessment unit may use the photonic steering assembly feedback to produce the scanning/work plan. The optical budget (e.g. laser power budget) may be derived from constraints such as: eye safety limitations, thermal budget, laser aging over time and more.

According to some embodiments, the work plan may be produced based on (a) real-time detected scene signal (b) intra-frame level scene signal and (c) interframe level scene signal accumulated and analyzed over two or more frames.

According to some embodiments, the detector may be a dynamic detector having one or more detector parameters and the closed loop controller may update the detector parameters based on the work plan. The detector parameters may be selected from the following group: scanning direction, frame rate, sampling rate, ambient light effects, mechanical static and dynamic impairments, dynamic gating for reducing parasitic light, dynamic sensitivity, dynamic bias, and/or thermal effects. The PSY may have one or more steering parameters and the closed loop controller may update the steering based on the work plan. The steering parameters may be selected from the following group: scanning method, power modulation, single or multiple axis methods, synchronization components. Optionally, the situational assessment unit may receive a host-feedback from a host device and use the host feedback to produce or contribute to the work plan.

According to some embodiments, processor 118 may include situational assessment logic or circuitry such as situational assessment logic (SAL). The SAL may receive detected scene signals from detector 116 as well as information from additional blocks/elements either internal or external to scanning unit 104.

According to some embodiments, the scene signal may be assessed and calculated with or without additional feedback signals such as a photonic steering assembly feedback PTX feedback, PRX feedback and host feedback and information stored in memory 2902 in a weighted means of local and global cost functions that determine a scanning/work plan such as a work plan signal for scanning unit 104 (such as: which pixels in the FOV are scanned, at which laser parameters budget, at which detector parameters budget). Accordingly, processor 118 may be a closed loop dynamic controller that receives system feedback and updates the system's operation based on that feedback. The scanning work plan, for example, may be developed for implementing an apportioned optical or computational budget.

According to some embodiments, there may be provided a scanning unit 104 for scanning one or more segments of a scene, also referred to as scene segments. The device may include one or more photonic emitter assemblies (PTX), one or more photonic reception and detection assemblies (PRX), a photonic steering assembly (PSY) and a situationally aware processor adapted to synchronize operation of the PTX, PRX and PSY, such that the device may dynamically perform active scanning of one or more scene segments, or regions, of a scene during a scanning frame. Active scanning, may include transmission of one or more photonic inspection pulses towards and across a scene segment, and when a scene element present within the scene segment is hit by an inspection pulse, measuring a roundtrip time-of-flight for the pulse to hit the element and its reflections to return, in order to estimate a distance and a (relative) three dimensional coordinate of point hit by the inspection pulse on the scene element. By collecting coordinates for a set of points on an element, using a set of inspection pulses, a three dimensional point cloud may be generated and used to detect, register and possibly identify the scene element.

Processor 118 may be a situationally aware controller and may dynamically adjust the operational mode and operational parameters of the PTX, PRX and/or PSY based on one or more detected and/or otherwise known scene related situational parameters. According to some embodiments, processor 118 may generate and/or adjust a work plan such as a scanning plan for scanning portions of a scene to implement an apportioned optical or computational budget, as part of a scanning frame intended to scan/cover one or more segments of the scene, based on an understanding of situational parameters such as scene elements present within the one or more scene segment. Other situational parameters which may be factored in generating the scanning plan may include a location and/or a trajectory of a host platform carrying a device according to embodiments. Yet further situational parameters which may be factored in generating the scanning plan may include a topography, include road slope, pitch and curvature, surrounding a host platform carrying a device according to embodiments.

The scanning plan may include: (a) a designation of scene segments within the scene to be actively scanned as part of a scanning frame, (b) an inspection pulse set scheme (PSS) which may define a pulse distribution pattern and/or individual pulse characteristics of a set of inspection pulses used to scan at least one of the scene segments, (c) a detection scheme which may define a detector sensitivity or responsivity pattern, (d) a steering scheme which may define a steering direction, frequency, designate idle elements within a steering array and more. In other words, the scanning plan may at least partially affect/determine a PTX control signal, steering parameters control, PRX control, and/or detector control parameters so that a scanning frame is actively scanned based on scene analysis and the apportioned optical and/or computational budgets.

The discussion below provides additional examples of controlling one or more scans of a LIDAR FOV based on determined optical and/or computational budgets. For example, based on a current detected or inferred driving environment, processor 118 may coordinate the control of the at least one light source with the control of the at least one light deflector to dynamically adjust an instantaneous detection distance by varying an amount of an optical budget spatially applied across a scan of the field of view. For example, processor 118 may increase the amount of light projected and/or decrease the spatial distribution of light to increase the instantaneous detection distance in certain regions of the FOV (regions of interest). By way of further example, processor 118 may decrease the amount of light projected and/or increase the spatial distribution of light to decrease the instantaneous detection distance in other regions of the FOV (regions of lower interest).

Deflector Feedback Control in Lidar

In some embodiments, as noted previously, LIDAR system 100 may be incorporated onto a vehicle. Due to engine operation and motion over roads and other surfaces, a certain amount of vibration may result, and this vibration may interfere with operation of LIDAR system 100. For example, vibrations may be transferred to any of the components of LIDAR system 100 and may affect their performance and/or the overall performance of the system. In some cases, vibration of the light source and/or the light deflector may result in variations in a direction of light emitted towards the LIDAR field of view ("FOV"), reduced collection of light from objects in the FOV, uncertainties in deflector position and/or instantaneous FOV position, and/or inefficiencies introduced into the deflector/sensor coupling. As a result, regions of the LIDAR FOV may not be illuminated as intended (e.g., as exemplified by the differences between intended FOV 3220 versus actual FOV 3222 in FIG. 32A), objects in the LIDAR FOV may go undetected, object may be detected in erroneous directions, and/or object detections may result in less than desirable resolution levels.

Figure 32A:
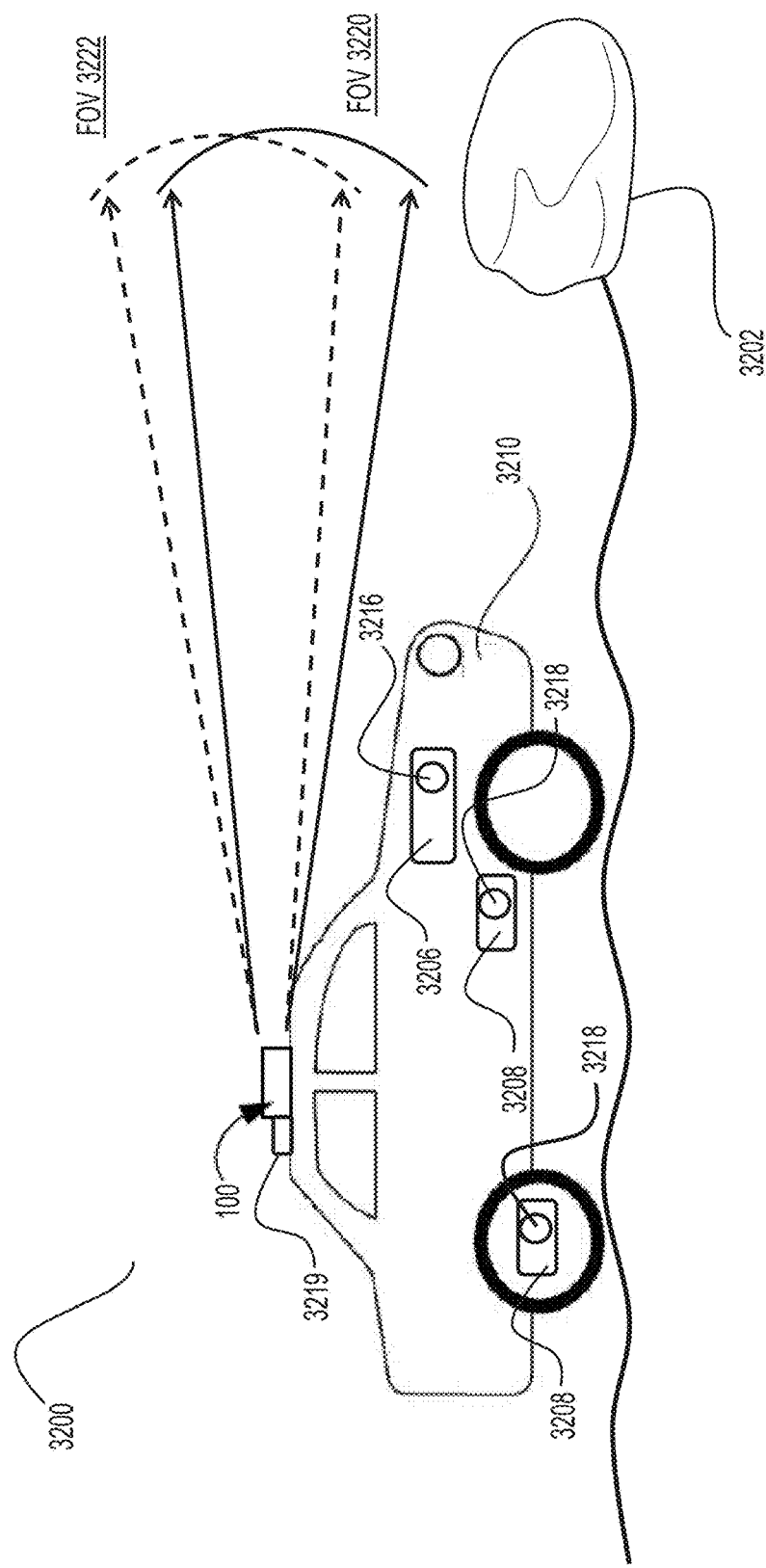
Figure 32B:
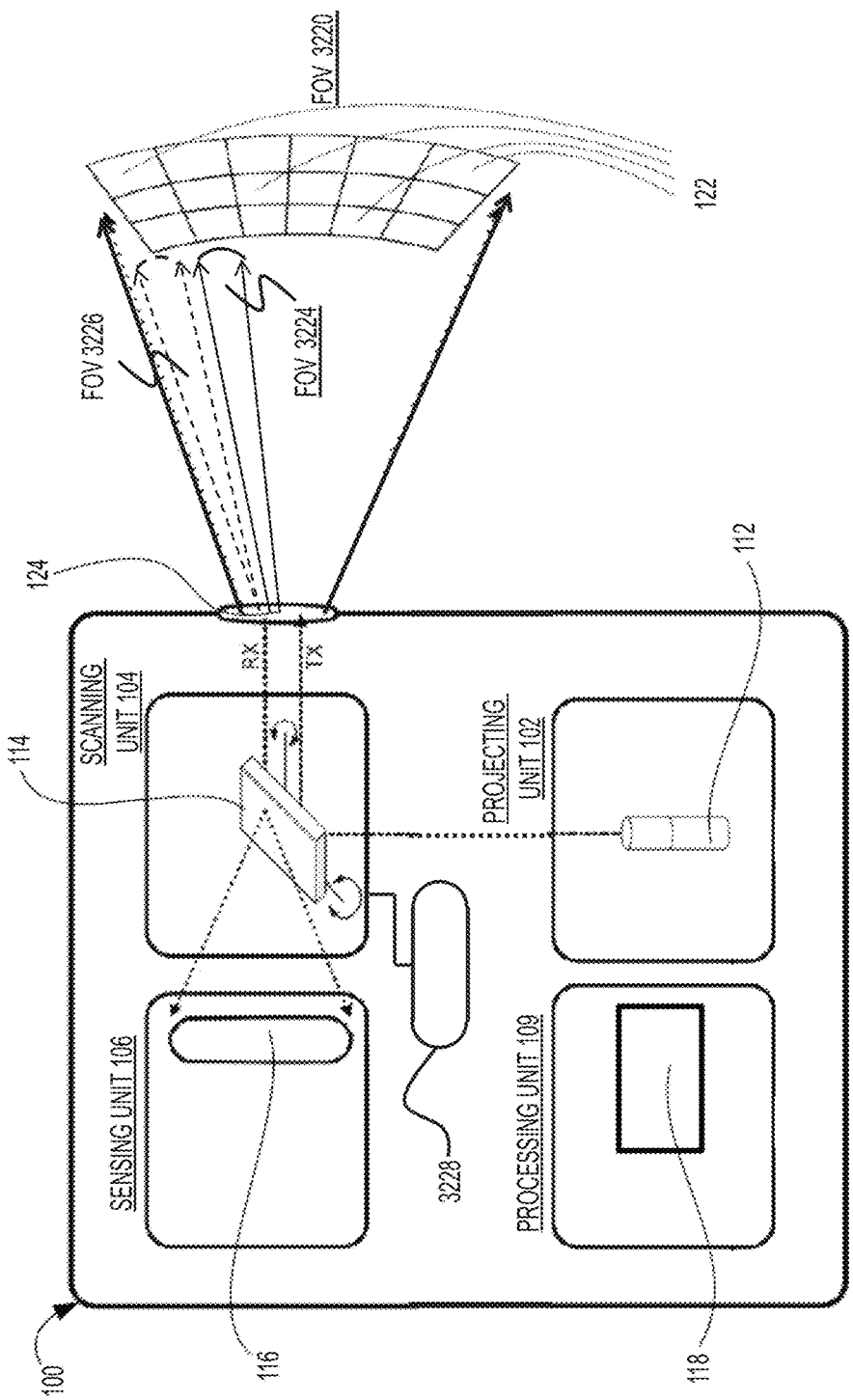

To counter such effects, in some embodiments, LIDAR system 100 may incorporate a vibration suppression system 3200 (e.g., FIG. 32A-B). In some cases, LIDAR system 100 may determine the presence of vibration and may take one or more actions to reduce or eliminate the effects of such vibration. LIDAR system 100 may determine the presence of vibration through any suitable technique. For example, in some cases, vibration may be detected using one or more sensors associated with the vehicle or with LIDAR system 100 itself. Such sensors may include one or more accelerometers, strain gauges, or any other suitable type of sensor. In some cases, vibration may be detected based on feedback received from deflector 114. That is, in some cases, the vibration suppression system of LIDAR system 100 may respond to vibrational feedback determined based on mirror position data associated with deflector 114 (e.g., using mirror position feedback sensors illustrated in FIG. 32C to detect movements of deflector 114 resulting from vibration, as well as, FIGS. 62, 65, 67, 76, 77, and 84). Variations in mirror position as a result of vibration may result from any source of vibration coupled directly or indirectly to LIDAR system 100. For example, such sources of vibration may result from engine operation, wheels rolling over a road surface, mechanical movements of vehicle components (including movements of components of LIDAR system 100), etc.

In addition to—or as an alternative to—being capable of countering some or all of the effects of vibration on the LIDAR system 100, vibration suppression system 3200 of LIDAR system 100 may also be capable of countering effects caused by uncertainties in positioning of the mirrors. For example, when using a piezo-electrically actuated MEMS mirror, the piezo-electric actuation may include a certain amount of hysteresis, which means that a certain control voltage may not necessarily result in desired positioning of the mirror due to ambiguity in mirror position compared to controlling voltage. Therefore, a position feedback mechanism, such as position feedback mechanism 3256 of FIG. 32C (e.g., FIGS. 62, 65, 67, 76, 77, and 84), may be useful to counter such effects, which may be present on any type of installment of LIDAR system 100 (e.g., installations on moving platforms, such as vehicles, or on stationary objects, such as buildings, infrastructure, etc.). It is further noted that sensors 3228 (e.g. FIG. 32B) may be used to obtain data indicative of position, orientation, velocity or acceleration of the at least one light deflector. These determined information regarding the state of the light deflector may be determined regardless of the reasons for diversions (e.g., vibrations, hysteresis, temperature effects), and may be used in the feedback control of the light deflector to improve detection accuracy and operability of LIDAR system 100 (e.g., in the examples provided below), mutatis mutandis.

In a LIDAR system configured to suppress the effects of vibration or uncertainties in light-deflector position, the system 3200 may include at least one processor configured to control at least one light source in a manner enabling light flux of light from the at least one light source to vary over scans of a field of view; control positioning of at least one light deflector to deflect light from the at least one light source in order to scan the field of view; and obtain data indicative of vibrations of a vehicle on which the LIDAR system is deployed. Based on the obtained data indicative of sensed vibration, the at least one processor may determine adjustments to the positioning of the at least one light deflector in order to compensate for the vibrations of the vehicle. The at least one processor may also implement the determined adjustments to the positioning of the at least one light deflector to suppress on the at least one light deflector, at least part of an influence of the vibrations of the vehicle on the scanning of the field of view.

FIG. 32A illustrates an exemplary vibration suppression system 3200 and vehicle 3210 on a bumpy road surface. Vehicle 3210 may be equipped with various types of sensors for detecting the presence of vibrations and/or characteristics associated with sensed vibrations. For example, in some embodiments, vehicle 3210 may include sensor units and/or vibration sensors deployed at various locations on the vehicle. Such sensors may sense vibrations associated with the wheels, engine, body, etc. of the vehicle resulting from movement of the vehicle over a road or other surface, operation of an engine of the vehicle, operation of one or more other components of the vehicle, or any other potential source of vibration imparted to vehicle 3210. For example sensor unit 3206, including sensor 3216 may be positioned in an area near an engine of the vehicle and may monitor vibrations associate with the engine. Additionally, one or more sensor units 3208, including sensors 3218, may be positioned in an area near or on wheels associated with the vehicle in order to monitor vibrations associated with the wheels of the vehicle. The vehicle may also be equipped with one or more vibration sensors 3219 positioned near to, with, on, or in LIDAR system 100 for detecting vibration at a location near to or in LIDAR system 100.

Sensor 3216, 3218, and/or 3219 may include any type of sensor capable of measuring at least one characteristic of vibration or an effect of vibration, including, for example, force, acceleration, torque, strain, stress, voltage, optical deflections, etc. Such sensor 3216, 3218, and/or 3219 may be connected to one or more processors associated with LIDAR system 100, either directly or indirectly, via wired or wireless connections and may communicate to the one or more processors of the LIDAR system information indicative of the sensed vibration.

In addition to sensors 3216, 3218, and/or 3219, LIDAR system 100 may be equipped with one or more sensors or may be configured with sensing capability to detect the presence of vibration and/or one or more characteristics of sensed vibration (e.g. sensor 3228 of FIG. 32B). As discussed in more detail below, one or more processors associated with LIDAR system 100 may include programming enabling detection of vibration present on deflector 114, for example. Such vibration may be detected, e.g., by monitoring movements of deflector 114, including movements not intentionally imparted to deflector 114 as part of a LIDAR FOV scan. For instance, FIG. 32B illustrates vehicle vibration compensation system 3200 with LIDAR system 100 components, as well as, sensor 3228 in contact with scanning unit 104 and deflector 114. Sensor 3228 may be used to obtain data indicative of position, orientation, velocity or acceleration of the at least one light deflector 114. Also, intended FOV scan 3220 incorporates the instantaneous FOV 3224 and the actual instantaneous FOV 3226 as scanned by deflector 114. Vibrations present in the scanning unit 104 cause discrepancies between the intended and actual instantaneous field of views (3224 and 3226 respectively). Sensor 3228 may detect the vibrations affecting deflector 114. It should be further noted that FIG. 32B illustrates a bi-static embodiment, but alternative cases may incorporate a monostatic design.

Turning back to FIG. 32A, the presence of vibrations on vehicle 3210 may interfere with the operation of LIDAR system 100. For example, as vehicle 3210 progresses along a road towards object 3202, LIDAR system 100 may direct a certain amount of light flux toward object 3202 during a scan of the LIDAR FOV. As previously described, this light flux directed to a particular sub-region of the LIDAR FOV (e.g., where object 3202 resides) may be accomplished by causing light projecting unit 102 to provide light to light deflector 114 located in an instantaneous position such that light is projected toward the FOV sub-region containing object 3202. In the presence of vibration, however, deflector 114 may experience movements that cause light, which was intended to be directed to the sub-region in which object 3202 resides, to be directed at least partially to regions of the LIDAR FOV not intended to receive the light. As a result, the ability of LIDAR system 100 to detect object 3202 and provide information sufficient for generating suitable depth maps including details of object 3202 and its position may be degraded. To combat this effect of vibration, processing unit 108 of LIDAR system 100 may detect the vibrations, including one or more characteristics of those vibrations, based on outputs received from sensing unit 106, sensor 116, and/or deflector-position monitoring units. Processing unit 108 may cause deflector 114 to move in such a way that counteracts at least a portion of the movement imparted to deflector 114, light projecting unit 102, sensing unit 106, or any other component of LIDAR system 100 affecting light projection, collection, or detection. For example, in some embodiments, processing unit 108 including one or more processors 118, may monitor the position or orientation of deflector 114, compare the monitored position with an intended instantaneous position/orientation, and if a difference is determined, processor 118 may cause deflector 114 to move toward the intended instantaneous position/orientation. Using such a feedback approach, processor 118 may counteract effects of vibrations that tend to displace deflector 114 from its intended position or orientation. In some embodiments, processor 118 may be configured to cause vibration-reducing or cancelling movements to any movable component of LIDAR system 100 in order to mitigate the effects of sensed vibrations.

The sections below further elaborate on the vibration-detection and vibration suppression capabilities of system 3200.

The presently disclosed embodiments may include a processor 118 (i.e. CPU 3234) configured to determine an instantaneous angular position (e.g. using θ, φ coordinates) of the at least one light deflector 114 (i.e. mirror 3236). The term "instantaneous angular position" refers to an instantaneous position of the at least one deflector which causes light to be deflected towards (and/or from) a given angular direction (e.g. indicated by θ, φ). Such a determination may be based on at least one of optical measurements, capacitance measurements, piezo resistance measurements, dielectric constant measurement, and piezo polarization measurements from one or more of the vibration sensors associated with vehicle 3210 or LIDAR system 100 (e.g., sensors associated with light deflector 114).

As discussed above, vibrations may be detected using one or more sensors 3216, 3218, and/or 3219. Such sensors may include one or more accelerometers, strain gauges, or any other type of sensor suitable for sensing vibration or at least one characteristic of vibration. Additionally, as noted, LIDAR system 100 may be equipped with dedicated vibration sensors (i.e. sensor 3228) or may detect vibration using one or more components of systems used for scanning the LIDAR FOV. For example, in some embodiments, vibrations may be detected using deflector 114 and position feedback sensors 3256 shown in FIG. 32C.

Figure 32C:
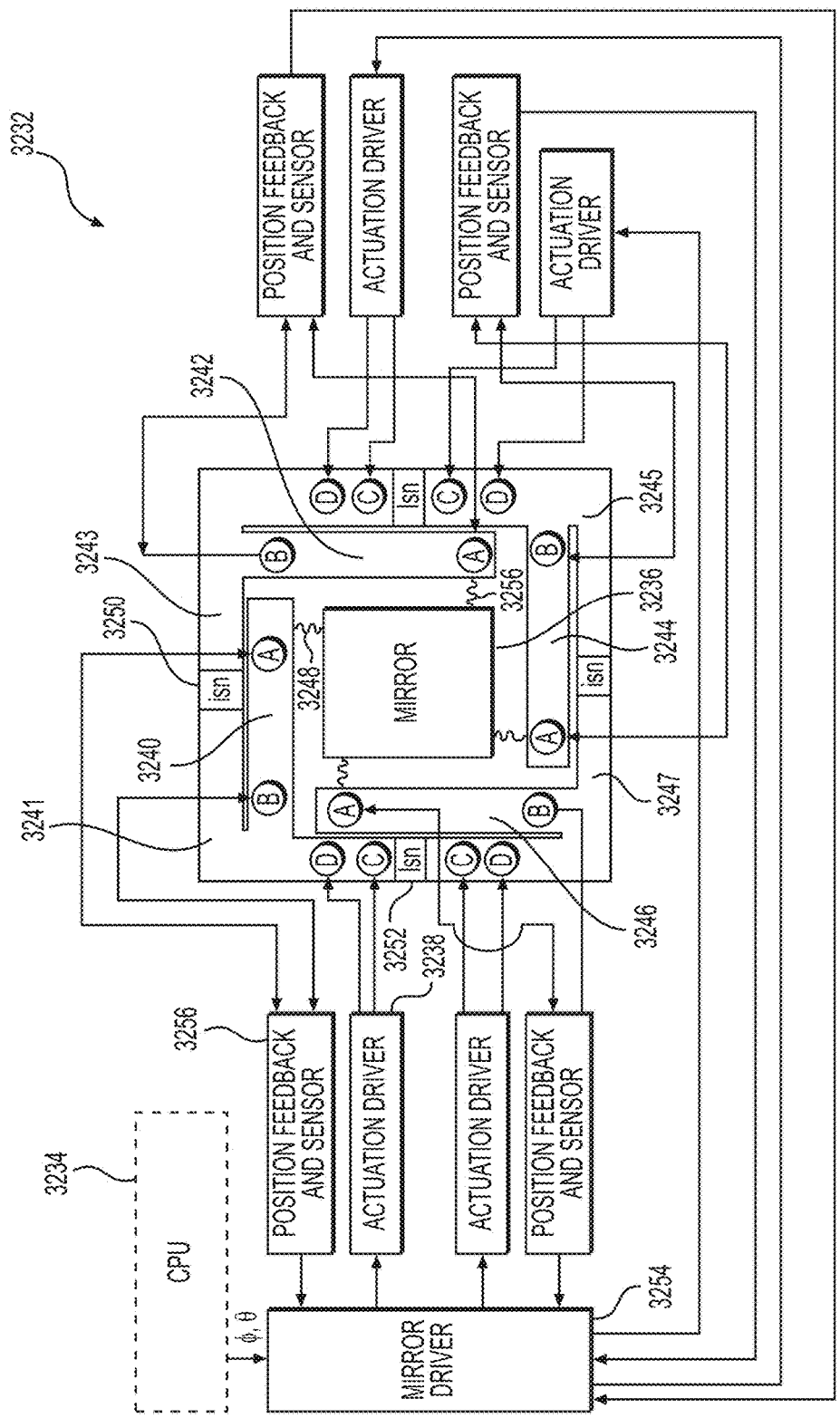

Shown in FIG. 32C is an exemplary pivotable mirror configuration including mirror 3306 which can be moved in two or more axes (e.g., θ, φ). As indicated in FIGS. 32C-G, mirror 3236 may be included in different configurations, including, for example, rectangular, square, circular, or rounded mirror shapes. Processor 118 may be configured to control at least one deflector 114, including, for example, a position of mirror 3236, during scans of the LIDAR FOV. Processor 118 may also control movement of mirror 3236 in order to provide a desired scanning rate, scanning pattern, spatial light distribution, temporal light distribution, etc.

For instantaneous directional control, steering unit 3232 (i.e. scanning unit 104) including mirror 3236 may also include an electrically controllable electromechanical driver, such as actuation driver 3238. Actuation driver 3238 may cause movement or power to be relayed to an actuator/cantilever/bender such as actuator 3240. Actuator 3240 may be part of a support frame such as frame 3241 or they may be indirectly connected. Additional actuators such as actuators 3242, 3244 and 3246 may each be controlled/driven by additional actuation drivers as shown, and may each have a support frame consistent of multiple layers 3243, 3245 and 3247 (appropriately). It is understood that frames 3241, 3243, 3245 and/or 3247 may comprise a single frame supporting all of the actuators or may be a plurality of interconnected frames. Furthermore the frames may be electrically separated by isolation (Isn) elements or sections (as shown). Optionally, a flexible interconnect element or connector, such as spring 3248, may be utilized to adjoin actuator 3240 to mirror 3236, to relay power or movement from actuation driver 3238 to mirror 3236. Actuator 3240 may include two or more electrical contacts such as contacts 3240A, 3240B, 3240C and 3240D. Optionally, one or more contacts 3240A, 3240B, 3240C and/or 3240D may be situated on frame 3241 or actuator 3240 provided that frame 3241 and actuator 3240 are electronically connected. According to some embodiments, actuator 3240 may be a semiconductor which may be doped so that actuator 3240 is generally conductive between contacts 3240A-3240D and isolative in isolation 3250 and 3252 to electronically isolate actuator 3240 from actuators 3242 and 3246 (respectively). Optionally, instead of doping the actuator, actuator 3240 may include a conductive element which may be adhered or otherwise mechanically or chemically connected to actuator 3240, in which case isolation elements may be inherent in the areas of actuator 3240 that do not have a conductive element adhered to them. Actuator 3240 may include a piezo electric layer so that current flowing through actuator 3240 may cause a reaction in the piezo electric section which may cause actuator 3240 to controllably bend.

CPU 3234, which may be incorporated, for example, into processing unit 108, may output/relay to mirror driver 3254 a desired angular position for mirror 3236 described by θ, φ parameters. Mirror driver 3254 may be configured to control movement of mirror 3236 and may cause actuation driver 3238 to push a certain voltage to contacts 3240C and 3240D in order to attempt to achieve specific requested values for θ, φ deflection values of mirror 3236 based on bending of actuators 3240, 3242, 3244 and 3246. According to some embodiments, position feedback control circuitry may be configured to supply an electrical source (such as voltage or current) to a contact such as contact 3240A (or 3240B) and the other contact such as 3240B (or 3240A, appropriately) may be connected to a sensor within position feedback 3256, which may be utilized to measure one or more electrical parameters of actuator 3240 to determine a bending of actuator 3240 and appropriately an actual deflection of mirror 3236. It is further understood that by determining the bend of actuator 3240 and appropriately deflection mirror 3236, the CPU 3234 in turn determine real-time position of the light deflector.

Additional positional feedback similar to position feedback 3256 and an additional actuation driver similar to actuation driver 3238 may be replicated for each of actuators 3242-3246 and mirror driver 3254 and CPU 3234 may control those elements as well so that a mirror deflection is controlled for all directions. The actuation drivers including actuation driver 3238 may push forward a signal that causes an electro-mechanical reaction in actuators 3240-3246 which each, in turn is sampled for feedback. The feedback on the actuators' (3240-3246) positions serves as a signal to mirror driver 3254 enabling it to converge efficiently towards the desired position θ, φ set by the CPU 3234, correcting a requested value based on a detected actual deflection.

In addition to the described operation of positioning mirror 3236 and obtaining feedback, e.g., via 3242 A/B, 3244 A/B, or 3246 A/B and the position feedback sensor, such elements among others may be used for detecting vibration. For example, processor 118 may monitor feedback from the position feedback sensor in order to determine data indicative of vehicle vibrations (or LIDAR system vibrations). As discussed above, the vehicle vibration compensation system may utilize measured reflected optics data acquired from deflector. Scanning unit 104, like shown in FIGS. 3A-3C, or LIDAR system 100 may utilize piezoelectric actuator micro electro mechanical (MEMS) mirror devices for deflecting a laser beam scanning a field of view (FOV). Mirror 3236 deflection is a result of voltage potential/current applied to the piezoelectric element that is built up on actuator 3240. Mirror 3236 deflection is translated into an angular scanning pattern that may not behave in a linear fashion, for a certain voltage level actuator 3240 does not translate to a constant displacement value. A scanning LIDAR system where the FOV dimensions are deterministic and repeatable across different devices is optimally realized using a closed loop method that provides an angular deflection feedback from position feedback and sensor 3256 to mirror driver 3254 and/or CPU 3234. Reflected optics not only can provide relevant data for the LIDAR system (e.g., reflected light from a particular sub-region of the LIDAR FOV used to create depth maps), but CPU 3234 can also use measured optic data as a basis detecting vibrations. For example, if a spot of light reflected by mirror 3236 onto sensor 116, for example, is determined to move relative to the sensor, especially if the movement is consistent with frequencies, amplitudes, etc. associated with vibration, then the direction and degree of movement of the collected light beam may enable processor 118 to detect the presence of vibration and also one or more characteristics of the vibration.

Other techniques can also be used by processor 118 to detect the presence of vibration. Returning to FIG. 32C and as discussed above, the position feedback sensor may also be used to measure vibrations. For example, the position feedback sensor may sense signals at actuator 3242, 3244 and/or 3246 via contacts 3242A or 3242B, 3244A or 3244B and/or 3246A or 3246B. The sensed signals may be used to determine actuator movement, which in turn, may be indicative of vibrations. In one example for detecting the effects of vibration by monitoring the actuators and/or output of the position feedback sensor, processor 118 may have caused mirror 3236 to move to a particular instantaneous location as part of a scan of the LIDAR FOV. Once mirror 3236 has been moved to its designated instantaneous position (e.g., in order to direct light to a particular sub-region of the LIDAR FOV), processor 118 may expect the mirror to remain in that position for a certain dwell time before the mirror is moved to its next instantaneous position. During the dwell time, mirror 3236 may be expected to remain fixed in the designated instantaneous position, or to move in a pace which allows continuous steering of light to a specific instantaneous FOV, as discussed above in greater detail. Thus, during the dwell time, if signals are received at processor 118 indicating that mirror 3236 deviates from its expected orientation, especially if that deviation is oscillatory, sporadic, random, above a certain frequency, above a certain threshold, etc., then processor 118 may determine that the signals indicative of movement/deviation during the dwell time may be indicative of vibration. Likewise, processor 118 may also determine that the signals indicative of movement/deviation during the instantaneous position scanning time are indicative of an external force applied to the mirror. Optionally, processor 118 may use the signals indicative of movement/deviation during the instantaneous position scanning time as such, without determining their cause. When processor 118 causes mirror 3236 to be moved (e.g., between dwell times at different instantaneous locations), if processor 118 observes signals from the position feedback sensor that are not consistent with signals expected for the proscribed movement, then processor 118 may determine that the inconsistent signals may be associated with vibrational effects. When processor 118 causes mirror 3236 to be moved (e.g., between dwell times at different instantaneous locations), if processor 118 observes signals from the position feedback sensor that are not consistent with signals expected for the proscribed movement, then processor 118 may issue position control signals to at least one actuator of mirror 3236, in response to the signals of the position feedback sensor. It will be clear to a person of skill in the art that such position control signals may also be issued by processor 118 to any other type of light deflector 114, mutatis mutandis.

Figure 32D:
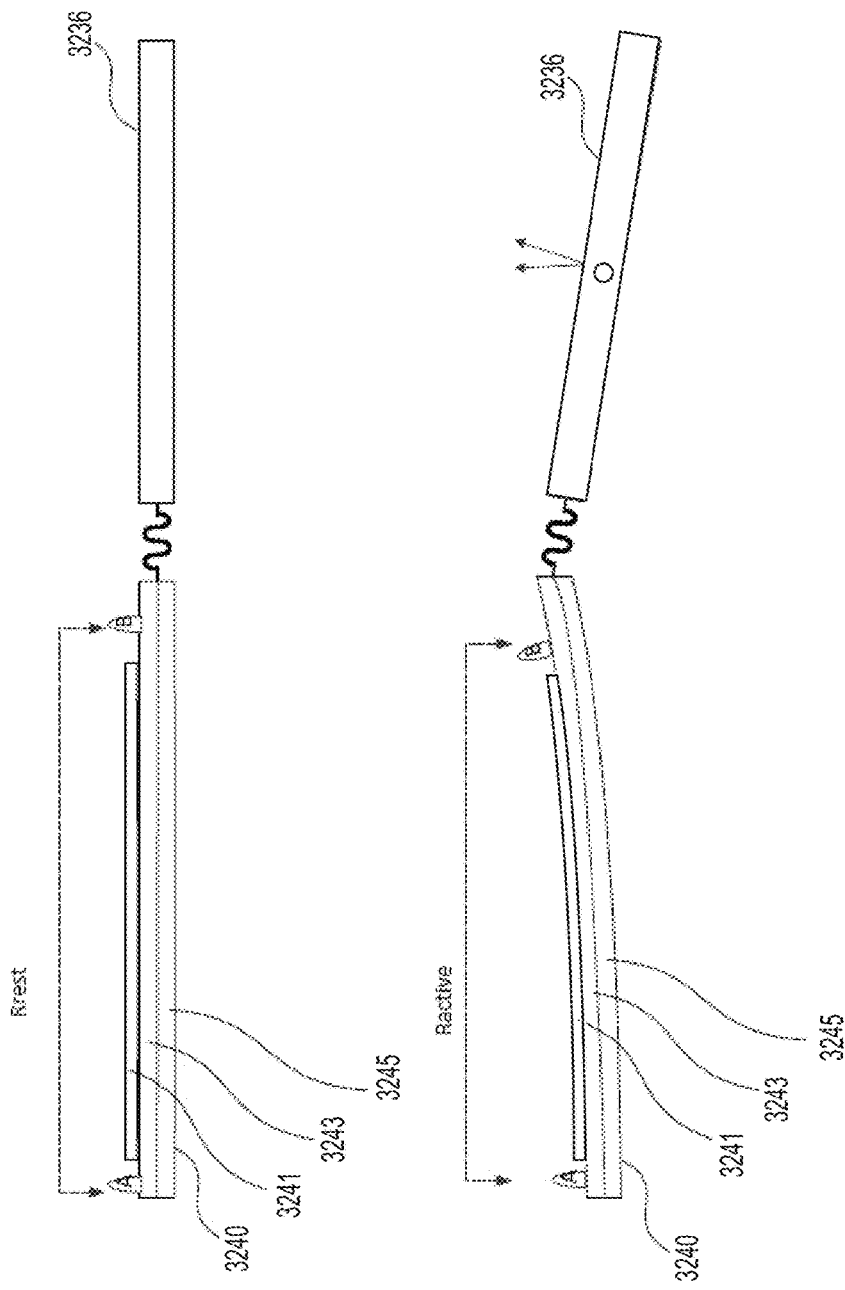

Determining and/or monitoring the position of mirror 3236 may be useful not only to detect vibrations, but may also be useful for countering other causes of unintended mirror movement. For instance, FIG. 32D shows an example actuator-mirror coupling in accordance with certain disclosed embodiments. Actuator 3240 may be made of several layers and may include a piezoelectric layer 3241, a semi conductive layer 3243, and a base layer 3245. The resistivity of the semiconductor layer 3243 may be measured in an active stage (denoted "Ractive" in the diagram) when the mirror is deflected at a certain angular position and compared to the resistivity at a resting state (Rrest). A feedback including Ractive may provide information to measure/determine the actual mirror deflection angle compared to an expected angle. Based on this information, if there is a difference between the expected angle/orientation/position of mirror 3236, then actuator 3240 may be controlled in order to alter the angle/orientation/position of mirror 3236 in conformance with what is expected. The electrical conductivity of the silicon (or other semiconductor) based actuator 3240 may vary in response to mechanical stresses that actuator 3240 experiences. When actuator 3240 is at rest the electrical conductivity exhibited at the two contacts 3240A and 3240B would be Rrest. The piezoelectric material of layer 3241, if activated (e.g., by applying electrical voltage), would exert force on actuator 3240 and cause it to bend. Additionally, vibrations experienced by LIDAR system 100 may result in unintended movement(s) of mirror 3236, which can also cause bending of actuator 3240. Bending of actuator 3240 in response to a mechanical force (whether caused by electrical activation of the piezoelectric layer or whether induced as a result of vibration) may result in a change of the electrical conductivity Ractive exhibited at the two contacts 3240A and 3240B. The difference between Rrest and Ractive may be correlated by a mirror drive (such as mirror driver 3254 of FIG. 32C) into an angular deflection value that serves to close the loop. This method may be used for dynamic tracking of the actual mirror position. And using this information in a feedback loop, processor 118 may cause application of electrical signals (e.g., supply current/voltage) to actuator 3240 to oppose motion caused by vibration.

Figure 32E:
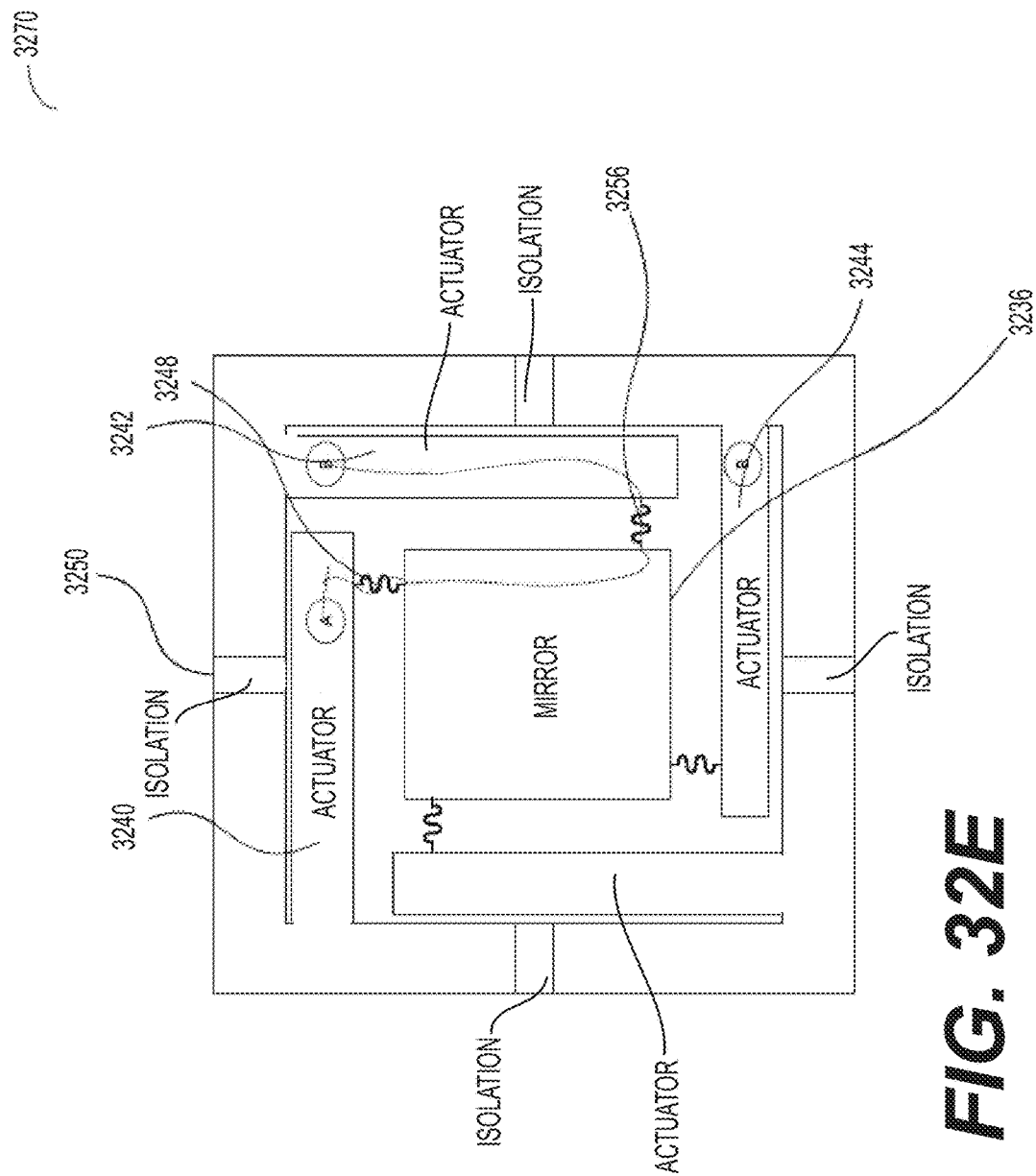
Figure 32F:
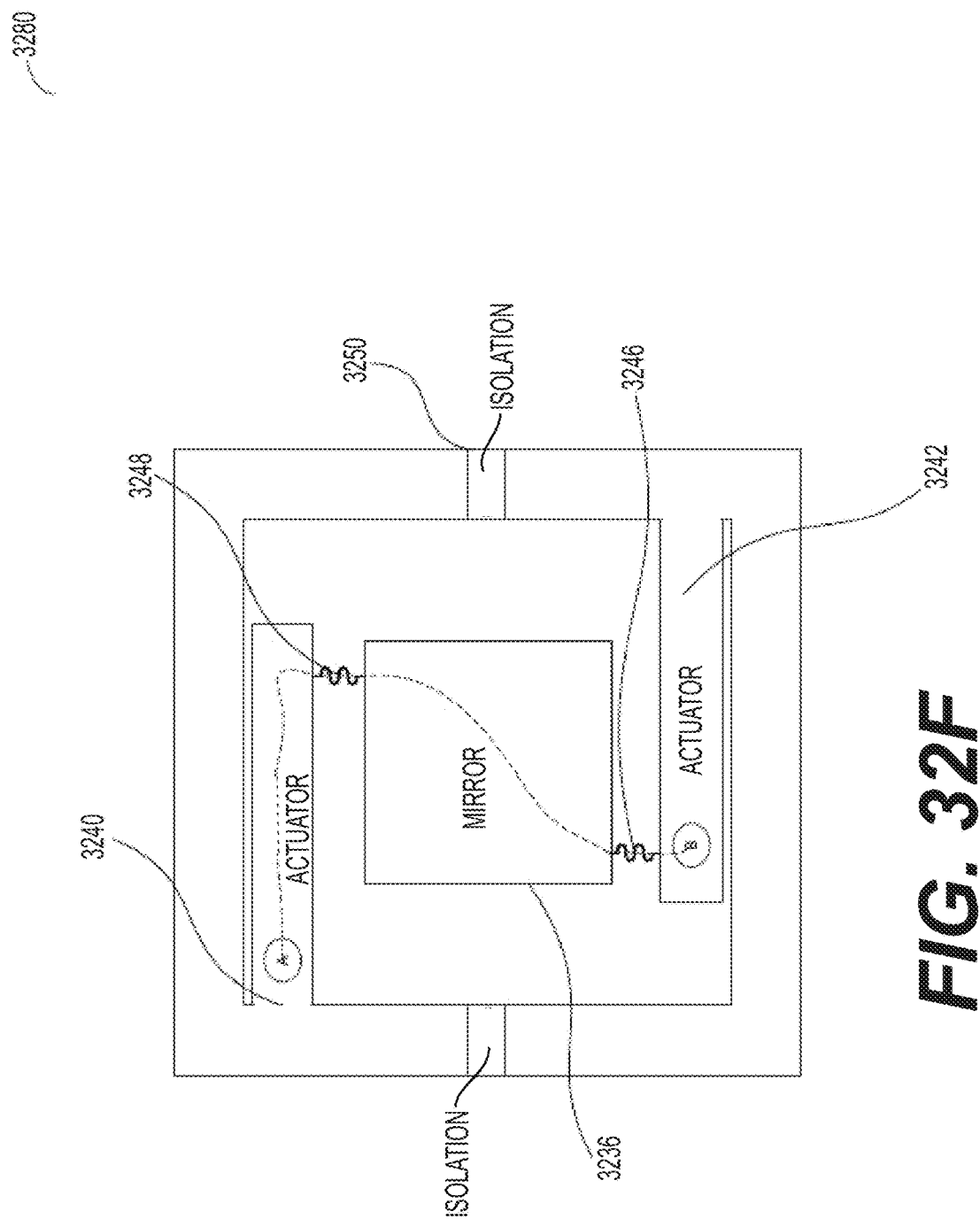

Each of FIG. 32E, which provides a diagrammatic representation of a dual axis mems mirror (3270), FIG. 32F, which provides a diagrammatic representation of a single axis mems mirror (3280), and FIG. 32G, which depicts a round mems mirror (3290), provides an example of a mirror and actuator assembly that may be used to detect movements of the mirror caused by vibration and to counter those movements through an active feedback loop. The mirror and actuator coupling may be configured with various characteristics according to the requirements of a particular application. For example, in some embodiments, the light deflector (e.g., mirror 3236 suspended within an actuator frame) may have a resonance frequency below 1000 Hz. Further, the deflector may include a MEMS mirror array, each of the separate mirrors constituting a light deflector element. In some embodiments, each light deflector may include a single MEMS mirror having a width of at least 4.5 mm. In other embodiments, each light deflector may include a two dimensional array of mirrors, each mirror having a width of at least 2 mm. As noted, upon detection of at least one movement (especially but not limited to movement which is indicative of vibration)—e.g., by monitoring one or more indicators of movement of mirror 3236—processor 118 may control various actuators to counter the movements. Such control may be performed as part of a feedback loop in which control may seek to reduce or eliminate differences between an intended/expected position or movement of mirror 3236 and an observed position/motion/velocity/acceleration of mirror 3236. Reduction or elimination of differences between an intended position/orientation/velocity/acceleration of mirror 3236 and an observed position/orientation/velocity/acceleration of mirror 3236 may be accomplished by driving actuators (e.g., actuators 3240, 3242, 3244, and/or 3246) in a manner that causes mirror 3236 to move opposite to motion imparted by vibration (or by any other force, as discussed above), or to otherwise modify movement characteristics of mirror 3236. By continuously monitoring a position/orientation/velocity/acceleration of mirror 3236 and by driving mirror 3236 toward an intended position/orientation associated with an intended instantaneous position of mirror 3236 (during a scan of the LIDAR FOV) as part of a feedback loop, mirror 3236 may be guided to substantially the intended position/orientation despite the forces applied on the mirror 3236 (e.g. forces caused by vibration).

Alternatively or additionally, processor 118 may control a position of mirror 3236 based on received outputs of one or more sensors, such as sensors 3216, 3218, and/or 3219. In such embodiments, processor 118 may determine adjustments for countering observed vibrations, which may include computing appropriate axis (θ, φ) parameter adjustments to move mirror 3236 to an intended instantaneous position. In some cases, these adjustments may include moving deflector 114 with steering device 3232 in order to compensate for computed acceleration, torque, strain, etc. determined based on outputs from sensors associated with the vehicle itself.

In addition to vibration suppression, LIDAR system 100 may also be capable of sensing and reacting to other movements that may be associated with a platform (e.g., a vehicle) on which LIDAR system 100 is mounted or otherwise associated. For instance, a processor (e.g., processor 118, CPU 3234, etc.) may be further configured to collect data indicative of an inclination of a vehicle (e.g., FIG. 33). Information indicative of the inclination of the vehicle may be provide as an output of one or more accelerometers, one or more three-dimensional accelerometers, an inertial measurement unit (IMU), etc. Based on this information, adjustments may be made to one or more aspects of LIDAR system 100. For example, in some embodiments, one or more mechanical actuators may be activated in order to rotate LIDAR system 100 (or one or more of its components, including deflector 114; a light projector assembly including the light projector, one or more light deflectors, and light sensors; or any other components of LIDAR system 100 that at least in part affect a location of the LIDAR FOV relative to a particular scene) in a manner that counters changes in the vehicle inclination. Such countering of vehicle inclination may result in the LIDAR FOV, for example, remaining substantially fixed (at least for a certain period of time) relative to a scene despite changes in vehicle inclination. In other cases, the LIDAR FOV may vary relative to the scene, but by less than an amount normally associated with a particular change in vehicle inclination. As an example, as the vehicle is approaching the crest of a hill (e.g., a negative inflection), the LIDAR system (or one or more of its components) may be moved such that the LIDAR FOV moves downward relative to the scene. Such a movement may enable the LIDAR FOV to overlap with less sky and more road. Similarly, as the vehicle approaches an upward inflection (e.g., a positive inflection) in a road, the LIDAR system (or one or more of its components) may be moved such that the LIDAR FOV moves upward relative to the scene. Such a movement may enable the LIDAR FOV to overlap with a region of the scene including more distant portions of the road past the upward inflection.

As an illustrative example, FIG. 33 shows two similar scenes including vehicle 110 with LIDAR system 100 traveling downhill in the direction of a truck 3302. In scene A, LIDAR system 100 has a fixed field of view 120A with minimal and maximal elevation points such that truck 3302 is not detected. In this case, LIDAR system 100 would not detect truck 3302 until a later time (e.g., when vehicle passes the positive inflection point in the road causing the LIDAR FOV to move upward relative to the scene, thereby overlapping with a region including truck 3302). In scene B, however, LIDAR system 100 has a dynamic field of view 120B which may be positioned relative to the scene by adjusting an aiming direction of LIDAR system 100 or one or more of its components, e.g., as discussed above. In this example, the inclination of the vehicle as it drives down the hill may be detected, and the dynamic FOV 120B may be adjusted such that it overlaps not with the bottom of the hill (as in scene A), but rather with a region farther along the road, where truck 3302 resides. As a result, LIDAR system 100 may detect truck 3302 earlier than it would without dynamic FOV capabilities. Clearly, processor 118 may react to various positions of vehicle 110, and driving downhill was provided as one example scenario only.

The processing unit 108 (including CPU 3234, for example) may accomplish such adjustments in a variety of ways. For instance, CPU 3234 may implement a constant feedback loop, from data collected by feedback various sensors associated with the vehicle in order to cause changes in a position of LIDAR system 100. Alternatively or additionally, deflector 114 (e.g., mirror 3236) may be steered in a manner that offsets changes in vehicle inclination.

A method for suppressing vibrations of a LIDAR system for use on a vehicle may include controlling at least one light source in a manner enabling light flux of light from the at least one light source to vary over scans of a field of view. The method further comprises controlling positioning of at least one light deflector to deflect light from the at least one light source in order to scan the field of view. The method obtains data indicative of vibrations of the vehicle. Base on that obtained data, the method adjusts the positioning of the at least one light deflector for compensating for the vibrations of the vehicle. And the method further implements the determined adjustments to the positioning of the at least one light deflector to thereby suppress on the at least one light deflector, at least part of an influence of the vibrations of the vehicle on the scanning of the field of view.

Figure 34:
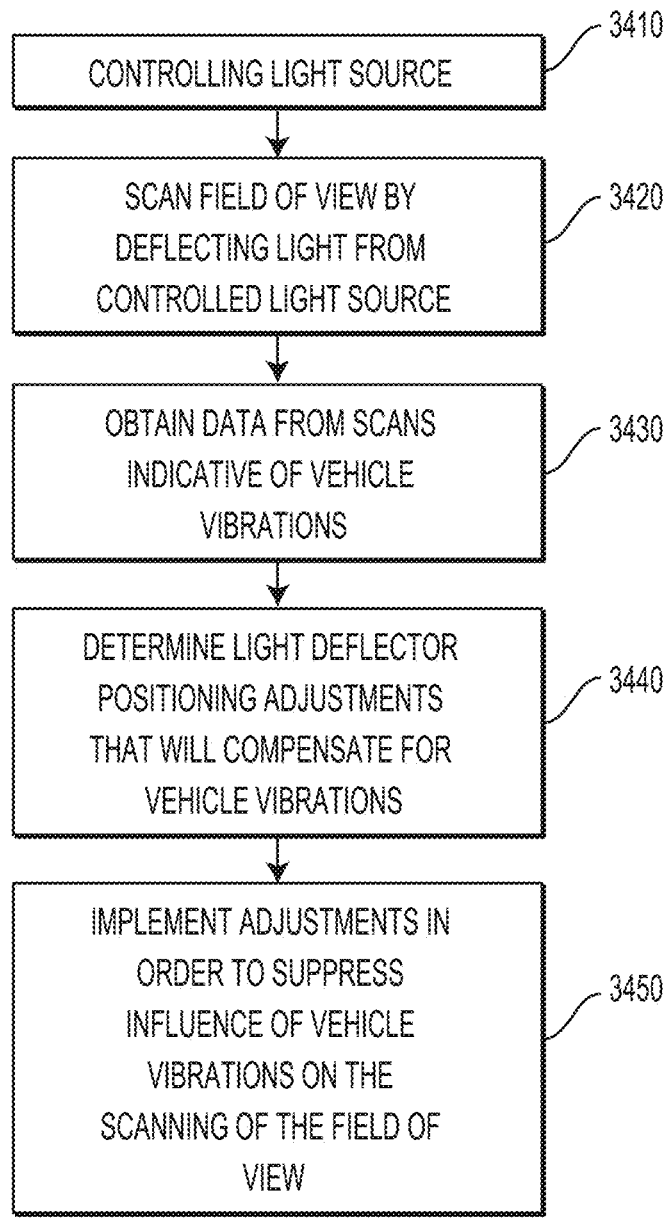
FIG. 34 is a flow diagram illustrating the method utilizing the vehicle vibration compensation system.

Turning now to FIG. 34, it is further understood that a method for suppressing vibrations of a LIDAR configured for use on a vehicle may include controlling at least one light source in a manner enabling light flux of light from the at least one light source to vary over scans of a field of view (step 3410). In addition, in some embodiments, the light deflector 114 has a resonance frequency below 1000 Hz. In step 3420, the field of view may be scanned by controlling, or steering, the light deflector positioning to deflect light from the at least one light source. In step 3430, data indicative of vibrations of the vehicle, where several examples of collected data are explained above, may be obtained. Then, in step 3440, based on the obtained data, adjustments are determined for the positioning of the at least one light deflector for compensating for the vibrations of the vehicle. And step 3450 indicates the method may implement the determined adjustments through positioning of the at least one light deflector in order to suppress or eliminate effects of vibrations on one or more scans of the LIDAR FOV. Additional embodiments may further comprise determining an instantaneous angular position of the light deflector, and altering the instantaneous angular position of the light deflector to compensate for a difference between the intended or required position and the instantaneous angular position.

Steerable High Energy Beam

To aid in the adoption of LIDAR systems by the automotive industry, there may be an interest in LIDAR systems that exhibit capabilities similar to certain aspects of human sight. For example, human sight provides information (e.g., through the parallax offered by two eyes viewing a scene from slightly different positions) enabling an individual to perceive a scene in three dimensions. In a road situation, such capability may enable a person to perceive an undulating road, uphill road segment, downhill road segment, pitching, yawing, speed bumpers, tight turns, berms, steep pathways (e.g., underground garage), etc., as depth in three dimensions. In addition, human sight may enable an individual to determine and/or predict which regions in a field of view (or within a scene) may require more attention such that the individual can focus on those areas. For example, when driving on a street, regions where pedestrians and vehicles reside may require more attention than the sky line, or regions of the individual's field of view or regions in the scene that do not include objects that may interact with, e.g., the individual's own vehicle. Thus, in response to determining the presence of such objects in a scene (or an environment of the individual), the individual may direct more attention to the regions in which those object reside. It may be desirable to provide LIDAR systems with similar capabilities.

In a LIDAR system consistent with embodiments of the present disclosure, the system may generate a 3-D reconstruction of objects in the environment within the FOV of the LIDAR system. The disclosed LIDAR systems may include a "gazing" capability that mimics to some extent human's sight behavior where the active field of view is shifted towards specific surrounding regions according to environmental, road features as well as vehicle motion vectors in three degrees of freedom (3DOF) up to six degrees of freedom (6DOF). This capability may enable the LIDAR system to provide increased sensing performance across a large field of view by adaptively partitioning the FOV, for example, into segments that are allocated with different levels of quality of service (QoS).

As noted above, LIDAR system 100 may include at least one processor 118, e.g., within a processing unit 108, that may control at least one light source 112 to cause the light source 112 to generate higher or lower light flux in certain regions of the FOV. For example, in response to a level of interest associated with a particular region of the FOV, more or less light may be provided to that particular region commensurate with the level of interest. Portions of field of view 120 that have lower interest (e.g., such as regions away from the detected cars shown in FIG. 5B) may be allocated with lower levels of light flux or even no light flux at all. In other areas of higher interest, however, (e.g., such as regions in which objects are detected, like the regions where cars are detected as shown in FIG. 5B) may be allocated with higher light flux levels. Such allocations may avoid expenditure of light energy and detection resources in areas of lower interest, but may enhance resolution and other performance characteristics in areas of greater interest. A higher or lower light flux may be generated by altering a light source parameter (e.g., pulse timing, pulse length, pulse size, pulse amplitude, pulse frequency, and/or the like) associated with the first portion such that light flux directed to the first portion is greater than light flux directed to at least one other portion of the field of view. Alternatively, processor 118 may alter a light source parameter associated with the first portion such that light flux directed to the first portion is lesser than light flux directed to at least one other portion of the field of view. Flux differences may also be achieved by modifying deflector parameters (e.g., scanning pattern, steering rate), and by changing synchronization of light source and deflector.

Figure 35A:
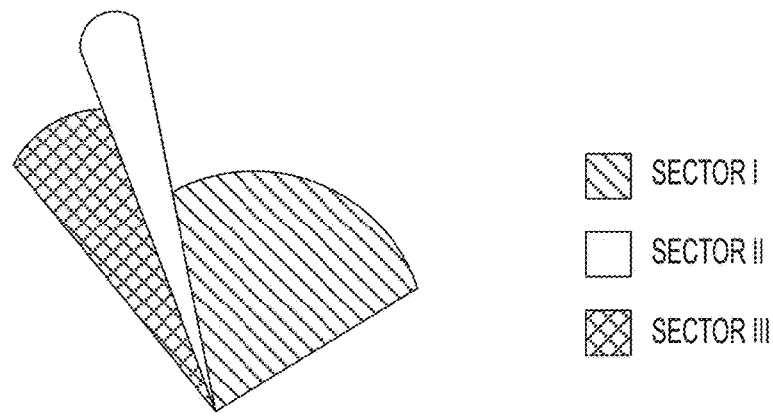
FIG. 35A-35D are diagrammatic representations of different detection ranges in different sectors, consistent with presently disclosed embodiments.

Light allocation can also be based on a predetermined allocation pattern across the FOV. FIG. 35A illustrates an example of FOV over a plane perpendicular to a detection plane of the sensor, e.g. seen from a birds eye view for a horizontally pointing LIDAR system. In the example shown in FIG. 35A, the FOV is divided into three sectors, but more or fewer sectors may be achieved. Each sector may have a certain light flux directed to it. As a result, each sector may exhibit a corresponding signal to noise distinctiveness balance, and/or a corresponding detection range associated with the amount of light provided to each sector. Among the three sectors depicted in FIG. 35A, sector II has been allocated with a greater light flux than either sector I or sector III. As a result, the LIDAR system may be capable of detecting similar objects at a more distant range at sector II than at either sector I or sector III. Similarly, as shown, sector III has been allocated with more light than sector I, but less light than sector II. As a result, sector III may enable detection of objects at a range greater than that of sector I, but less than sector II. Of course, other light allocation patterns may be possible. For example, in some embodiments, sector II may be allocated with the greatest light flux, and sector I and sector III may each be allocated with substantially the same amount of light flux. The greater level of light flux directed to the second sector may at least partially compensate for laser signal loss over the distance between the light source and a target of interest. Moreover, the greater light flux directed to the second sector may also enhance the resolution that the system may be capable of providing in that sector and, in turn, may enhance the quality of service in that sector and for the LIDAR system as a whole. The enhanced resolution may be enhanced temporal resolution, enhanced spatial resolution, or a combination of both.

Not only may different levels of light flux be allocated to the different sectors of the FOV, but the shape and size of the sectors may also vary. For example, in some embodiments, sector II (e.g., the sector of highest light allocation in the FIG. 35A embodiment) may occupy a central region of the FOV, as shown in the illustrative example shown in FIG. 35A. In other words, as described above, the FOV may be divided into multiple sub-regions. Processor 118 may designate any region/sub-region in the FOV as sector II (or any other sector). Thus, light allocation caused by the processor 118 may include supplying a certain light flux level to one or more sub-regions included within a particular sector. Furthermore, each sector/subsector contains at least one pixel. Systems and methods of the present disclosure may collect data on a pixel-by-pixel basis. To scan the FOV, processor 118 may control at least one light deflector (e.g., light deflector 114 of FIG. 1A, deflector 114A and/or deflector 114B of FIG. 2A, and/or one-way deflector 214 of FIG. 2B) in order to scan the field of view. For example, processor 118 may cause mechanical movement of the at least one light deflector to scan the field of view. Alternatively or concurrently, processor 118 may induce a piezoelectric or thermoelectrical change in the at least one deflector to scan the field of view.

Figure 35B:
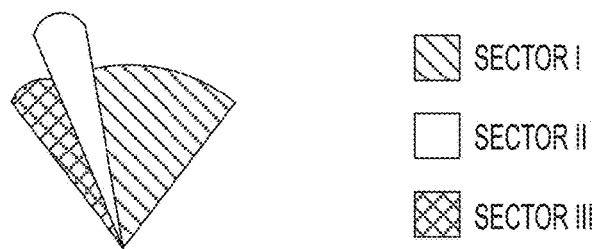
Figure 35C:
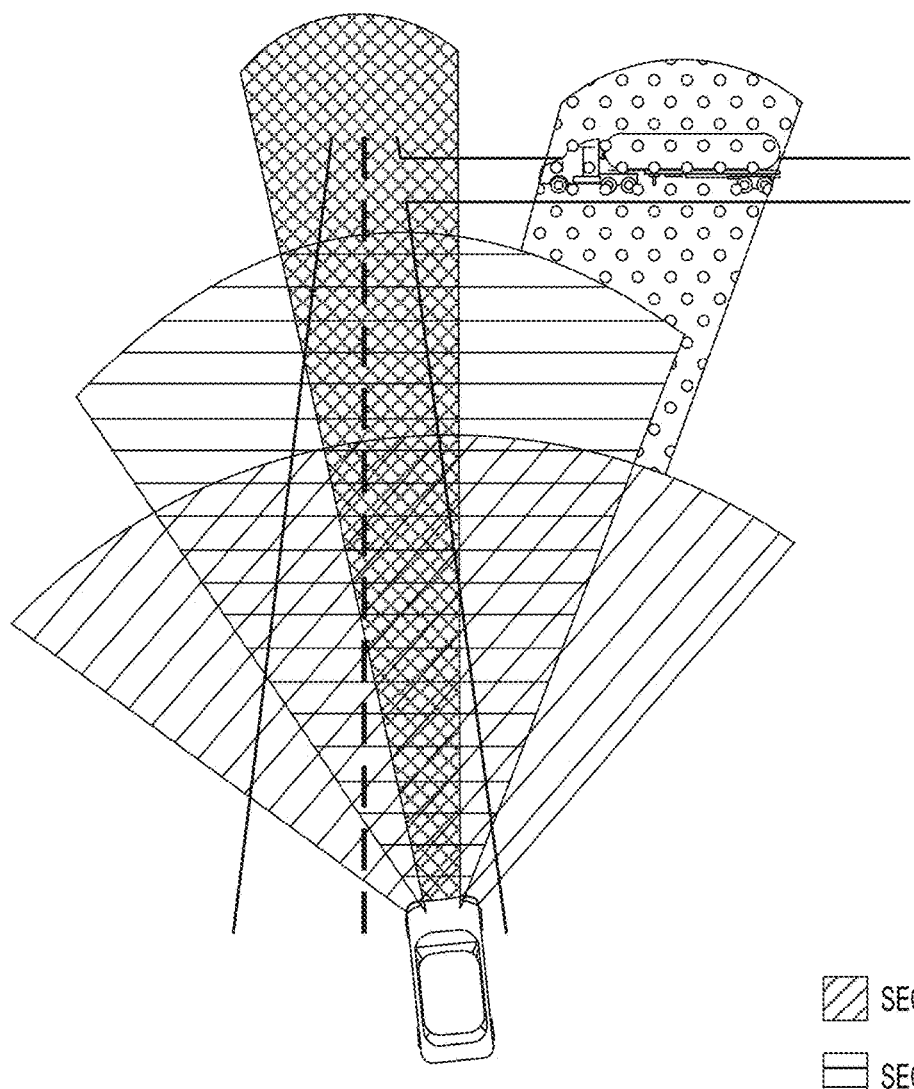

The sectors associated with the LIDAR system may include any suitable size or any orientation or different solid angles. For example, in some embodiments, each sector may have a similar size (e.g., may occupy a similar number of similarly sized FOV sub-regions, such as a similar number of "pixels", a similar number of "beam spots"). In other cases, however, the sectors may have different sizes. For example, FIG. 35C illustrates different sectors with different sizes and shapes.

The sectors may also be located within the LIDAR FOV with various different orientations. In the illustrative example shown in FIG. 35A, each sector occupies a full height of the LIDAR FOV, such that the LIDAR FOV is divided vertically into three sectors (I, II, and III) each occupying the full height of the LIDAR FOV. This is not necessarily the case in all embodiments, however. Rather, because processor 118 may assign any FOV sub-region or group of sub-regions to a particular sector, such sectors may constitute vertical slices of the FOV (FIG. 35A), horizontal slices of the FOV, or may take on various other shapes or patterns, as discussed in more detail below with respect to FIG. 36. Herein, for example, a sub-region may be an instantaneous FOV, which can be moved within the FOV by altering the instantaneous position of at least one deflector.

In addition, the size, shape, and/or range associated with each sector may change in different scanning cycles. For example, after acquiring a frame over a scanning cycle of the FOV, light allocations to the various sectors may be changed, the number of sectors may be changed, the size of the sectors may be changed, and/or the relative position of any of the sectors within the FOV may be changed. In an illustrative example shown in in FIG. 35B, the light allocated to sector III in a later scan of the FOV has been changed relative to the amount of light allocated to sector III in an earlier scan of the FOV, as represented by FIG. 35A. As a result, sector III in the FIG. 35B scan may be associated with less light flux and, therefore, a shorter detection range, lower signal to noise ratio, etc. as compared to sector III in the FIG. 35A scan. Consequently, as illustrated in FIG. 35B, sector I and sector III may have a same detection range.

Furthermore, the position, size, shape, and/or light flux associated with different sectors may be varied over multiple scanning cycles according to a predetermined pattern, based on detection feedback, based on instructions or information provided by the host or another external system, or based on any other suitable basis. In some embodiments, for example, the relative position of a particular sector may be changed within the FOV across two or more scanning cycles of the FOV. As a result, the particular sector, such as sector II, for example, may be made to scan the FOV across multiple scans (for example, in a raster pattern, in a sweeping motion, etc.). Additionally, an amount of light flux provided to the available sectors may be varied from scan to scan. For example, compared to a scan associated FIG. 35A, the scan represented by FIG. 35B shows that the amount of light allocated to sector III has been reduced. As a result, a detection range of sector III may also be changed (e.g., reduced). Such changes in light allocation may be made by processor 118 in response to a predetermined sector scanning scheme, based on feedback (e.g., sensor output relating to vehicle motion, LIDAR detections of one or more objects of interest, other sensors/detectors, etc.). Consequently, as illustrated in FIG. 35B, processor 118 may determine a same detection range for two different sectors in the FOV.

In one example, referring to FIG. 1A, the LIDAR system 100 may be deployed on a vehicle 110, and the processing unit 108 may select a predefined scanning pattern for a particular sector (such as sector II) based on the driving mode of the vehicle. (e.g., pitching, yawing, rolling, stopping, etc.). As the vehicle moves, the processing unit 108 may cause sector II to move from scan to scan in a sweeping motion. Such changes in position may enable the LIDAR system to effectively detect target objects (including those located at a range or ranges of interest). Additionally, the sweeping of a particular sector across multiple scans of the LIDAR FOV may enable the system to track one or more targets of interest across a plurality of scans. For example, if from scan to scan, the vehicle continues to move relative to a detected object, by moving the location of a detection sector relative to the FOV, (e.g., moving sector II in a sweeping motion across a plurality of scans), the LIDAR system may keep track of one or more target objects as the vehicle moves relative to those objects.

Another illustrative example may include situations in which the vehicle 110 changes direction (e.g., making a left or right turns, making a U-turn, parking, etc.). In such cases, scanning of a particular sector across the FOV over a plurality of scan cycles may enable continuous tracking of a target object that would otherwise not be detected (or perhaps not be detected with a desired resolution) without scanning of a particular sector across the FOV. While such scanning may occur according to a predetermined pattern (e.g., regular sweeping of the relative location in the FOV at a predetermined rate, location, etc.), the scanning of a particular sector may also be based on any other suitable basis. For example, in one embodiment, the scanning may be based on feedback associated with vehicle motion, as mentioned above. As the vehicle moves, sensors on the vehicle (e.g., speed sensors, accelerometers, etc.) may monitor the speed and orientation of the vehicle. In turn, the location of a particular sector in the FOV may be changed from one scanning cycle to the next to at least partially account for the sensed motion of the vehicle. In one example, the sector location may be changed such that a detected object (e.g., another vehicle, a pedestrian, etc.) may be tracked at least partially within a particular sector (e.g., sector II of FIG. 35A or 35B or sector IV of FIG. 35C) over the course of a plurality of FOV scanning cycles.

Figure 35D:
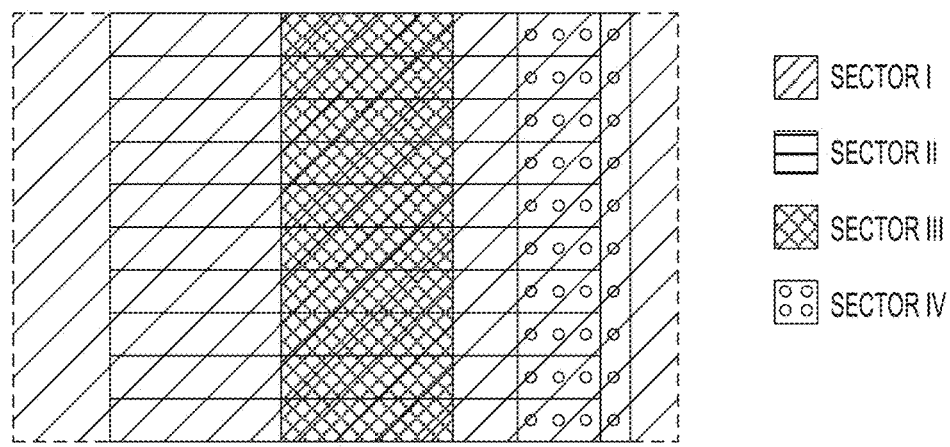

Additionally, the relative movement of the sector within the FOV may be based on other types of feedback. For example, if an object of interest detected within a particular sector of the FOV (e.g., sector II), and that object is determined to be moving relative to the LIDAR system, the relative motion of the object of interest may be taken into account when assigning a subsequent location of a particular sector within the FOV during one or more subsequent scans. For instance, as illustrated in FIG. 35C, if a target vehicle is crossing in front of the host vehicle including the LIDAR system and is crossing from right to left, the relative location of a particular sector (e.g., sector IV) may be swept across the FOV over multiple scans in order to track the motion of the target vehicle as it moves from right to left across the FOV. As a result, the location of sector IV may also move right to left across the FOV over multiple scans of the FOV. The rate at which the sector is moved to new locations in the FOV (e.g., the angular change of the sector location from scan to scan) may depend on the observed relative movement characteristics of the target vehicle (e.g., its relative velocity, acceleration, distance from the host vehicle, etc.). Correspondingly, FIG. 35D illustrates the FOV divided into sectors corresponding to the sectors in FIG. 35C.

Alternatively and concurrently, the relative movement of the sector within the FOV may be a sweeping pattern. Similar to the light projecting mode of a "lighthouse", a particular sector can move across the FOV or a portion of the FOV to detect any moving object and track them.

Alternatively and concurrently, processor 118 may cause the dimensions of the center-of-frame a particular sector in a FOV (e.g. sector II) be reduced, based on the speed of the host vehicle, in order to increase detection range ahead at the expense of wider scene understanding.

Sweeping a sector (or more than one sector) across the FOV from scan to scan may be done continuously (e.g., where the angular change of the sector is constant from scan to scan). Sweeping or one or more sectors may also be done in a non-continuous manner (e.g., the angular change of the sector from scan to scan is not constant).

One or more sectors of a FOV may also be designated by processor 118 to receive little or no light flux. For example, if a dead zone is detected (e.g., one with few or no objects of interest) or a nearby object blocks a portion of FOV, there may be less need for additional information from that zone during one or more subsequent scans. As a result, a low light flux sector or even a no light flux sector may be assigned to overlap with the dead zone during one or more subsequent scans of the FOV. In that way, the energy usage/energy requirements of the LIDAR system may be reduced. Additionally or alternatively, light energy that would have been available for allocation to the dead zone sector(s) may be freed up for reallocation to one or more other sectors of higher interest.

Figure 36:
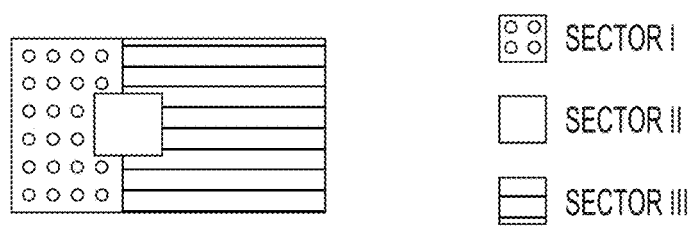
FIG. 36 is diagram illustrating different sectors in a field of view, consistent with presently disclosed embodiments.

As noted above, the FOV may be divided into one or more sectors, each being made of any one or more sub-regions with the FOV. Such sector divisions may include vertical sections of the FOV, horizontal sections of the FOV, or may include various other patterns. In one embodiment, as shown in FIG. 36, the FOV may be divided into three sectors (sector I, sector II, and sector III). Sectors I and III, in this embodiment, include vertical slices of the FOV. Sector II, however, is assigned to sub-regions of the FOV that are completely surrounded by the first and third sectors. The location of sector II may be in a similar relative position within the FOV from scan to scan or may be moved. In some embodiments, sector II may be caused to sweep in multiple consecutive scanning cycles such that in each scanning cycle at least a part of the second sector is located below a horizon line or level. For example, when driving on an undulating road and an object of interest (e.g., a pothole, another vehicle, a pedestrian, etc.) is detected on the road, it may be desirable to allocate more light flux toward the region of the object of interest to increase the resolution in that area and to improve capabilities in determining the characteristics of the object. Thus, in the manner described above, processor 118 may cause sector II to track the object of interest from scan to scan based on sensed vehicle orientation, relative motion of the object of interest, or any other criteria. Thus, as the vehicle on which the LIDAR system resides drives down a hill, sector II may be caused to move upward from scan to scan to maintain overlap with the object of interest on the road ahead. Similarly, when the host vehicle drives up a hill, the location of sector II in the FOV may be caused to move downward from scan to scan. As a result, despite the undulating road, the location of sector II (e.g., a high light flux allocation zone) within the FOV may move up and down such that sector II overlaps with a region of the FOV substantially below a horizon line.

Figure 37:
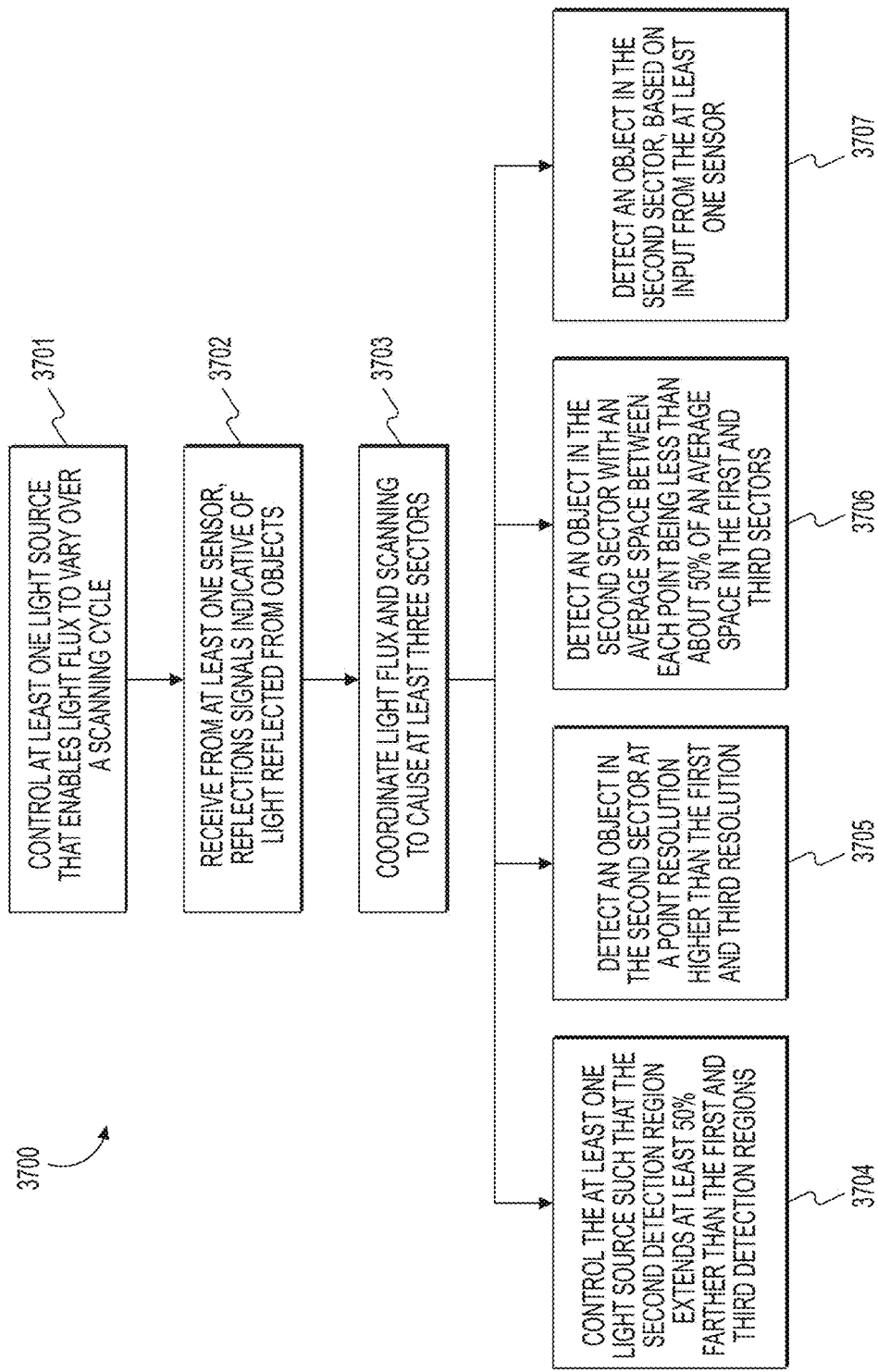
FIG. 37 is a flow chart illustrating an example of a method for detecting objects in a region of interest using a LIDAR system, consistent with presently disclosed embodiments.

FIG. 37 is a flowchart of example method 3700 for detecting objects using a LIDAR system. In step 3701, a processor (e.g., processor 118) controls at least one light source (e.g., light source 112) in a manner enabling light flux of light from at least one light source to vary over a scanning cycle of a field of view (e.g., field of view 120), wherein the light projected from the at least one light source is directed to at least one deflector (e.g., light deflector 114) to scan the field of view. In step 3702, a processor (e.g., processor 118) receives from at least one sensor (e.g., sensor 116), reflections signals indicative of light reflected from objects in the field of view (e.g., field of view 120). In step 3703, a processor (e.g., processor 118) coordinates light flux and scanning in a manner to cause at least three sectors to occur in a scanning cycle. Processor 118 may cause similar or different levels of light flux to be supplied to each of the at least three sectors. In some examples, the light flux supplied to the second sector may be greater than the light flux supplied to the first and third sectors. Processor 118 may also cause different point resolutions with respect to one or more of the available sectors. A "point resolution" may refer to a resolution of a point cloud map in which every point of one or more points of the point cloud map corresponds to a location in the object or a location on a face thereof. That is, if the average space between each point is reduced and a number of points increase, the point resolution may be higher. And, the higher the point resolution becomes, the more accurate the information may be (e.g., spatial information, temporal information, etc.).

In step 3704, a processor (e.g., processor 118) may control the at least one light source (e.g., light source 112) such that the light flux supplied to a first sector is substantially the same as the light flux supplied to a third sector, and a light flux level supplied to a second sector is greater than the flux supplied to the first and third regions. As a result, a detection range associated with the second sector may be extended by at least 50% farther than a detection range associated with the first sector or a detection range associate with the third sector. In step 3705, a processor (e.g., processor 118) may detect, based on input from at least one sensor (e.g., sensor 116), an object in the second sector at a point resolution that is higher than a point resolution provided by either the first sector or the third sector. In step 3706, a processor (e.g., processor 118) may detect an object in the second sector using a second point resolution having an average space between each point that is less than about 50% of an average space between points in point resolutions associated with the first and the third sectors. For example, when more accurate information in the second sector is desired, the at least one processor may enhance the point resolution by reducing the average space between each point in the point resolution associated with the second sector. In step 3707, a processor (e.g., processor 118) may detect an object in the second sector, based on input from the at least one sensor (e.g., sensor 116).

Parallel Capturing of Lidar Frames at Differing Rates

Figure 38:
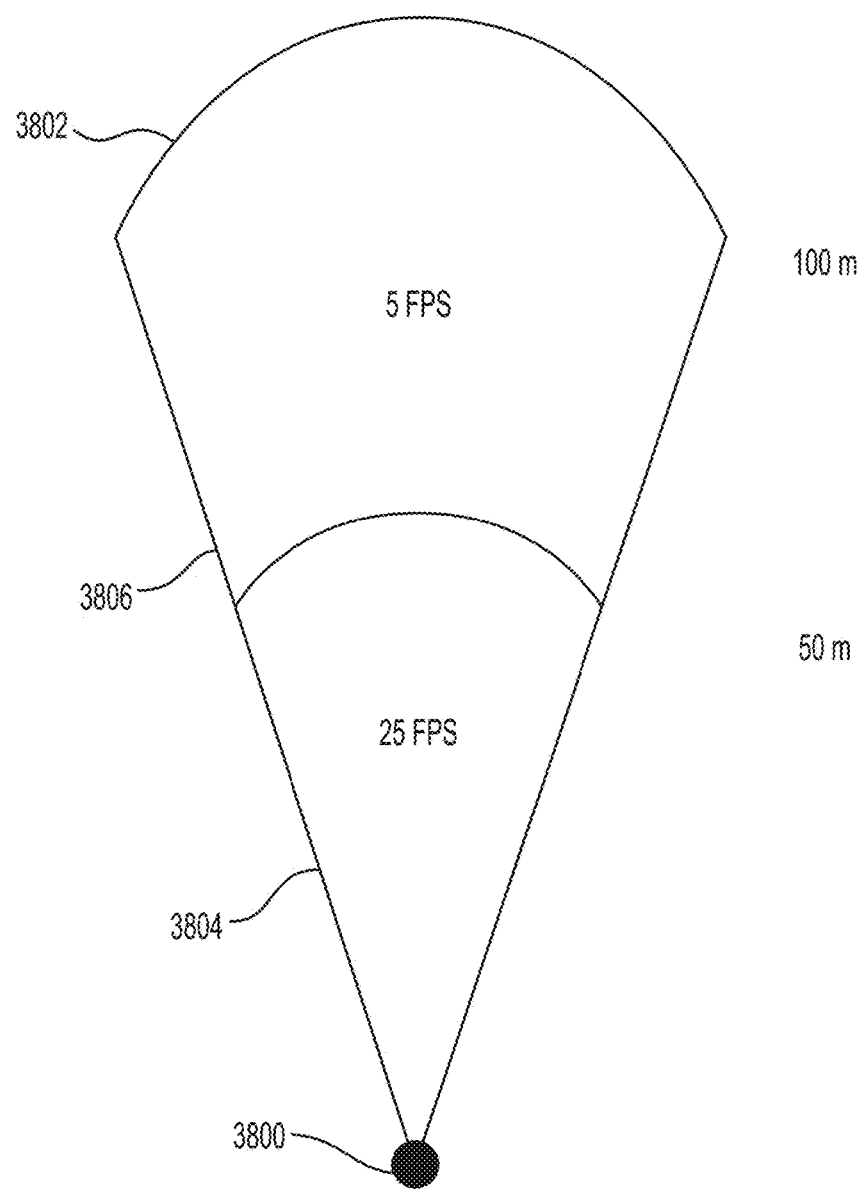
FIG. 38 is a diagrammatic illustration of a field of view of a LIDAR system consistent with embodiments of the present disclosure.

FIG. 38 is a diagram of illustrating a field of view 3802 of a LIDAR system 3800. LIDAR system 3800 may operate as described above with reference to LIDAR system 100. In some embodiments the LIDAR system 3800 includes one or more processors configured to control one or more light sources in a manner enabling light flux to vary over a number of scans of a field of view 3802. Each scan of the field of view may result in a captured frame. Each frame may include sensor output information for each of the regions of the field of view to which light was directed and collected during the scan. The field of view may include a near-field portion 3804 and a far-field portion 3806. In some cases, captured frames may target detection of objects in the near-field portion. In other cases, captured frames may target detection of objects in the far-field portion. As discussed in more detail below, scans directed to the near field (and the associated captured frames) may involve lower light flux and faster scan rates, as compared to scans directed to the far-field portion of the FOV (and the associated captured frames).

As previously noted, the processor may control one or more light deflectors to deflect light from the light source to scan the field of view 3802. For example, controller 118 may control the movement of the one or more deflectors to provide a desired scan rate. The processor may implement a near-field scanning rate for frames associated with scanning cycles that cover the near-field portion 3804 of the field of view. Processor 118 may implement a far-field scanning rate for frames associated with scanning cycles that cover the far-field portion 3806 of the field of view.

During one or more scans for capturing one or more corresponding frames, processor 118 may control the light source in a manner enabling detection of objects in the near-field portion 3804 of the field of view. For example, processor 118 may cause the light source to emit a certain amount of light flux, emit light at a certain power level, etc., appropriate for detection of objects in the near field (e.g., objects less than 50 meters away, objects less than 100 meters away, etc.). At other times, processor 118 may control the light source such that light is emitted in a manner enabling detection of objects in the far-field portion 3806. For example, in capturing frames associated with detection in the far-field, the light source may be caused to supply higher amounts of flux, light at a higher power level, etc. in order to increase the LIDAR sensitivity to objects at a greater distance, to objects having a lower reflectivity, etc. It should be noted that such increases in light flux may also enable detection of objects in the near field as well (including objects of lower reflectivity relative to other objects).

In some cases, such as when LIDAR system 3800 is associated with a vehicle, when an object is nearer to the LIDAR system, there may be less time to react to a detected object than if the object is farther away. Therefore, in some embodiments, the near-field scanning rate may be greater than a scanning rate employed for acquiring frames that concentrate on the far-field, where reaction times may be longer. In some embodiments the near-field scanning rate may at least five times faster than the far-field scanning rate. For example, in one example embodiment, the scanning rate for the near-field portion 3802 of the field of view may be 25 frames per second, and the scanning rate for the far-field portion 3804 of the field of view may be 5 frames per second. A faster scanning rate may provide increased feedback in a short time period, and may allow the LIDAR system to detect near-field objects with enough time to react to the detected near-field objects (e.g., reactions by an autonomous or semi-autonomous driving system; driver assist system; navigation system, etc.). Far-field detection may require a larger amount of light energy than near-field detection (e.g., as a result of higher light flux levels, higher light source power levels, etc.). Adjusting the scanning rate of the far-field detection (e.g., by decreasing the FOV scan rate relative to other scans that may focus on near-field detections) may offer a benefit of reducing power consumption of the LIDAR system, as compared to scans of the far-field region at higher scanning rates.

Objects in the near-field portion of the LIDAR field of view may include objects located relatively close to the LIDAR system. For example, in some embodiments, near-field objects may refer to objects located less than 50 meters from the LIDAR system. Similarly, far-field objects may include objects located at a distance greater than near-field objects. For example, in some embodiments, far-field objects may include objects located more than 100 meters from the LIDAR system. In some embodiments, objects in the near-field portion of the field of view may be less than 100 meters from the LIDAR system. In some embodiments objects in the far-field portion of the field of view may be more than 50 meters from the LIDAR system. For example, in one illustrative embodiment, LIDAR system 3800 may detect in a first frame a first car parked at a curb in the near-field, e.g., 30 meters away. LIDAR system 3800 may also detect in a second frame the first car parked at a curb and a second car in the lane ahead in the far-field, e.g., 200 meters away. In other words, in some embodiments, the far-field frames may provide near-field information in addition to far-field information, such that the rate of information received about the near-field may not be interrupted.

In some embodiments, the detection distance of the LIDAR system associated with the far-field frames may extend at least 50% farther than the detection distance associated with the near-field frames. In some embodiments the detection distance associated with the near-field and far-field frames may be adjustable, for example, by adjusting light flux/light energy levels. A far-field detection may require more power, as compared to near-field detection, as more light may be required to gather object information from the far-field. As noted above, the increased power consumption from far-field detection may be mitigated by reducing the frame scan rate for frame acquisitions associated with far-field detection.

The processor may control one or more of the light deflectors to be located in a number of different instantaneous positions during a scanning cycle. In some embodiments, at least one light deflector 114 and at least one light source 112 may be coordinated such that the light deflector is in a position to deflect a portion of the light beam generated by the light source to an object in the field of view and to deflect the reflection from the object toward one or more sensors. In some embodiments, one or more light sources may be aimed towards a common area in the light deflector such that the processor may control the deflector to project the light from the light sources towards one or more independent regions of the field of view.

Figure 39:
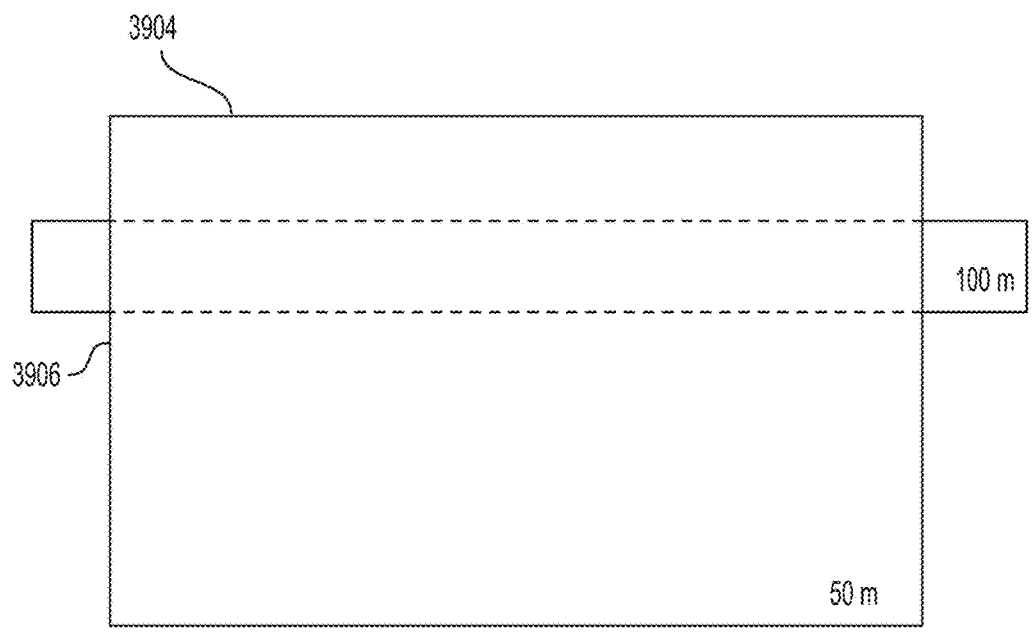
FIG. 39 is a diagrammatic illustration of an exemplary field of view of a LIDAR system consistent with embodiments of the present disclosure.

In some embodiments, the processor may control the one or more light sources to provide a particular spatial light distribution in a given frame and different spatial light distribution in one or more subsequent frames. Additionally, the processor may control the light source to use a certain light-distribution scheme for the near-field frames and a different light-distribution scheme for the far-field frames. For example, as shown in FIG. 39, light may be emitted toward an area in the far-field 3906 located near the horizon according to a far-field light-distribution scheme. And less light may be emitted toward the horizon in the near-field 3904 according to a near-field light-distribution scheme. By focusing emitted light on the far-field horizon, the LIDAR system may detect an object in the far-field, while saving resources to scan greater portions of the near-field for objects. Information on the nature, size, or other properties of an object in the far-field may not need to be determined or detected until a detected objection is at a closer distance relative to the LIDAR system.

In some embodiments, the processor may receive information from one or more sensors associated with a frame to detect object(s) located in the far-field. In some embodiments, in a certain frame, the processor may receive information from a sensor indicating one or more objects are located in the far-field and/or one or more objects are located in the near-field portion of the field of view.

In some embodiments, the resolution of acquired frames associated with the far-field may be lower than a resolution of frames associated with the near-field. While various expressions of such resolution may be possible, in one example, the average spacing between points in the near-field frames may be less than about 75% of the average spacing between points in the far-field frames. It is noted that a similar differentiation scheme between frames may be used, mutatis mutandis, where high-resolution frames are acquired at a first frame rate, and low-resolution frames are acquired at a second, higher, frame rate.

In some embodiments, the near-field scanning rate and/or far-field scanning rate may be implemented depending on the driving mode of a vehicle containing the LIDAR system. For example, a vehicle driving in a city may benefit from an emphasis on near-field scanning as compared to a vehicle driving on a rural road. In other embodiments, the near-field scanning rate and/or far-field scanning rate may be implemented depending on vehicle speed. For example, as vehicle speed slows, the scanning rates associated with either or both of the far-field and the near-field may be reduced. Similarly, the scanning rates associated with either or both of the far-field and the near-field may be increased as vehicle speed increases.

Figure 40A:
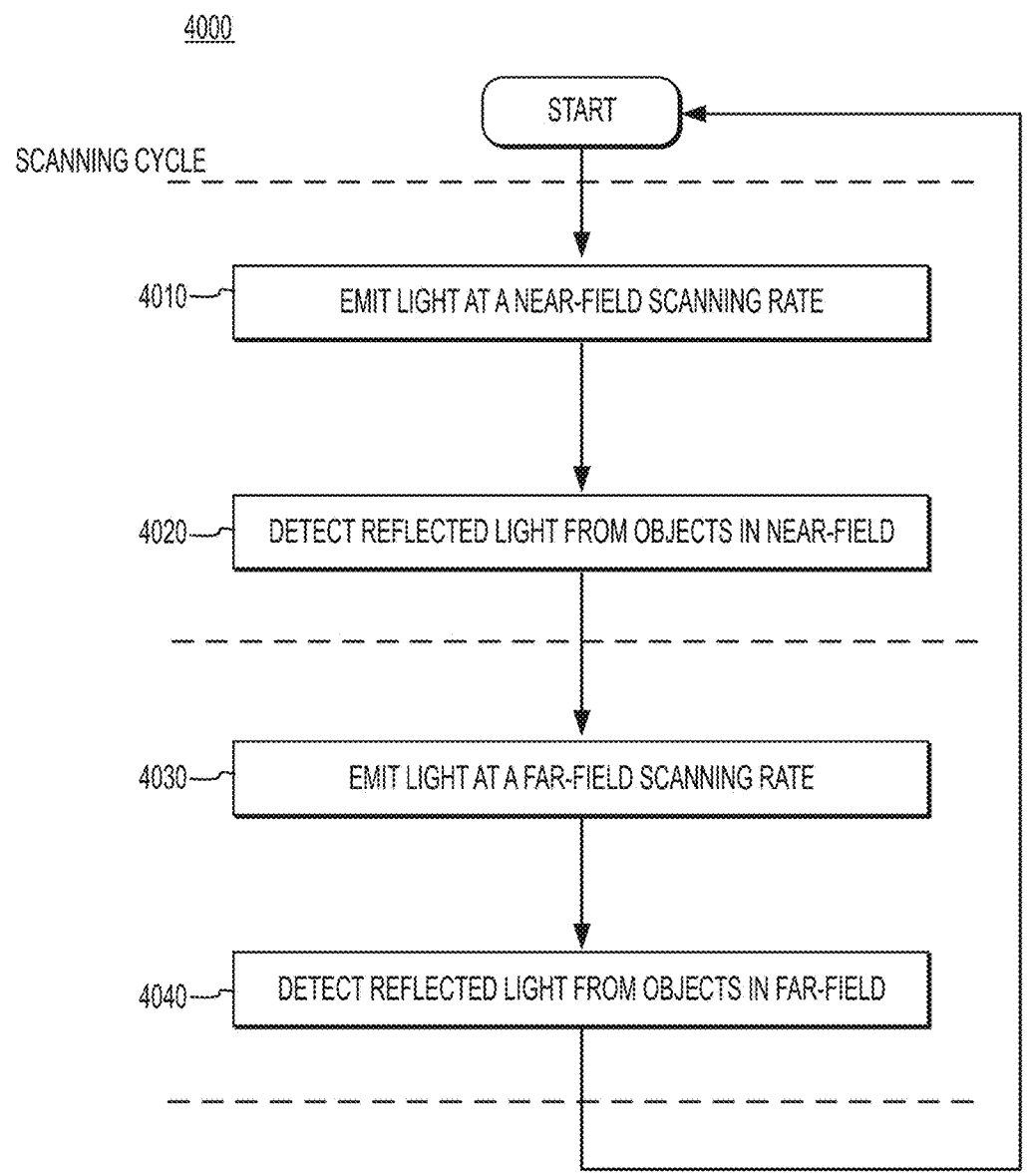
FIGS. 40A and 40B are flow charts of an exemplary implementation of a scanning process, consistent with embodiments of the present disclosure.

FIG. 40A is a flow chart of an exemplary process 4000 for emitting light from a LIDAR system. In step 4010, a light source emits light to one or more areas of the near-field portion of the field of view. If an object exists in the near-field, light may be reflected off the object and detected by one or more sensors of the LIDAR system in step 4020. The combination of steps 4010 and 4020 may form one scanning cycle. In some embodiments, the sequence of steps 4010 and 4020 may be repeated one or more times as part of a single scanning cycle.

At the beginning of the next scanning cycle, at step 4030, light may be emitted from the light source at the far-field scanning rate. If an object exists in the far-field, light may be reflected off the object and detected by one or more sensors of the LIDAR system in step 4040. The combination of steps 4030 and 4040 may form another scanning cycle. In some embodiments, the sequence of steps 4030 and 4040 may be repeated one or more times as part of a single scanning cycle. After Steps 4010-4040 are completed, the sequence of scanning cycles may start over from step 4010.

Figure 40B:
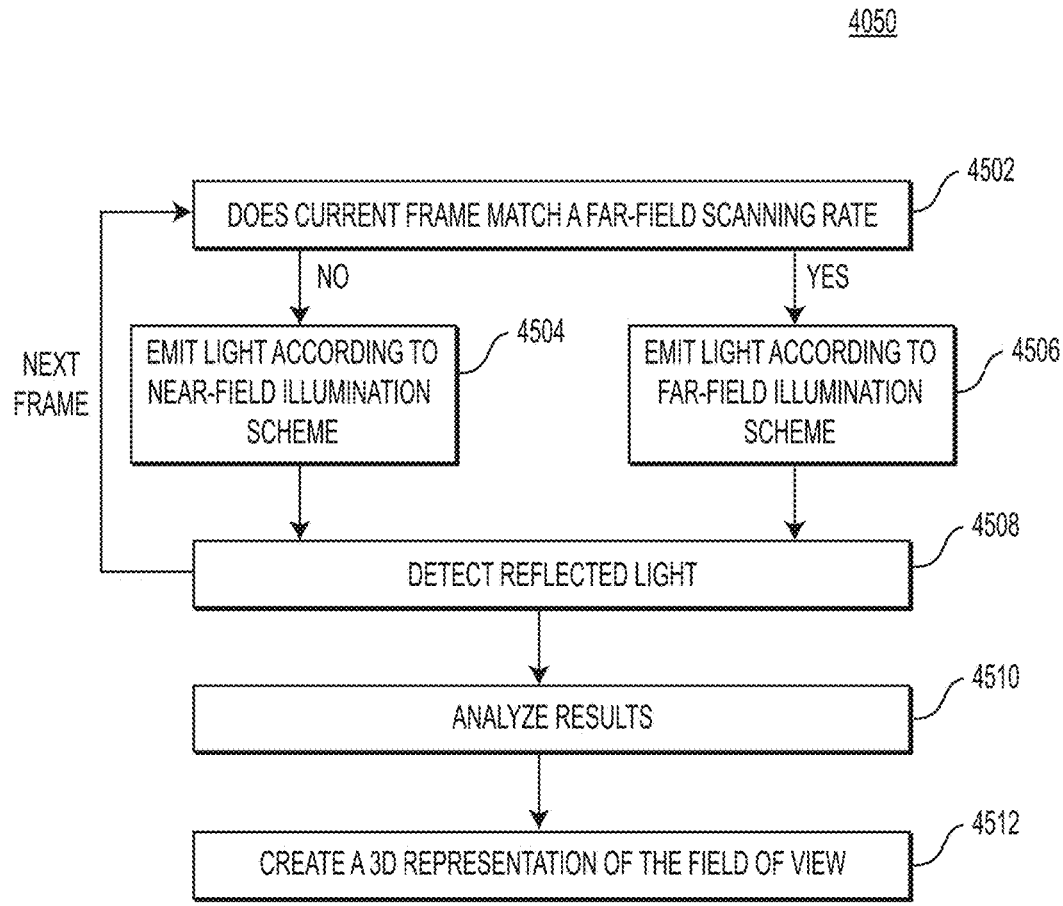

FIG. 40B is a flow chart of another exemplary process for emitting light from LIDAR system 100. At step 4502, processor 118 may determine whether a current FOV frame matches or is otherwise designated with a scan rate designated as a far-field scanning rate. If yes, then at step 4506, processor 118 may control light source 112 and deflector 114 according to a far-field illumination scheme. If no, then at step 4504, processor 118 may control light source 112 and deflector 114 according to a near-field illumination scheme. At step 4508, reflected light may be acquired. At step 4510, the detected light may be analyzed, and at step 4512, a 3-D depth map representation may be generated for the FOV based on the detected light reflections.

Dynamic Mode of Operation Based on Driving Environment

In a vehicle having a LIDAR system consistent with embodiments of the present disclosure, driving environments may change throughout the course of a drive. For example, the vehicle may begin in an urban (or suburban) environment and move to a rural environment during a trip. Other driving environments might include parking lots, traffic jams, tunnels, junctions, bridges, interstates or highways, and so on. Based on various indicators of the environment (or based on direct input to the system), LIDAR systems consistent with embodiments of the present disclosure may adjust one or more properties of a scan of a field of view to account for the environment. For example, the LIDAR systems may adjust an instantaneous detection distance, a spatial resolution, a temporal resolution, a signal-to-noise ratio, flux distribution across the FOV, frame rate, a size of the field of view, aspect ratio of the field of view, one or more pulse-transmission schemes, or the like.

Figure 41A:
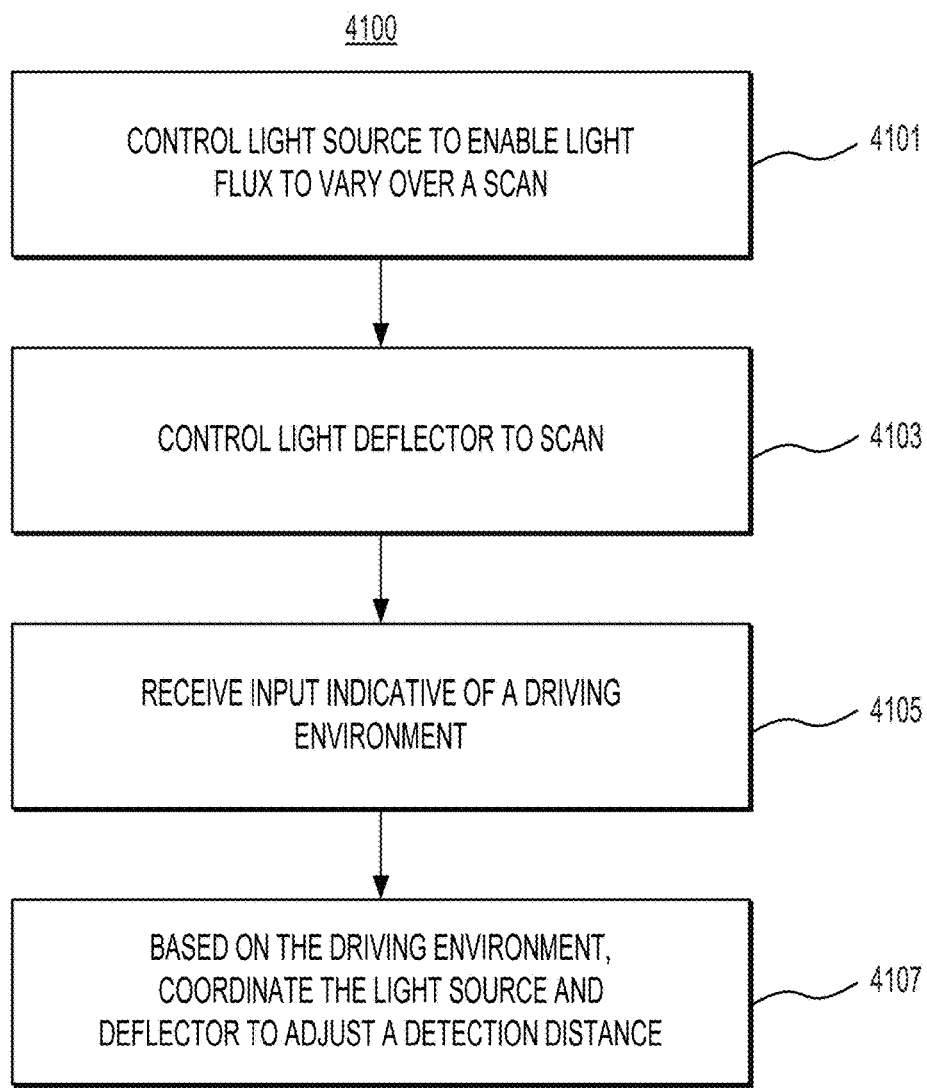
FIG. 41A is a flowchart illustrating an example method for detecting objects in a path of a vehicle using LIDAR consistent with some embodiments of the present disclosure.

Systems and methods of the present disclosure may thus allow for adjustment of one or more properties of a field-of-view scan, for example, in response to a determined driving environment. FIG. 41A illustrates an example method 4100 for altering detection distance in a LIDAR system. Although method 4100 of FIG. 41A adjusts detection distance, other properties, such as those discussed above, may additionally or alternatively be adjusted. Method 4100 may be performed by at least one processor (e.g., processor 118 of processing unit 108 of LIDAR system 100 as depicted in FIG. 1A and/or two processors 118 of processing unit 108 of the LIDAR system depicted in FIG. 2A).

Figure 42A:
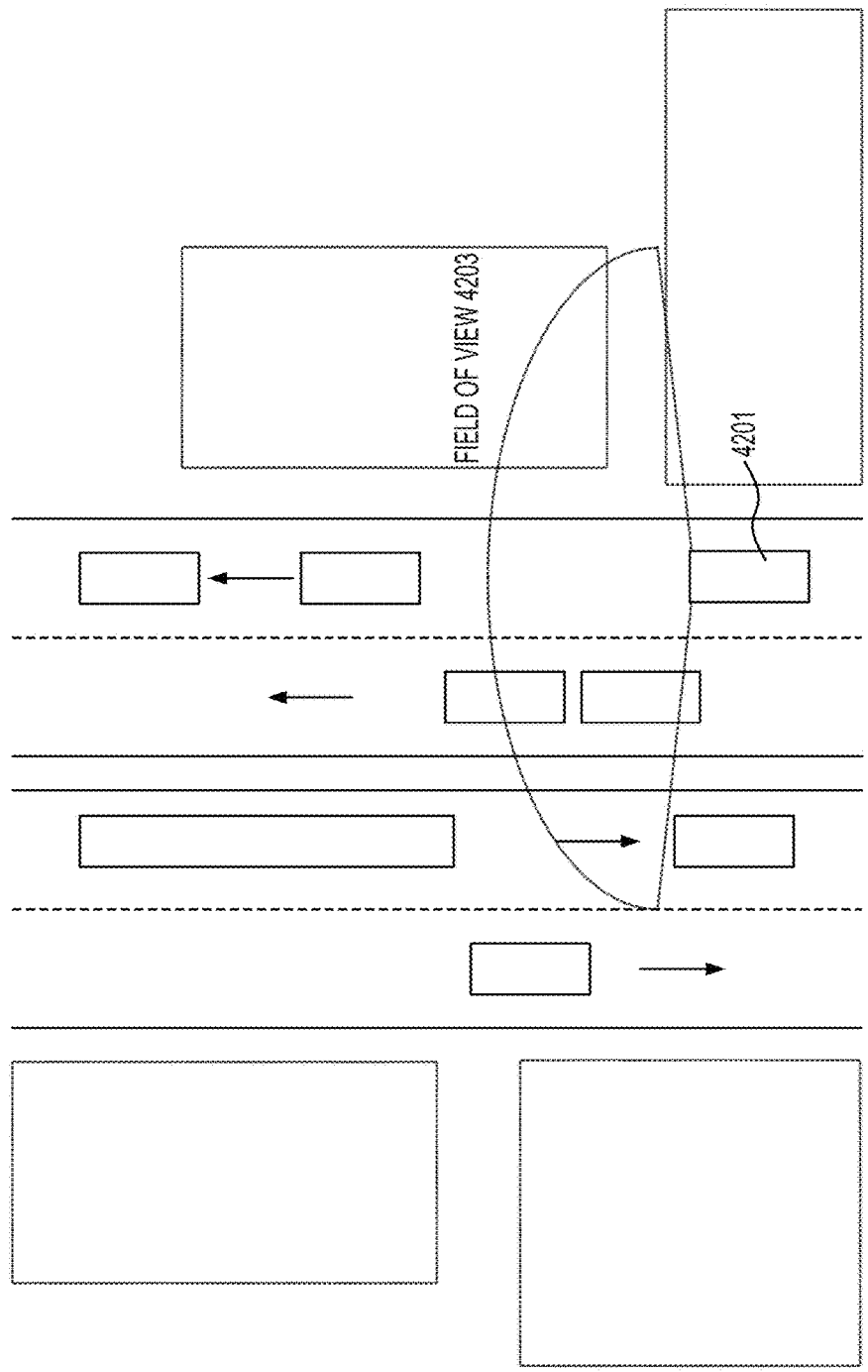
FIG. 42A is a diagram illustrating an example of a vehicle in an urban environment consistent with some embodiments of the present disclosure.
Figure 42B:
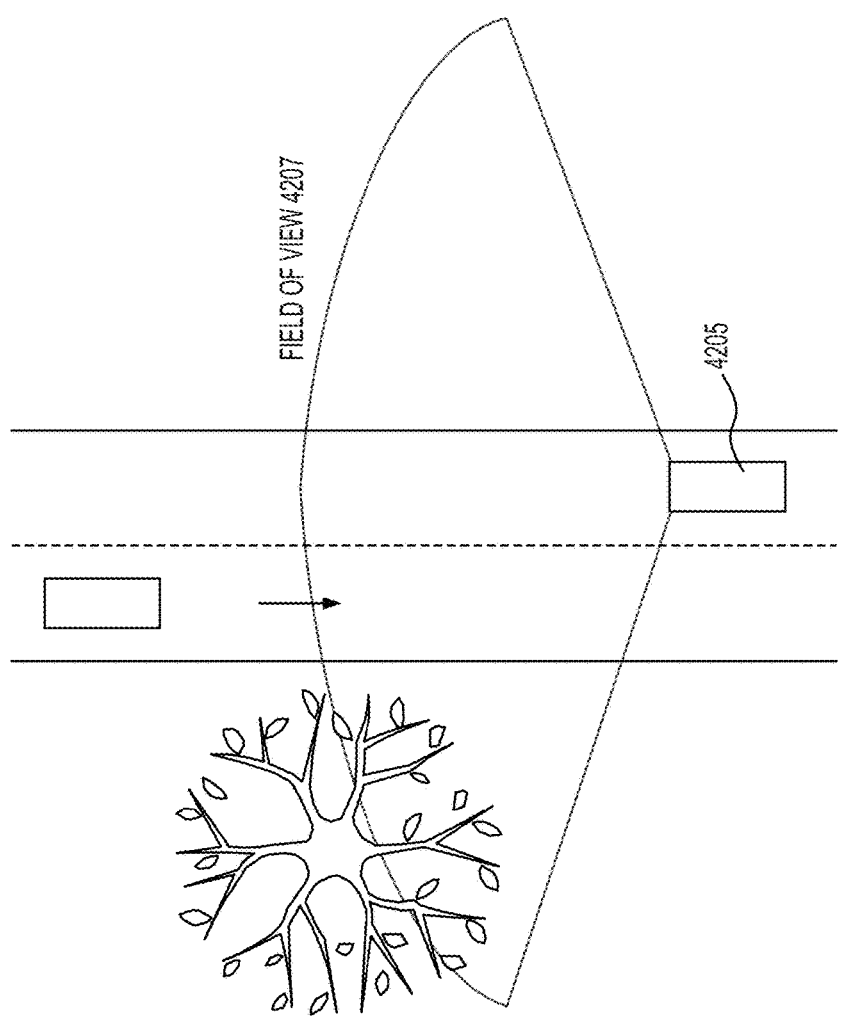
FIG. 42B is a diagram illustrating an example of a vehicle in a rural environment consistent with some embodiments of the present disclosure.
Figure 42C:
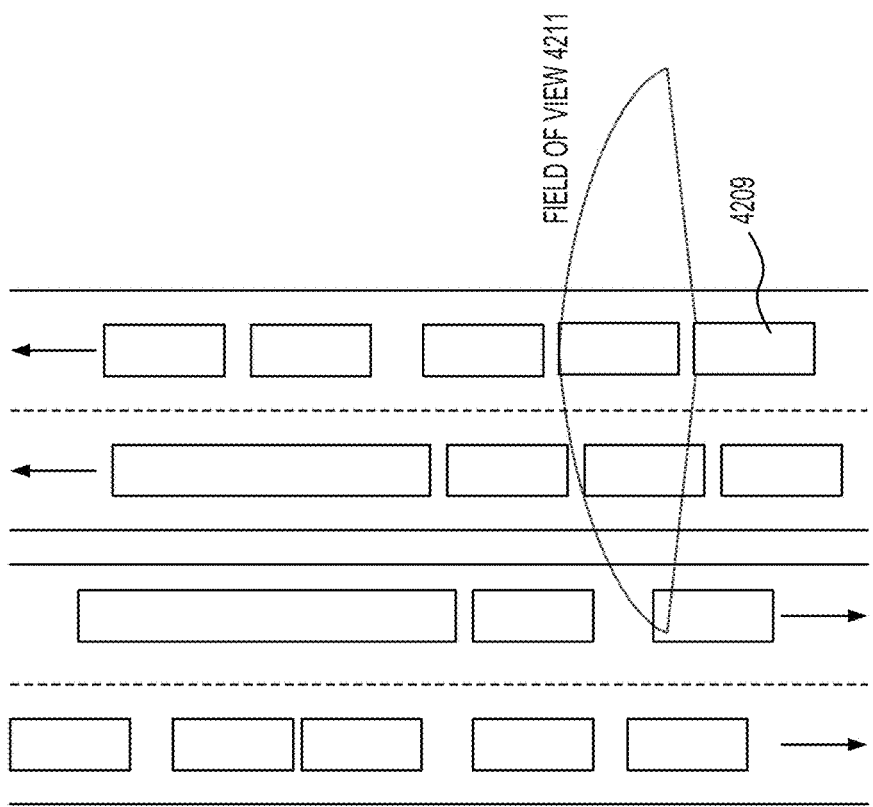
FIG. 42C is a diagram illustrating an example of a vehicle in a traffic jam consistent with some embodiments of the present disclosure.
Figure 42D:
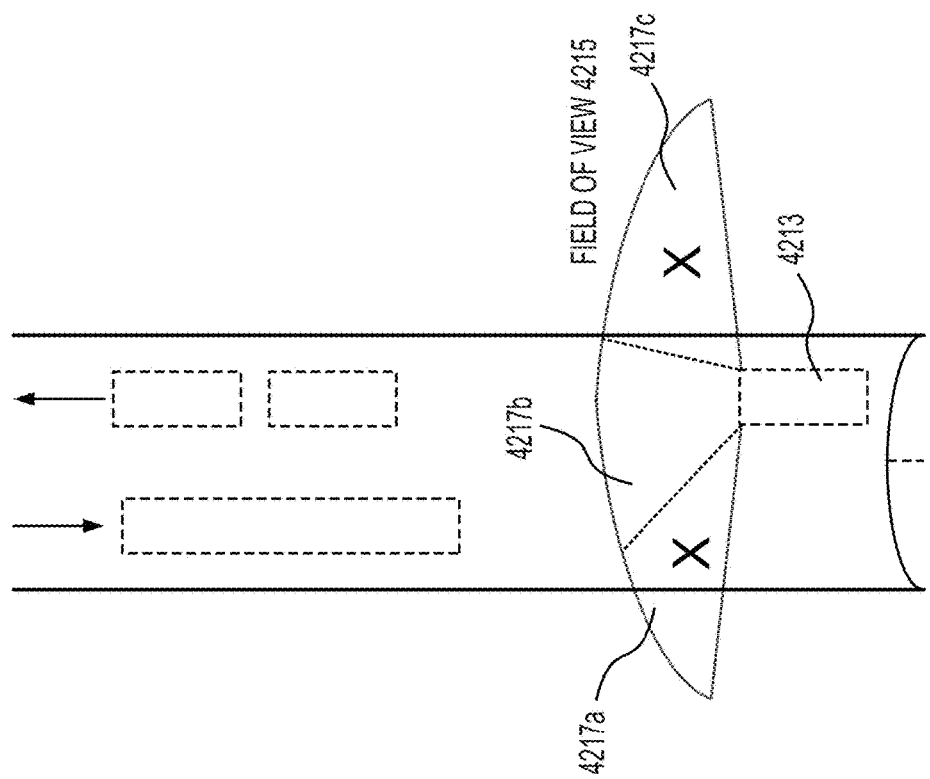
FIG. 42D is a diagram illustrating an example of a vehicle in a tunnel consistent with some embodiments of the present disclosure.
Figure 42E:
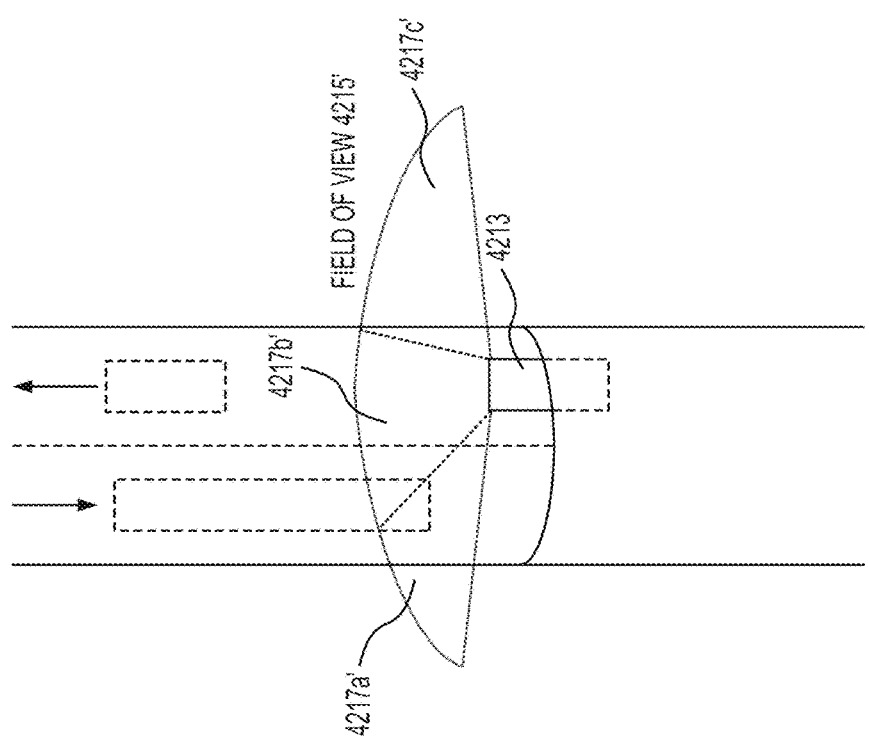
FIG. 42E is a diagram illustrating an example of a vehicle exiting a tunnel consistent with some embodiments of the present disclosure.
Figure 43:
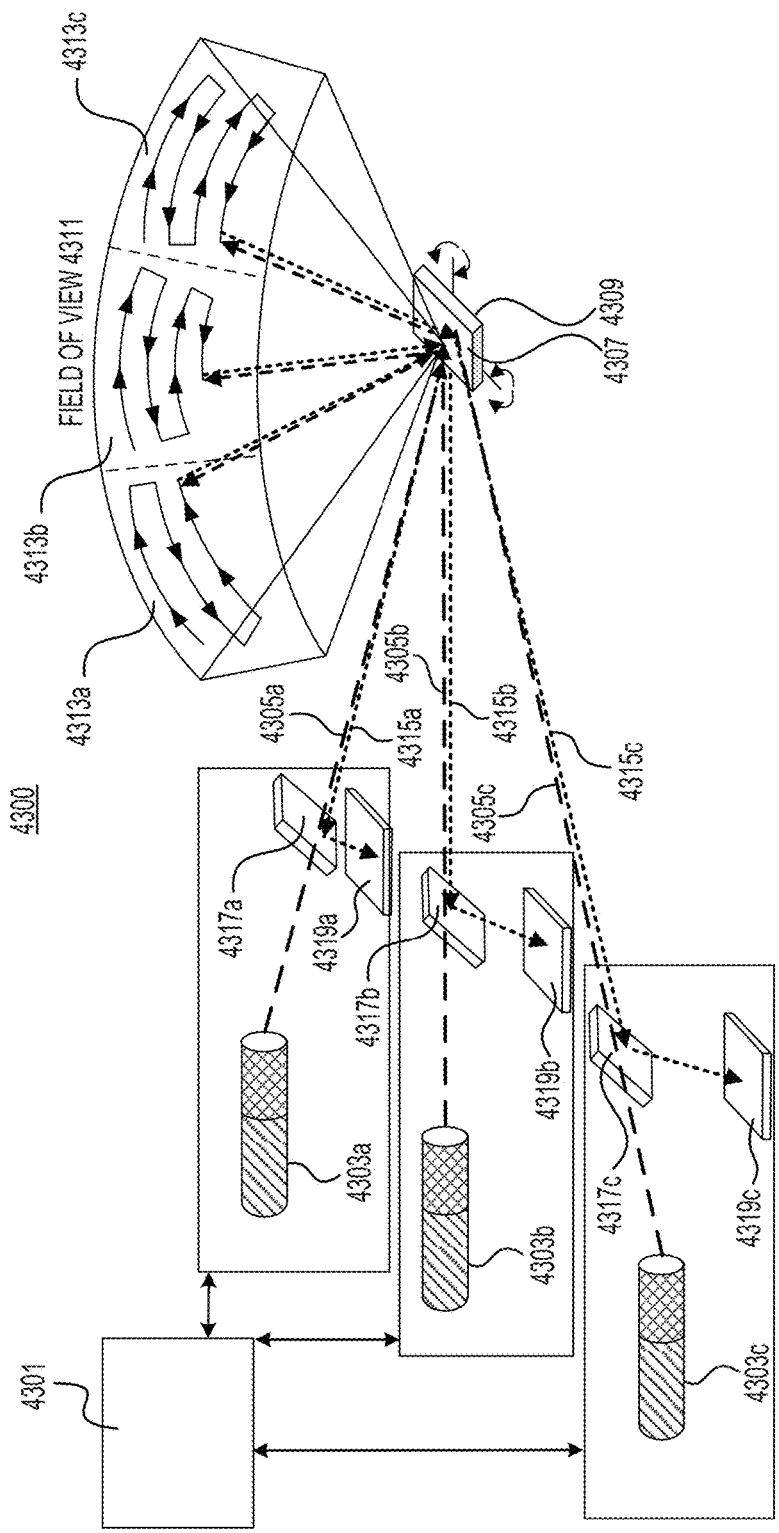
FIG. 43 is a diagram illustrating an example LIDAR system having a plurality of light sources aimed at a common area of at least one light deflector.

At step 4101, processor 118 controls at least one light source (e.g., light source 112 of FIG. 1A, laser diode 202 of light source 112 of FIG. 2A, and/or plurality of light sources 102 of FIG. 2B) in a manner enabling light flux of at least one light source to vary over scans of a field of view (e.g., field of view 120 of FIGS. 1A and 2A, field of view 4203 of FIG. 42A, field of view 4207 of FIG. 42B, field of view 4211 of FIG. 42C, field of view 4215 of FIG. 42D, field of view 4215' of FIG. 42E, field of view 4311 of FIG. 43). For example, processor 118 may vary the timing of pulses from the at least one light source. Alternatively or concurrently, processor 118 may vary the length of pulses from the at least one light source. By way of further example, processor 118 may alternatively or concurrently vary a size (e.g., length or width or otherwise alter a cross-sectional area) of pulses from the at least one light source. In a yet further example, processor 118 may alternatively or concurrently vary the amplitude and/or frequency of pulses from the at least one light source.

At step 4103, processor 118 controls at least one light deflector (e.g., light deflector 114 of FIG. 1A, deflector 114A and/or deflector 114B of FIG. 2A, and/or one-way deflector 214 of FIG. 2B) to deflect light from the at least one light source in order to scan the field of view. For example, processor 118 may cause mechanical movement of the at least one light deflector to scan the field of view. Alternatively or concurrently, processor 118 may induce a piezoelectric or thermoelectrical change in the at least one deflector to scan the field of view. Alternatively or concurrently, processor 118 may induce steering of an Optical Phased Array (OPA) light source, by modifying relative amplitude, phase or other signal characteristics of the different emission sources of the OPA. Alternatively or concurrently, processor 118 may induce changing of active light emitters of a vertical-cavity surface-emitting laser (VCSEL) array.

In some embodiments, the field of view (e.g., field of view 4215 of FIG. 42D, field of view 4215' of FIG. 42E, field of view 4311 of FIG. 43) may include a plurality of portions (e.g., a first portion and a second portion). For example, the portions may comprise halves, fourths, or other fractions of the area covered by the field of view. In other examples, the portions may comprise irregular, rather than symmetric and/or fractional, portions of the area covered by the field of view. In still other examples, the portions may comprise discontinuous portions of the area covered by the field of view.

In some embodiments, processor 118 may control the at least one light deflector such that, during a single scanning cycle, the at least one light deflector is located in a plurality of different instantaneous positions (e.g., the deflector is controlled such that the deflector moves from or through one instantaneous position to another during the scan of the LIDAR FOV). For example, the at least one light deflector may be moved continuously or non-continuously from one of the plurality of positions to another (optionally with additional positions and/or repetitions) during the scanning cycle.

In such embodiments, processor 118 may coordinate the at least one light deflector and the at least one light source such that, when the at least one light deflector is located at a particular instantaneous position, a portion of a light beam is deflected by the at least one light deflector from the at least one light source towards an object in the field of view and reflections of the portion of the light beam are deflected from the object toward at least one sensor. Accordingly, the at least one light deflector may direct a portion of the light beam toward the field of view and also receive a reflection from the field of view. For example, FIGS. 1A, 2B, and 2C depict examples in which a deflector both directs a portion of the light beam towards the field of view and also receives a reflection from the field of view. In other embodiments, a portion of the light beam from the at least one light source may be directed towards the field of view by at least one light deflector separate from at least one other light deflector that receives a reflection from the field of view. For example, FIG. 2A depicts an example in which one deflector directs a portion of the light beam towards the field of view and a separate deflector receives a reflection from the field of view. In some embodiments, the at least one deflector may include a first group of one or more deflectors for (transmission) and a second group of one or more deflectors for (reception), which may be different from each other.

In some embodiments, the at least one light source may comprise a plurality of light sources aimed at a common area of the at least one light deflector. In such embodiments, processor 118 may control the at least one light deflector such that, when the at least one light deflector is located at a particular instantaneous position, light from the plurality of light sources is projected towards a plurality of independent regions forming the field of view. An example of such an embodiment is depicted in FIG. 43, discussed below.

At step 4105, processor 118 receives input indicative of a current driving environment of the vehicle. For example, processor 118 may receive input that includes at least one of a rural-related indication and an urban-related indication. By way of further example, processor 118 may receive input that includes at least one rural-related indication, urban-related indication, information associated with a light condition, information associated a weather condition, and information associated with a velocity of the vehicle.

In some embodiments, processor 118 may receive the input from a determination performed by processor 118 itself. In such an example, processor 118 may determine the current driving environment based on information from one or more previous (and/or the current) scans of the field of view. For example, the processor may determine that the current driving environment is urban based on the presence of numerous vehicles and/or buildings in close proximity to the vehicle. By way of further example, the processor may determine that the current driving environment is rural based on the presence of numerous trees and/or open land. Processor 118 may alternatively or concurrently determine the current driving environment based on a speed of the vehicle and/or based on map information (which may be stored or received and may include updated traffic information). For example, processor 118 may determine that the current driving environment is an interstate or highway based on sustained, high speeds of the vehicle and/or based on a location of the vehicle aligning with a known interstate or highway. By way of further example, processor 118 may determine that the current driving environment is a traffic jam based on frequent stopping of the vehicle with sustained, low speeds and/or based on known traffic information.

Alternatively or concurrently, processor 118 may receive the input from a host processing unit, for example, a central computer located in the vehicle along with processor 118. The central computer may determine the current driving environment using the techniques described above with respect to processor 118. Similarly, processor 118 may additionally or alternatively receive the input from a remote system. For example, processor 118 may receive an indication of the weather from a weather server or other source of updated weather information. Similarly, processor 118 may receive an indication of the traffic from a traffic server or other source of updated traffic information.

In some embodiments, processor 118 may receive the input indicative of the current driving environment from at least one of a GPS, a vehicle navigation system, a vehicle controller, a radar, a LIDAR, and a camera. For example, as explained above, processor 118 may use the vehicle's location as determined by the GPS and/or the vehicle navigation system in combination with maps and/or traffic information to derive the current driving environment. In such an example, processor 118 may align the vehicle's GPS location with a map to determine that the vehicle is on an interstate or may align the vehicle's GPS location with traffic information to determine that the vehicle is in a traffic jam. Similarly, processor 118 may use the speed, heading, or the like from the vehicle controller to derive the current driving environment, as explained above. Additionally or alternatively, processor 118 may use information from radar, LIDAR, and/or a camera to derive the current driving environment. For example, processor 118 may identify one or more objects using radar, LIDAR, and/or a camera, such as fields, trees, buildings, medians, or the like, and use the identified objects to derive the current driving environment.

At step 4107, based on the current detected or inferred driving environment, processor 118 may coordinate the control of the at least one light source with the control of the at least one light deflector to dynamically adjust an instantaneous detection distance by varying an amount of light projected and a spatial light distribution of light across the scan of the field of view. For example, processor 118 may increase the amount of light projected and/or decrease the spatial distribution of light to increase the instantaneous detection distance. By way of further example, processor 118 may decrease the amount of light projected and/or increase the spatial distribution of light to decrease the instantaneous detection distance. For example, processor 118 may determine when the vehicle exits a tunnel and coordinate control of the at least one light source and the at least one light deflector in order to increase light emission in at least one portion of the field of view as compared to a light emission used in the at least one portion when the vehicle was in the tunnel, as depicted in the examples of FIGS. 42D and 42E.

Processor 118 may vary an amount of light projected across the scan of the field of view by varying a length of pulses from the at least one light source, an amplitude and/or frequency of pulses from the at least one light source, or the like. Additionally or alternatively, processor 118 may vary a spatial light distribution of light across the scan of the field of view by varying a strength of the at least one light deflector (in embodiments in which, for example, the at least one light deflector is piezoelectric or thermoelectrical), an angle of reflection of the at least one light deflector (e.g., resulting in more or less spread of a light beam from the at least one light source), or the like.

Processor 118 may base the dynamic adjustment of an instantaneous detection distance on the current driving environment. For example, processor 118 may increase a detection distance in a rural environment. A rural environment may have objects that are sparser than in an urban environment and, thus, a longer detection distance may compensate for the increased sparseness. By way of further example, processor 118 may decrease a detection distance in a traffic jam. A traffic jam may result in significantly slower speeds and more frequent and sudden stops, thus rendering detection of farther away objects less important. The energy not spent for longer detection ranges may simply be saved, or may be used to improve other detection characteristics, such as resolution, frame rate, SNR, etc.

At step 4107, processor 118 may additionally or alternatively adjust other properties of the LIDAR system. For example, processor 118 may coordinate the control of the at least one light source with the control of the at least one light deflector to dynamically adjust a scan rate by varying an amount of light projected and a spatial light distribution of light across the scan of the field of view. In such an example, processor 118 may increase a scan rate in an urban environment. An urban environment may have a significant number of other vehicles and pedestrians that are moving and thus, a faster scan rate may allow for earlier detection of events such as stopping of other vehicle ahead of the vehicle and movement of pedestrians into a road. By way of further example, processor 118 may decrease a scan rate in a rural environment. A rural environment may have less other vehicles and less pedestrians than an urban environment, reducing the need for fast scan rates. Accordingly, processor 118 may determine when the vehicle is in an urban area and coordinate control of the at least one light source control and the at least one light deflector in order to cause an increase rate of scanning cycles as compared to a rate of scanning cycles used in a non-urban area.

In another example, processor 118 may coordinate the control of the at least one light source with the control of the at least one light deflector to dynamically adjust a spatial resolution by varying an amount of light projected and a spatial light distribution of light across the scan of the field of view. In such an example, processor 118 may increase a spatial resolution in rain. An urban environment may have objects that are denser than in an urban environment and, thus, a greater spatial resolution may compensate for the increased density. By way of further example, processor 118 may decrease a scan rate in a tunnel. A tunnel may have little detail besides other vehicles ahead of the vehicle, reducing the need for high resolution.

In yet another example, processor 118 may coordinate the control of the at least one light source with the control of the at least one light deflector to dynamically adjust a temporal resolution by varying an amount of light projected and a spatial light distribution of light across the scan of the field of view. In such an example, processor 118 may increase temporal resolution in an urban environment. An urban environment may have a significant number of other vehicles and pedestrians that are moving and thus, a greater temporal resolution may allow for more detailed monitoring of the movement of other vehicles and pedestrians. By way of further example, processor 118 may decrease a temporal resolution in a rural environment. A rural environment may have less other vehicles and less pedestrians than an urban environment, reducing the need for detailed monitoring.

In still another example, processor 118 may coordinate the control of the at least one light source with the control of the at least one light deflector to dynamically adjust a signal-to-noise ratio by varying an amount of light projected and a spatial light distribution of light across the scan of the field of view. In such an example, processor 118 may increase the signal-to-noise ratio in the rain. Rain may increase the noise within the environment by increasing the amount of reflections in the field of view and thus, a higher signal-to-noise ration may reduce the impact of the increased noise. By way of further example, processor 118 may decrease the signal-to-noise ratio at night. Noise may decrease at night, reducing the need for obtaining a stronger signal to differentiate from the noise.

In an additional example, processor 118 may coordinate the control of the at least one light source with the control of the at least one light deflector to dynamically adjust a size of the field of view by varying an amount of light projected and a spatial light distribution of light across the scan of the field of view. In such an example, processor 118 may decrease the size of the field of view in a rural environment. A rural environment may have roads with fewer lanes, reducing the need for a larger field of view. By way of further example, processor 118 may increase the size of the field of view on an interstate. An interstate may have a large number of lanes and thus, a larger field of view may allow for monitoring of the large number of vehicles that the interstate may accommodate.

In a further example, processor 118 may coordinate the control of the at least one light source with the control of the at least one light deflector to dynamically adjust one or more pulse transmission schemes by varying an amount of light projected and a spatial light distribution of light across the scan of the field of view. For example, some schemes may be more or less susceptible to noise and/or ambient light. Accordingly, processor 118 may select a pulse transmission scheme less susceptible to noise in high noise environments such as rain or snow and may select a pulse transmission scheme less susceptible to ambient light in environments with high ambient light such as urban environments or at night.

In embodiments in which the field of view has a plurality of portions, processor 118 may dynamically adjust the instantaneous detection distance in the single scanning cycle, such that a detection distance in a first portion of the field of view is increased from a prior scanning cycle and a detection distance in a second portion of the field of view is decreased from the prior scanning cycle. For example, processor 118 may decrease a detection distance in a portion of the field of view in front of the vehicle on a current side of the road and increase a detection distance in another portion of the field of view next to the vehicle and having the other side of the road if the vehicle is in a traffic jam but the other side of the road is not. In such an example, the increased detection distance in the portion containing the other side of the road may allow for the vehicle to react earlier if a vehicle on the other side of the road is encroaching on the current side. Moreover, the decreased detection distance in the portion containing the current side may prevent needlessly expending energy because traffic is not moving.

Similarly, processor 118 may dynamically adjust another property of the scan such that the property in a first portion of the field of view is increased from a prior scanning cycle and the property in a second portion of the field of view is decreased from the prior scanning cycle. For example, processor 118 may increase a spatial resolution in the first portion and decrease a spatial resolution in the second portion. In such an example, processor 118 may increase a spatial resolution for a front portion and decrease a spatial resolution for a side portion if the vehicle is in a tunnel. The increased spatial resolution may allow for the greater tracking of the motion of other vehicles in front of the vehicle, and the decreased spatial resolution may prevent needlessly expending energy on tracking the walls of the tunnel.

By way of additional example, processor 118 may increase a temporal resolution in the first portion and decrease a temporal resolution in the second portion. In such an example, processor 118 may increase a temporal resolution for a side portion and decrease a temporal resolution for a front portion if the vehicle is on an interstate. The increased spatial resolution may allow for the more detailed tracking of the motion of other vehicles traveling in the opposite direction that may necessitate a rapid response if they cross into the vehicle's lane, and the decreased temporal resolution may prevent needlessly expending energy on tracking other vehicles in front of the vehicle and traveling with it.

In another example, processor 118 may increase a signal-to-noise ratio in the first portion and decrease a signal-to-noise ratio in the second portion. In such an example, processor 118 may increase a signal-to-noise ratio for a side portion and decrease a signal-to-noise ratio for a front portion if the vehicle is in an urban environment. The increased signal-to-noise ratio may compensate for ambient light from street lights on the side of a road, and the decreased signal-to-noise ratio may prevent needlessly expending energy on tracking other vehicles in front of the vehicle and traveling with it.

In yet a further example, processor 118 may increase a size of the first portion of the field of view and decrease a size of the second portion of the field of view. In such an example, processor 118 may increase the field of view in a front portion and decrease a field of view for a side portion if the vehicle is in a rural environment. The increased field of view may allow for sooner visibility of an oncoming or preceding vehicle, and the decreased field of view may prevent needlessly expending energy on tracking fields or trees on the side of the road.

In another example, processor 118 may modify a pulse-transmission scheme in the first portion and differently modify a pulse-transmission scheme in the second portion. In such an example, processor 118 may select a pulse-transmission scheme that minimizes noise for a front portion and select a pulse-transmission scheme more susceptible to noise for a side portion if the vehicle is in a rural environment at night. The former scheme may account for noise from bright headlights of oncoming vehicles or from rear lights of preceding vehicles, and the latter scheme may prevent needlessly expending energy on minimizing the already minimal noise from objects on the side of the road.

Similarly, in some embodiments, processor 118 may, based on the current driving environment, coordinate control of the at least one light source and the at least one light deflector in a plurality of scanning cycles to dynamically adjust a first rate of scanning cycles for detecting objects in a near-field portion of the field of view and a second rate of scanning cycles for detecting objects in a far-field portion of the field of view. For example, processor 118 may scan objects in a near-field portion at a greater rate than objects in a far-field portion. This may allow processor 118 to track the motion of nearer objects more precisely than the motion of farther objects. Alternatively, processor 118 may scan objects in a near-field portion at a lower rate than objects in a far-field portion.

Method 4100 may include additional steps. For example, method 4100 may further include coordinating control of the at least one light source and the at least one light deflector in at least one scanning cycle to dynamically adjust an instantaneous point resolution associated with a first portion of the field of view. For example, a light beam from the at least one light source may be spread across a larger area to produce data across a greater number of pixels or may be compacted into a smaller area to produce data across a smaller number of pixels.

Method 4100 may further include controlling the at least one light source based on an environment type corresponding to the received input indicative of the current driving environment. For example, processor 118 may adjust a property of the at least one light source, such as the light flux, the wavelength, or the like. In such an example, processor 118 may select a lower wavelength at night than during the day or may select a greater intensity in a rural environment than an urban environment.

Method 4100 may further include adjusting a sensitivity mode of at least one sensor based on the current driving environment. For example, processor 118 may determine when the vehicle drives in rain and adjust a sensitivity mode associated with output from at least one sensor to dismiss reflections of rain drops. As discussed above in greater detail, modification of the sensor sensitivity may be achieved by modifying sensor parameter (e.g., operational voltage), detection-path parameters (e.g., signal amplification level, ADC parameters), or even processor parameters (e.g., processor applied threshold or decision rules).

Figure 41B:
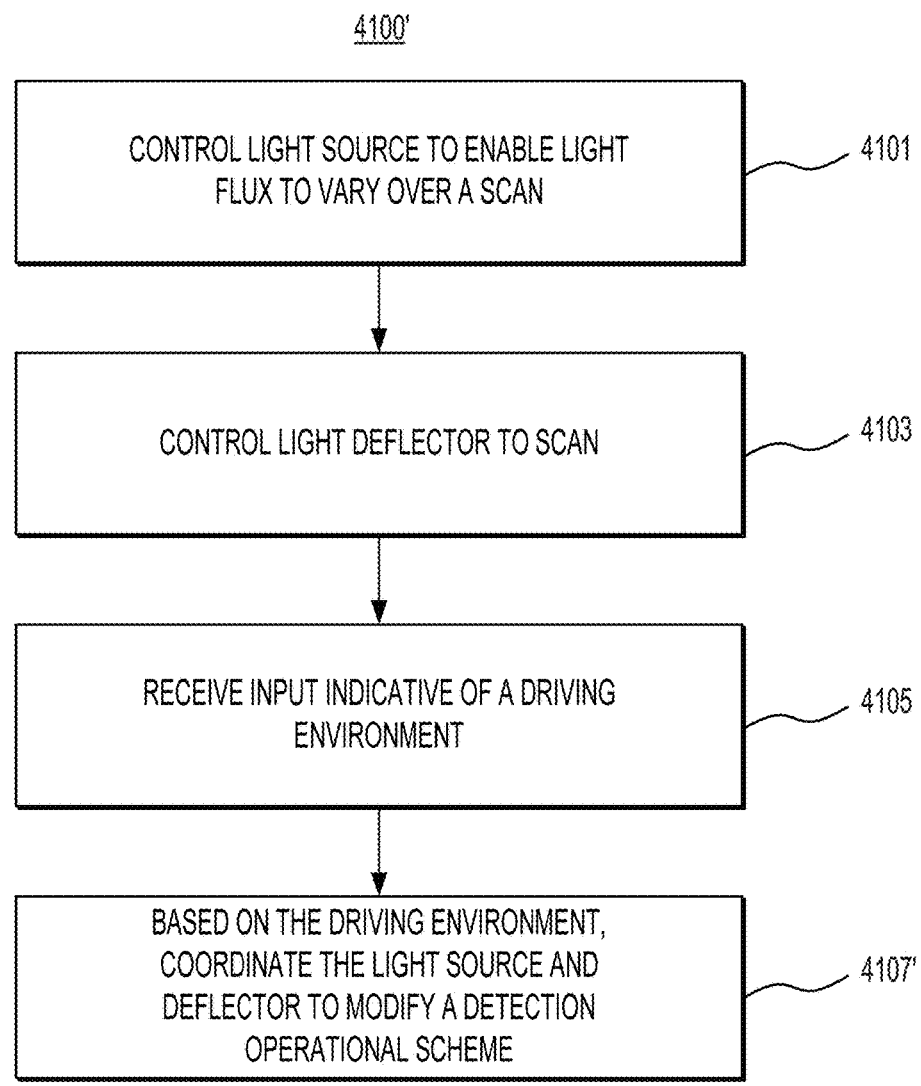
FIG. 41B is a flowchart illustrating another example method for detecting objects in a path of a vehicle using LIDAR consistent with some embodiments of the present disclosure.

FIG. 41B illustrates an example method 4100' for altering detection distance in a LIDAR system. Method 4100' may be performed by at least one processor (e.g., processor 118 of processing unit 108 of LIDAR system 100 as depicted in FIG. 1A and/or two processors 118 of processing unit 108 of the LIDAR system depicted in FIG. 2A).

Steps 4101, 4103, and 4105 of method 4100' of FIG. 41B are the same as steps 4101, 4103, and 4105 of method 4100 of FIG. 41A. Accordingly, their description will not be repeated here.

At step 4107, based on the current detected or inferred driving environment, processor 118 may coordinate the control of the at least one light source with the control of the at least one light deflector to modify a detection operational scheme. For example, as explained above with reference to FIG. 17, processor 118 may alter an operational parameter of the at least one sensor and/or processor 118. For example, alteration of the operational parameter in such cases may change the sensitivity of the detection to the signal level and/or noise level acquired by the at least one sensor. For example, processor 118 may alter the sensor sensitivity by changing a post-convolution threshold, as discussed above with reference to FIG. 17. However, other operational parameters of the at least one sensor and/or processor 118 may additionally or alternatively be altered by processor 118.

Examples of differing driving environments are depicted in FIGS. 42A-42E. In the example of FIG. 42A, a vehicle 4201 may comprise a vehicle body and at least one processor located within the vehicle body. The at least one processor may execute method 4100 of FIG. 41 or a variation thereof. In the example of FIG. 42A, vehicle 4201 is driving in an urban environment. Accordingly, a LIDAR system of vehicle 4201 may scan field of view 4203 with a higher frame rate (e.g., 25 frames per second (FPS)), at a moderate distance (e.g., 100 meters), and with a wide horizontal field-of-view (e.g., 320°, 340°, 360°, etc.), as depicted in FIG. 42A. This may account for the moderate speed, high detail, near objects, and possible rapid change of conditions associated with the urban environment.

In the example of FIG. 42B, a vehicle 4205 may comprise a vehicle body and at least one processor located within the vehicle body. The at least one processor may execute method 4100 of FIG. 41 or a variation thereof. In the example of FIG. 42B, vehicle 4205 is driving in a rural environment. Accordingly, a LIDAR system of vehicle 4205 may scan field of view 4207 with a moderate frame rate (e.g., 20 frames per second (FPS)), at a larger distance (e.g., 200 meters), and with a moderate horizontal field-of-view (e.g., 200°, 150°, 120°, etc.), as depicted in FIG. 42B. In some embodiments, the range may be varied over scans, e.g., scanning at 100 meters for most scans but at 200 meters every fifth scan. Such settings may account for the fast speed, low detail, far objects, and slower change of conditions associated with the rural environment.

In the example of FIG. 42C, a vehicle 4209 may comprise a vehicle body and at least one processor located within the vehicle body. The at least one processor may execute method 4100 of FIG. 41 or a variation thereof. In the example of FIG. 42C, vehicle 4209 is driving in a traffic jam. Accordingly, a LIDAR system of vehicle 4209 may scan field of view 4211 with a moderate frame rate (e.g., 20 frames per second (FPS)), at a short distance (e.g., 75 meters), and with a moderate horizontal field-of-view (e.g., 200°, 150°, 120°, etc.), as depicted in FIG. 42C. Such settings may account for the low speed, low detail, close objects, and generally slower change of conditions associated with a traffic jam.

In the example of FIG. 42D, a vehicle 4213 may comprise a vehicle body and at least one processor located within the vehicle body. The at least one processor may execute method 4100 of FIG. 41 or a variation thereof. In the example of FIG. 42D, vehicle 4213 is driving through a tunnel. Accordingly, a LIDAR system of vehicle 4213 may scan field of view 4215 using different properties in regions 4217*a* and 4217*c* than in regions 4217*b*. In regions 4217*a* and 4217*c*, a low frame rate (e.g., 10 frames per second (FPS)), a short distance (e.g., 75 meters), and a low spatial and/or temporal resolution may be used to account for the lack of necessity in tracking the walls of the tunnel. On the other hand, in region 4217*b*, a moderate frame rate (e.g., 20 frames per second (FPS)), a moderate distance (e.g., 100 meters), and a moderate spatial and/or temporal resolution may be used to track possible sudden stopping of another vehicle preceding vehicle 4213. Alternatively, as depicted in FIG. 42D, regions 4217*a* and 4217*c* may not be scanned (as depicted by the "X") while region 4217*b* is scanned.

In the example of FIG. 42E, vehicle 4213 is now exiting the tunnel. Accordingly, a LIDAR system of vehicle 4213 may scan field of view 4215' using different properties in regions 4217*a*' and 4217*c*' than previously used in regions 4217*a* and 4217*c*. For example, the frame rate, detection distance, and/or spatial and/or temporal resolution may be increased to account for the necessity of tracking possible objects in those regions. On the other hand, frame rate, detection distance, and/or spatial and/or temporal resolution in region 4217*b*' may be kept the same as those used in region 4217*b*. Alternatively, regions 4217*a* and 4217*c* may now be scanned in addition to region 4217*b*, either with the same properties (as depicted in FIG. 42E) or with differing properties.

Figure 42F:
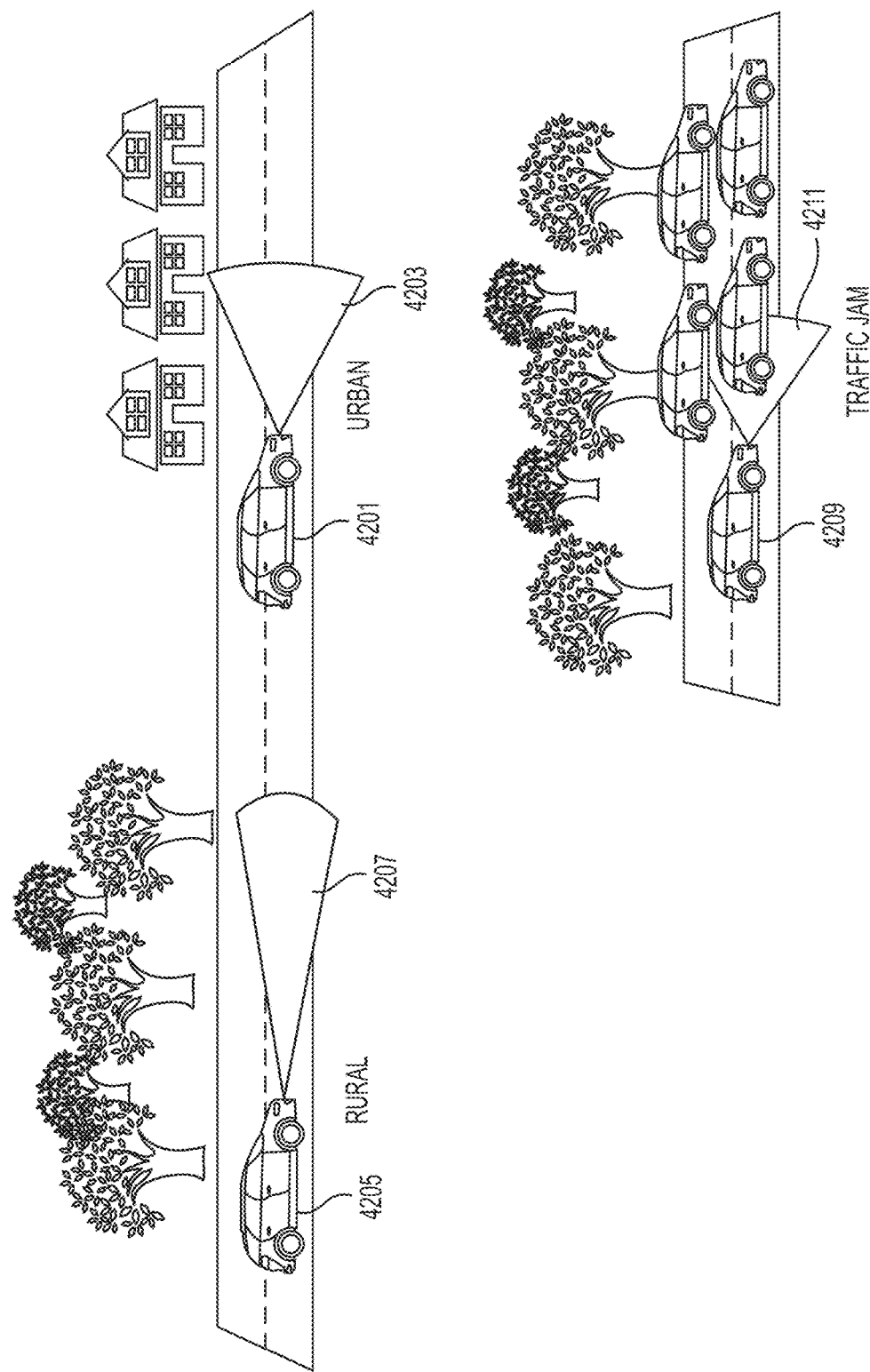
FIG. 42F is a diagram illustrating the example vehicles of FIGS. 42A, 42B, and 42C from a different angle consistent with some embodiments of the present disclosure.

FIG. 42F depicts vehicles 4201, 4205, and 4209 of FIGS. 42A, 42B, and 42C, respectively, with their corresponding fields of view 4203, 4207, and 4211. As depicted in FIG. 42F, field of view 4203 for vehicle 4201 in an urban environment has a moderate detection distance and a wide horizontal field-of-view. As further depicted in FIG. 42F, field of view 4207 for vehicle 4205 in a rural environment has a larger detection distance than field of view 4203 (in the urban environment) but has a moderate horizontal field-of-view compared with field of view 4203 (in the urban environment). As still further depicted in FIG. 42F, field of view 4211 for vehicle 4209 in a traffic jam has a shorter detection distance than field of view 4203 (in the urban environment) but also has a wide horizontal field-of-view (e.g., similar to that of field of view 4203 in the urban environment).

Additional driving environments not depicted in FIGS. 42A-42F may result in adjustments of one or more properties of the LIDAR system. For example, in the rain, a LIDAR system consistent with embodiments of the present disclosure may scan a field of view with a higher frame rate (e.g., 25 frames per second (FPS)) and higher spatial and/or temporal resolution to accommodate for the greater noise and distorted detail in each frame.

FIG. 43 is a diagram illustrating an example LIDAR system 4300 having a plurality of light sources aimed at a common area of at least one light deflector. As depicted in FIG. 43, light from the plurality of light sources may impinge on an overlapping area of the at least one light deflector. Additionally or alternatively, light originating from the plurality of light sources and reflected back from the scene may impinge on an overlapping area of the at least one light deflector. As depicted in FIG. 43, system 4300 includes a processing unit (e.g., at least one processor 4301) along with a plurality of light sources (e.g., light sources 4303*a*, 4303*b*, and 4303*c*). The plurality of light sources

4303a, 4303b, and 4303c may emit a corresponding plurality of light beams (e.g., light beams 4305a, 4305b, and 4305c).

In the embodiment of FIG. 43, LIDAR system 4300 includes at least one deflector 4309 having a common area 4307. At least one deflection 4309 may, for example, be in a particular instantaneous position during a scan cycle. The plurality of light sources 4303a, 4303b, and 4303c may be aimed at common area 4307 and thus direct the plurality of corresponding light beams 4305a, 4305b, and 4305c thereto. Common area 4307 may project the plurality of light beams 4305a, 4305b, and 4305c to a field of view 4311. In the embodiment of FIG. 43, common area 4307 may project the plurality of light beams 4305a, 4305b, and 4305c towards a plurality of independent regions (e.g., regions 4313a, 4313b, and 4313c) that form the field of view 4311. The plurality of light beams 4305a, 4305b, and 4305c cause a plurality of corresponding reflections 4315a, 4315b, and 4315c from field of view 4311 (or from objects therein).

Furthermore, in the example of FIG. 43, the scanning rates for the plurality of regions 4313a, 4313b, and 4313c may differ. For example, as depicted in FIG. 43, the scan rate for region 4313a may be slower than that of region 4313b, and the scan rate of region 4313c may be In other embodiments, additional or alternative properties of the scan may differ between the plurality of regions 4313a, 4313b, and 4313c. For example, an instantaneous detection distance, a spatial resolution, a temporal resolution, a signal-to-noise ratio, a size of the field of view, one or more pulse-transmission schemes, or the like may independently or in combination differ between the plurality of regions 4313a, 4313b, and 4313c.

In the example of FIG. 43, both light beams 4305a, 4305b, and 4305c and corresponding reflections 4315a, 4315b, and 4315c both hit common area 4307 of at least one deflector 4309. In other embodiments, however, light beams 4305a, 4305b, and 4305c may be projected by one or more different deflectors than those by which corresponding reflections 4315a, 4315b, and 4315c are reflected.

As further depicted in the example of FIG. 43, each reflection 4315a, 4315b, and 4315c is directed to a corresponding at least one deflector and sensor (e.g., deflectors 4317a, 4317b, and 4317c correspondingly coupled with sensors 4319a, 4319b, and 4319c). In other embodiments, however, any additional deflectors may be omitted. In addition, in other embodiments, more than one reflection may be directed to a single sensor.

Lidar Detection Scheme for Cross Traffic Turns

Cross-lane turns without can present certain challenges. For example, navigating a vehicle along a path that crosses one or more lanes of traffic (e.g., turning left at an intersection in the United States or turning right at a junction in England, etc.), can be difficult in heavy traffic with oncoming vehicles, bicycles, and pedestrians. Human drivers may enter the intersection and wait for an opportunity to accelerate and perform the risky cross-lane turn. Similar challenges may exist for autonomous or semi-autonomous vehicles.

Figure 45:
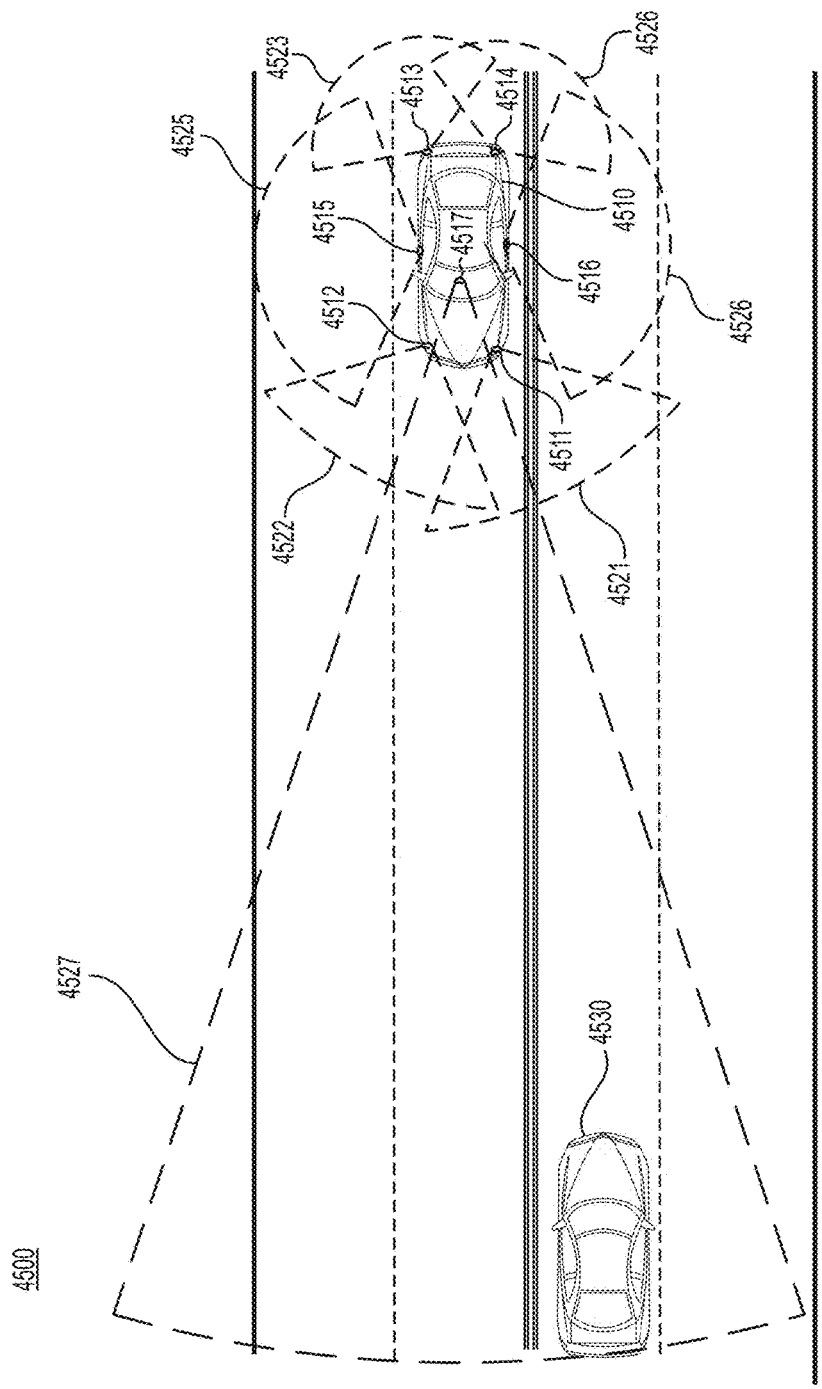
FIG. 45 is a diagram illustrating an example of a LIDAR detection scanning scheme consistent with some embodiments of the present disclosure.

To aid in navigating an intersection or other road situation that includes crossing a lane of traffic, LIDAR system 100 may be configured to alter one or more operational characteristics of the system relative to certain regions of the LIDAR FOV, as compared to other regions of the LIDAR FOV. For example, in a LIDAR system consistent with embodiments of the present disclosure, a detection range of a certain region of the LIDAR FOV (e.g., a portion of the FOV overlapping with a lane to be crossed) may be increased relative to one or more other regions of the LIDAR FOV. For example, in one example, if a vehicle (autonomous or otherwise) is attempting to make a left turn across at least one lane of traffic, a detection range associated with one or more regions of the LIDAR FOV overlapping the lanes to be crossed (e.g., generally on a right half of the FOV, which may correspond to a right forward quarter of the vehicle that faces the oncoming traffic of the lane to be crossed) may be extended to exceed a detection range in other regions of the FOV (e.g., generally on a left half of the FOV, which may correspond to a left forward quarter of the vehicle not facing the oncoming traffic of the lane to be crossed). It should be noted that a LIDAR FOV may include the aggregate of multiple scanning regions, whether contiguous or not. For example, in some embodiments, a LIDAR FOV may be made up of a plurality of portions that overlap continuous range of solid angle values. In other embodiments, the LIDAR FOV may be an aggregate of multiple non-overlapping or partially overlapping solid angle ranges each being bisected by an axis extending in a different direction (e.g., as shown in FIG. 45). In this manner, LIDAR system 100 may be better able to detect oncoming vehicles and to generate higher resolution depth maps associated with the lanes to be crossed.

Systems and methods of the present disclosure may allow a detection range in a direction opposing the direction of the cross-lane turn (e.g., a detection range associated with one or more regions of the FOV on a right half of the FOV when a direction of the cross-lane turn is to the left) of the vehicle to temporarily exceed a detection range toward a direction of the cross-lane turn. Such a change in the detection range may be made, for example, by coordinating the control of at least one light source with the control of at least one light deflector to increase light flux, relative to other portions of the field of view, on a side of the vehicle opposite a direction of the cross-lane turn and encompassing a far lane of traffic into which the vehicle is merging.

Figure 44:
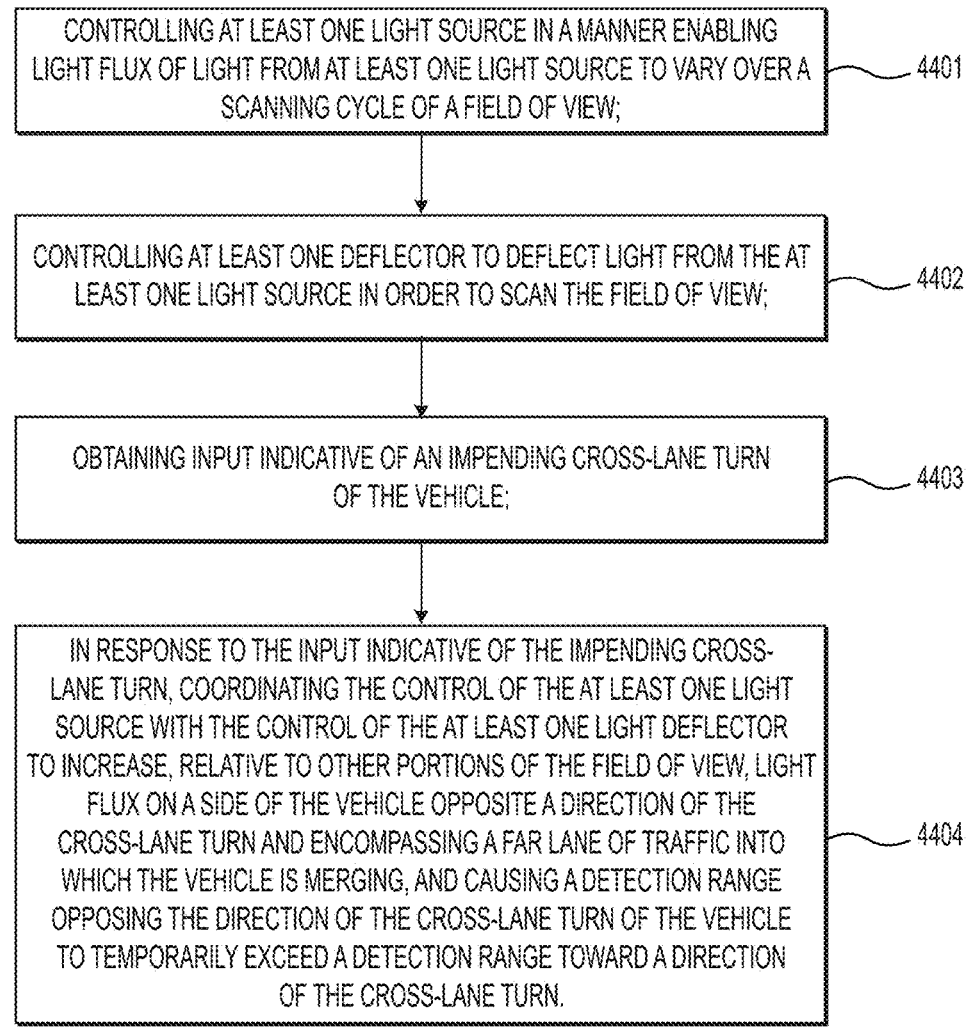
FIG. 44 is a flowchart illustrating an example method for a LIDAR detection scheme for cross traffic turns consistent with some embodiments of the present disclosure.

FIG. 44 illustrates an example method 4400 for a LIDAR detection scheme for cross traffic turns. Method 4400 may be performed by at least one processor (e.g., processor 118 of processing unit 108 of LIDAR system 100 as depicted in FIG. 1A and/or two processors 118 of processing unit 108 of the LIDAR system depicted in FIG. 2A). At step 4401, processor 118 controls at least one light source (e.g., light source 112 of FIG. 1A, laser diode 202 of light source 112 of FIG. 2A, and/or plurality of light sources 102 of FIG. 2B) in a manner enabling light flux of light from at least one light source to vary over a scanning cycle of a field of view (e.g., field of view 120 of FIGS. 1A and 2A). For example, processor 118 may vary the timing of pulses from the at least one light source. Alternatively or concurrently, processor 118 may vary the length of pulses from the at least one light source. By way of further example, processor 118 may alternatively or concurrently vary a size (e.g., length or width or otherwise alter a cross-sectional area) of pulses from the at least one light source. In a yet further example, processor 118 may alternatively or concurrently vary the amplitude and/or frequency of pulses from the at least one light source.

Step 4402 may further include processor 118 controlling at least one deflector (e.g., light deflector 114 of FIG. 1A, deflector 114A and/or deflector 114B of FIG. 2A, and/or one-way deflector 214 of FIG. 2B) to deflect light from the at least one light source in order to scan the field of view. For example, processor 118 may cause mechanical movement of the at least one light deflector to scan the field of view. Alternatively or concurrently, processor 118 may induce a piezoelectric or thermoelectrical change in the at least one deflector to scan the field of view.

In some embodiments, a single scanning cycle of the field of view may include moving the at least one deflector such that, during the scanning cycle, the at least one light deflector is located in a plurality of different instantaneous positions (e.g., the deflector is controlled such that the deflector moves from or through one instantaneous position to another during the scan of the LIDAR FOV). For example, the at least one light deflector may be moved continuously or non-continuously from one of the plurality of positions to another (optionally with additional positions and/or repetitions) during the scanning cycle.

In such embodiments, processor 118 may coordinate the at least one light deflector and the at least one light source such that, when the at least one light deflector is located at a particular instantaneous position, a light beam is deflected by the at least one light deflector from the at least one light source towards the field of view and reflections from an object in the field of view are deflected by the at least one light deflector toward at least one sensor. Accordingly, the at least one light deflector may direct a light beam toward the field of view and also receive a reflection from the field of view. For example, FIGS. 1A, 2B, and 2C depict examples in which a deflector both directs a light beam towards the field of view and also receives a reflection from the field of view. In certain aspects, the reflection may be caused by the light beam directed toward the field of view. In other embodiments, a light beam from the at least one light source may be directed towards the field of view by at least one light deflector separate from at least one other light deflector that receives a reflection from the field of view. For example, FIG. 2A depicts an example in which one deflector directs a light beam towards the field of view and a separate deflector receives a reflection from the field of view.

At step 4403, processor 118 obtains input indicative of an impending cross-lane turn of the vehicle. Examples of cross-lane turn techniques are discussed below with references to FIGS. 45 and 46.

At step 4404, in response to the input indicative of the impending cross-lane turn, processor 118 may coordinate the control of the at least one light source with the control of the at least one light deflector to increase light flux, relative to other portions of the field of view, on a side of the vehicle (i.e., a direction, angle, region of interest, and not a part of the vehicle) opposite a direction of the cross-lane turn and encompassing a far lane of traffic into which the vehicle is merging, and causing a detection range opposing the direction of the cross-lane turn of the vehicle to temporarily exceed a detection range toward a direction of the cross-lane turn.

In some embodiments, processor 118 may control one light source or one light deflector to increase light flux, relative to other portions of the field of view, on a side of the vehicle opposite a direction of the cross-lane turn and encompassing a far lane of traffic into which the vehicle is merging. For example, if the deflector (e.g., light deflector 114 of FIG. 1A, deflector 114A and/or deflector 114B of FIG. 2A, and/or one-way deflector 214 of FIG. 2B) continues scanning according to a fixed scan schedule, parameters of light source 112 may be changed in order to vary a detection range in regions of the LIDAR FOV where objects (e.g., vehicles) in one or more of the lanes of traffic to be crossed by the cross-lane turn may be found. Such regions of the FOV where a detection range may be increased (either individually or in the aggregate) may be referred to as regions of interest.

In some embodiments, a detection range in a region of interest may be higher than a detection range in regions of the FOV outside the region of interest. Any suitable ratio of detection ranges may be accomplished. In some embodiments, a detection range in a region of interest may be at least two times greater than a detection range outside a region of interest. In a particular example in the context of a vehicle making a cross-lane turn, processor 118 may detect a vehicle at range X in a direction corresponding to a region of interest (e.g., a particular portion of the LIDAR FOV overlapping with the cross-lane) and may be capable of detecting vehicles only at a range of X/2 or less in a region of the LIDAR FOV not in a region of interest (e.g., not overlapping with the cross-lane). For example, if an autonomous vehicle is preparing to, initiating, and/or making a left turn, the region of interest may be in the right half of the LIDAR FOV, which may encompass at least a portion of the right side of the vehicle. In some cases, the region of the LIDAR FOV overlapping with an area immediately forward of the vehicle may fall outside of the region of interest. Additionally or alternatively a LIDAR system FOV may be provided across different segments, each segment potentially being directed to a different zone surrounding a vehicle, for example. In such cases, the region of interest of the LIDAR FOV may reside on the passenger side of the vehicle, the driver side of the vehicle, at the rear of the vehicle, in any quartering direction relative to the vehicle (e.g., between a longitudinal and a lateral axis through the vehicle), etc. Processor 118 may control light source 112 (including any of its controllable parameters affecting light output) and deflector 114, among other components of LIDAR system 100, in a manner to increase the detection range in region of interest and to conserve resources relative to regions of the LIDAR FOV of lower interest.

Method 4400 may include additional steps. For example, method 4400 may further include controlling the light deflector such that during a scanning cycle of the field of view the at least one light deflector is located in a plurality of different instantaneous positions. Alternatively, method 4400 may further include coordinating at least one light deflector and at least one light source such that when the light deflector is located at a particular instantaneous position, a portion of a light beam is deflected by the light deflector from the light source towards an object in the field of view, and reflections of the portion of the light beam from the object are deflected by the light deflector toward at least one sensor. In some embodiments, the LIDAR system may further comprise a plurality of light sources aimed at the at least one light deflector. The processor may control the light deflector such that when the light deflector is located at a particular instantaneous position, light from the plurality of light sources is projected towards a plurality of independent regions in the field of view.

Processor 118 may determine that a host vehicle is planning to execute a cross-lane turn or has initiated a cross-lane turn based on various sources. For example, in some embodiments, processor 118 may receive an input indicative of an impending cross-lane turn from a navigation system of the vehicle. In other embodiments, processor 118 may receive an input indicative of the impending cross-lane turn from another system of the vehicle (e.g., one or more sensors, engaged turn signals, wheel steering direction, GPS sensor, etc.) or a system external to the vehicle (e.g., one or more autonomous vehicle navigation server systems, mapping systems, etc.). In other embodiments, processor 118 may determine the input indicative of the impending cross-lane turn based on information received from at least one sensor (e.g., sensor 116) configured to detect reflections associated with the light projected from the at least one light source. In other words, processor 118 may determine an impending or initiated cross-lane turn based on an output of sensor 116 of the LIDAR system 100.

Processor 118 may be configured to determine one or more characteristics of objects detected within a lane to be crossed. In some cases, the one or more characteristics may include a distance to a detected object and/or a type of object (e.g., car, truck, stationary object, pedestrian, etc.). In some embodiments, processor 118 may also determine a velocity of a moving object detected in the cross lane (e.g., a far lane of traffic), a direction of travel (e.g., by monitoring a location over two or more scans of the FOV), or any other characteristic associated with a detected object. In some embodiments, processor 118 may monitor motion characteristics of the host vehicle (e.g., velocity, acceleration, position, etc.) and may determine based on motion characteristics of the host vehicle and motion characteristics of a detected object (e.g., in a cross-lane) to determine if the host vehicle and the detected object are on a collision course. If so, processor 118 may trigger an alert (e.g., a horn blast, visual alert, wireless communication to a controller associated with the detected object, etc.) if the host vehicle and the moving object are determined to be on a collision course. In other embodiments, a determination of a collision course may include other potential hazards. For example, even if the host vehicle is stationary, an alert to the host may be issued if, for example, an approaching vehicle poses a hazard to the host vehicle in its current position or where the host vehicle expects to move. In some embodiments, processor 118 may cause alerts to be issued (audible, visual, or otherwise) not only in an autonomous mode, but also in other modes (e.g., advanced driver assist system operation, full driver control, etc.).

In some embodiments, processor 118 may generate a reflectivity image associated with the LIDAR field of view. The reflectivity image may include a fingerprint of a detected moving object representing an amount of light reflected from various portions of the moving object. By way of example, when light from light projector 112 is incident on objects in an environment of LIDAR system 100, based on the reflectivity characteristics of those objects, processor 118 can detect a pattern. For example, processor 118 may identify a reflectivity pattern or fingerprint in order to determine a type category associated with the detected object (e.g., a pedestrian, vehicle, road divider barrier, etc.). Processor 118 may also be able to determine a sub-type associated with the detected object (e.g., whether a detected vehicle is a bus, a small car, or a van, etc.). Every vehicle may exhibit a different reflectivity fingerprint based on its shape and its configuration (e.g., license plate location and surrounding contours; headlight size, shape, spacing, and placement on a vehicle; etc.).

In some embodiments, processor 118 may be configured to determined one or more states of a detected object based on a comparison between a detected reflectivity pattern and a predetermined reflectivity templates. For example, in some embodiments, processor 118 may compare one or more reflectivity fingerprints acquired relative to a detected moving object (e.g., over a plurality of scanning cycles) with a plurality of predetermined/stored reflectivity templates to determine that the moving object is a vehicle signaling a right turn.

Processor 118 may also be configured to allocate different light flux levels to different regions of the LIDAR FOV based on detected maneuvers by the host vehicle. For example, in some embodiments, processor 118 may apply a differing power allocation scheme for right turns than for left turns. For example, depending on the change in light flux, processor 118 may allocate different power for a left turn than for a right turn. Additional examples of power budget allocation are further described relative to FIGS. 29-31.

In yet other embodiments, processor 118 may receive input indicative of a current driving environment and apply a different power allocation schemes depending on the determined driving environment. For example, processor 118 may apply different power allocation schemes for cross-lane turns in a rural area than for cross-lane turns in an urban area. By way of example, in an urban area, there may be a greater likelihood that pedestrians or bicyclists may approach the host vehicle from sides of the vehicle. Accordingly, there may be a greater need in an urban area, as compared to a more rural area, to detect objects in one or more directions relative to the host vehicle (e.g., driver side, passenger side, rear, etc.) with more precision than when in a rural area. In a rural area, by contrast, fewer pedestrians and other obstacles may be present. Thus, there may be less need for high resolution depth maps around the host vehicle, especially at distance ranges close to the host vehicle. On the other hand, however, vehicle speed in rural environments tends to be higher than in an urban area due to various factors, including less traffic. As a result, processor 118 may allocate fewer resources to detection of objects in close proximity to the host vehicle (e.g., within about 40 m, 20 m, etc.) and instead, may allocate more resources to detection of objects that are more distant.

In some embodiments, processor 118 may control at least two light sources and at least two deflectors to enable scanning a first field of view associated with a right side of the vehicle and a second field of view associated with a left side of the vehicle. In yet other embodiments, processor 118 may control the at least one light source 112 such that an amount of light projected toward a first portion of the field of view including a road onto which the vehicle is merging is greater than an amount of light provided to a second portion of the field of view including a building adjacent the road.

As previously described, increases in light flux provided to particular portions of the LIDAR FOV may enhance detection capabilities, among other capabilities, in those regions. the field of view (e.g., field of view 120 of FIGS. 1A and 2A) may be enlarged. As described in FIG. 2C, primary light source 112A may project light with a longer wavelength in order to optimize detection range. As further described in FIG. 5A, the time between light pulses may depend on desired detection range. Specifically, sending the same amount light pulses in a shorter period of time may increase light flux. As described in FIG. 5C, varying the number of pulses or changing the amount of time between pulses may not be the only ways to adjust light flux. Changes in light flux may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more.

By way of example, processor 118 may control at least one light source (e.g., light source 112 of FIG. 1A, laser diode 202 of light source 112 of FIG. 2A, and/or plurality of light sources 102 of FIG. 2B) in a manner enabling light flux of light from at least one light source to vary over a scanning cycle of a field of view (e.g., field of view 120 of FIGS. 1A and 2A).

FIG. 45 includes a diagram 4500 illustrating an example of a LIDAR detection scanning scheme. As depicted, autonomous vehicle 4510 drives east to west on a road approaching vehicle 4530 driving west to east. Autonomous vehicle 4510 may including a LIDAR system capable of projecting light toward seven different regions of an environment surrounding vehicle 4510 to provide seven fields of view (which may overlap in at least some portions). In some embodiments, each field of view of the LIDAR system may be associated with a corresponding module which may a light source 112, a deflector 114, a detector 116, and related optics components (e.g., lenses, etc.), although more or few components may be possible. For simplicity, each of these modules will be referenced here as a lens system as a means for identifying the different fields of view. Through the lens systems, the LIDAR system may receive reflected light from objects in the fields of view. Autonomous vehicle 4510 may have field of view 4521 (e.g., similar to field of view 120 of FIG. 1A) corresponding to lens system 4511, field of view 4522 corresponding to lens system 4512, field of view 4523 corresponding to lens system 4513, field of view 4524 corresponding to lens system 4514, field of view 4525 corresponding to lens system 4515, field of view 4526 corresponding to lens system 4516, and field of view 4527 corresponding to lens system 4517.

In one particular example (not shown), LIDAR system 100 may include four lens systems that "look" ahead of the car. In total, the four lens systems may cover an aggregated 160° field of view using four light sources, each scanning, for example, via a shared deflector a horizontal field of view of 40°. Processor 118 may, in some embodiments, increase light flux by a first light source (corresponding to a portion of the FOV in which a cross-lane may be located) while concurrently reducing light flux for a second light source (corresponding to another direction and an FOV portion not substantially overlapping with a region of interest, such as a cross-lane). The reflections of both signals may impinge on a common light deflector 114 (e.g. mirror).

FIG. 46A depicts diagram 4600 illustrating an example of LIDAR detection scheme for cross traffic turns. Autonomous vehicle 4510 of FIG. 45 may enter an intersection for a cross-lane turn. In other embodiments, the autonomous vehicle may enter a T junction, a Y intersection, or any other type of intersection/junction for a cross-lane turn. Autonomous vehicle 4510 may follow a path, e.g., trajectory 4620, for the cross-lane turn. As autonomous vehicle 4510 enters the intersection (or even before), processor 118 may increase light flux levels to a portion of the LIDAR field of view represented by FOV portions 4525, 4522, and 4523. A a result a potential detection range associated with those portions may increase relative to other portions of the total LIDAR FOV. For example, as depicted, FOV portion 4522 may have a detection range greater than FOV portion 4521; FOV portion 4523 may have a detection range greater than 4524; FOV portion 4525 (the portion on a side of the vehicle facing the oncoming direction of the lane being crossed) may have a detection range greater than FOV portion 4526 and may also have a detection range greater than FOV portions 4522 and 4523. In some cases, the detection range of FOV portion 4525 may be more than twice as long as is other FOV portions. As depicted in FIG. 46A, FOV portion 4525, on the right side of the vehicle, may be allocated the highest light flux and have the largest detection range during the left cross-lane turn because it is in a direction determined to be overlapping with a region of interest. Detection ranges of FOV portions 4521, 4526, and 4524, on the left side of the vehicle may remain unchanged relative to their default values (e.g., as shown in FIG. 45 prior to the cross-lane turn shown in FIG. 46A). Alternatively, light flux projected to any of FOV portions 4521, 4526, and 4524, on the left side of the vehicle may be reduced relative to their default values during the cross-lane turn. FOV portion 4527, capturing the front of autonomous vehicle 4510 during the cross-turn situation of FIG. 46A may be allocated with a light flux level lower than a level normally allocated to the forward FOV portion in a non-cross-lane situation. For example, as shown in FIG. 45, FOV portion 4527 may be allocated a higher light flux value, which in turn may increase the detection range for FOV portion 4527, in situations such as a vehicle travelling at speed on a road. A light flux level of FOV portion 4527 may be reduced in a cross-lane situation as speeds may be lower than the situation shown in FIG. 45. Also, the side of the vehicle adjacent to oncoming traffic in a cross-lane situation may represent a region of higher interest (e.g., from a potential collision standpoint) as compared to a forward travelling direction of the vehicle in the cross-lane situation of FIG. 46A. Of course, as right turns (e.g., in the US and other countries where cars travel on the right side of the road) may not involve cross-lane situations, it may not be necessary to increase the light flux in FOV portions of the LIDAR system residing on a left side of the vehicle. In countries such as Japan and the UK, however, light flux supplied to FOV portions on the left side of the vehicle may be increased during a right turn cross-lane situation. Processor 118 may be equipped to automatically determine a location for the host vehicle (e.g., based on the output of a vehicle navigation system, a GPS sensor, etc.) and control the light flux applied to the various FOV portions according to driving customs/road configurations, etc. in the determined location.

As further depicted in FIG. 46A, processor 118 may detect vehicle 4610 during the cross-lane turn due to the extended detection range from FOV portion 4525. By way of example, processor 118 may determine whether detected object is an object of interest, for example, a moving vehicle, pedestrian, etc. Processor 118 may differentiate between a building, the sidewalk, a parked vehicle, a pedestrian, and a moving vehicle based at least on the reflectivity pattern associated with the detected object. Accordingly, processor 118 may allocate greater levels of resources to FOV portions determined to include such objects of interest (moving vehicles or pedestrians, etc.) and may conserve resources by reducing (or not increasing) resource expenditures on FOV portions determined to contain a building, parked car, or other stationary object.

In some embodiments, processor 118 may increase light flux supplied to a particular sub-region of an FOV portion. For example, in the cross-lane situation shown in FIG. 46A, moving car 4610 may be determined by processor 118 to be an object of interest. Thus, processor 118 may cause more light flux to be provided to sub-regions of FOV portion 4525 that overlap with car 4610. Processor 118 may also increase light levels provided to one or more sub-regions of an FOV portion in other circumstances. For example, where no objects are detected or where no objects beyond a certain distance are detected within a particular sub-region of the FOV portion, processor 118 may allocate increased light flux to those sub-regions in an attempt to detect objects at more distant ranges.

Figure 46B:
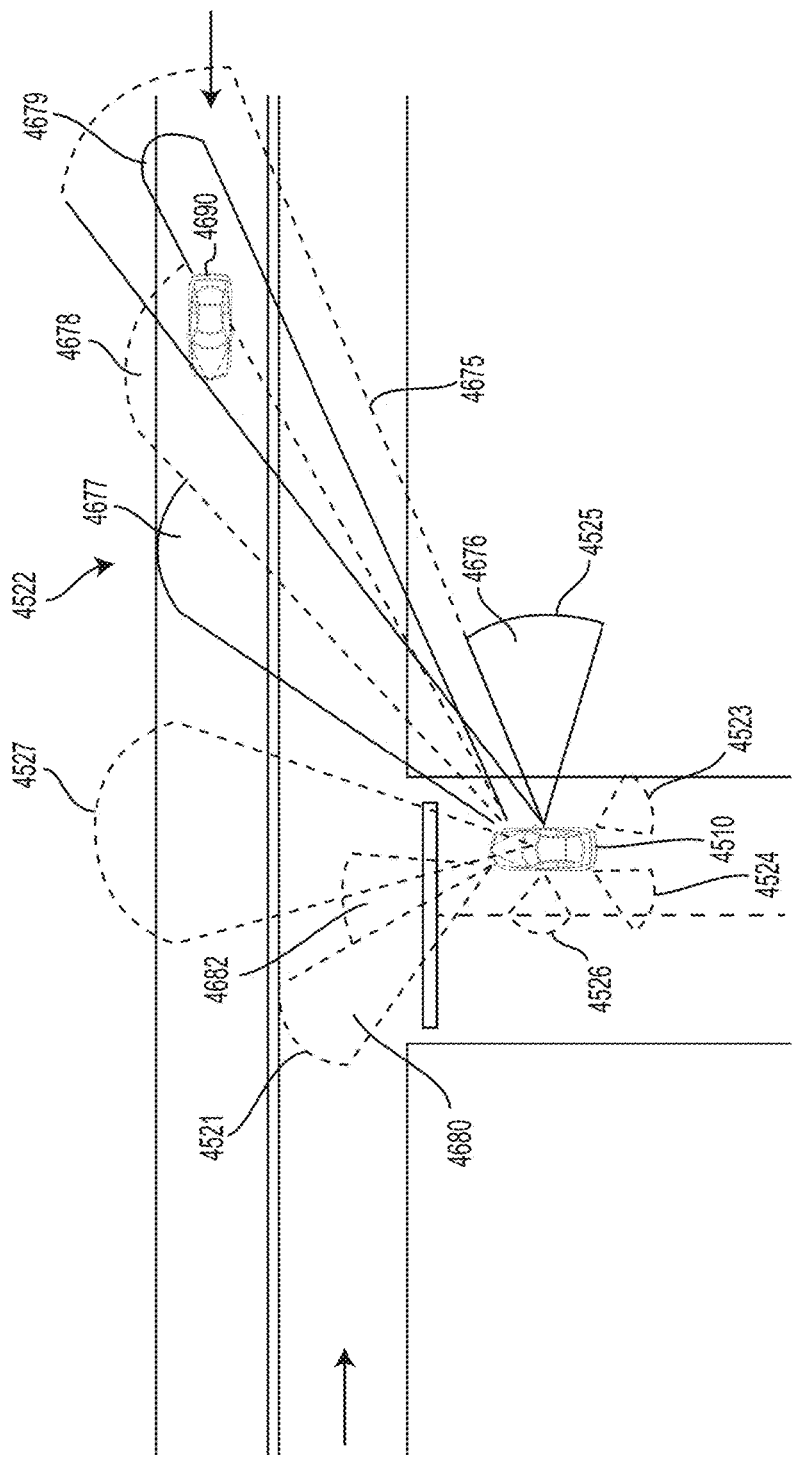

FIG. 46B provides another example of a LIDAR detection scheme for cross traffic turns. In this example, vehicle 4510 has approached a T-intersection and is stopped and waiting for an opportunity to turn left into the far lane. In this situation, there may be little risk of object encounters from the rear of vehicle 4510 or from much of the left side of vehicle 4510. Rather, the areas of most interest may be forward and to the left and right of the vehicle. Thus, light projections to FOVs 4526, 4524, and 4523 may be reduced, as long detection ranges and/or high resolution depth mapping may not be required in these zones. In some embodiments, reduction of light projected to FOVs 4526, 4524, and 4523 may free up resources that may be used relative to other fields of view. For example, light emission power and/or computational resources that would have been used in detecting objects in larger versions of FOVs 4526, 4524, and 4523 may be reallocated to other FOVs, such as FOV 4521, 4522, 4527, or 4525, by reducing the resources required to scan FOVs 4526, 4524, and 4523.

With more resources available to enhance detection in important areas, LIDAR system 100 may increase an amount of light flux projected to FOV 4521 in order to increase a detection range in an area forward and to the left of vehicle 4510. And the increase in light flux provided to FOV 4521 need not be uniform over all regions of the FOV. Rather, as shown in FIG. 46B, FOV 4521 may be segmented into FOV sub-regions 4680 and 4682. While both sub-regions may receive more light flux than FOV 4526, for example, sub-region 4680 may receive more light flux than sub-region 4682 during one or more scanning cycles of FOV 4526. Such an FOV scanning scheme may potentially increase a detection distance in the lane of traffic approaching from the left.

In making a left turn at the T-intersection shown in FIG. 46B, it may be important to enhance detection capabilities with respect to vehicles approaching vehicle 4510 from the left. Thus, as described above, more light flux can be supplied to FOV 4521 and distributed to its sub-regions either uniformly or non-uniformly, as described above, to enhance detection capabilities with respect to vehicles approaching from the left. In the situation illustrated in FIG. 46B, however, what may be even more important is the detection capability of traffic approaching vehicle 4510 from the right. While generally, traffic approaching from the left and the right may be expected to approach vehicle 4510 with similar velocities, an interaction time with vehicles approaching from the right may be significantly longer than interaction times for vehicles approaching from the left. For example, to turn left at the T-intersection shown, vehicle 4510 may need to determine whether any cars are approaching from the right and whether under normal acceleration conditions there is sufficient time for vehicle 4510 simply to clear in front of left-approaching vehicles. Once clear of those vehicles, the interaction between vehicle 4510 and a left-approaching vehicle may end.

On the other hand, the interaction time between vehicle 4510 and right-approaching vehicles may be longer, assuming vehicle 4510 is making a left turn a the illustrated T-intersection. For example, not only must vehicle 4510 determine if there is sufficient time to navigate in front of a right-approaching vehicle, but vehicle 4510 must also determine if there will be sufficient time to accelerate up to speed forward of the right-approaching vehicle without that vehicle colliding with the rear of vehicle 4510 after vehicle 4510 completes the left turn and during its acceleration period. Thus, not only may there be a need for greater detection ranges to detect vehicles, such as vehicle 4690, approaching from the right, but there may be a need for detection ranges that are even longer than the detection ranges needed to detect left-approaching vehicles. Thus, in the example shown, both FOVs 4522 and 4525 (the FOVs that have coverage of a region forward and to the right of vehicle 4510) have been allocated with increased light flux levels in order to increase detection capabilities forward and to the right of vehicle 4510. Again, such light increases need not be made uniformly over all regions of the respective FOVs. Rather, as illustrated, a sub-region 4675 of FOV 4525 has been allocated with more light than another sub-region 4676 of FOV 4525. Indeed, the amount of light supplied to sub-region 4675 may be significantly more than the amount of light supplied to sub-region 4676. As a result, a detection range in sub-region 4675 may be two times, three times, five times, ten times (or more) greater than a detection range associated with sub-region 4676.

Similarly, increased light levels may be applied to FOV 4522. As illustrated, FOV 4522 may include three sub-regions, 4677, 4678, and 4679, and the light flux levels applied to these sub-regions may progressively increase from sub-region 4677 to sub-region 4679, such that sub-region 4679 may offer a higher detection range than sub-region 4678, which may offer a higher detection range than sub-region 4677. By reallocating available resources (e.g., an optical budget) in this manner, a right-approaching vehicle 4690 may be detected at ranges sufficient to determine whether vehicle 4510 has enough time to merge in front of vehicle 4690 and accelerate to speed.

Dynamic Illumination Allocation in Highway Driving

LIDAR system 100 may be incorporated onto a vehicle (e.g., onto a body of the vehicle or in any other suitable position). And as discussed previous, LIDAR system 100 may be capable of dynamically controlling amounts of light flux provided to different portions of the LIDAR FOV. In one example, discussed below, processor 118 may determine or otherwise receive an indication that the vehicle is driving along a highway (e.g., where the vehicle may travel at higher speeds with less risk of encountering crossing obstacles, such as pedestrians, bicycles, and other vehicles, which are more typically found in an urban environment, etc.). In response to such an indication, processor 118 may apportion an available optical budget such that over one or more scans of the LIDAR FOV, more light flux may be provided to a central region of the FOV than to peripheral regions of the FOV. Such apportionment of light flux may be appropriate for highway driving where there may be a need for increasing a detection range ahead of the vehicle and where there may be less need for maintaining long-range or high resolution detection capabilities in peripheral regions of the FOV. In instances where processor 118 determines that the host vehicle has left a highway environment and, for example, entered a non-highway road or environment (e.g., an urban environment) where there may be greater risk of collision with crossing objects, processor 118 may reapportion the optical budget such that the extra light flux applied in a central region of the FOV during highway driving is reallocated to the peripheral regions.

More specifically, in some embodiments, processor 118 of LIDAR system 100 may control at least one light source 112 in a manner enabling light flux of light from at least one light source to vary over a scanning cycle of the FOV. Processor 118 may also control at least one deflector 114 to deflect light from light source 112 in order to scan the FOV, which may be dividable into a central region generally corresponding a location of a road on which the vehicle travels, a right peripheral region generally corresponding to an area right of the road, and a left peripheral region generally corresponding to an area left of the road. Processor 118 may obtain input that the vehicle is in a mode corresponding to highway travel, and in response to the input, processor 118 may coordinate control of light source 112 with control of light deflector 114 such that during scanning of the FOV, more light may be directed to the central region than to the right peripheral region and to the left peripheral region.

Processor 118 may receive, from any suitable source, an indication that the host vehicle is travelling on a highway. In some cases, this information may be obtained through communication with a vehicle navigation system 4740 (FIG. 47), via a GPS receiver and a map server or map application, through analysis of images from one or more cameras, based on an output from LIDAR system 100 itself, based on outputs of other LIDAR systems, etc. For example, in some embodiments, navigation system 4730 may incorporate, access, or otherwise receive from a remote server one or more maps from which a status of a roadway as a highway or as a non-highway may be determined. Processor 118 may receive an indication of whether a roadway is a highway directly from navigation system 4730. In other cases, processor 118 may determine a roadway status based on one or more indicators associated with map information used by navigation system 4730 (e.g., a roadway status indicator, a speed limit associated with a particular road, etc.). In some cases, processor 118 may determine a road status as a highway or non-highway based on a combination of information from two or more sensors or information sources. For example, in combination with information received from navigational information 4730, processor 118 may receive position information from a GPS receiver, speed information from a vehicle sensor (e.g., a speedometer), visual information from a camera, depth map information from one or more LIDAR systems (including the system in which processor 118 is based), or any other suitable source, and may use a combination of information sources to determine whether a road being traveled is a highway. Such auxiliary information sources may convey information indicative of vehicle speed, vehicle position, identified lane markings, identified landmarks, identified road barriers, a direction of traffic flow, a road width, a lane width, lane configuration, identified traffic signs, identified traffic lights, etc. Processor 118 may use any of this information alone or in combination to verify a status of a road.

FIG. 47 provides a diagrammatic illustration of a vehicle travelling in a highway environment with the assistance of a LIDAR system consistent with exemplary disclosed embodiments. Vehicle 4710 may be equipped with LIDAR system 100 and in some cases navigation system 4730. As shown, LIDAR FOV 120 may be partitioned into central region 4720, right peripheral region 4724, and left peripheral region 4722. By coordinating operation of light projector 112 and deflector 114, processor 118 may cause FOV 120 to be scanned during one or more scanning cycles (e.g., by moving deflector either continuously or discontinuously through a plurality of different instantaneous positions at different times during a scanning cycle). For example, processor 118 may coordinate light deflector 114 and light source 112 such that when light deflector 114 is located at a particular instantaneous position, a portion of a light beam is deflected by the light deflector from light source 112 toward an object in the LIDAR FOV, and reflections of the portion of the light beam from the object are deflected by the deflector toward at least one sensor 116. In some embodiments, more than one light source may be used. For example, a plurality of light sources may be aimed at deflector 114, and processor 118 may control deflector 114 such that when deflector 114 is located at a particular instantaneous position, light from the plurality of light sources is projected towards a plurality of independent regions in the LIDAR FOV.

An available optical budget may be apportioned to one or more portions of the LIDAR FOV in any suitable manner. In some embodiments, e.g., where processor 118 determines that the vehicle is travelling on a highway, processor 118 may allocate the available optical budget to portions of the LIDAR FOV such that central region 4720 receives more light flux than is provided to right peripheral region 4724 or left peripheral region 4722. For example, processor 118 may be configured to coordinate the control of light source 112 with the control of deflector 114 such that during a first scanning cycle, light having a first light flux is directed to the central region 4720. After determining that the vehicle is travelling on a highway, processor 118 may change light apportionment such that during a second scanning cycle, light having a second light flux is directed to the central region 4720, and wherein the second light flux is greater than the first light flux. As a result of increased light flux in the central region of the LIDAR FOV relative to peripheral regions of the LIDAR FOV, a detection range in the central region may be greater than a detection range in the peripheral regions. In some cases, processor 118 may control light source 112 such that a detection distance in the central region is at least two times greater than the detection distances in the right peripheral region and in the left peripheral region.

Of course, the LIDAR FOV may be segmented into more or fewer than three regions. Additionally, any of the segments may be further divided into a plurality of sub-regions. And, processor 118 may be configured such that during a scan of the field of view, more light is directed to one of the plurality of sub-regions than to another of the plurality of sub-regions.

Just as light apportionment may change based on a determination that the host vehicle is travelling on a highway, processor 118 may reallocate an optical budget based on a determination that the vehicle has exited the highway or that an environment of the vehicle has otherwise changed from the highway environment. For example, in cases where the vehicle transitions from road types, such as highway to urban, processor 118 may reallocate the available optical budget. For example, upon changing from a highway environment to an urban environment, processor 118 may reduce light flux projected toward the central region 4720 (as compared to one or more previous scanning cycles) and may increase light applied to one or more of the peripheral regions (as compared to one or more previous scans).

Such apportionment of an available optical budget to selected regions of a LIDAR FOV may be referred to as defining a spatial light scanning pattern. In some embodiments, processor 118 may determine a spatial light scanning pattern associated with a plurality of scanning cycles upon obtaining data indicative of a type of road on which the vehicle is traveling. As noted above, the type of road may include at least one of: an urban road, a highway road, an undivided road, a road with a single lane per direction, a road with a plurality of lanes per direction, or a road with a public transportation lane. And upon obtaining data indicative of a change of the type of road on which the vehicle is traveling (e.g., from a highway to an undivided road), less light may be directed to the central region and more light may be directed to the right peripheral region and the left peripheral region compared to the light projected in a prior scanning cycle.

Processor 118 may apportion the available optical budget not based not only upon a determination of a type of road on which the host vehicle travels, but also may apportion the available optical budget based on detected driving events.

Figure 48B:
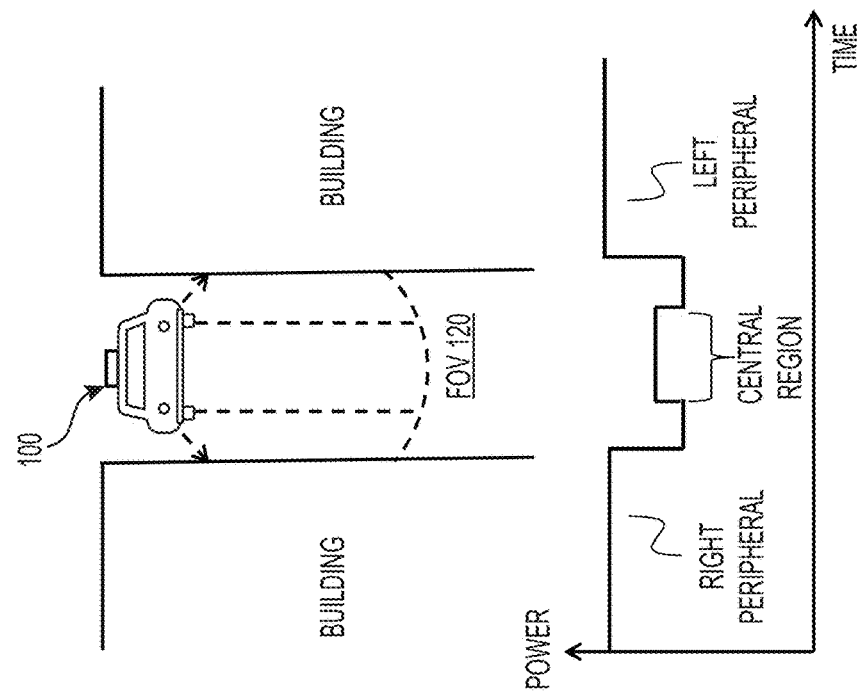
FIGS. 48A-48D provide diagrammatic illustrations of dynamic light allocation by a LIDAR system in a highway environment according to exemplary disclosed embodiments.
Figure 48A:
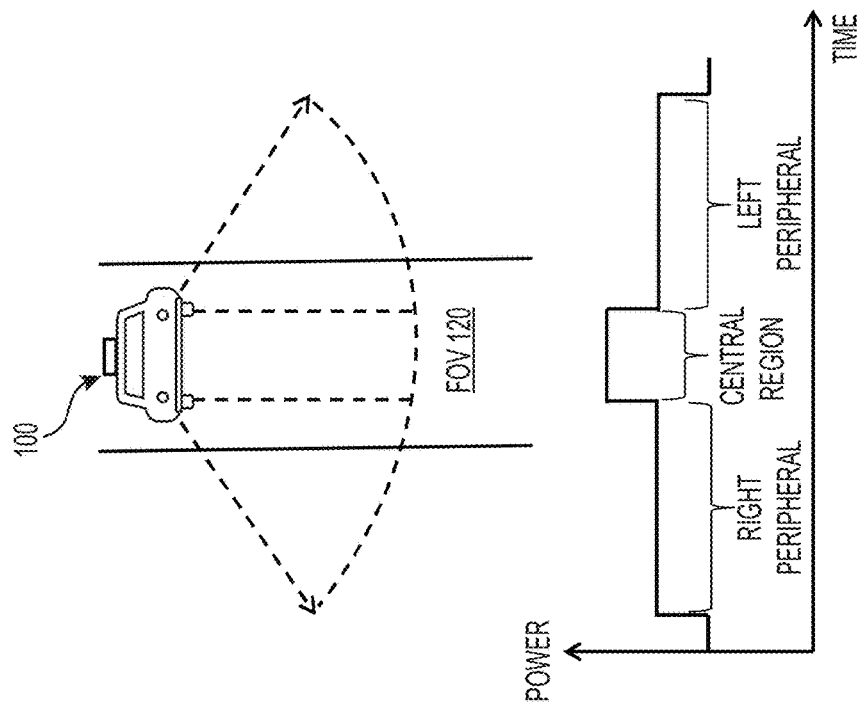

For example, FIG. 48A represents a scenario as described above. Processor 118 may determine that the vehicle has entered a highway, and as a result of this event, processor 118 may allocate the available optical budget such that more light flux (e.g., higher light power levels) may be supplied to the central region as compared to either the right or left peripheral regions.

In FIG. 48B, processor may determine that the vehicle has entered an area where the road may be closes bounded by buildings on either side. Such a scenario may occur, for example, in an urban environment. Based on the detection of the driving event of entering an urban road setting, processor 118 may cause more light flux to be supplied to the left and right peripheral regions than is supplied to the central region. Such an allocation of the optical budget may be suitable for urban environments where vehicle speed is typically lower than highway speeds (meaning that a detection range forward of the vehicle need not be as great in an urban environment and what might be preferred in an highway environment). Further, in an urban environment, there may be more risk of encounters with pedestrians, which may reside in regions to either side of the vehicle (e.g., on sidewalks adjacent to the illustrated buildings). Thus, in an urban environment, enhancing detection range and or resolution capabilities in the peripheral regions of a LIDAR FOV relative to a central region may be beneficial.

Figures 48C, 48D:
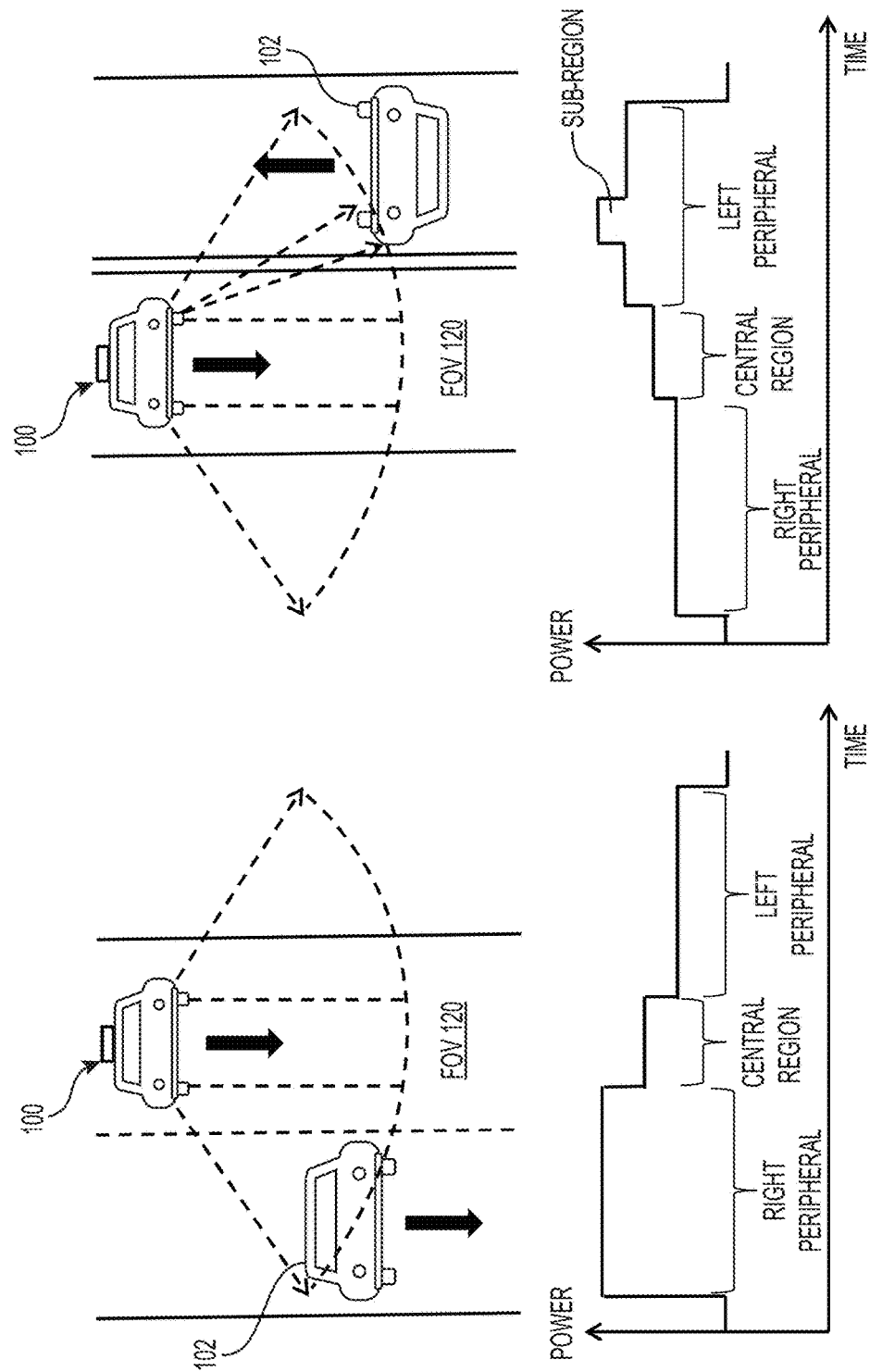

FIG. 48C provides another example of a detected driving event that may trigger a change in allocation of the available optical budget to certain regions of the LIDAR FOV. For example, as shown, another vehicle 102 may be detected in a lane adjacent to the host vehicle with both vehicle 102 and the host vehicle being determined as moving in the same direction. In such a scenario, processor 118 may determine that an area forward and to the right of the host vehicle constitutes a region of interest, as that is the region in which vehicle 102 is located. To aid in detection and/or tracking of vehicle 102, processor 118 may allocated the available optical budget such that the right peripheral region receives a highest level of light flux, the central region receives the next highest level of light flux, and the left peripheral region receives the lowest level of light flux.

FIG. 48D provides yet another example of a detected driving event that may trigger a change in allocation of the available optical budget to certain regions of the LIDAR FOV. For example, as shown, another vehicle 102 may be detected in a lane adjacent to the host vehicle with vehicle 102 and the host vehicle being determined as moving in opposite directions. In such a scenario, processor 118 may determine that an area forward and to the left of the host vehicle constitutes a region of interest, as that is the region in which vehicle 102 is located (and where oncoming traffic is expected to be found). To aid in detection and/or tracking of vehicle 102, processor 118 may allocated the available optical budget such that the left peripheral region receives a highest level of light flux, the central region receives the next highest level of light flux, and the right peripheral region receives the lowest level of light flux. Further, as shown in FIG. 48D, a particular sub-region of the left peripheral region may be defined, and processor 118 may cause the highest level of light flux (even within the left peripheral region) to be supplied to the particular sub-region. In some cases, the defined sub-region of the left peripheral region may overlap with a location of the detected vehicle 102.

Processor 118 may allocate or re-allocate an available optical budget based on other detected driving events as well. For example, in some embodiments the detected driving event justifying allocation or re-allocation of the optical budget may include at least one of a traffic-related event, a road-related event, an approach to a predefined establishment, and a weather-related event. Based on detection or an indication of any of these types of events, processor 118 may alter the spatial light scanning pattern from one scanning cycle to another. For example, processor 118 may alter the spatial light scanning pattern such that more light is directed to at least a portion of the right peripheral region than was directed to the at least a portion of the right peripheral region in a prior scanning cycle, such that more light is directed to at least a portion of the left peripheral region than was directed to the at least a portion of the left peripheral region in a prior scanning cycle, such that more light is directed to at least a portion of the central region than was directed to the at least a portion of the central region in a prior scanning cycle, etc.

Figure 49:
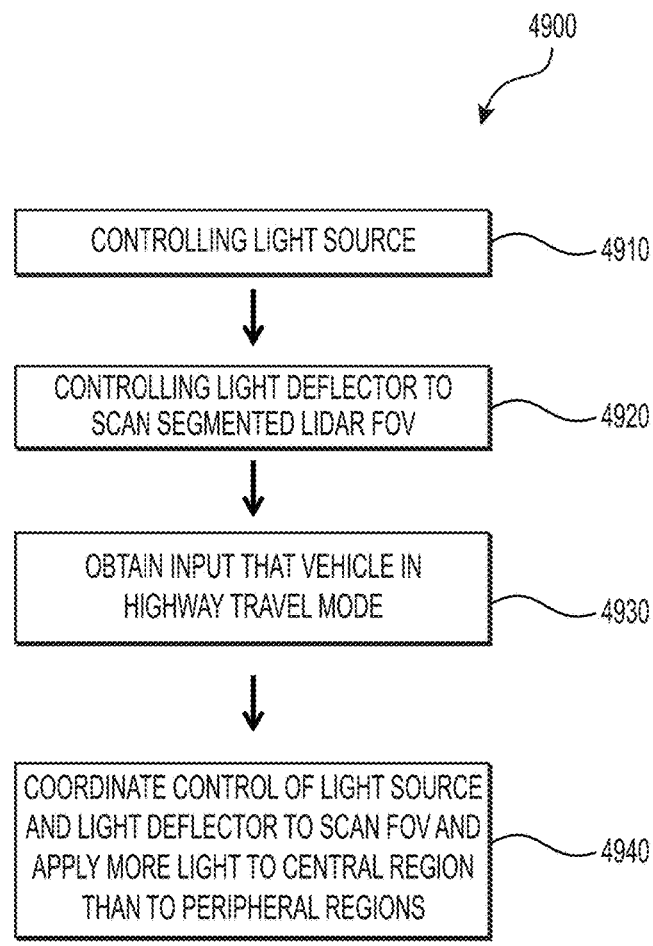
FIG. 49 illustrates a method for detecting objects in a path of a vehicle using a LIDAR consistent with exemplary disclosed embodiments.

FIG. 49 provides a flow chart representation of a method 4900 for operating a LIDAR system consistent with presently disclosed embodiments. The method may include controlling at least one light source in a manner enabling light flux of light from at least one light source to vary over a scanning cycle of a field of view (step 4910). The method may also include controlling at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway (step 4920). At step 4930, processor 118 may obtain input that the vehicle is in a mode corresponding to highway travel, and in response, as step 4940, processor 118 may coordinates the control of the at least one light source with the control of the at least one light deflector such that during scanning of the field of view that encompasses the central region, the right peripheral region, and the left peripheral region, more light is directed to the central region than to the right peripheral region and to the left peripheral region.

Varying Lidar Illumination Responsive to Ambient Light Levels

A LIDAR system may be used in many different environments having differing levels of ambient light. In addition, levels of ambient light may drastically differ within a single scene at any one time. For example, parts of the scene may be shaded, other may be illuminated by sunlight or other light sources, and yet other parts of the field may include ambient light source such as lamps, headlights, open fire, etc. Such ambient light may cause noise which, in turn, may lower the quality of service (QoS) of the LIDAR system. In situations where LIDAR system 100 operates in the presence of high ambient light (e.g., bright sunlight or artificial light sources), LIDAR system 100 may experience significant noise from the ambient noise. On the other hand, if the LIDAR system 100 operates in environments with less ambient light, the noise may be lesser.

As described, systems and methods consistent with the presently disclosed embodiments may collect light reflection data and allocate light flux on a pixel-by-pixel basis, on a beam-spot-by-beam-spot basis, or on a portion by portion basis relative to a LIDAR FOV (it is noted that in the description below, implementations which are discussed with respect to any one of these aforementioned bases may also be implemented, mutatis mutandis, with respect to the other two bases). In some instances, the amount of light flux allocated to a particular portion of the LIDAR FOV may depend on an amount of ambient light detected in the particular region of the FOV. Especially, in some instances, the amount of light flux allocated to a particular portion of the LIDAR FOV (e.g. to a specific pixel) in a given scanning cycle may depend on an amount of ambient light detected in that particular region of the FOV in the same scanning cycle. In some instances, the amount of light flux allocated to a particular portion of the LIDAR FOV (e.g. to a specific pixel) in a given instantaneous position of the at least one light deflector 114 may depend on an amount of ambient light detected in that particular portion of the FOV while the at least one light deflector 114 remained in that particular instantaneous position (e.g., without any emission to any other portion of the FOV intermittent between the detection of the ambient light to the emission of the allocated light flux). For example, where an amount of ambient light in a particular region of the FOV is determined to be low, lower amounts of light flux may be supplied to that particular region. On the other hand, as more ambient light is detected within a particular region of the FOV, the amount of light flux provided to that region may be increased. By varying light allocation to regions of the LIDAR FOV based on levels of detected ambient light, effects of noise on the operation of LIDAR system 100 may be reduced or eliminated.

Figure 50:
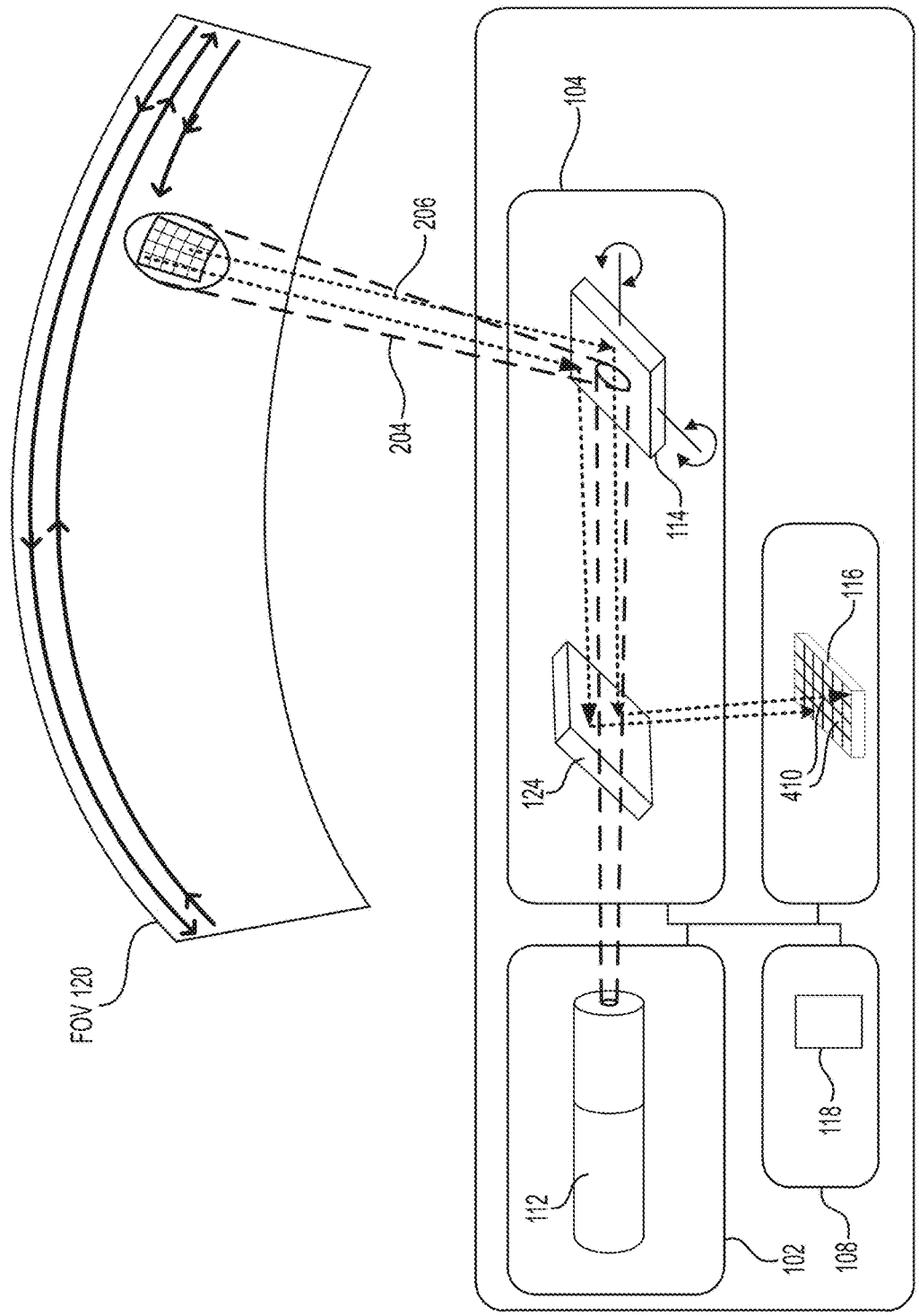
FIG. 50 is a diagram illustrating an example of a sensing arrangement for a LIDAR system according to exemplary disclosed embodiments.

In some embodiments, the field of view (e.g., FOV 120, as shown in FIG. 50) may include a plurality of portions, each corresponding to a different instantaneous position of deflector 114. Each of the portions may have any suitable size and/or occupy any suitable portion of FOV 120.

Figure 51:
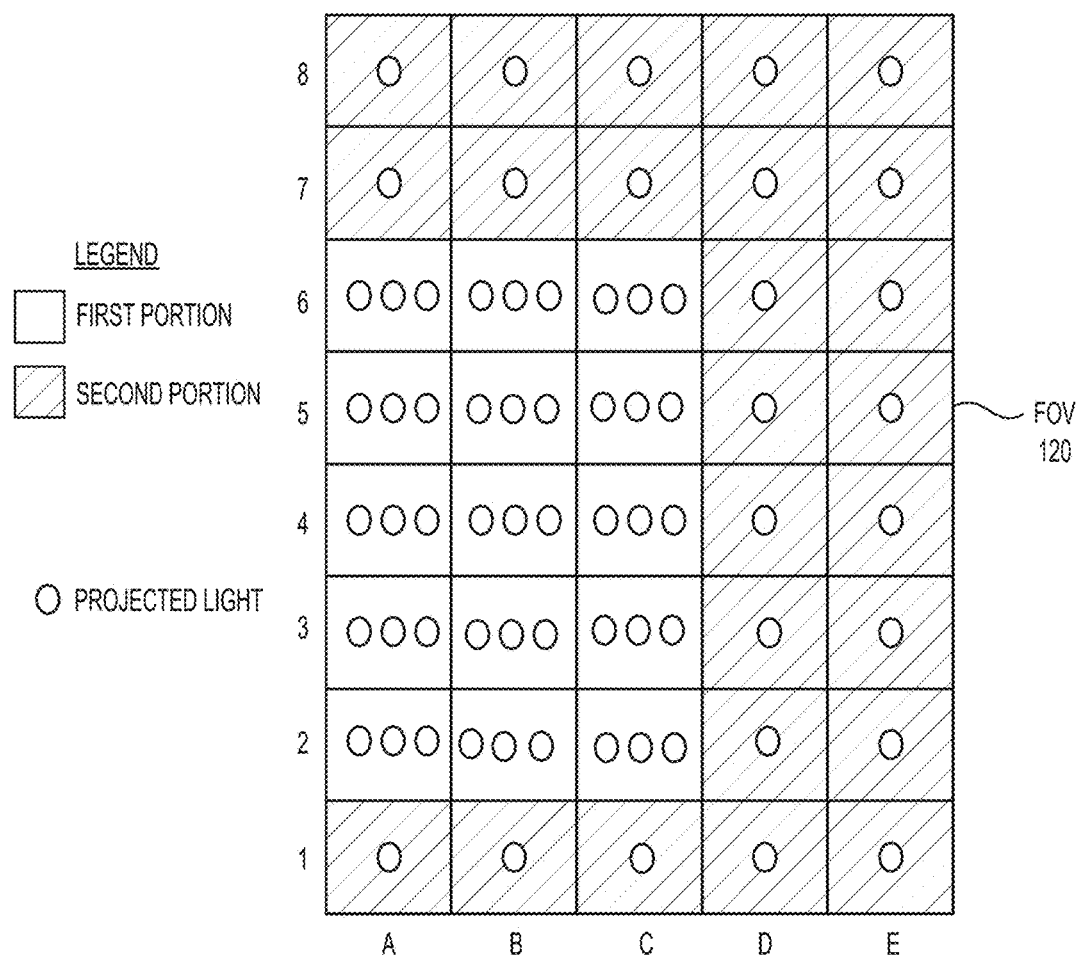
FIG. 51 is a diagrammatic illustration representing different portions of a LIDAR field of view.

The at least one processor 118 may receive, on a pixel by pixel basis, signals from at least one sensor 116, as shown in FIG. 50). For example, the at least one sensor may detect light collected from a specific portion of the FOV on a pixel-by-pixel basis (e.g., pixels A1, B1, C1, A2, etc. of FOV 120 as shown in FIG. 51) and generates signals corresponding to light collected for each pixel. The signals may be indicative of multiple sources of light collected from the FOV. For examples, one component of the light collected and provided to sensor 116 may include ambient light. Another component of the light collected and provided to sensor 116 may include light from the at least one light source 112 that is projected to the particular portion of the FOV and reflected by one or more objects in the particular portion of the field of view. In certain situations (e.g., where an object is distant or has a low reflectivity), the ambient light collected from a particular portion of the LIDAR FOV may account for a greater proportion of light provided to sensor 116 than the reflected light originating from the LIDAR illumination. In other situations (e.g., where an object is closer or has a higher reflectivity), the ambient light collected from a particular portion of the LIDAR FOV may account for a smaller proportion of the light provided to sensor 116 than the reflected light. For example, in a first portion of the LIDAR FOV (represented by the particular regions of the FOV shown in white in FIG. 51), the ambient light may account for a greater proportion of the light collected from FOV 120 than reflected light collected from a second portion of FOV 120 (represented by the particular regions of the FOV shown with shading in FIG. 51). It should be noted that the first and second portions of the LIDAR FOV may each include more or fewer particular regions of the LIDAR FOV than what is shown in FIG. 51. For example, in some embodiments, the first and/or second portions may each correspond to a single particular region of FOV 120 or may include a plurality of portions (as shown).

Based on the output of sensor 116, processor 118 may be configured to detect ambient light in a particular portion of the LIDAR FOV separately from detection of projected light reflected from objects. For example, in some embodiments, processor 118 may sample an output of sensor 116 at times when reflected light is not expected. For example, prior to a light emission from projector 112 toward a particular portion of the FOV, reflected light would not be expected from the particular portion of the FOV, as no light has yet been projected there. Thus, light sensed by the sensor 116/processor 118 may be assumed to correspond to ambient light. Similarly, after light has been projected to the particular portion, but after a sufficient time has elapsed such that no reflections are expected from the light projection (e.g., at a time greater than or equal to a time corresponding to the time of flight of light to and from a maximum expected range of the LIDAR system for a particular light emission), light gathered from a particular portion of the FOV may be attributed to ambient light. In some embodiments, following light emission by light projector 112, sensor 116 may detect reflections of light from the field of view in a first sensing duration following the light emission. And sensor 116 may measure an ambient-light level in the field of view in a second sensing duration following the light emission. By monitoring the output of sensor 116 at such times, an ambient light level in a particular portion of the FOV may be determined.

Optionally, processor 118 may be configured to determine an amount of ambient light in a particular portion of the FOV during a time when light projected to the particular portion is reflected from one or more objects and received by sensor 116. For example, in some cases, the projected light may be associated with one or more characteristics (e.g., wavelength, modulation pattern, pulse duration, etc.) that may be sensed and/or differentiated from background ambient light, for example, based on an output of sensor 116 or one or more other sensors. In some cases, LIDAR system 100 may include a first sensor configured to detect reflections of light from objects in the field of view and a second sensor configured to measure the ambient light in the field of view. In other cases, sensor 116 may detect both reflections from objects and ambient light. Differentiating ambient light from reflected light in this manner may enable determination of an amount of ambient light present in a particular portion of the FOV. In some examples, received light which is determined by processor 118 to be a reflections signal of light emitted by the LIDAR (e.g. based on a matching filter) may be subtracted from the overall receive signal, to provide an estimation of ambient light level.

In some embodiments, processor 118 may be configured to identify a type of light source or sources associated with the ambient light detected in a particular portion of the LIDAR FOV. For example, after receiving sensed light information associated with a specific portion of the FOV, processor 118 may compare the received information with the pre-stored noise-level data associated with various sources of ambient light. Based on such a comparison, processor 118 may identify a type of light source from which the ambient light may have originated. Processor 118 may also use other characteristics of the ambient light (e.g., polarization, fluctuations levels) and/or information from multiple pixels (e.g. physical size estimation, distance between light sources) in for the identification of the type of the light source. It is noted that the identification of the type of the light source may later be used for object classification (e.g., headlights may indicate that the object is a car or a semitrailer truck, based on a distance between the headlights), and vice versa (object features may be used to identify the light source, e.g. high lights sources in buildings may be identified as lit windows).

In some embodiments, where ambient light levels are sensed in a particular region of the LIDAR FOV, processor 118 may determine an allocation of light to be projected to that particular portion of the FOV based on the sensed ambient light levels. For example, if the sensed ambient light levels are below a predetermined threshold/value, processor 118 may determine that no additional light needs to be projected to the particular FOV portion. On the other hand, if the sensed ambient light levels are above a predetermined threshold/value, then processor 118 may determine that additional light should be projected to the particular FOV portion. In such instances, processor 118 may cause additional light flux to be supplied to the particular portion of the FOV.

As just one example represented by the diagram of FIG. 51, a first portion of the FOV includes fifteen particular regions of the FOV, and a second portion of the FOV includes 25 particular regions. The regions of the second portion were all determined to have ambient light levels below a predetermined level. Thus, in these regions, only one pulse of light (or any other type of light projection affecting an amount of light flux provided to a particular FOV region) has been allocated to the regions of the second portion of the FOV. On the other hand, each of the regions of the FOV in the first portion were determined to have ambient light levels above the predetermined ambient light level threshold/value. As a result, processor 118 has allocated three light pulses to be projected toward each of the regions included in the second portion of the FOV. Of course, the concept of light pulses provided to regions of the FOV is exemplary only. Any other type of light projection techniques may be used in order to increase light flux in the regions of the first portion of the FOV relative to the amounts of light provided to the regions of the second portion of the FOV.

It is also noted that other considerations may be used, in addition to the detection of ambient light levels, for determining the amount of flux which will be provided to different portions of the FOV (e.g., to different pixels) during each scanning cycle. For example, processor 118 may decide not to allocate additional light to a portion in which light source is detected, if that portion is included in a predefined region of no interest. Processor 118 may combine the information of the determined ambient light levels in a portion of the FOV with information indicative of other noise levels of that portion, or with any other type of information (from the same scanning cycle or not) which is disclosed in the present disclosure as usable for determining flux levels.

An amount of light that processor 118 allocates to a particular region of the FOV may also depend on a determined type of light source associated with ambient light detected in the particular region. For example, more light may be allocated to the particular region if the ambient light is determined to have originated from the sun rather than from an electric lamp, for example. Of course, the reverse may also be true.

To scan the FOV (e.g. FOV 120 of FIG. 50), the at least one processor 118 may coordinate the at least one light deflector and the at least one light source such that, when the at least one light deflector is located at a particular instantaneous position, a light beam is deflected by the at least one light deflector from the at least one light source towards the field of view and reflections from an object in the field of view are deflected by the at least one light deflector toward at least one sensor. Accordingly, the at least one light deflector may direct a light beam toward the field of view and also receive a reflection from the field of view. For example, FIGS. 1A, 2B, and 2C depict examples in which a deflector both directs a light beam towards the field of view and also receives a reflection from the field of view. In certain aspects, the reflection may be caused by the light beam directed toward the field of view. In other embodiments, a light beam from the at least one light source may be directed towards the field of view by at least one light deflector separate from at least one other light deflector that receives a reflection from the field of view. For example, FIG. 2A depicts an example in which one deflector directs a light beam towards the field of view and a separate deflector receives a reflection from the field of view.

In some embodiments, a sensitivity level associated with sensor 116 may be controlled based on detected ambient light and/or whether light sources are detected, for example, in a particular region of the LIDAR FOV (for example, during the same scanning cycle, but not necessarily so). For example, processor 118 may be configured to identify, based on the received information from sensor 116, an existence of a light source in a particular portion of the LIDAR FOV. In response to identification of such a light source, processor 118 may alter a sensor sensitivity relative to light reflections from the particular portion of the LIDAR FOV.

As explained above, as more ambient light is detected within a particular region of the FOV, the amount of light flux provided to that region may be increased, in order to reduce or eliminate the effects of noise. The at least one processor 118 may cause the at least one light source (e.g., light source 112 of FIG. 50) to project a higher light flux toward a portion of a field of view (e.g., field of view 120 of FIG. 50). The higher light-flux projected toward a particular portion of the FOV may improve a signal to noise ratio (or otherwise improve the detection probability in this portion of the FOV, e.g. as discussed above), and therefore may increase the QoS for an object located in the portion of the field of view.

The at least one processor 118 may also obtain an identification of at least one distinct region of interest in a portion of the field of view and may increase light flux in the region of interest. For example, light flux may be increased by increasing the number of light pulse per solid angle, increasing irradiance versus FOV portion, emitting additional light pulses, increasing power per pixel, emitting additional photons per unit time, increasing the aggregated energy over a certain period of time, emitting additional photons per data point in a generated point cloud model, increasing aggregated energy per data point in a generated point cloud model, altering the wavelength, increasing the amplitude and/or frequency of the light pulses, or any other characteristic of increasing light flux. In some cases, the region of interest may be a particular region of the LIDAR FOV determined to have a level of ambient light meeting at least one predetermined characteristic (e.g., ambient light level, type of light source, night or daytime operation (ambient light sources indicative of headlights at night), etc.).

A particular region of interest in a portion of a field of view may also be identified based on information received from at least one of a GPS unit, a vehicle navigation system, a radar, a LIDAR, a camera, etc. Based on the identification, the at least one processor 118 may cause the at least one light source (e.g., light source 112 of FIG. 50) to project a higher light flux toward a portion of a field of view than what is projected in other portions of the field of view. For example, a signal from a camera may indicate that the LIDAR system 100 is in a bright environment (e.g., under a light source or under the sun). To compensate for high levels of noise associated with such light sources, the at least one processor 118 may cause light source 112 to project a higher light flux toward a portion of the LIDAR field of view.

To project more light toward a portion in a FOV, the at least one processor 118 may cause the at least one light source 112 to project more light-pulses. For example, the at least one processor 118 may vary the timing of pulses from the at least one light source. To increase the number of the light-pulses in a portion, the at least one processor may shorten the timing of the pulses. By way of further example, processor 118 may alternatively or concurrently vary power level, of pulses from the at least one light source. In a yet further example, processor 118 may alternatively or concurrently vary the amplitude and/or frequency of pulses from the at least one light source. For example, in FIG. 51, the system may determine to project one light-pulse per pixel as default. Because the first portion of FOV 120 may contain a higher ambient light and the received signal may be greater than the predetermined threshold, three light pluses per pixel, instead of one per pixel, may be projected in the first portion of FOV, as described above. In some embodiments, the intensity of light projected to the regions of the first portion of the FOV in FIG. 51 may be greater than an intensity of light provided to the second portion of the FOV in FIG. 51.

Moreover, processor 118 may be configured to alter a light source parameter associated with light projector 112 such that in a single scanning cycle, more light-pulses per solid angle are projected toward the first portion of the FOV than a number of light-pulses per solid angle projected toward the second portion of the FOV in FIG. 51. In some cases, rather than even providing a default level of light to certain regions of the LIDAR FOV, processor 118 may be configured to alter a light source parameter associated with light projector 112 such that during at least one single scanning cycle for the LIDAR FOV, no light is projected towards the second portion of the field of view shown in FIG. 51. In another example, processor 118 may also be configured to alter the light source parameter such that the light projected toward the first portion is at a different wavelength than the light projected toward the second portion.

Figure 52:
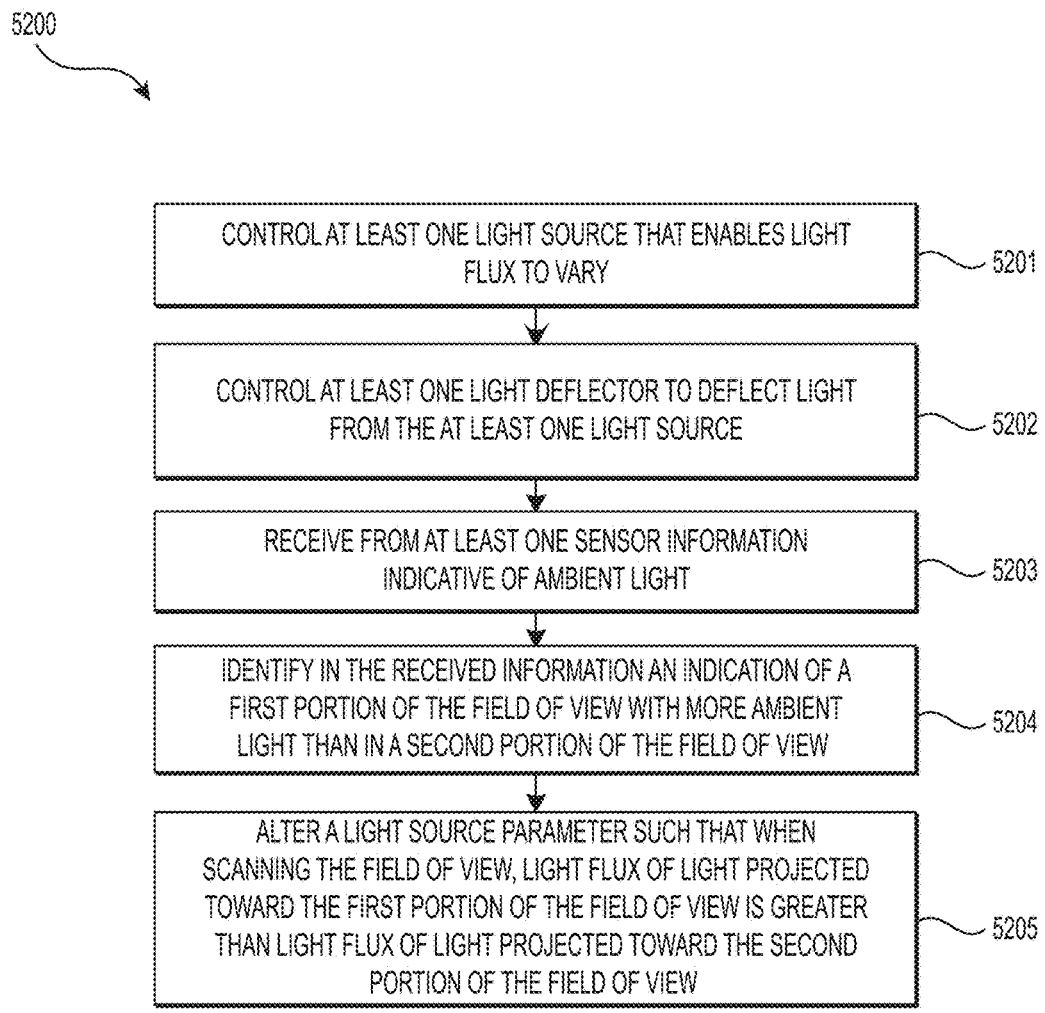
FIG. 52 is a flow chart illustrating an example of a method for detecting objects in a region of interest using a LIDAR system.

FIG. 52 illustrates an example method 5200 for detecting objects using a LIDAR system. At step 5201, as explained above, processor 118 may control at least one light source (e.g., light source 112 of FIG. 1A, laser diode 202 of light source 112 of FIG. 2A, and/or plurality of light sources 102 of FIG. 2B) in a manner enabling light flux to vary over a scan of a field of view (e.g., field of view 120 of FIGS. 1A and 2A). At step 5202, at least one processor 118 controls at least one light deflector (e.g., light deflector 114 of FIG. 1A, deflector 114A and/or deflector 114B of FIG. 2A, and/or one-way deflector 214 of FIG. 2B) in order to scan the field of view. For example, processor 118 may cause mechanical movement of the at least one light deflector to scan the field of view. Alternatively or concurrently, processor 118 may induce a piezoelectric or thermos-electrical change in the at least one deflector to scan the field of view. In some embodiments, a single scanning cycle of the field of view may include moving the at least one deflector such that, during the scanning cycle, the at least one light deflector is instantaneously located in a plurality of positions. For example, the at least one light deflector may be moved from one of the plurality of positions to another (optionally with additional positions and/or repetitions) during the scanning cycle rather than being moved in a continuous sweep.

At step 5203, the at least one processor 118 receives, on a pixel by pixel basis, signals from at least one sensor (e.g., sensing unit 106 of FIG. 51). For example, the signals may be indicative of at least one of ambient light and light from the at least one light source reflected by an object in the field of view. At step 5204, the at least one processor 118 may identify a type of light source at a portion of a field of view, that causes the ambient noise from the received information and determine a level of light-flux to allocate the at least one light source (e.g., light source 112 of FIG. 1A, laser diode 202 of light source 112 of FIG. 2A, and/or plurality of light sources 102 of FIG. 2B). At step 5205, as explained above, the at least one processor 118 may cause the at least one light source (e.g., light source 112 of FIG. 1A, laser diode 202 of light source 112 of FIG. 2A, and/or plurality of light sources 102 of FIG. 2B) to project a higher light flux toward the portion of the field of view (e.g., field of view 120 of FIGS. 1A and 2A). For example, the at least one processor 118 may cause the at least one light source to project a higher light flux toward the portion of the field of view before moving to another portion of the field of view (e.g., while the at least one deflector is still in the same instantaneous position).

Temperature Based Control in Lidar

In LIDAR systems it may be important to regulate the temperature of the system components to prevent damage to the components themselves and for safety reasons. Additionally, some components of LIDAR systems may provide suboptimal performance when exceeding a temperature range, and it may therefore me important to modify the operation of the LIDAR system to optimize the performance which can be provided in such suboptimal conditions. In some embodiments, a LIDAR system may be used in a vehicle. A LIDAR system 100 may include one or more light sources 112 for projecting light toward a FOV 120 for illuminating one or more objects in the FOV 120 that are in the environment of the vehicle. The LIDAR system 100 may contain one or more processors 118 to vary the light flux over scans of one or more portions of the FOV 120 by controlling the light source 112. During scanning of the FOV 120, heat may be radiated from one or more of the LIDAR system components. System components may include one or more light sources, deflectors, sensors, processors, and/or other LIDAR system components. Heat may also radiate from a vehicle in which LIDAR system 100 is installed (especially if the LIDAR system is installed in locations which are hot and/or difficult to ventilate, such as under the hood of the vehicle). Heat may also result from weather or other ambient conditions (e.g., driving inside a warehouse). It is also noted that LIDAR system 100 may also be sensitive to low temperature, which may also result from similar causes.

The processor 118 may receive information, via one or more temperature sensors, indicating the temperature of one or more components exceeds a threshold temperature. The threshold temperature may be determined dynamically by a processor or may be a static, preset value. The threshold temperature may be the temperature at which or above which the component or system is at risk of overheating. In some embodiments, the threshold temperature may be a percentage of a temperature at which the system or a system component is at risk of overeating. For example, the threshold temperature may be 80% of a temperature at which the system or a system component is at risk of overeating. If the system or a component overheats, it could damage the LIDAR system, create a fire hazard, and/or cause system functions. If the detected temperature of one or more system components meets and/or exceeds the threshold, the processor 118 may modify an illumination ratio between two portions of the FOV 120 so that less light is delivered to the FOV 120 during one or more subsequent scanning cycles.

As noted above, the temperature threshold may be determined dynamically, and it can be modified based on the state of various components of LIDAR system 100, of the vehicle in which it is installed, and on other parameters. It is also noted that the temperature threshold may pertain to the measured temperature, but may also pertain to other temperature-based parameters (e.g. change of temperature over time, plurality of temperatures measured in different locations, etc.). In implementations in which processor 118 implements such complex and/or time-dependent temperature thresholds, processor 118 may be considered to implemented a temperature decision rule. Processor 118 may be configured to manage high temperatures in the LIDAR system by determining when the temperature threshold is exceeded so that exceedingly high temperatures and/or temperature rise rates are measured. Processor 118 may be configured to manage low temperatures in the LIDAR system by determining when the temperature threshold is exceeded so that exceedingly low temperature and/or too fast temperature fall rates are measured.

Figure 53:
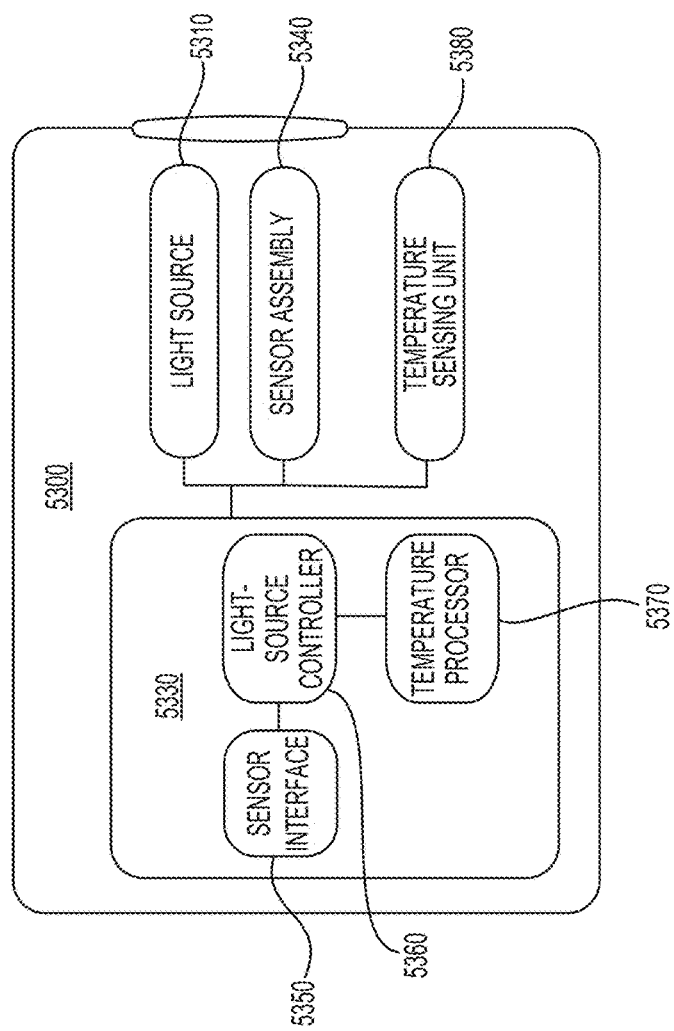
FIG. 53 is a diagrammatic illustration of a LIDAR system consistent with embodiments of the present disclosure.

FIG. 53 is a diagrammatic illustration of a LIDAR system consistent with embodiments of the present disclosure. For example, as shown, a LIDAR system 5300 may contain a light source 5310, sensor assembly 5340, and a temperature sensing unit 5380. In some embodiments, the LIDAR system 5300 may contain all or some of the components of LIDAR system 100 and a temperature sensing unit 5380. In some embodiments, LIDAR system 100 may contain a temperature sensing unit 5380. Temperature sensing unit 5380 may be configured to detect the temperature of individual system components and/or the overall temperature of the LIDAR system 5300.

In some embodiments, LIDAR system 5300 may contain a control system 5300 including a sensor interface 5350, a light-source controller 5360, and a temperature processor 5370. The temperature processor 5370 may receive temperature information from an optional temperature detector 5380 (or from other sources, such as external temperature sensor, from the host, etc.) and process the received information to determine if the temperature of one or more system components or of the LIDAR system 5300 exceeds a threshold temperature. If the threshold temperature is exceeded (e.g., during a particular scanning cycle), the temperature processor 5370 may communicate with light-source controller 5360 to modify the illumination ratio between two portions of the FOV so less light is delivered to the FOV during a subsequent scanning cycle, thereby decreasing the temperature of the one or more system components and/or the LIDAR system 5300. In some embodiments, the LIDAR system 5300 may include cooling components to cool system components having temperatures that meet or exceed the threshold.

In some embodiments, the processor 118 may be configured to control one or more light deflectors 114 such that during a scanning cycle of the FOV, one or more light deflectors 114 are located in one or more different instantaneous positions. The processor 118 may also coordinate one or more light deflectors 114 and one or more light sources 112 such that when a light deflector 114 is located at a particular instantaneous position, a portion of a light beam is deflected by the deflector 114 from the light source 112 towards an object in the FOV 120. Reflections of the portion of the light beam from the object may be deflected by the one or more deflectors 114 toward one or more sensors 116. In some embodiments, one or more light sources 112 may be aimed at one or more light deflectors 114. Processor 118 may control the one or more light deflectors 114 such that when a light deflector 114 is located at a particular instantaneous position, light from one or more light sources 112 may be projected towards several independent regions in the FOV 120.

In some embodiments, the processor 118 may determine, based on the temperature information, a spatial light distribution in a single scanning cycle of the FOV and modify the illumination ratio so more light is projected toward a first portion of the FOV than a second portion of the FOV. In some embodiments, the processor 118 may, based on the temperature information, coordinate control of one or more light sources 112 and one or more light deflectors 114 such that during one or more subsequent scanning cycles, the same amount of light is projected towards a portion of the FOV as was projected in the prior scanning cycle. In some embodiments, the processor 118 may, based on the temperature information, coordinate control of one or more light sources 112 and one or more light deflectors 114 to project more light-pulses toward the first portion of the FOV than toward the second portion of the FOV. In some embodiments, the processor 118 may, based on the temperature information, coordinate control of one or more light sources 112 and one or more light deflectors 114 in one or more scanning cycles to dynamically adjust the rate of scanning cycles for illuminating the first portion of the FOV and the rate of scanning cycles for illuminating the second portion of the FOV. Adjusting the scanning cycle rate may decrease the temperature of one or more system components. In some embodiments, the processor 118 may restore the settings of the LIDAR system 100 once the temperature of the system or one or more components returns to a value lower than the threshold temperature.

In some embodiments, processor 118 may identify a region of interest in a portion of the FOV and modify, based on the temperature information, the illumination ratio between the portion of the FOV and another portion of the FOV such that during one or more subsequent scanning cycles, more light is directed toward the portion of the FOV containing a region of interest. In some embodiments, processor 118 may identify regions of non-interest in a portion of the FOV. Based on a region of interest determination and on the temperature information, more light flux may be allocated to regions of interest than to regions of the LIDAR FOV of less interest or not in a determined region of interest. As a result, illumination of a region of interest (e.g., with a different scanning rate, power level, light intensity, light flux, pulse duration, number of pulses, etc.) may increase localized heating in one or more components of LIDAR system 100 in an optical path of the projected light (e.g., deflector 114, etc.). Thus, temperature management through light allocation techniques described herein may become more important for certain portions of system components when regions of interest are being illuminated.

In some embodiments, the processor 118 may receive information that the temperature associated with one or more components of the LIDAR system 100 (or one or more portions of those components) exceeds a threshold temperature. The processor 118 may receive temperature information via a wired or wireless connection a temperature sensing component, such as temperature sensor 5380. In some embodiments, the processor 118 may receive information from the vehicle controller that the temperature of one or more system components exceeds a threshold, which may involve one or more additional processors.

In some embodiments, temperature information received by processor 118 may include information about the temperature of the environment external to the vehicle, information about the vehicle's engine heat, information about a temperature of one or more light sources 112, and/or information about a temperature of the one or more processors, including processor 118.

In some embodiments, processor 118 may determine a value for the threshold temperature based on information about a temperature of an environment surrounding the vehicle. For example, on a hot day the threshold temperature may be lowered to account for the external heat from the sun or from the air surrounding the LIDAR system 100.

In some embodiments, processor 118 may reduce a resolution in a part of the FOV if the temperature of one or more system components exceeds a temperature threshold. The resolution may be reduced in areas of the FOV with less illumination, but the detection distance may be the same as the detection distance achieve with the original resolution. In some embodiments, a farther detection distance is achieved with the lower resolution than with the original resolution.

Figure 54:
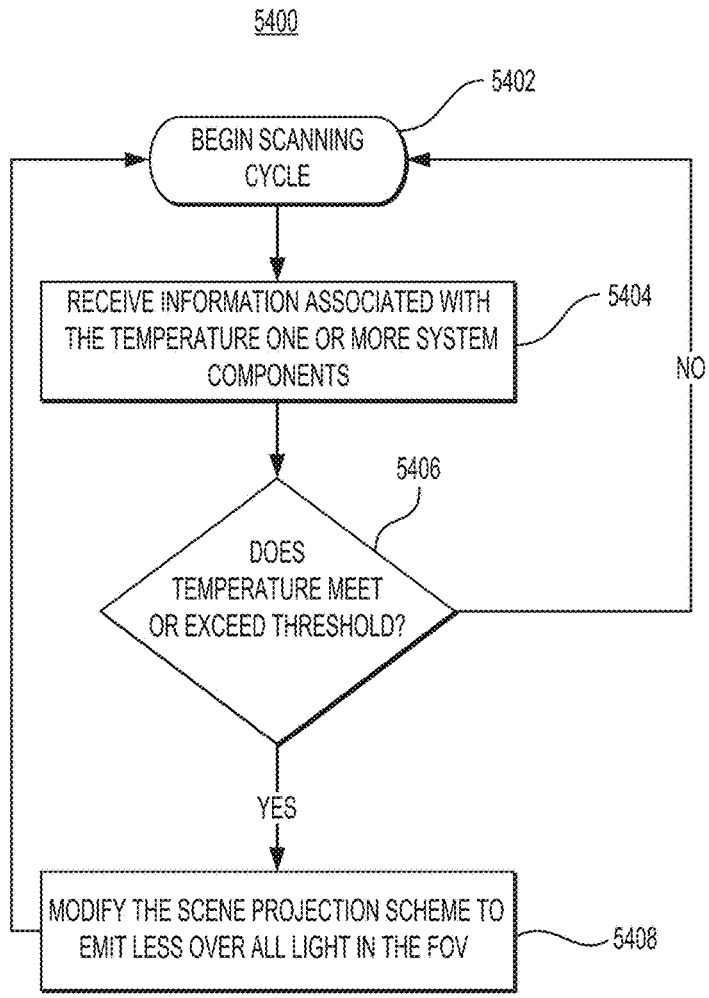
FIG. 54 is a flow chart of an exemplary implementation of a temperature reduction process, consistent with embodiments of the present disclosure.

FIG. 54 is an exemplary flow chart of an exemplary process 5400 for detecting the temperature of one or more components of a LIDAR system 100. At step 5402 the LIDAR system 100 begins a scanning cycle at an initial scanning rate. In some embodiments, step 5402 may not occur during each scanning cycle, but rather at a predetermined interval. In other embodiments, step 5402 may occur outside a scanning cycle, for example, when the LIDAR system is turned on or initiated. At step 5404, processor 118 may receive information from one or more temperature sensors 5380 indicating the temperatures of one or more system components. Processor 118 may determine whether or not the temperature of a system component meets or exceeds a threshold temperature at step 5404. If the threshold temperature is not met, the component or components are not at risk of overheating (or, alternatively, freezing) and the LIDAR system 100 may execute the subsequent scanning cycle with no measures to alter the component's temperature. If the threshold temperature is met or exceeded, processor 118 may act to restrict (e.g., decrease) the temperature of component by adjusting the LIDAR system 100 to emit less overall light in the FOV (step 5408) thereby decreasing the temperature of the component. In some embodiments, the processor 118 may act to prevent the temperature of the component from reaching the threshold temperature. In some embodiments, the processor 118 may adjust the illumination ratio between portions of the FOV during the following scanning cycle. Based on which component is at risk of overheating, the processor 118 may employ different heat reduction techniques. In some embodiments, the processor 118 may decrease the scanning rate in the following scanning cycle. In some embodiments, processor 118 may reduce the resolution in the following scanning cycle. In other embodiments, the processor 118 may control a cooling component to cool the component overheating or at risk of overheating. In other embodiments, the processor 118 may control a heating component to heat a component freezing or at risk of freezing.

Figure 55:
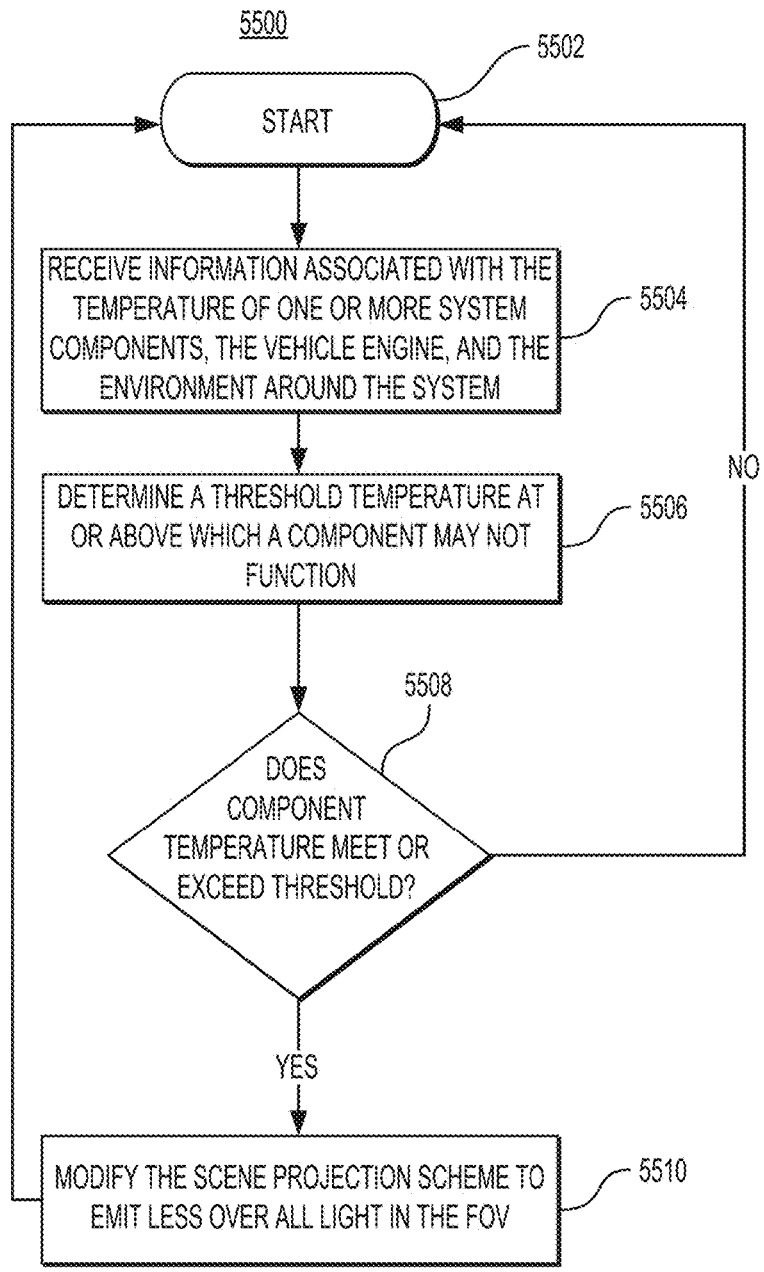
FIG. 55 is a flow chart of an exemplary implementation of a temperature reduction process, consistent with embodiments of the present disclosure.

FIG. 55 is an exemplary flow chart of an exemplary process 5500 for determining a threshold temperature and detecting the temperature of one or more components of a LIDAR system 100 in a vehicle. At 5502 the LIDAR system 100 begins the process of determining the component temperatures. A processor 118 may receive temperature information from one or more sensors, such as temperature sensor 5380, indicating the temperatures of one or more system components, the vehicle engine, and/or the environment around the vehicle. At step 5504 the processor 118 may receive information from one or of the above described temperature sensors. At step 5506, the processor 118 may use an algorithm or other method of calculation to determine an appropriate threshold temperature for a system component based on the vehicle engine temperature, the temperature inside the vehicle, and/or the temperature of the environment around the vehicle. The calculated threshold temperature may also account for a temperature at which a component begins to perform sub-optimally. The processor 118 may determine whether the component temperatures is greater than or equal to the calculated threshold temperature at step 5508. If the temperature does not meet the threshold, the processor 118 may take no action until the temperature is next evaluated. The process 5500 may occur at a predetermined time interval, independent from the LIDAR system 100 scanning cycles. The calculated threshold temperature may be calculated during each scanning cycle or may be calculated repeatedly at another interval. For example, the threshold may be calculated every five minutes, 30 minutes, two hours, etc.

If the component temperature is greater than or equal to the threshold temperature, processor 118 may modify the scene projection scheme to emit less light in the FOV at step 5510. As described above, the processor 118 may reduce the component temperature in a number of ways. The process 5500 may then restart at the next predetermined interval. In some embodiments, the modifications made in step 5510 may be reversed, thereby restoring performance of the component when the component's temperature is below the threshold temperature.

MEMS Mirror and Actuation Techniques

Figure 56:
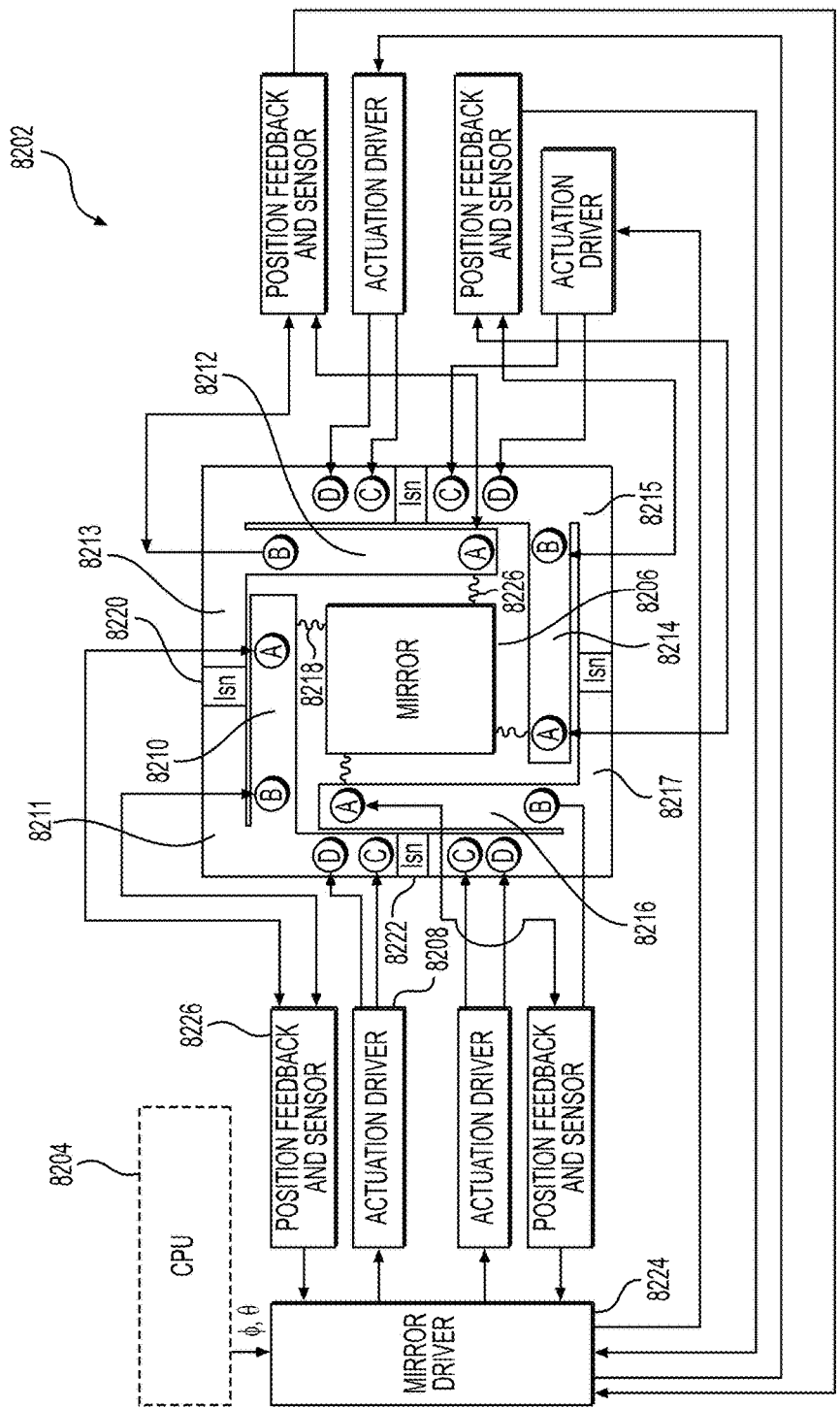
FIGS. 56-84 are diagrams illustrating various examples of MEMS mirrors and associated components incorporated in scanning units of the LIDAR system in accordance with some embodiments of the present disclosure.

FIG. 56 illustrates an example embodiment of a scanning device (e.g., deflector 114 hereinafter "scanning device 8202") and a processing device (e.g., processor 118 hereinafter controller 8204). Consistent with the present disclosure, controller 8204 may be local and included within scanning device 8202. Controller 8204 may include at least one hardware component, one or more integrated circuits, one or more FPGAs, one or more ASICs, one or more hardware accelerators, and the like. A central processor unit (CPU) and an actuation driver are some examples of a controller 8204.

As shown in FIG. 56, a mirror configuration may include mirror 8206 which can be moved in two or more axes (θ, φ). Mirror 8206 may be associated with an electrically controllable electromechanical driver such as actuation driver 8208. Actuation driver 8208 may cause movement or power to be relayed to an actuator/cantilever/bender such as actuator 8210. Actuator 8210 may be part of a support frame such as frame 8211. Additional actuators, such as actuators 8212, 8214 and 8216, may each be controlled/driven by additional actuation drivers as shown, and may each have a support frame 8213, 8215 and 8217 (appropriately). It is understood that frames 8211, 8213, 8215 and/or 8217 may comprise a single frame supporting all of the actuators or may be a plurality of interconnected frames. Furthermore, the frames may be electrically separated by isolation elements or sections. Optionally, a flexible interconnect element or connector (interconnect), such as spring 8218, may be utilized to adjoin actuator 8210 to mirror 8206, to relay power or movement from actuation driver 8208 to spring 8218.

Actuator 8210 may include two or more electrical contacts such as contacts 8210A, 8210B, 8210C and 8210D. Optionally, one or more contacts 8210A, 8210B, 8210C and/or 8210D may be situated on frame 8211 or actuator 8210 provided that they are electronically connected. According to some embodiments, actuator 8210 may be a semiconductor which may be doped so that sections actuator 8210 (except the piezoelectrical layer that is insulative) is generally conductive between contacts 8210A-210D and isolative in isolation 8220 and 8222 to electronically isolate actuator 8210 from actuators 8212 and 8216 (respectively). Optionally, instead of doping the actuator, actuator 8210 may include a conductive element which may be adhered or otherwise mechanically or chemically connected to actuator 8210, in which case isolation elements may be inherent in the areas of actuator 8210 that do not have a conductive element adhered to them. Actuator 8210 may include a piezoelectric layer so that current flowing through actuator 8210 may cause a reaction in the piezoelectric section which may cause actuator 8210 to controllably bend.

According to some embodiments, Controller 8204 may output/relay to mirror driver 8224 a desired angular position described by θ, φ parameters. Mirror driver 8224 may be configured to control movement of mirror 8206 and may cause actuation driver 8224 to push a certain voltage amplitude to contacts 8210C and 8210D in order to attempt to achieve specific requested values for θ, φ deflection values of mirror 8206 based on bending of actuators 8210, 8212, 8214 and 8216. In addition, position feedback control circuitry may be configured to supply an electrical source (such as voltage or current) to a contact, such as contact 8210A or 8210B, and the other contact (such as 8210B or 8210A, respectively) may be connected to a sensor within position feedback 8226, which may be utilized to measure one or more electrical parameters of actuator 8210 to determine a bending of actuator 8210 and appropriately an actual deflection of mirror 8206. As shown, additional positional feedback similar to position feedback 8226 and an additional actuation driver similar to actuation driver 8208 may be replicated for each of actuators 8212-216 and mirror driver 8224 and controller 8204 may control those elements as well so that a mirror deflection is controlled for all directions.

The actuation drivers including actuation driver 8208 may push forward a signal that causes an electromechanical reaction in actuators 8210-216 which each, in turn is sampled for feedback. The feedback on the actuators' (8210-8216) positions serves as a signal to mirror driver 8224, enabling it to converge efficiently towards the desired position θ, φ set by the controller 8204, correcting a requested value based on a detected actual deflection. According to some embodiments, a scanning device or LIDAR may utilize piezoelectric actuator micro electro mechanical (MEMS) mirror devices for deflecting a laser beam scanning a field of view. Mirror 8206 deflection is a result of voltage potential applied to the piezoelectric element that is built up on actuator 8210. Mirror 8206 deflection is translated into an angular scanning pattern that may not behave in a linear fashion, for a certain voltage level actuator 8210 does not translate to a constant displacement value. A scanning LIDAR system (e.g., LIDAR system 100) where the field of view dimensions are deterministic and repeatable across different devices is optimally realized using a closed loop method that provides an angular deflection feedback from position feedback and sensor 8226 to mirror driver 8224 and/or controller 8204.

In some embodiments, position feedback and sensor 8226 may also be utilized as a reliability feedback module. According to some embodiments, a plurality of elements may include semiconductors or conducting elements, or a layer and accordingly, actuators 8201-8216 could at least partially include a semiconducting element, springs 8218, 8226, 8228 and 8230 may each include a semiconductor, and so may mirror 8206. Electrical Power (current and/or voltage) may be supplied at a first actuator contact via position feedback 8226, and position feedback 8226 may sense an appropriate signal at actuator 8212, 8214 and/or 8216 via contacts 8214A or 8214B and/or 8216A or 8216B. Some of the following figures illustrate MEMS mirrors, actuators and interconnects. The number of interconnects, the shape of the interconnects, the number of actuators, the shape of the actuators, the shape of the MEMS mirror, and the spatial relationships between any of the MEMS mirror, actuators and interconnects may differ from those illustrated in the following figures.

Interconnects

Figure 57:
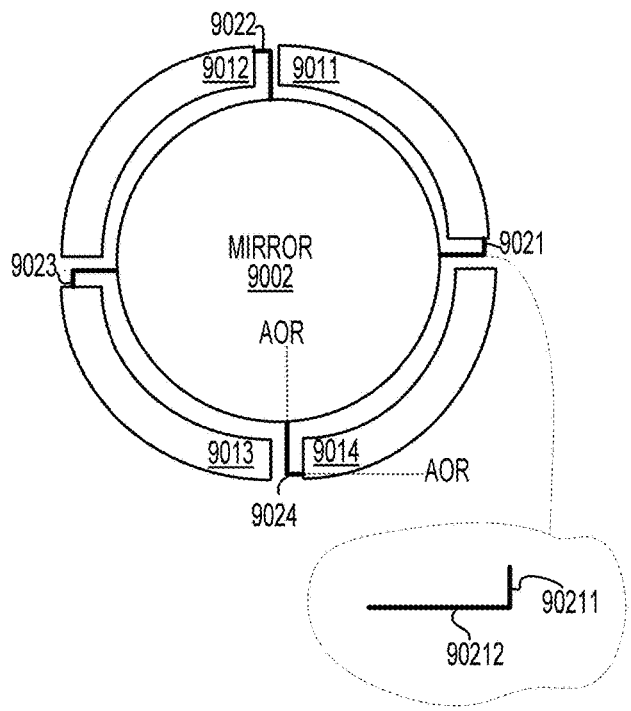

FIG. 57 illustrates four L-shaped interconnects 9021, 9022, 9023 and 9024 that are connected between circular MEMS mirror 9002 and four actuators 9011, 9012, 9013 and 9014. Each L-shaped interconnect (for example 9021) includes a first segment 90212 and a second segment 90211. The first and second segments are mechanically connected to each other. In FIG. 57 the first and second segments are normal to each other. In FIG. 57 the second segment of each L-shaped interconnect is connected to a circumference of an actuator and the first segment of each L-shaped interconnect is connected to the circumference of the MEMS mirror. The second segment is normal to the circumference of first actuator. The first segment is normal to the circumference of the MEMS mirror and/or may be directed towards a center of the MEMS mirror when the MEMS mirror is at an idle position. The MEMS mirror is at an idle position when all of the actuators that are coupled to the MEMS mirror are not subjected to a bending electrical field.

In one embodiment, using L-shaped interconnects may provide superior durability and stress relief. Using the L-shaped interconnects facilitates seamless movement about two axes of rotation (see dashed lines denoted AOR near interconnect 9024) that are normal to each other. Thereby, the bending and unbending of an actuator does not impose an undue stress on the L-shaped interconnect. Furthermore, the L-shaped interconnects are relatively compact and may have a small volume, which reduces the mechanical load imposed on the actuators, and may assist in increasing the scanning amplitude of the MEMS mirror. It should be noted that the different segments of the interconnect may be oriented in relation to each other (and/or in relation to the MEMS mirror and/or in relation to the actuator) by angles that differ from ninety degrees. These angles may be substantially equal to ninety degrees (substantially may mean a deviation that does not exceed 5, 10, 15 or 20 percent and the like). It should further be noted that the L-shaped interconnects may be replaced by interconnects that include a single segment or more than a pair of segments. An interconnect that has more than a single segment may include segments that are equal to each other and/or segments that differ from each other. Segments may differ by shape, size, cross section, or any other parameter. An interconnect may also include linear segments and/or nonlinear segments. An interconnect may be connected to the MEMS mirror and/or to the actuator in any manner.

Figure 58:
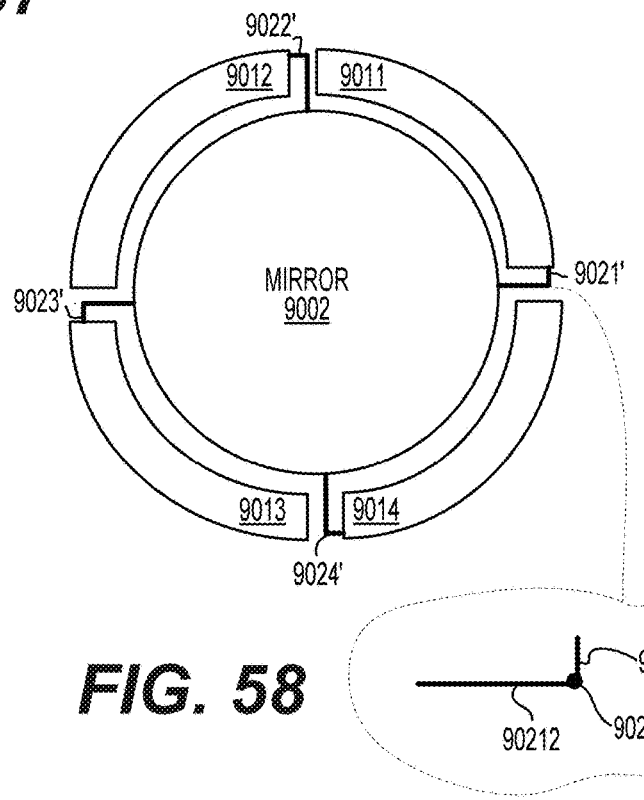

FIG. 58 illustrates four interconnects 9021', 9022', 9023' and 9024' that are connected between circular MEMS mirror 9002 and four actuators 9011, 9012, 9013 and 9014. The first and second segments of each interconnect are connected by joints. For example, interconnect 9021' includes a first segment 90212, a second segment 90211 and a joint 90213 that is connected to the first and second segments and facilitates relative movement between the first and second interconnects. The joint may be a ball joint or any other type of joint.

Figure 59:
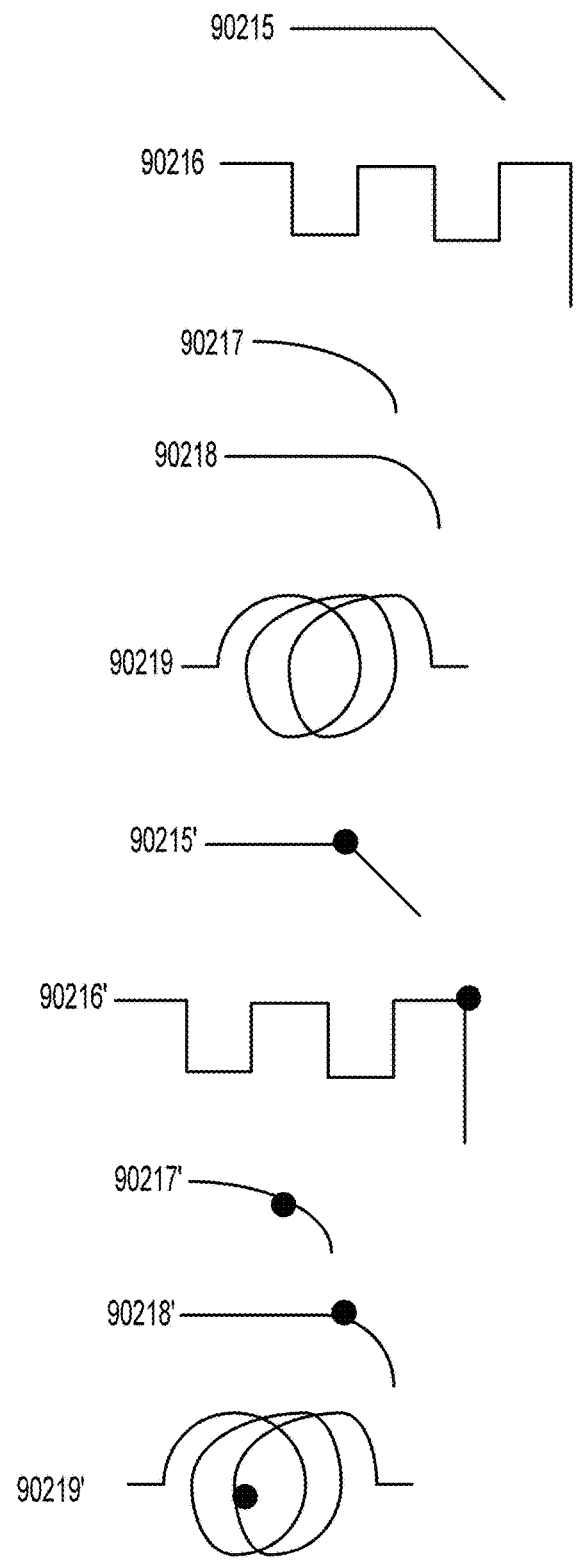

FIG. 59 illustrates ten non-limiting examples of interconnects. Interconnects 90215, 90216, 90217, 90218 and 90219 do not include joints. Interconnects 90215', 90216', 90217', 90218' and 90219' do include at least one joint. In addition, FIG. 59 illustrates interconnects that include linear segments, nonlinear segments, one segments, two segments and even nine segments. The interconnects may include any number of segments, have segments of any shape, and may include zero to multiple joints.

Response to Mechanical Vibrations

A scanning unit (e.g., scanning unit 104) may include the MEMS mirror, the actuators, the interconnector and other structural elements of the LIDAR system. Scanning unit 104 may be subjected to mechanical vibrations that propagate along different directions. For example, a LIDAR system that is installed in a vehicle may be subjected to different vibrations (from different directions) when the vehicle moves from one point to another. If all actuators have the same structure and dimensions the response of the unit to some frequencies may be very high (high Q factor). By introducing a certain asymmetry between the actuators, scanning unit 104 may react to more frequencies, however, the reaction may be milder (low Q factor).

Figure 60:
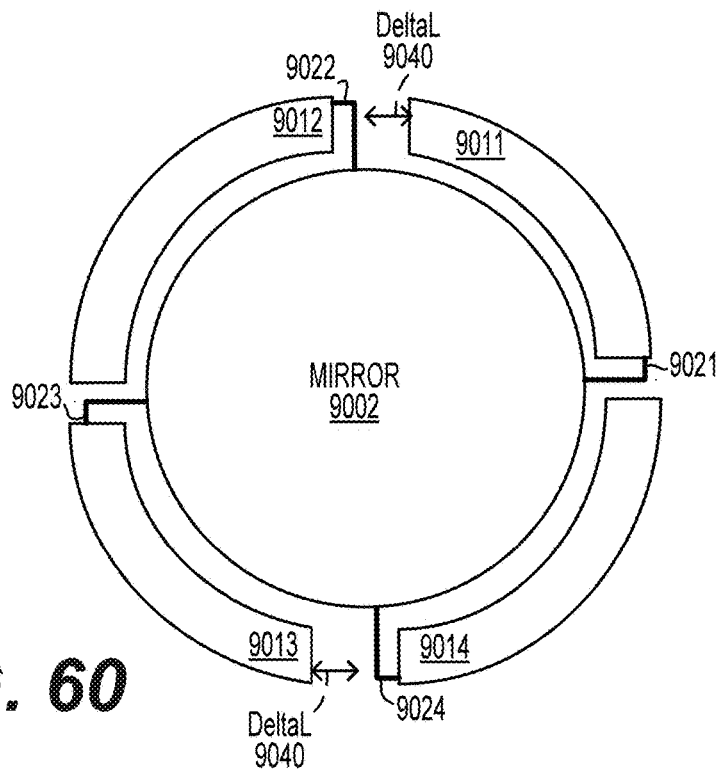

FIG. 60 illustrates a first pair of actuators 9011 and 9013 that are opposite to each other and are shorter (by DeltaL 9040) than actuators of a second pair of actuators 9012 and 9014. Actuators 9012 and 9014 are opposite to each other and are oriented to actuators 9011 and 9013. FIG. 60 also illustrates L-shaped interconnects 9021, 9022, 9023 and 9024, and a circular MEMS mirror 9002. The resonance frequency of the unit may be outside the frequency range of the mechanical vibrations. The resonance frequency of the unit may exceed a maximal frequency of the certain frequency range by a factor of at least two. The resonance frequency of the unit is between four hundred hertz and one Kilohertz.

Figure 61A:
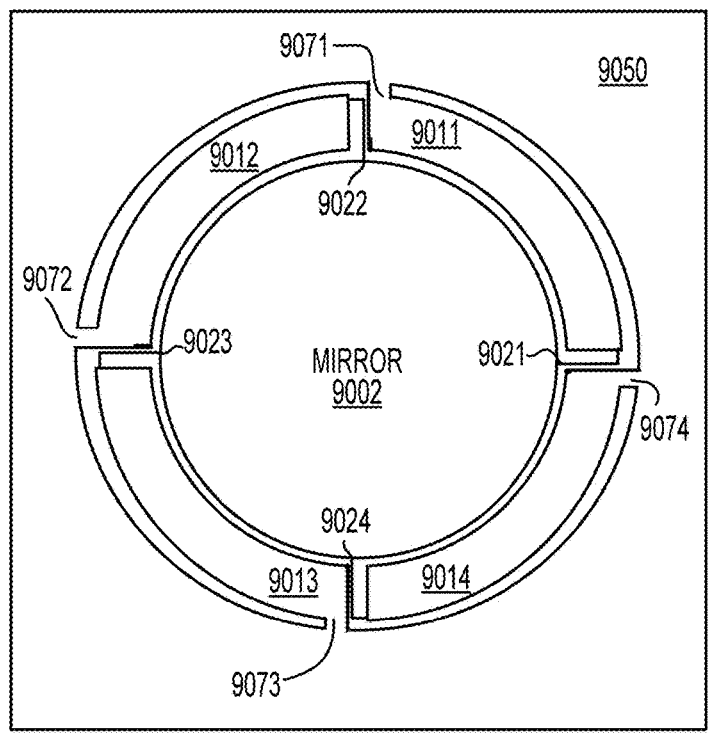

FIG. 61A illustrates a frame 9050 that surrounds the actuators 9011, 9012, 9013 and 9014, the interconnects 9021, 9022, 9023 and 9024, and the MEMS mirror 9002. Actuators 9011, 9012, 9013 and 9014 are connected to the frame 9050 at their bases 9071, 9072, 9072 and 9074 respectively. In one embodiment, the width of the base may be any fraction (for example below 50%) of the entire length of the actuator. In addition, the base may be positioned at any distance from point of connection of the actuator to the interconnect. For example, the base may be positioned near an end of the actuators that is opposite to the end of the connector that is connected to the interconnect.

Figure 61B:
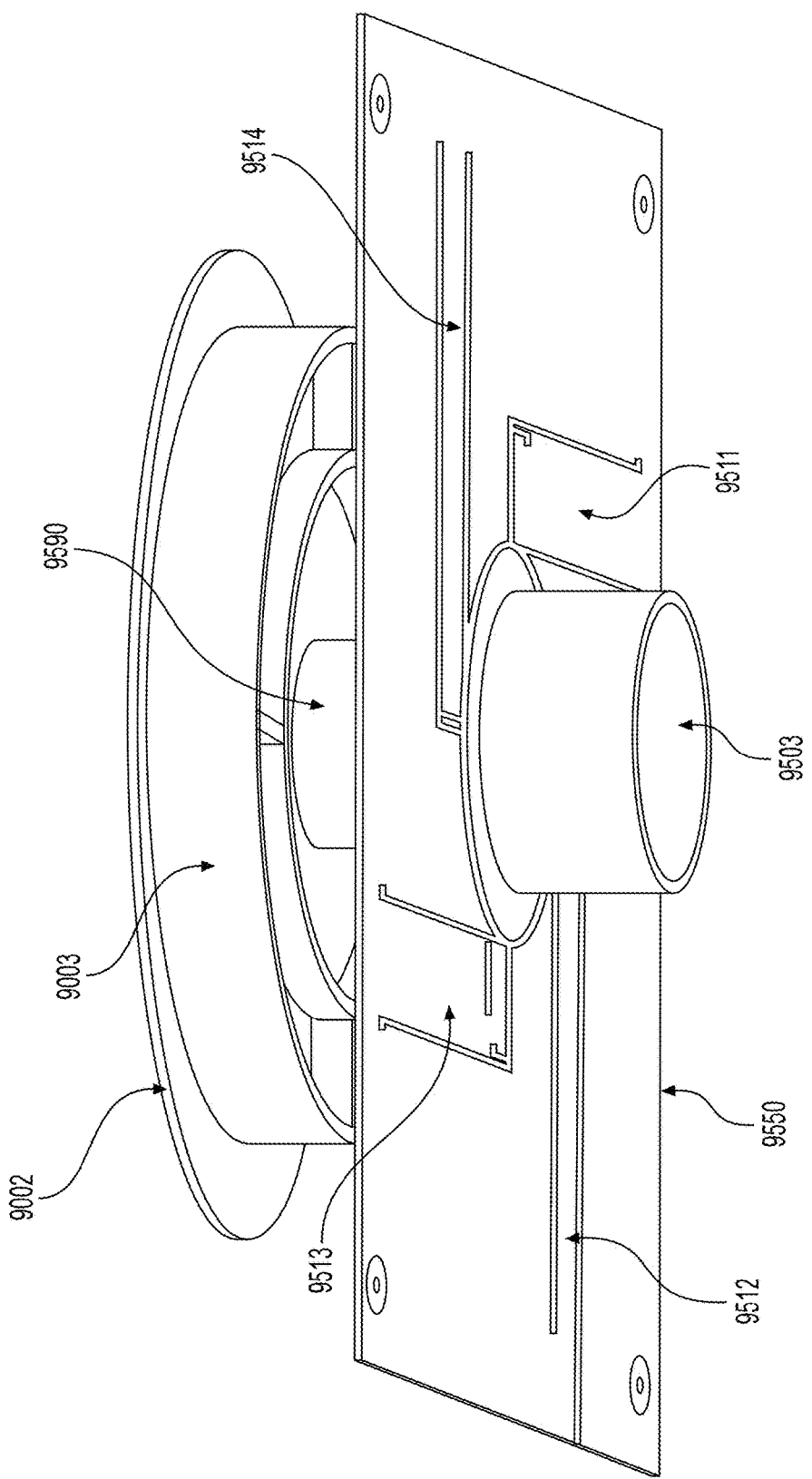

FIG. 61B illustrates a frame 9550 that surrounds the actuators 9511, 9512, 9513 and 9514, connected via shaft 9590 to MEMS mirror 9002 that is positioned on different plane than a plane of frame 9550, in accordance with examples of the presently disclosed subject matter. The interconnects between actuators 9511, 9512, 9513 and 9514 and shaft 9590 are not illustrated, for the sake of simplicity. Those interconnects may have similar shapes and characteristics to those discussed above with respect to interconnects 9021, 9022, 9023 and 9024, but this is not necessarily so. As exemplified in FIG. 61A, MEMS mirror 9002 may be actuated by actuators which are positioned in a different plane than the plane of MEMS mirror 9002. The movement of the actuators 9511, 9512, 9513 and 9514 is transmitted to MEMS mirror 9002 by shaft 9590, which is connected on its one end to the actuators, and on its other end to a base surface of MEMS mirror 9002. It is noted that shaft 9590 may be replaced by any kind of rigid connector. Referring to the actuators which move the shaft (which can of course be of any other number, and not necessarily four as illustrated), it is noted that these actuators may be actuated using any kind of actuation technique—e.g., piezoelectric actuation, electrostatic actuation, electromagnetic actuation, electromechanical actuation—including any actuation method discussed in this disclosure. It is noted that MEMS mirrors may implemented actuation on a different plane for one-dimensional (1D) scanning or for two-dimensional (2D) scanning.

The disclosed position of the actuation assembly of MEMS mirror 9002 in a different plane behind the reflective surface plane allows to create a reflector array (such as reflector array 312) which includes a plurality of reflectors which are located in great proximity to one another. This increases the usable portion of the surface of the reflectors array, and reduce the amount of undesired reflections (reflecting from parts of the reflector assembly which are not the mirrors surfaces). Also, locating the moving actuators behind MEMS mirror 9002 (and away from the optical transmission paths of light in the system) reduces the amount of photons which are reflected from the moving actuators in unintended direction, thus reducing the level of noise in the system. MEMS mirror 9002 and actuation surface (which includes the actuators and frame 9550) may be manufactured on two different wafers, and connected to each other in different ways, such as those which are known in the art.

Monitoring the MEMS Mirror Using a Variable Capacitor

Consistent with the present disclosure, the orientation of the MEMS mirror may be estimated by monitoring the bending of the actuators that are connected (via the interconnects) to the MEMS mirror. For example, LIDAR system 100 may include one or more variable capacitors. There may be one variable capacitor per actuator, more than a single variable capacitor per actuator, and/or less variable capacitors than actuators. For each variable capacitor, the capacitance of the variable capacitor represents a spatial relationship between the frame and an actuator. The capacitance of the variable capacitor may be a function of an overlap area between one or more plates of the variable capacitor that are connected to the frame and one or more other plates of the variable capacitor that are connected to the actuator, especially to a circumference of the actuator that faces the frame.

Figure 62:
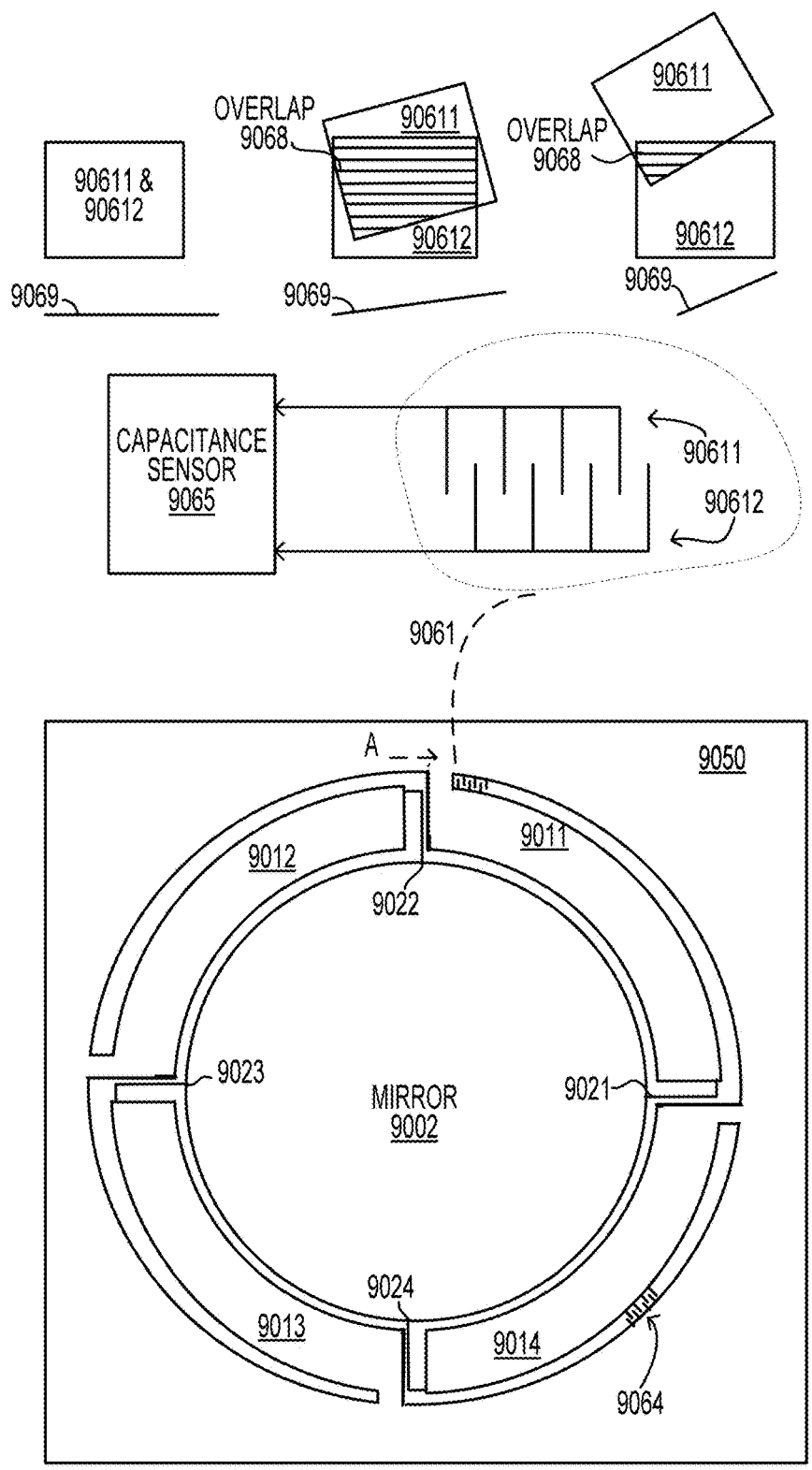

FIG. 62 illustrates a frame 9050 that surrounds the actuators 9011, 9012, 9013 and 9014, the interconnects 9021, 9022, 9023 and 9024, and the MEMS mirror 9002. FIG. 62 also illustrates a variable capacitor 9061 that is formed between the frame 9050 and actuator 9011. Variable capacitor 9061 includes multiple plates first plates 90612 that are connected to the actuator and multiple second plates 90611 that are connected to the frame. It may be beneficial to have at least three variable capacitors between at least three actuators and the frame. For simplicity of explanation only a single variable capacitor is shown. The variable capacitor may be located anywhere along the circumference of the actuator, and at any distance from the circumference of the actuator that is connected to the interconnect. In addition, the location of the variable capacitor may be determined based on the shape and size of the plates of the variable capacitor, and the amount of bending that can be experienced by different parts of the actuator. For example, positioning the variable capacitor near the base will result in smaller changed in the overlap area between the first and second plates, while positioning the variable capacitor near the connection point to the interconnect may result in a lack of overlap between the first and second plates.

FIG. 62 also illustrates (from left to right) first and second plates (90611 and 90612) that fully overlap, then (as the actuator starts bending) mostly overlap (overlap area 9068), and then only slightly overlap (small overlap area 9068) when the actuator continues to bend. The first plates 90612 are coupled in parallel to each other. The second plates 90611 are coupled in parallel to each other. The first and second plates are coupled to a capacitance sensor 9065 that is configured to sense the capacitance of the variable capacitor. A controller of the LIDAR system may estimate the orientation of the MEMS mirror based on the capacitance of one or variable capacitors.

Figure 63:
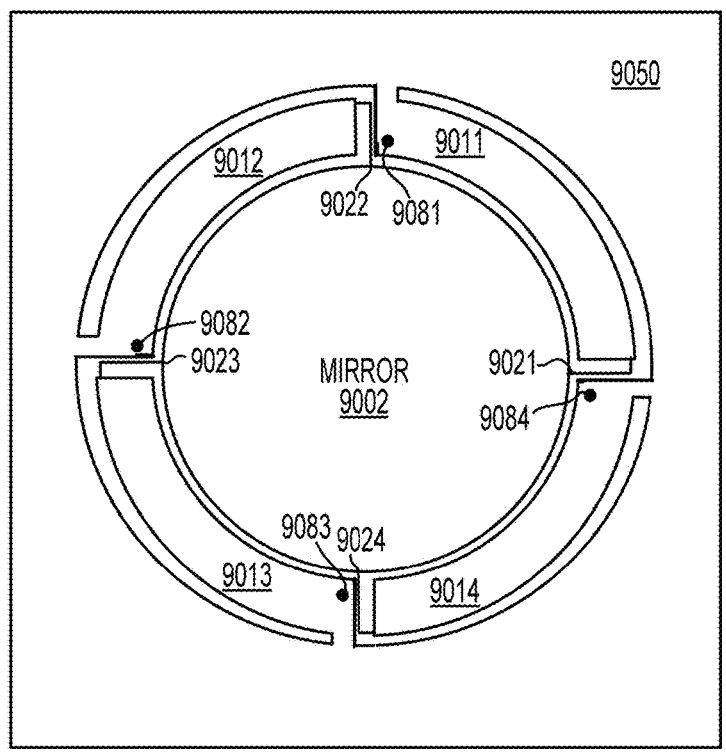

FIG. 63 illustrates a frame 9050 that surrounds the actuators 9011, 9012, 9013 and 9014, the interconnects 9021, 9022, 9023 and 9024, and the MEMS mirror 9002. FIG. 63 also illustrates electrodes 9081, 9082, 9083 and 9084 that are connected to actuators 9011, 9012, 9013 and 9014. The electrodes may be connected to any part of the actuators. An actuator may be connected to multiple electrodes. The electrodes usually spread along significant regions of the actuator.

Monitoring the MEMS Mirror Using Dummy Piezoelectric Elements

Consistent with the present disclosure, the provided electrode may convey electrical signals for bending the actuator and/or for sensing the bending of the actuator. The bending of the actuators may be monitored by using actuators that include dummy elements. The dummy elements may be dummy electrodes and dummy piezoelectric elements. A dummy piezoelectric element is mechanically coupled to a piezoelectric element that is subjected to a bending electrical field. The piezoelectric element is bended. This bending causes the dummy piezoelectric element to bend. The bending of the dummy piezoelectric element can be measured by electrodes coupled to the dummy piezoelectric element.

Figure 64:
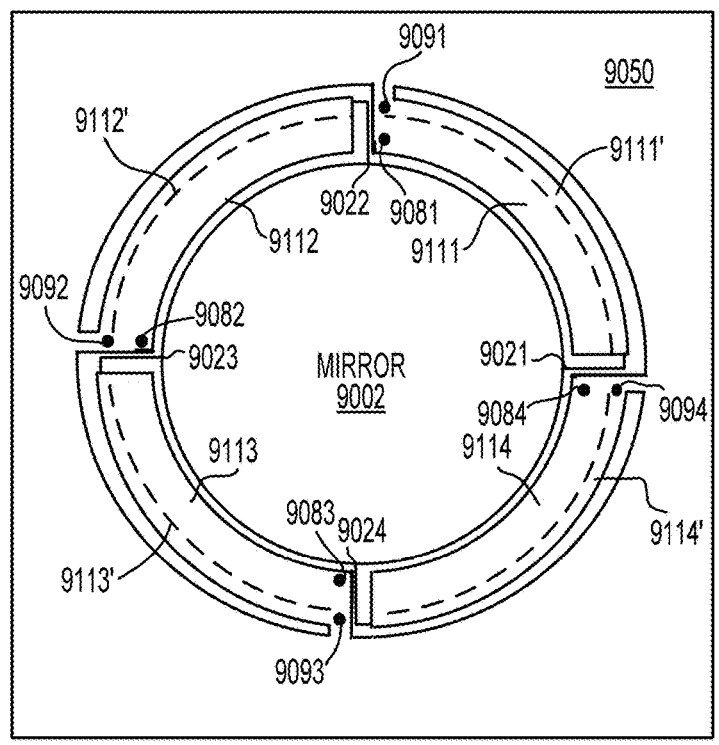

FIG. 64 illustrates frame 9050 that surrounds the actuators 9011, 9012, 9013 and 9014, the interconnects 9021, 9022, 9023 and 9024, and the MEMS mirror 9002. FIG. 64 also illustrates electrodes 9081, 9082, 9083 and 9084 that are connected to piezoelectric elements 9111, 9112, 9113 and 9114 of actuators 9011, 9012, 9013 and 9014. Electrodes 9081, 9082, 9083 and 9084 are used to convey bending control signals. FIG. 64 also illustrates electrodes 9091, 9092, 9093 and 9094 that are connected to dummy piezoelectric elements 9011', 9112', 9113' and 9114' of actuators 9011, 9012, 9013 and 9014. Electrodes 9091, 9092, 9093 and 9094 are used to measure the state of dummy piezoelectric elements 9011', 9112', 9113' and 9114'. Electrodes 9081, 9082, 9083, 9084, 9091, 9092, 9093 and 9094 usually cover a significant part of the piezoelectric elements. It should be noted that each piezoelectric element is positioned between pairs of electrodes, and that FIG. 64 illustrates only the external electrodes. Internal electrodes located between a substrate (or a body) of the actuator and the piezoelectric elements are not shown.

Figure 65:
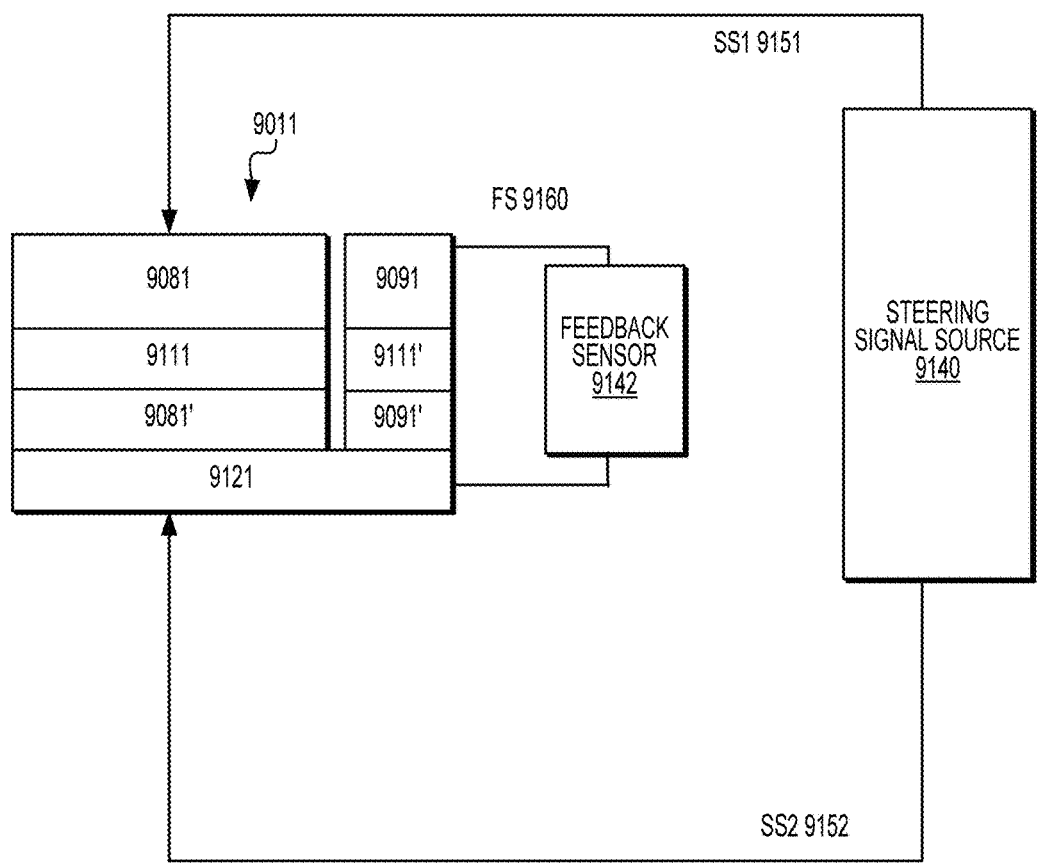

FIG. 65 is a cross sectional view of an actuator 9011, a feedback sensor 9142 and a steering source signal 9140. The actuator 9011 may include substrate (or body) layer 9121, internal electrode 9081', internal dummy electrode 9091', piezoelectric element 9111, dummy piezoelectric element 9111', external electrode 9081 and external dummy electrode 9091. Steering signal sensor 9140 sends steering signals SS1 9151 and SS2 9152 to external electrode 9081 and internal electrode 9121 for bending actuator 9011. Feedback sensor 9142 sensed the bending of the dully piezoelectrical element 9111' be measuring the electrical field between internal dummy electrode 9091' and external dummy electrode 9091. It should be noted that only one steering signal may be provided.

Figure 66:
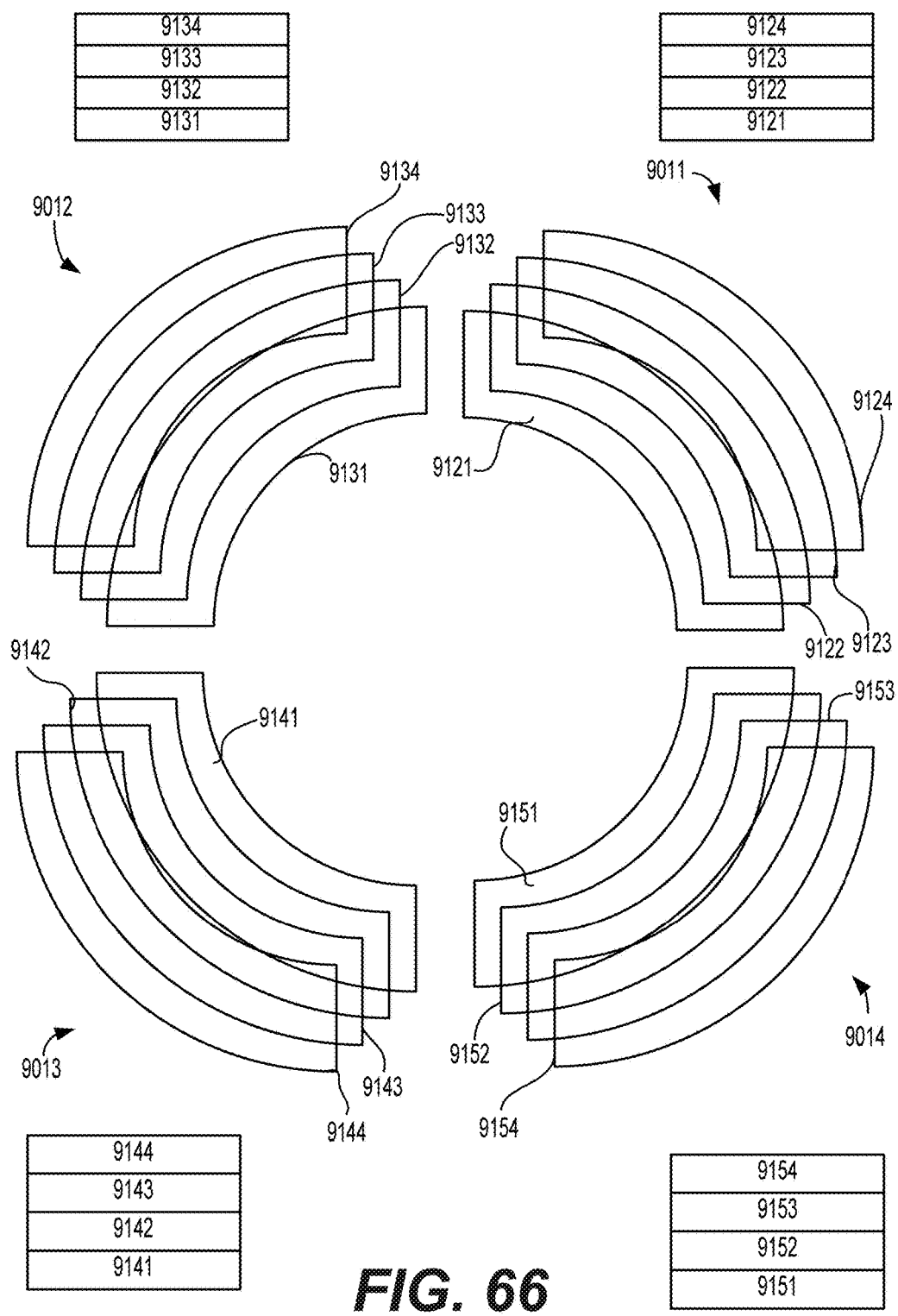

FIG. 66 illustrates that each actuator out of actuators 9011, 9012, 9013 and 9014 can be formed from four major layers: external electrode layer (9124, 9134, 9144 and 9154), a piezoelectric layer (9123, 9133, 9143 and 9153), internal electrode layer (9122, 9132, 9142 and 9152), and a substrate (or body) layer (9121, 9131, 9141 and 9151).

Monitoring the MEMS Mirror by Measuring Dielectric Coefficient Changes

Consistent with the present disclosure, the bending of the actuator may change the dielectric coefficient of the piezoelectric element. Accordingly, the actuator may be monitored by measuring changes in the dielectric coefficient of the piezoelectric element. The actuator may be fed with electrical field induced by one or more control signals from a control signal source, the one or more control signals are fed to one or more electrodes of LIDAR system 100, for example, a pair of electrodes that are positioned on opposite sides of the piezoelectric element. One control signal, both control signals and/or a difference between the control signals have an alternating bias component and a steering component. The bending of the body is responsive to the steering component. In some embodiments, the frequency of the alternating bias component may exceed a maximal frequency of the steering component (for example, by a factor of at least ten); and the amplitude of the alternating bias component may be lower than an amplitude of the steering component by any factor, for example, a factor that is not smaller than one hundred. For example, the steering component may be tens of volts while the alternating bias component may range between tens to hundreds of millivolts. Therefore, a sensor of LIDAR system 100 may be configured to sense dielectric coefficient changes of the actuator due to the bending of the actuator.

Figure 67:
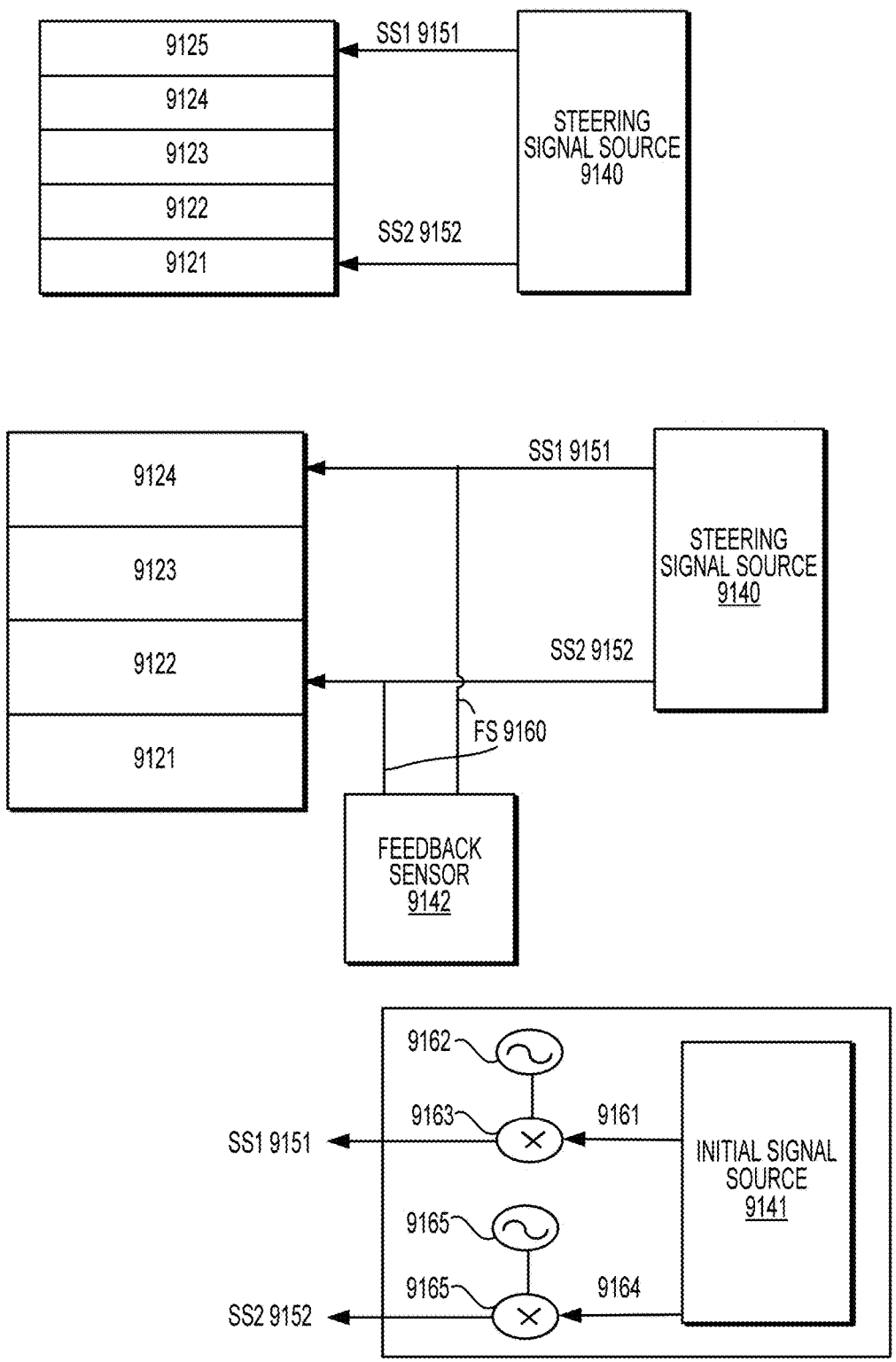

FIG. 67 illustrates an actuator that includes external electrode layer 9124, piezoelectric layer 9123, internal electrode layer 9122 and a substrate layer 9121. Steering signal source 9140 sends control signal SS1 9151 to external electrode layer 9124 and sends control signal SS2 9152 to internal electrode layer 9122. At least one of control signals SS1 9151 and SS2 9152 or the difference between the control signals includes the alternating bias component and the steering component. Feedback sensor 9124 is coupled to external electrode layer 9124, and to internal electrode layer 9122 and may sense (directly or indirectly) changes of the dielectric coefficients of piezoelectric layer 9123. Feedback sensor 9124 may be, for example, a current amplitude sensor or a combination of a current amplitude sensor and a phase shift sensor. The LIDAR sensor may include a controller that may be configured to receive (from feedback sensor 9142) information about the dielectric coefficient changes and to determine an orientation of the MEMS mirror. FIG. 67 also illustrates the steering signal source 9140 as including an initial signals source 9141 that outputs the steering components (9161 and 9164) of control signals SS1 9151 and SS2 9152. These steering components are mixed (by mixers 9163 and 9165) with the alternating bias components (generated by oscillators 9162 and 9165) to generate control signals SS1 9151 and SS2 9152. The actuator may be monitored by sensing the resistance of the actuator.

Figure 68:
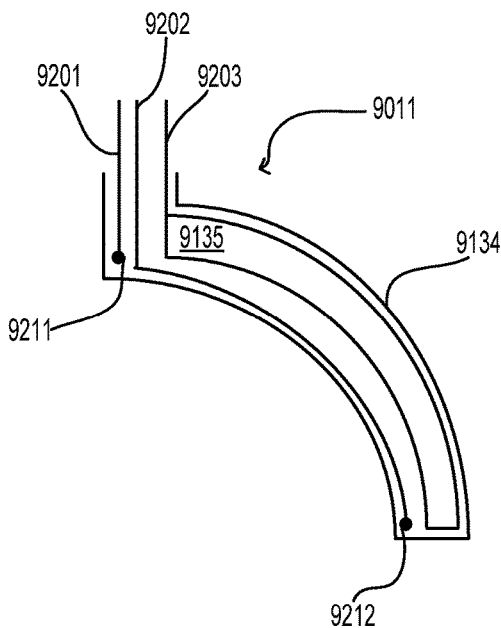

FIG. 68 illustrates two electrodes 9211 and 9212 that are positioned at two opposite ends of actuator 9011, and are used for measuring the resistance of the actuator. Electrode 9135 is used for bending the actuator. Electrodes 9211, 9212 and 9135 are electrically coupled to three conductors 9201, 9202 and 9203.

Figure 69:
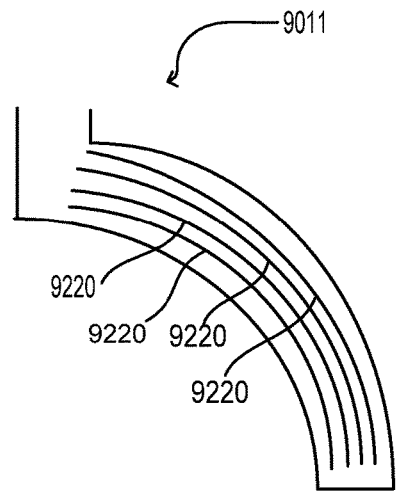

FIG. 69 illustrates stress relief apertures 9220 that are formed in actuator 9011. The stress relief apertures of FIG. 69 are curved and are substantially parallel to each other. The number of the stress relief apertures may differ from four, the slots may have any shape or size and may differ from each other. In some of the previous figures the piezoelectric element was positioned above the substrate. It should be noted that the piezoelectric element may be positioned below the substrate. Piezoelectric elements may be positioned below and above the substrate.

Figure 70:
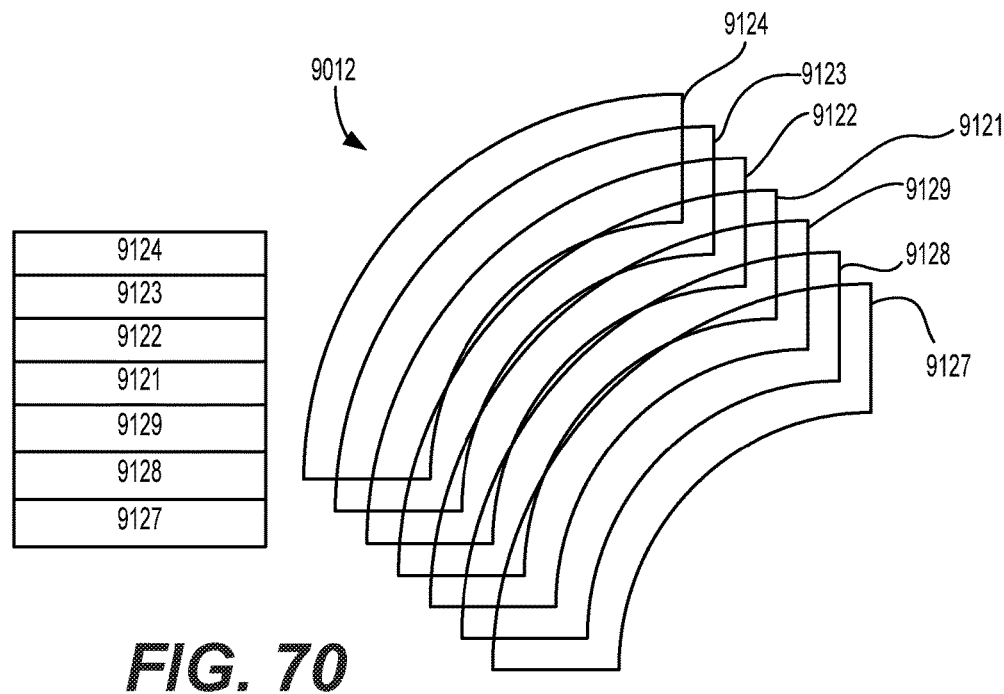

FIG. 70 illustrates actuator 9012 as including seven major layers: external electrode layer 9124, piezoelectric layer 9123, internal electrode layer 9122, substrate (or body) layer 9121, additional internal electrode layer 9129, additional piezoelectric layer 9128, and additional external electrode layer 9127. External electrode layer 9124, piezoelectric layer 9123 and internal electrode layer 9122 are positioned above substrate layer 9121. Additional internal electrode layer 9129, additional piezoelectric layer 9128, and additional external electrode layer 9127 are positioned below substrate layer 9121. The additional piezoelectric layer 9128 may equal the piezoelectric layer 9123 or may differ from the piezoelectric layer 9123 by at least one out of size, shape and the like. Specifically, any of the electrode layers may be the same or may differ from each other. Additional piezoelectric layer 9128 and piezoelectric layer 9123 may be controlled independently from each other or in a dependent manner. Additional piezoelectric layer 9128 may also be used for bending the actuator downwards while piezoelectric layer 9123 may be used for bending the actuator upwards. The additional piezoelectric layer 9128 may be used as a dummy piezoelectrical sensor (for monitoring the actuator) when the piezoelectric layer 9123 is activated for bending the actuator. In one example, the piezoelectric layer 9122 may be used as a dummy piezoelectrical sensor (for monitoring the actuator) when the piezoelectric layer 9128 is activated for bending the actuator.

Figure 71:
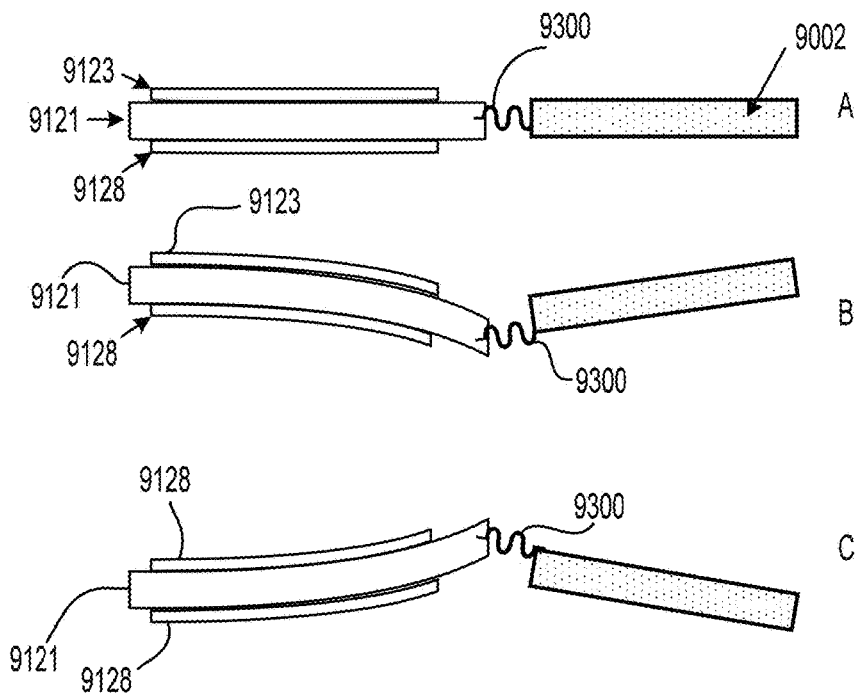

FIG. 71 illustrates, from top to bottom, (i) an idle state of mirror 9002, (ii) a downward bent actuator that lowers the circumference of MEMS mirror 9002, and (iii) an upward bent actuator that elevates the circumference of MEMS mirror 9002. MEMS mirror 9002 is coupled to the actuator via interconnect 9300. The MEMS mirror 9002 may include a thin reflecting surface that is reinforced by reinforcing elements.

Figure 72:
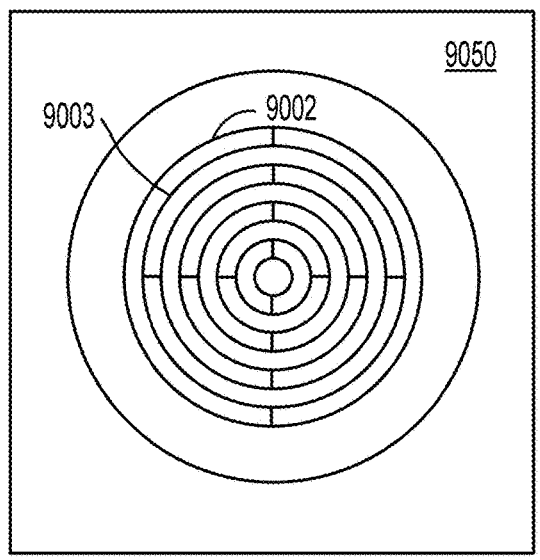
Figure 73:
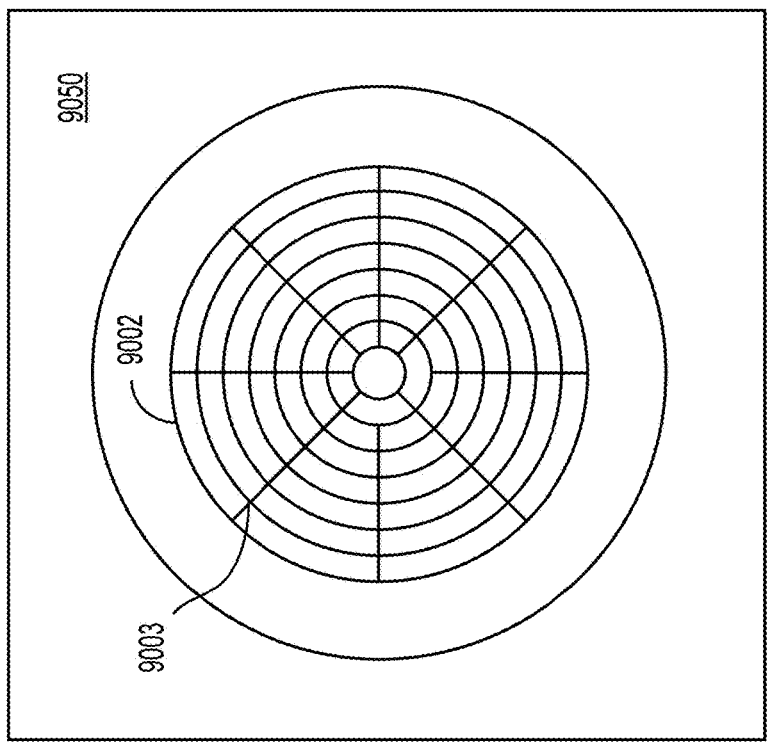

FIGS. 72 and 73 illustrate frame 9050 and a backside of MEMS mirror 9002. For simplicity of explanation the actuators are not shown. The reinforcing elements 9003 include concentric rings and radial segment. Any arrangement and shapes of reinforcing elements may be provided.

The orientation of the MEMS mirror may be monitored by illuminating the backside of the MEMS mirror 9002. It may be beneficial to illuminate at least one area of the MEMS mirror and to sense reflected light in at least three locations. The orientation of the MEMS mirror may be monitored by illuminating the backside of the MEMS mirror 9002. It may be beneficial to illuminate at least one area of the back side of the MEMS mirror and to sense reflected light in at least three locations. It is noted that LIDAR system 100 may include a dedicated light source for illuminating the back side of the MEMS mirror. The dedicated light source (e.g., LED) may be located behind the mirror (i.e., away from its main reflective sensor used for the deflection of light from the at least one light source 112). Alternatively, LIDAR system 100 may include optics to direct light onto the back side of the mirror. In some examples, light directed at the back side of the MEMS mirror (e.g. light of the dedicated light source) is confined to a backside area of the mirror, and prevented from reaching the main reflective side of the MEMS mirror. The processing of the signals of the back side sensors may be executed by processor 118, but may also be processed by a dedicated circuitry integrated into a chip positioned within a casing of the mirror. The processing may include comparing the reflected signals to different back side sensors (e.g. 9231, 9232, 9233), subtracting such signals, normalizing such signals, etc. The processing of such signals may be based on information collected during a calibration phase.

Figure 74:
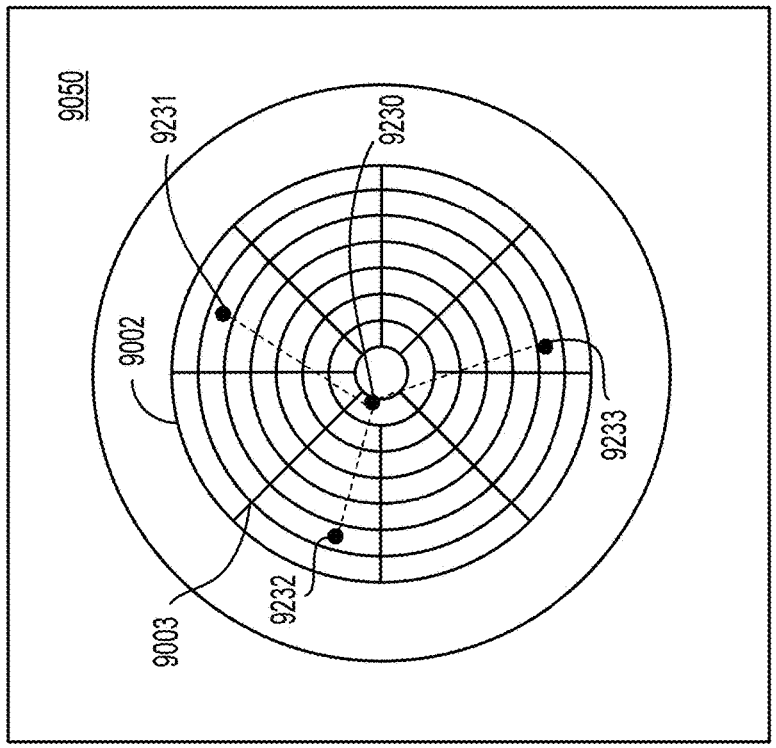

FIG. 74 illustrates an illuminated region 9030 and three sensors 9231, 9232 and 9233 that are positioned below the MEMS mirror and are arranged to sense light that is reflected (dashed lines) at three different directions thereby allowing to sense the orientation of the MEMS mirror. The illuminated region may be located anywhere at the backside of the MEMS mirror, and may have any shape and size. In embodiment, the MEMS mirror may not be parallel to a window of the Lidar system. The MEMS mirror may receive a light that passes through a window of the Lidar system and deflects the reflected mirror to provide deflected light that may pass through the window and reach other components (such as light sensors) of the Lidar system. A part of the deflected light may be reflected (by the window) backwards—toward the MEMS mirror, the frame or the actuators. However, when the MEMS mirror and the window are parallel to each other the light may be repetitively reflected by the MEMS mirror and the window thereby generating unwanted light artifacts. These light artifacts may be attenuated and even prevented by providing a window that is not parallel to the MEMS mirror or when the optical axis of the MEMS mirror and the optical axis of the window are not parallel to each other. When either one of the MEMS mirror and the window are curved or have multiple sections that are oriented to each other—then it may be beneficial that no part of the MEMS mirror should be parallel to any part of the window. The angle between the window and the MEMS mirror may be set so that the window does not reflect light towards the MEMS mirror, when the MEMS mirror is at an idle position or even when the MEMS mirror is moved by any of the actuators.

It is noted that illuminating a backside of the MEMS mirror may be implemented when the back of the mirror is substantially uniformly reflective (e.g. a flat back, without reinforcement ribs). However, this is not necessarily the case, and the back of the mirror may be design to reflect light in a patterned non-uniform way. The patterned reflection behavior of the back side of the mirror may be achieved in various way, such as surface geometry (e.g. protrusions, intrusions), surface textures, differing materials (e.g., Silicon, Silicon Oxide, metal), and so on. Optionally, the MEMS mirror may include a patterned back side, having a reflectivity pattern on at least a part of the back surface of the mirror, which cast a patterned reflection of the back side illumination (e.g. from the aforementioned back side dedicated light source) onto the back side sensors (e.g. 9231, 9232, 9233). The patterned back side may optionally include parts of the optional reinforcing elements 9003 located at the back of the MEMS mirror, but this is not necessarily so. For example, the reinforcing elements 9003 may be used to create shadows onto the sensors 9231 etc. at some angles (or to deflect the light to a different angle), which means that movement of the mirror would change the reflection on the sensor from shadowed to bright.

Optionally, the processing of the outputs of the backside sensors (9231, 9232, 9233 etc.) may take into account a reflectivity pattern of the backside (e.g. resulting from the pattern of the reinforcement ribs). Thus, the processing may use the patterning resulting from the backside surface pattern as part of the feedback being processed. Optionally, the backside mirror feedback option discussed herein may utilize a backside reflectivity pattern which can be processed by data from backside sensors which are located in greater proximity to the mirror (comparing to the uniform reflectivity implementation), which reduce the size of the MEMS assembly and improves its packaging. For example, the back side pattern may de designed so that the reflection pattern includes sharp transitions between dark and bright reflections. Those sharp transitions mean that even small changes in the angle/position of the MEMS mirror would cause significant changes in the light reflected to detectors which are positioned in even close distance. In addition, the reflectivity pattern may be associated with a reflectivity gradient, not sharp edges (i.e.—light or shadow). This embodiment, may have linearity from the first option of sharp edges, thus it may ease the post-processing process, and also support a larger angles range and will probably be less sensitive to assembly tolerances.

MEMS Mirror that is not Parallel to a Window of the LIDAR System

Consistent with the present disclosure, the MEMS mirror may receive a light that passes through a window of the LIDAR system and deflects the reflected mirror to provide deflected light that may pass through the window and reach other components (such as light sensors) of LIDAR system 100. A part of the deflected light may be reflected (by the window) backwards, toward the MEMS mirror, the frame or the actuators. When the MEMS mirror and the window are parallel to each other, the light may be repetitively reflected by the MEMS mirror and the window thereby generating unwanted light artifacts. These light artifacts may be attenuated and even prevented by providing a window that is not parallel to the MEMS mirror or when the optical axis of the MEMS mirror and the optical axis of the window are not parallel to each other. When either one of the MEMS mirror and the window are curved or have multiple sections that are oriented to each other, then it may be beneficial that no part of the MEMS mirror should be parallel to any part of the window. The angle between the window and the MEMS mirror may be set so that the window does not reflect light towards the MEMS mirror, when the MEMS mirror is at an idle position or even when the MEMS mirror is moved by any of the actuators.

Figure 75:
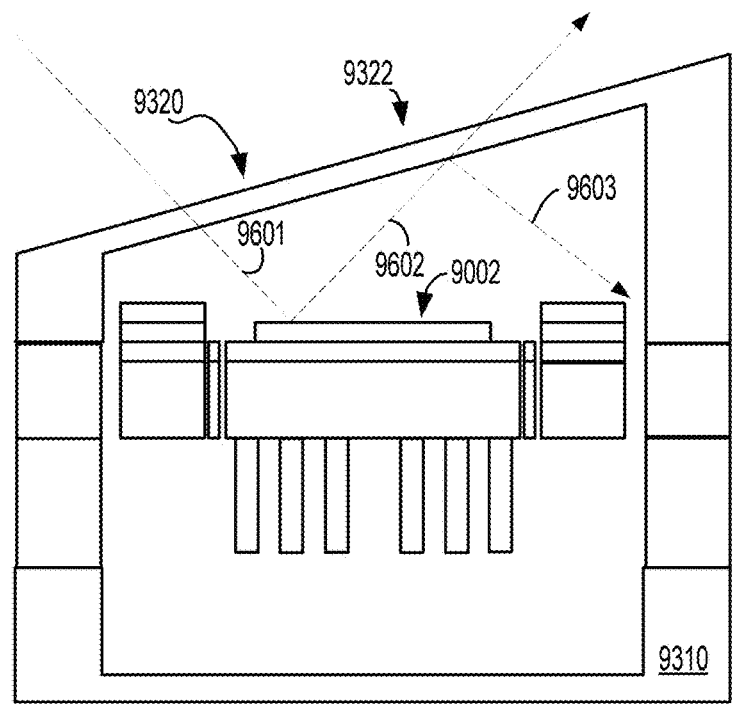

FIG. 75 illustrates a housing 9320 that includes window 9322. The housing encloses the MEMS mirror 9002. Housing 9320 may be a sealed housing that may be manufactured using wafer level packaging or any other technology. Housing 9320 includes a base 9310. Base 9310 may be transparent or not transparent. A transparent base may be useful when the backside of MEMS mirror 9002 is monitored by illumination. Light 9601 passes through window 9322 and impinges on MEMS mirror 9002. MEMS mirror 9002 deflects the light to provide a deflected light 9602. A part of the deflected light may pass through window 9322, but another part 9603 is reflected by mirror 9322 towards housing 9320. Accordingly, part 9603 may not reflected towards MEMS mirror 9002.

Figure 76:
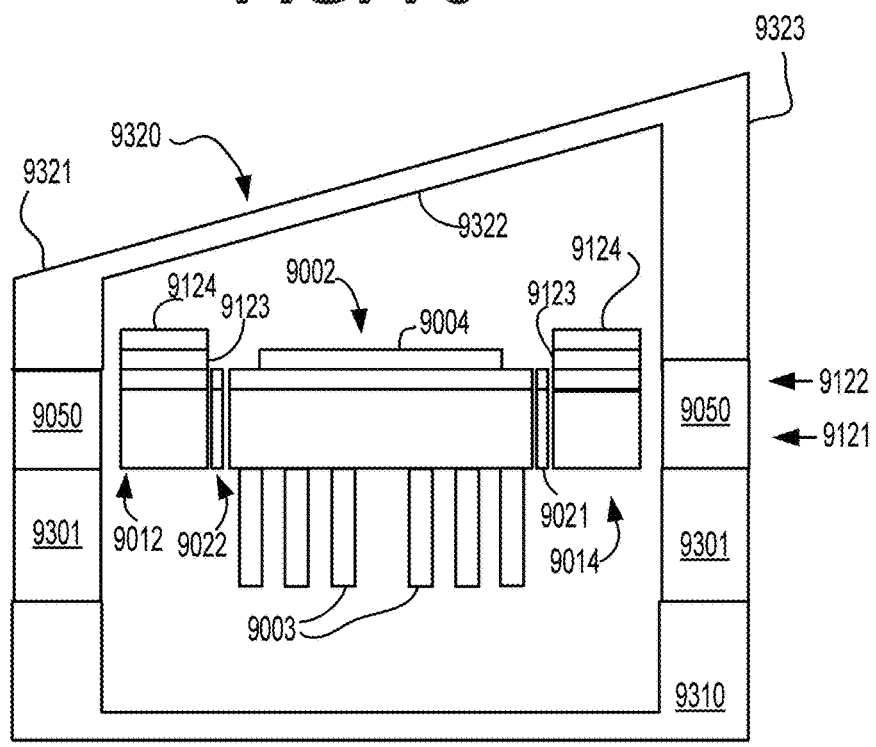

FIG. 76 illustrates the housing 9320 as including an upper part. The upper part includes mirror 9320 and two sidewalls 9321 and 9323. An intermediate part of the housing may be formed from the exterior part (such as but not limited to frame 9050) of an integrated circuit that includes various layers (such as 9121 and 9122). The integrated circuit may include MEMS mirror 9002 (having an upper reflecting surface 9004, various intermediate elements of layers 9121 and 9122, and reinforcing elements 9003), interconnects 9022 and 9021, actuators 9012 and 9014. A bonding layer 9301 may be positioned between the integrated circuit and base 9310.

Figure 77:
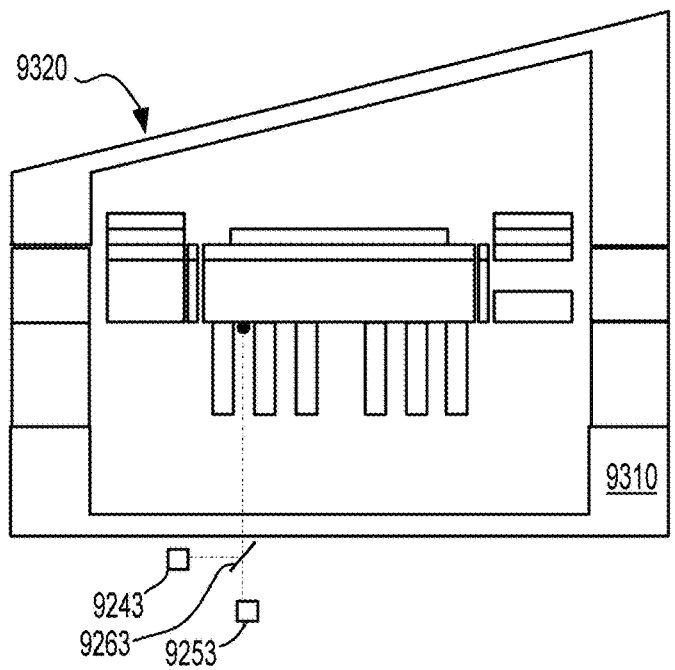

FIG. 77 illustrates the housing 9320 that includes a transparent base. For simplicity of explanation this figure illustrates illumination unit 9243, beam splitter 9263 and a sensor 9253. Illumination unit 9243 and the light sensor 9253 are positioned outside the housing.

Figure 78:
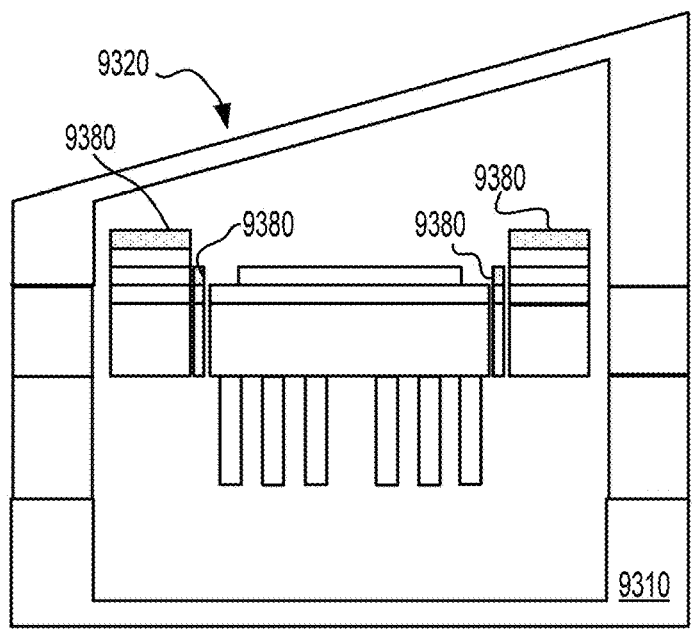
Figure 79:
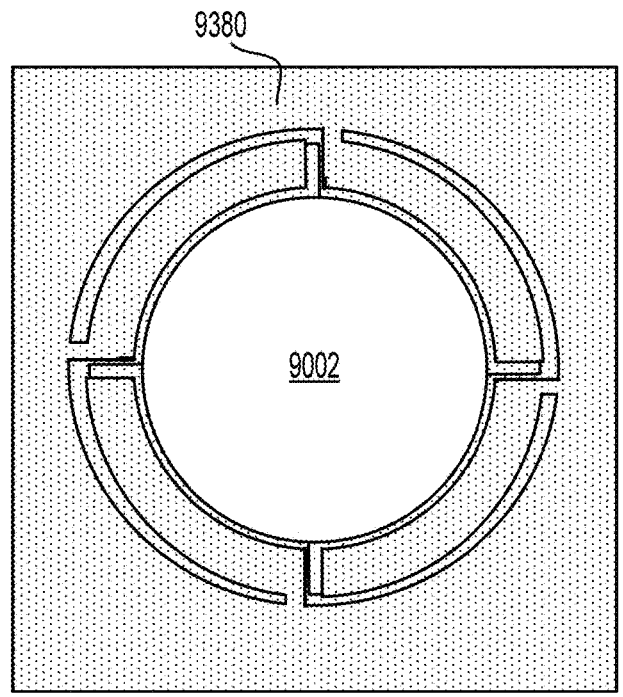
Figure 80:
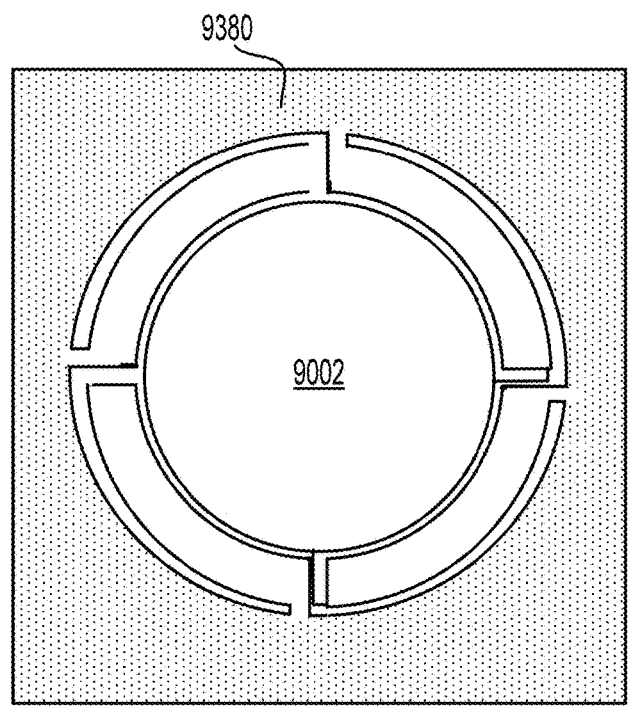

FIG. 78 illustrates an anti-reflective layer 9380 that is positioned on top of the actuators, and the interconnects. FIG. 79 illustrates anti-reflective layer 9380 that is positioned on top of the actuators, frame and the interconnects. FIG. 80 illustrates anti-reflective layer 9380 that is positioned on top of the frame. Any of the mentioned above anti-reflective layers may be replaced by one or more anti-reflective elements that may differ from a layer. The anti-reflective element may be parallel to the window, oriented in relation to the window, and the like.

Figure 81:
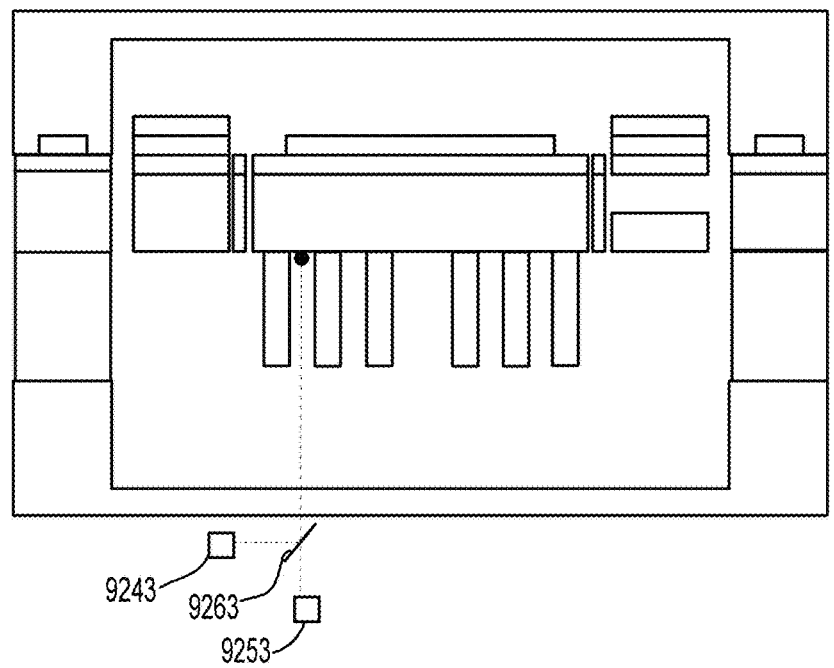

FIG. 81 illustrates a housing that has a window that is parallel to the MEMS window. The housing includes a transparent base. For simplicity of explanation this figure illustrates illumination unit 9243, beam splitter 9263 and a sensor 9253. Illumination unit 9243 and the light sensor 9253 are positioned outside the housing. The MEMS mirror may be of any shape or size. For example, the MEMS mirror may be rectangular.

Figure 82:
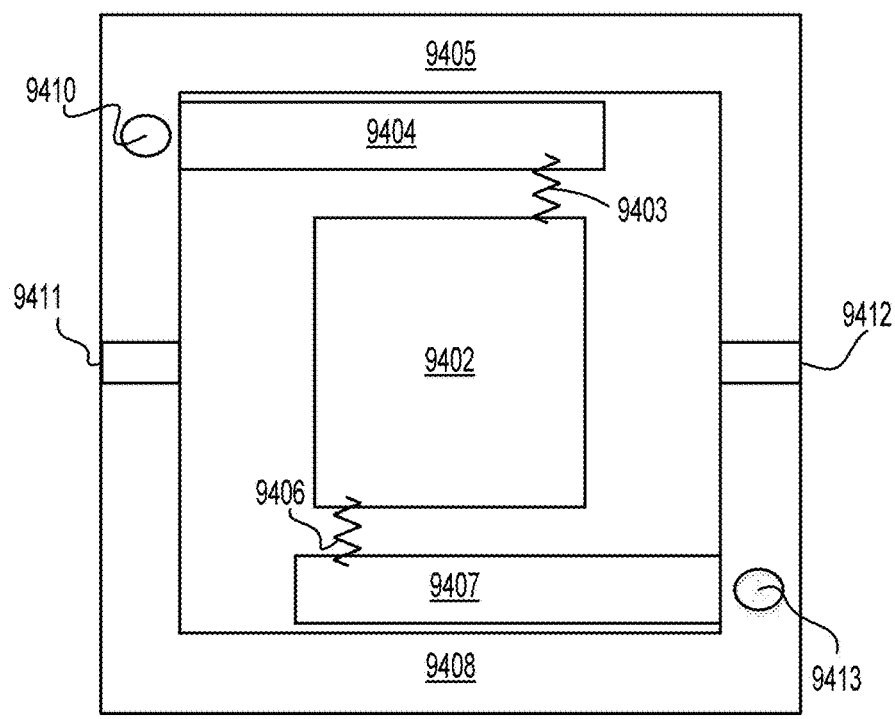
Figure 83:
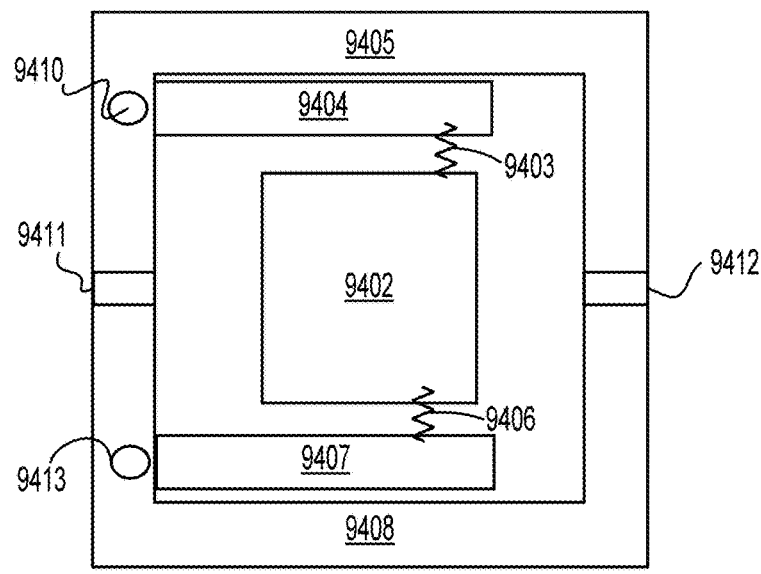

FIGS. 82 and 83 illustrate a rectangular MEMS mirror 9402, two actuators 9404 and 9407, two interconnects 9403 and 9406, electrodes 9410 and 9413, and a rectangular frame that includes an upper part 9504, a lower part 9408 and two insulating parts 9411 and 9422 that are connected between the upper and lower parts of the frame. In FIG. 82, actuators 9404 and 9407 are parallel to each other opposite, face opposite sides of the MEMS mirror and are connected to opposite parts of the frame. In FIG. 83, actuators 9404 and 9407 are parallel to each other opposite, face opposite sides of the MEMS mirror and are connected to the same side of the frame.

Figure 84:
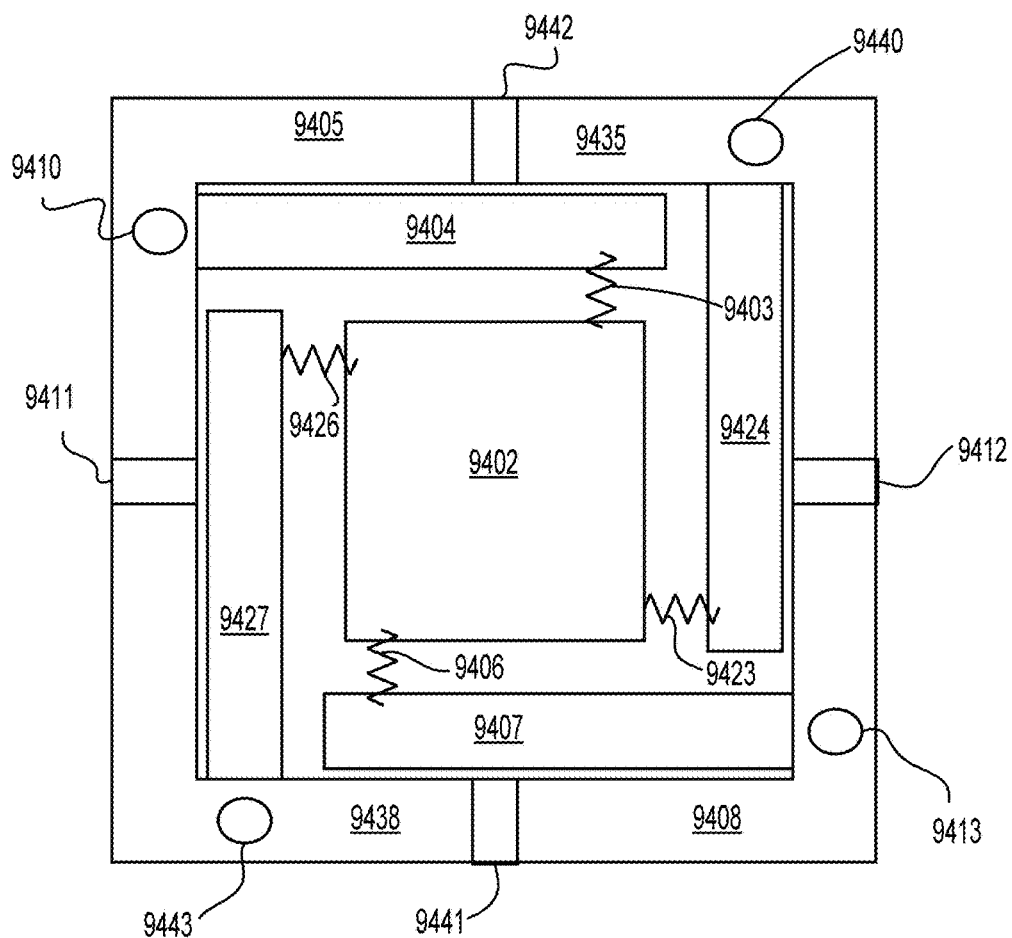

FIG. 84 illustrates a rectangular MEMS mirror 9402, four actuators 9404, 9407, 9424, 9427, four interconnects 9403, 9406, 9423 and 9436, four electrodes 9410, 9413, 9440 and 9443, and a rectangular frame that includes an upper part 9504, a lower part 9408 and two insulating parts 9411 and 9422 that are connected between the upper and lower parts of the frame. The four actuators face four facets of MEMS mirrors 9402 and each is connected to a different facet of the frame. Although FIGS. 56-84 illustrate a single MEMS mirror. LIDAR system 100 may include an array of multiple MEMS mirrors. Any number of MEMS mirrors may be monitored in order to provide feedback that is used to control any of the multiple MEMS mirrors. For example, if there are more N MEMS mirrors than any number between 1 and N, MEMS mirrors may be monitored to provide feedback that may be used for monitoring any number of MEMS mirrors of the N MEMS mirrors.

In one embodiment, LIDAR system 100 may include a window for receiving light; a microelectromechanical (MEMS) mirror for deflecting the light to provide a deflected light; a frame; actuators; interconnect elements that may be mechanically connected between the actuators and the MEMS mirror. Each actuator may include a body and a piezoelectric element. The piezoelectric element may be configured to bend the body and move the MEMS mirror when subjected to an electrical field. When the MEMS mirror is positioned at an idle positioned it may be oriented in relation to the window. The light may be reflected light that may be within at least a segment of a field of view of the LIDAR system. The light may be transmitted light from a light source of the LIDAR system. During a first period the light is a transmitted light from a light source of the LIDAR system and during a second period the light is reflected light that is within at least a segment of a field of view of the LIDAR system.

In another embodiment, LIDAR system 100 may include at least one anti-reflective element that may be positioned between the window and the frame The anti-reflective element may be oriented in relation to the window. The angle of orientation between the MEMS mirror and the window may range between 20 and 70 degrees. The window may be shaped and positioned to prevent a reflection of any part of the deflected light towards the MEMS mirror. The MEMS mirror may be oriented to the window even when moved by at least one of the actuators. An interconnect element of the interconnect elements may include a first segment that may be connected to the MEMS mirror and a second segment that may be connected to the actuator, wherein the first segment and the second segments may be mechanically coupled to each other.

In related embodiments: the first segment may be oriented by substantially ninety degrees to the second segment; the first segment may be connected to a circumference of the MEMS mirror and may be oriented by substantially ninety degrees to circumference of the MEMS mirror; the first segment may be directed towards a center of the MEMS mirror when the MEMS mirror is positioned at an idle position; the second segment connected to a circumference of the actuator and may be oriented by substantially ninety degrees to the circumference of the actuator; a longitudinal axis of the second segment may be substantially parallel to a longitudinal axis of the actuator; the first segment and the second segment may be arranged in an L-shape when the MEMS mirror is positioned at an idle position; the interconnect element may include at least one additional segment that may be mechanically coupled between the first and second segments; the first segment and the second segment may differ from each other by length; the first segment and the second segment may differ from each other by width; the first segment and the second segment may differ from each other by a shape of a cross section; the first segment and the second segment may be positioned at a same plane as the MEMS mirror when the MEMS mirror is positioned at an idle position. The first segment and the second segment may be positioned at a same plane as the actuators.

In another embodiment, LIDAR system 100 may include a MEMS mirror that may have an elliptical shape (e.g., the MEMS mirror may be circular), and wherein the actuators may include at least three independently controlled actuators. Each pair of actuator and interconnect elements may be directly connected between the frame and the MEMS mirror. The MEMS mirror may be operable to pivot about two axes of rotation.

In related embodiments, the actuators may include at least four independently controlled actuators; a longitudinal axis of the MEMS mirror corresponds to a longitudinal axis of the light beam; a longitudinal axis of MEMS mirror corresponds to a longitudinal axis of a detector array of the LIDAR system; the actuators may include a first pair of actuators that may be opposite to each other along a first direction and a second pair of actuators that may be opposite to each other along a second direction; the first pair of actuators may differ from the second pair of actuators; the window, the MEMS mirror, the frame and the actuators may form a unit; the unit may respond differently to mechanical vibration that propagate along the first direction and to mechanical vibrations that propagate along the second direction; the actuators of the first pair, when idle, may have a length that substantially differs from a length of the actuators of the second pair, when idle; the actuators of the first pair, when idle, may have a shape that substantially differs from a shape of the actuators of the second pair, when idle; during operation, the LIDAR system may be subjected to mechanical vibrations having a certain frequency range; the resonance frequency of a unit may be outside the certain frequency range; the resonance frequency of the unit may exceed a maximal frequency of the certain frequency range by a factor of at least two; the resonance frequency of the unit may be between four hundred hertz and one Kilohertz; an actuator may include a piezoelectric element that may be positioned below the body of the actuator and another actuator may include a piezoelectric element that may be positioned above the body of the other piezoelectric element; the actuator may include a piezoelectric element that may be positioned above the body of the piezoelectric element; the LIDAR system may further include a controller which may be configured to receive from the sensor an indication of the state of the additional piezoelectric element; the controller may be configured to control the actuator based on the indication of the state of the additional piezoelectric element; and the controller may be configured to determine an orientation of the MEMS mirror based on the indication of the state of the additional piezoelectric element.

In another embodiment, LIDAR system 100 may include a variable capacitor and a sensor. The capacitance of the variable capacitor represents a spatial relationship between the frame and an actuator of the actuators. the sensor may be configured to sense the capacitance of the variable capacitor.

In related embodiments, the variable capacitor may include a first plate that may be connected to the actuator and a second plate that may be connected to the frame. the spatial relationship between the frame and the actuator determines an overlap between the first plate and the second plate; the variable capacitor may include multiple first plates that may be connected to the actuator and multiple second plates that may be connected to the frame; the actuator has a first end that may be mechanically connected to the frame and a second end that may be opposite to the first end and may be mechanically connected to the interconnect element; a distance between the variable capacitor and the first end exceeds a distance between the variable capacitor and the second end; the actuator has a first end that may be mechanically connected to the frame and a second end that may be opposite to the first end and may be mechanically connected to the interconnect element; and a distance between the variable capacitor and the first end may be smaller than a distance between the variable capacitor and the second end.

In another embodiment, LIDAR system 100 may include a controller which may be configured to receive an indication of a capacitance of the variable capacitor and to determine an orientation of the MEMS mirror based on the capacitance of the variable capacitor. A piezoelectric element may be configured to bend the body and move the MEMS mirror when subjected to an electrical field induced by a control signal from a control signal source, the control signal may be fed to an electrode of the LIDAR system.

The control signal has an alternating bias component and a steering component. A bending of the body may be responsive to the steering components, wherein a frequency of the alternating bias component exceeds a maximal frequency of the steering component. The sensor may be configured to sense dielectric coefficient changes of the actuator due to the bending of the actuator.

In related embodiments, the sensor may be a current amplitude sensor; the sensor may also be a current amplitude sensor and a phase shift sensor; an amplitude of the alternating bias component may be lower than an amplitude of the steering component by a factor of at least one hundred; the LIDAR system may further include a controller which may be configured to receive information about the dielectric coefficient changes and to determine an orientation of the MEMS mirror; the window may belong to a housing. The housing may be a sealed housing that encloses the MEMS mirror, the frame, and the actuators; the housing may include a transparent region that may be positioned below the MEMS mirror; the LIDAR system may further include at least one optical sensor and at least one light source, the at least one light source may be configured to transmit at least one light beam through the transparent region and towards a backside of the MEMS mirror; the at least one optical sensor may be configured to receive light from the backside of the MEMS mirror; the LIDAR system may include a controller which may be configured to determine an orientation of the MEMS mirror based on information from the at least one optical sensor; different parts of the housing may be formed by wafer level packaging; the frame may belong to an integrated circuit that forms a bottom region of the housing; an interconnect element of the interconnect elements may include multiple segments that may be mechanically coupled to each other by at least one joint; the joint may be a ball joint; and the joint may also be a MEMS joint.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system for use with a roadway vehicle traveling on a highway, the LIDAR system comprising:
at least one processor configured to:
control at least one light source in a manner enabling light flux of light from at least one light source to vary over a scanning cycle of a field of view;
control at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway;
obtain input that the vehicle is in a mode corresponding to highway travel; and
in response to the input that the vehicle is in a mode corresponding to highway travel, coordinate the control of the at least one light source with the control of the at least one light deflector such that during scanning of the field of view that encompasses the central region, the right peripheral region, and the left peripheral region, light projected toward at least one field of view pixel associated with the central region is of a higher light intensity than a light intensity of light projected to the right peripheral region and to the left peripheral region.

2. The LIDAR system of claim 1, wherein the at least one processor is further configured to control the at least one light deflector such that during a scanning cycle of the field of view the at least one light deflector is located in a plurality of different instantaneous positions.

3. The LIDAR system of claim 2, wherein the at least one processor is configured to coordinate the at least one light deflector and the at least one light source such that when the at least one light deflector is located at a particular instantaneous position, a portion of a light beam is deflected by the at least one light deflector from the at least one light source towards an object in the field of view, and reflections of the portion of the light beam from the object are deflected by the at least one light deflector toward at least one sensor.

4. The LIDAR system of claim 2, further comprising a plurality of light sources aimed at the at least one light deflector, wherein the at least one processor is further configured to control the at least one light deflector such that when the at least one light deflector is located at a particular instantaneous position, light from the plurality of light sources is projected towards a plurality of independent regions in the field of view.

5. The LIDAR system of claim 1, wherein the at least one processor is further configured to receive the input that the vehicle is in a mode corresponding to highway travel from a navigation system of the vehicle.

6. The LIDAR system of claim 1, wherein the at least one processor is further configured to determine the input that the vehicle is in a mode corresponding to highway travel based on information received from at least one sensor configured to detect reflections of light associated with the light projected from the at least one light source.

7. The LIDAR system of claim 1, wherein the at least one processor is further configured to determine an existence of an object in the central region at a distance greater than detection distances associated with the right peripheral region and the left peripheral region.

8. The LIDAR system of claim 7, wherein the at least one processor is further configured to control the at least light source such that a detection distance in the central region is at least two times greater than the detection distances in the right peripheral region and in the left peripheral region.

9. The LIDAR system of claim 1, wherein the right peripheral region includes a plurality of subregions, and wherein the at least one processor is configured such that during a scan of the field of view, more light is directed to one of the plurality of sub-regions than to another of the plurality of sub-regions.

10. The LIDAR system of claim 1, wherein the at least one processor is further configured to determine a spatial light scanning pattern associated with a plurality of scanning cycles upon obtaining data indicative of a type of road on which the vehicle is traveling.

11. The LIDAR system of claim 10, wherein the type of road includes at least one of: an urban road, a highway road, an undivided road, a road with a single lane per direction, a road with a plurality of lanes per direction, and a road with a public transportation lane.

12. The LIDAR system of claim 11, wherein upon obtaining data indicative of a change of the type of road on which the vehicle is traveling, less light is directed to the central region and more light is directed to the right peripheral region and the left peripheral region compared to the light projected in a prior scanning cycle.

13. The LIDAR system of claim 10, wherein the at least one processor is further configured to alter the spatial light scanning pattern upon obtaining data indicative of a driving event, such that more light is directed to at least a portion of the right peripheral region than was directed to the at least a portion of the right peripheral region in a prior scanning cycle.

14. The LIDAR system of claim 13, wherein the driving event includes at least one of a traffic-related event, a road-related event, an approach to a predefined establishment, and a weather-related event.

15. The LIDAR system of claim 1, wherein the at least one processor is further configured to coordinate the control of the at least one light source with the control of the at least one light deflector such that during a first scanning cycle a light having a first light flux is directed to the central region and during a second scanning cycle light having a second light flux is directed to the central region, and wherein the second light flux is greater than the first light flux.

16. The LIDAR system of claim 1, wherein a detection range of the central region is greater than a detection range of the right peripheral region and a detection range of the left peripheral region.

17. The LIDAR system of claim 1, wherein the at least one field of view pixel corresponds to a portion of the field of view from which reflected light is translated into a single data point.

18. The LIDAR system of claim 1, wherein a higher number of pulses are projected toward at least one field of view pixel associated with the central region than projected to the right peripheral region and to the left peripheral region.

19. The LIDAR system of claim 18, wherein the at least one processor is further configured to:
control the at least one light deflector such that during a scanning cycle of the field of view the at least one light deflector is located in a plurality of different instantaneous positions; and
coordinate the at least one light deflector and the at least one light source such that when the at least one light deflector is located at a particular instantaneous position, a portion of a light beam is deflected by the at least one light deflector from the at least one light source towards an object in the field of view, and reflections of the portion of the light beam from the object are deflected by the at least one light deflector toward at least one sensor.

20. The LIDAR system of claim 18, wherein the at least one processor is further configured to determine an existence of an object in the central region at a distance greater than detection distances associated with the right peripheral region and the left peripheral region.

21. The LIDAR system of claim 18, wherein the at least one processor is further configured to control the at least light source such that a detection distance in the central region is at least two times greater than the detection distances in the right peripheral region and in the left peripheral region.

22. The LIDAR system of claim 18, wherein the at least one processor is further configured to determine a spatial light scanning pattern associated with a plurality of scanning cycles upon obtaining data indicative of a type of road on which the vehicle is traveling, and wherein the type of road includes at least one of: an urban road, a highway road, an undivided road, a road with a single lane per direction, a road with a plurality of lanes per direction, and a road with a public transportation lane.

23. The LIDAR system of claim 18, wherein the at least one processor is further configured to alter the spatial light scanning pattern upon obtaining data indicative of a driving event, such that more light is directed to at least a portion of the right peripheral region than was directed to the at least a portion of the right peripheral region in a prior scanning cycle, and wherein the driving event includes at least one of a traffic-related event, a road-related event, an approach to a predefined establishment, and a weather-related event.

24. A method for detecting objects in a path of a vehicle using LIDAR, the method comprising:
controlling at least one light source in a manner enabling light flux of light from at least one light source to vary over a scanning cycle of a field of view;
controlling at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway;
obtaining input that the vehicle is in a mode corresponding to highway travel; and
in response to the input that the vehicle is in a mode corresponding to highway travel, coordinating the control of the at least one light source with the control of the at least one light deflector such that during scanning of the field of view that encompasses the central region, the right peripheral region, and the left peripheral region, light projected toward at least one field of view pixel associated with the central region is of a higher light intensity than a light intensity of light projected to the right peripheral region and to the left peripheral region.

25. The method of claim 24, wherein a higher number of pulses are projected toward at least one field of view pixel associated with the central region than projected to the right peripheral region and to the left peripheral region.

26. The method of claim 24, further comprising:
controlling the at least one light deflector such that during a scanning cycle of the field of view the at least one light deflector is located in a plurality of different instantaneous positions; and
coordinating the at least one light deflector and the at least one light source such that when the at least one light deflector is located at a particular instantaneous position, a portion of a light beam is deflected by the at least one light deflector from the at least one light source towards an object in the field of view, and reflections of the portion of the light beam from the object are deflected by the at least one light deflector toward at least one sensor.

27. The method of claim 24, further comprising:
determining an existence of an object in the central region at a distance greater than detection distances associated with the right peripheral region and the left peripheral region; and
controlling the at least light source such that a detection distance in the central region is at least two times greater than the detection distances in the right peripheral region and in the left peripheral region.

28. The method of claim 24, wherein a detection range of the central region is greater than a detection range of the right peripheral region and a detection range of the left peripheral region.

29. The method of claim 24, further comprising determining an existence of an object in the central region at a distance greater than detection distances associated with the right peripheral region and the left peripheral region.

30. The method of claim 24, wherein the right peripheral region includes a plurality of sub-regions, and wherein the at least one processor is configured such that during a scan of the field of view, more light is directed to one of the plurality of sub-regions than to another of the plurality of sub-regions.

31. The method of claim 24, further comprising determining a spatial light scanning pattern associated with a plurality of scanning cycles upon obtaining data indicative of a type of highway road in which the vehicle is traveling.

32. The method of claim 31, further comprising altering the spatial light scanning pattern upon obtaining data indicative of a driving event such that more light is directed to at least a portion of the left peripheral region than light was directed to the at least a portion of the right peripheral region in a prior scanning cycle.

33. A vehicle, comprising:
a vehicle body;
at least one processor located within the vehicle body and configured to:
control at least one light source in a manner enabling light flux of light from at least one light source to vary over a scanning cycle of a field of view;
control at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway;
obtain input that the vehicle is in a mode corresponding to highway travel; and
in response to the input that the vehicle is in a mode corresponding to highway travel, coordinate the control of the at least one light source with the control of the at least one light deflector such that during scanning of the field of view that encompasses the central region, the right peripheral region, and the left peripheral region, light projected toward at least one field of view pixel associated with the central region is of a higher light intensity than a light intensity of light projected to the right peripheral region and to the left peripheral region.

34. A vehicle, comprising:
a vehicle body;
at least one processor located within the vehicle body and configured to:
control at least one light source in a manner enabling light flux of light from at least one light source to vary over a scanning cycle of a field of view;
control at least one deflector to deflect light from the at least one light source in order to scan the field of view, wherein the field of view is dividable into a central region generally corresponding to the highway on which the vehicle is traveling, a right peripheral region generally corresponding to an area right of the highway, and a left peripheral region generally corresponding to an area left of the highway;
obtain input that the vehicle is in a mode corresponding to highway travel; and
in response to the input that the vehicle is in a mode corresponding to highway travel, coordinate the control of the at least one light source with the control of the at least one light deflector such that during scanning of the field of view that encompasses the central region, the right peripheral region, and the left peripheral region, light projected toward at least one field of view pixel associated with the central region is of a higher light intensity than a light intensity of light projected to the right peripheral region and to the left peripheral region, wherein a higher number of pulses are projected toward at least one field of view pixel associated with the central region than projected to the right peripheral region and to the left peripheral region; and
wherein the at least one processor is further configured to:
determine an existence of an object in the central region at a distance greater than detection distances associated with the right peripheral region and the left peripheral region; and
control the at least light source such that a detection distance in the central region is at least two times greater than the detection distances in the right peripheral region and in the left peripheral region.

* * * * *

UNITED STATES PATENT AND TRADEMARK OFFICE
CERTIFICATE OF CORRECTION

PATENT NO. : 10,310,088 B2
APPLICATION NO. : 15/861110
DATED : June 4, 2019
INVENTOR(S) : David Elooz et al.

Page 1 of 1

It is certified that error appears in the above-identified patent and that said Letters Patent is hereby corrected as shown below:

In the Claims

Column 187, Lines 13-14, "further configured to control the at least light source" should read
-- further configured to control the at least one light source --

Column 188, Lines 25-26, "further configured to control the at least light source" should read
-- further configured to control the at least one light source --

Column 189, Line 30, "controlling the at least light source" should read -- controlling the at least one light source --

Column 190, Line 61, "control the at least light source" should read -- control the at least one light source --

Signed and Sealed this
Ninth Day of July, 2019

Andrei Iancu
*Director of the United States Patent and Trademark Office*